US012544368B2

(12) United States Patent
Jordan et al.

(10) Patent No.: US 12,544,368 B2
(45) Date of Patent: Feb. 10, 2026

(54) COMPOSITIONS AND METHODS FOR REDUCING CANCER STEM CELLS

(71) Applicant: The Regents of the University of Colorado, A Body Corporate, Denver, CO (US)

(72) Inventors: Craig Jordan, Aurora, CO (US); Clayton Smith, Aurora, CO (US); Courtney L. Jones, Aurora, CO (US); Brett Stevens, Aurora, CO (US)

(73) Assignee: THE REGENTS OF THE UNIVERSITY OF COLORADO, A BODY CORPORATE, Denver, CO (US)

( * ) Notice: Subject to any disclaimer, the term of this patent is extended or adjusted under 35 U.S.C. 154(b) by 1018 days.

(21) Appl. No.: 17/284,545

(22) PCT Filed: Oct. 15, 2019

(86) PCT No.: PCT/US2019/056205
§ 371 (c)(1),
(2) Date: Apr. 12, 2021

(87) PCT Pub. No.: WO2020/077353
PCT Pub. Date: Apr. 16, 2020

(65) Prior Publication Data
US 2021/0315878 A1 Oct. 14, 2021

Related U.S. Application Data

(60) Provisional application No. 62/774,090, filed on Nov. 30, 2018, provisional application No. 62/752,796, filed on Oct. 30, 2018, provisional application No. 62/744,737, filed on Oct. 12, 2018.

(51) Int. Cl.
| | |
|---|---|
| *A61P 35/02* | (2006.01) |
| *A61K 31/336* | (2006.01) |
| *A61K 31/4545* | (2006.01) |
| *A61K 31/55* | (2006.01) |
| *A61K 31/635* | (2006.01) |
| *A61K 31/706* | (2006.01) |
| *A61K 45/06* | (2006.01) |

(52) U.S. Cl.
CPC ........ *A61K 31/4545* (2013.01); *A61K 31/336* (2013.01); *A61K 31/55* (2013.01); *A61K 31/635* (2013.01); *A61K 31/706* (2013.01); *A61K 45/06* (2013.01); *A61P 35/02* (2018.01)

(58) Field of Classification Search
CPC ..... A61P 35/02; A61K 31/635; A61K 31/336; A61K 31/55; A61K 31/706
See application file for complete search history.

(56) References Cited

U.S. PATENT DOCUMENTS

| | | |
|---|---|---|
| 2018/0303815 A1 | 10/2018 | Merchant et al. |
| 2022/0136068 A1 | 5/2022 | Smith et al. |
| 2023/0383357 A1 | 11/2023 | Jordan et al. |

FOREIGN PATENT DOCUMENTS

| | | |
|---|---|---|
| WO | WO-2009073885 A1 | 6/2009 |
| WO | WO-2016181093 A1 | 11/2016 |
| WO | WO-2020077353 A3 | 7/2020 |

OTHER PUBLICATIONS

Chen et al., "Activities and Mechanism Based Combinations of Omacetaxine In Acute Myeloid Leukemia", 2013, Blood, 122, pp. 1-2 (Year: 2013).*
Pollyea et al., "Relapsed Acute Myeloid Leukemia Is Less Sensitive to Venetoclax plus Azacitidine Due to Leukemia Stem Cell Resistance Driven by Fatty Acid Metabolism and Can be Overcome by Pharmacologic Inhibition of CPT1", 2018, Blood, 132, pp. 432-434. (Year: 2018).*
Samudio et al., "Pharmacologic inhibition of fatty acid oxidation sensitizes human leukemia cells to apoptosis induction", 2010, The Journal of Clinical Investigation, 120, pp. 142-156. (Year: 2010).*
Pollyea et al., "Therapeutic targeting of acute myeloid leukemia stem cells". 2017, Blood, 129, pp. 1627-1635 (Year: 2017).*
Pollyea et al., "Results of a phase 1b study of venetoclax plus decitabine or azacitidine in untreated acute myeloid leukemia patients ≥ 65 years ineligible for standard induction therapy." 2016, Journal of Clinical Oncology, 34, Abstract only (Year: 2016).*
Nahimana et al., "The NAD biosynthesis inhibitor APO866 has potent antitumor activity against hematologic malignancies", 2009, Blood, 113, pp. 3276-3286 (Year: 2009).*
Omecetaxine Monograph, "Omacetaxine Mepesuccinate (Synribo)", 2015, VA Pharmacy Benefits Management Services, pp. 1-15 (Year: 2015).*
Song et al., "Hybrid, sequential and concomitant therapies for Helicobacter pylori eradication: A systematic review and meta-analysis", 2016, World Journal of Gastroenterology, pp. 4766-4775 (Year: 2016).*
Stevens et al., "Characterization and targeting of malignant stem cells in patients with advanced myelodysplastic syndromes", 2018, Nature Comunications, 9, pp. 1-14 (Year: 2018).*
Al Ali et al., "Venetoclax Combination with Hypomethylating Agents for Treatment of Myelodysplastic Syndromes", Sep. 2019, Clinical Lymphoma Myeloma & Leukemia, S339-S340 (Year: 2019).*
Short et al., "A Phase II Trial of Omacetaxine Mepesuccinate for Patients with High-Risk Myelodysplastic Syndrome after Failure of Hypomethylating Agents", 2016, Blood, 128, 4 pages (Year: 2016).*
Carter et al., "Combined targeting of BCL-2 and BCR-ABL tyrosine kinase eradicates chronic myeloid leukemia stem cells", Sep. 7, 2016; 8(355): 15 pages.

(Continued)

*Primary Examiner* — Jeffrey H Murray
*Assistant Examiner* — Madeline E Braun
(74) *Attorney, Agent, or Firm* — Foley & Lardner LLP

(57) ABSTRACT

Compositions and methods for reducing cancer stem cells and/or treating cancer are provided. In some aspects, the compositions and methods can comprise at least one metabolism modulating agent. In other aspects, the compositions and methods can comprise at least two metabolism modulating agents.

12 Claims, 135 Drawing Sheets

(56) References Cited

OTHER PUBLICATIONS

Chen et al., "Activities and Mechanism Based Combinations of Omacetaxine In Acute Myeloid Leukemia", Blood. Nov. 15, 20135; 122(21): 2 pages.

Chowdhury "Venetoclax in combination with NAMPT inhibitors decreases mitochondrial bioenergetics through the impaired AMPK/SIRT/PGCI[alpha] signaling pathway in CLL", Blood. Nov. 2, 20189; 132: p. 1368-1370.

Ginet et al., "A critical role of autophagy in antileukemia/lymphoma effects of AP0866, an inhibitor of NAD biosynthesis", Autophagy. Apr. 14, 2014; 10(4): 603-17.

International Search Report and Written Opinion issued Jun. 25, 2020 for PCT/US2019/056205, 25 pages.

Jones et al., "Inhibition of Amino Acid Metabolism Selectively Targets Hum Leukemia Stem Cells", Blood, vol. 132, No. Suppl. 1, 2018, p. 1521-1523.

Konopleva et al., "Efficacy and Biological Correlates of Response in a Phase II Study of Venetoclax Monotherapy in Patients with Acute Myelogenous Leukemia", Cancer Discovery. Oct. 1, 2016; 6(10): 1106-17.

Kuntz et al., "Targeting mitochondrial oxidative phosphorylation eradicates therapy-resistant chronic myeloid leukemia stem cells", Nature Medicine. Oct. 1, 2017; 23(10): 1234-40.

Lagadinou et al., "BCL-2 inhibition targets oxidative phosphorylation and selectively eradicates quiescent human leukemia stem cells", Cell Stem Cell. Mar. 7, 2013; 12(3): 329-41.

Nguyen et al., "Inhibition of ROS-Induced Nrf2 Antioxidant Pathway Activation May Explain Synergy between Venetoclax and Hypomethylating Agents Against Acute Myeloid Leukemia", Blood, vol. 130, No. Suppl. 1, 2017, 2 pages.

Pollyea et al., "Relapsed Acute Myeloid Leukemia Is Less Sensitive to Venetoclax plus Azacitidine Due to Leukemia Stem Cell Resistance Driven by Fatty Acid Metabolism and Can be Overcome by Pharmacologic Inhibition of CPT1", Blood. Nov. 29, 2018; 132: 432-434.

Pollyea et al., "Venetoclax with azacitidine disrupts energy metabolism and targets leukemia stem cells in patients with acute myeloid leukemia", Nature Medicine. Dec. 2018; 24(12): 1859-66.

Pollyea et al., "Venetoclax (Ven) with Azacitidine (Aza) for Untreated Elderly Acute Myeloid Leukemia (AML) Patients (Pts) Unfit for Induction Chemotherapy: Single Center Clinical Experience and Mechanistic Insights from Correlative Studies", Blood. Dec. 8, 2017; 130: 181-183.

Samudio et al., "Pharmacologic inhibition of fatty acid oxidation sensitizes human leukemia cells to apoptosis induction", The Journal of Clinical Investigation. Jan. 4, 2010; 120(1): 142-56.

Sharma et al., "Shutting Down Acute Myeloid Leukemia and Myelodysplastic Syndrome with BCL-2 Family Protein Inhibition". Current Hematologic Malignancy Reports. Aug. 2018; 13: 256-64.

Stevens et al., "Characterization and targeting of malignant stem cells in patients with advanced myelodysplastic syndromes", Nature Communications. Sep. 12, 2018; 9(1): 3694-3707.

Dinardo et al., "Safety and preliminary efficacy of venetoclax with decitabine or azacitidine in elderly patients with previously untreated acute myeloid leukaemia: a non-randomised, open-label, phase 1b study". The Lancet Oncology. Feb. 1, 2018; 19(2): 216-28.

Gatta et al., "Acute effects of pharmacological modifications of fatty acid metabolism on human satiety". Br J Nutr. Jun. 2009;101(12): 1867-77. Epub Dec. 16, 2008.

Hinderling et al., "The effect of etomoxir on 24-h substrate oxidation and satiety in humans". Am J Clin Nutr. Jul. 2002; 76(1): 141-7.

Ho et al., "Evolution of acute myelogenous leukemia stem cell properties after treatment and progression". Blood. Sep. 29, 2016; 128(13): 1671-8.

Holubarsch et al., "A double-blind randomized multicentre clinical trial to evaluate the efficacy and safety of two doses of etomoxir in comparison with placebo in patients with moderate congestive heart failure: the ERGO (etomoxir for the recovery of glucose oxidation) study". Clin Sci (Lond). Aug. 2007; 113(4): 205-12.

Jones et al., "Inhibition of Amino Acid Metabolism Selectively Targets Human Leukemia Stem Cells". Cancer Cell. Nov. 12, 2018; 34(5): 724-740.

Jones et al., "Leukemia Stem Cells in Relapsed AML Patients Are Uniquely Dependent on Nicotinamide Metabolism". Blood. Nov. 29, 2018; 132: pp. 1-4.

Kurtz et al., "Patterns of Sensitivity Exhibited By Venetoclax-Inclusive Drug Combinations in Acute Myeloid Leukemia". Blood. Nov. 13, 2019; 134: pp. 1-4.

Pei et al., "AMPK/FIS1-Mediated Mitophagy Is Required for Self-Renewal of Human AML Stem Cells". Cell Stem Cell. Jul. 5, 2018;23(1): 86-100. Epub Jun. 14, 2018.

Pei et al., "Monocytic subclones confer resistance to venetoclax-based therapy in patients with acute myeloid leukemia". Cancer Discovery. Apr. 1, 2020; 10(4): 536-51.

Pollyea et al., "Targeting acute myeloid leukemia stem cells: a review and principles for the development of clinical trials". Haematologica. Aug. 2014; 99(8): 1277-84.

Pollyea et al., "Therapeutic targeting of acute myeloid leukemia stem cells". Blood. Mar. 23, 2017; 129(12): 1627-1635.

Schmidt-Schweda et al., "First clinical trial with etomoxir in patients with chronic congestive heart failure". Clin Sci (Lond). Jul. 2000; 99(1): 27-35.

Schrauwen et al., "Uncoupling protein 3 as a mitochondrial fatty acid anion exporter". The FASEB Journal. Dec. 2003; 17(15): 2272-4.

Skanland et al., "An in vitro assay for biomarker discovery and dose prediction applied to ibrutinib plus venetoclax treatment of CLL". Leukemia. Feb. 2020; 34(2): 478-87.

Zhang et al., "Biomarkers predicting venetoclax sensitivity and strategies for venetoclax combination treatment". Blood. Nov. 29, 2018; 132: pp. 1-4.

Zhang et al., "Integrated analysis of patient samples identifies biomarkers for venetoclax efficacy and combination strategies in acute myeloid leukemia". Nat Cancer. Aug. 2020; 1(8): 826-839.

Jones et al. "Cysteine depletion targets leukemia stem cells through inhibition of electron transport complex II" Blood, The Journal of the American Society of Hematology (2019); 134(4):389-394.

Jones et al. "Nicotinamide metabolism mediates resistance to venetoclax in relapsed acute myeloid leukemia stem cells" Cell Stem Cell (2020); 27:1-17, 22 pages.

Jones et al. "Targeting energy metabolism in cancer stem cells: progress and challenges in leukemia and solid tumors" Cell Stem Cell (2021); 28(3):378-393.

Parrondo et al. "ABT-737, a small molecule Bcl-2/Bcl-xL antagonist, increases antimitotic-mediated apoptosis in human prostate cancer cells" PeerJ (2013); 1:e144, 22 pages.

Pei et al. "A novel type of monocytic leukemia stem cell revealed by the clinical use of venetoclax-based therapy" Cancer Discovery (2023); 13:1-18.

Souers et al. "ABT-199, a potent and selective BCL-2 inhibitor, achieves antitumor activity while sparing platelets" Nature Medicine including Online Methods (2013); 19(2):202-208, 9 pages.

Stevens et al. "Fatty acid metabolism underlies venetoclax resistance in acute myeloid leukemia stem cells" Nature Cancer (2020); 1(12):28 pages.

* cited by examiner

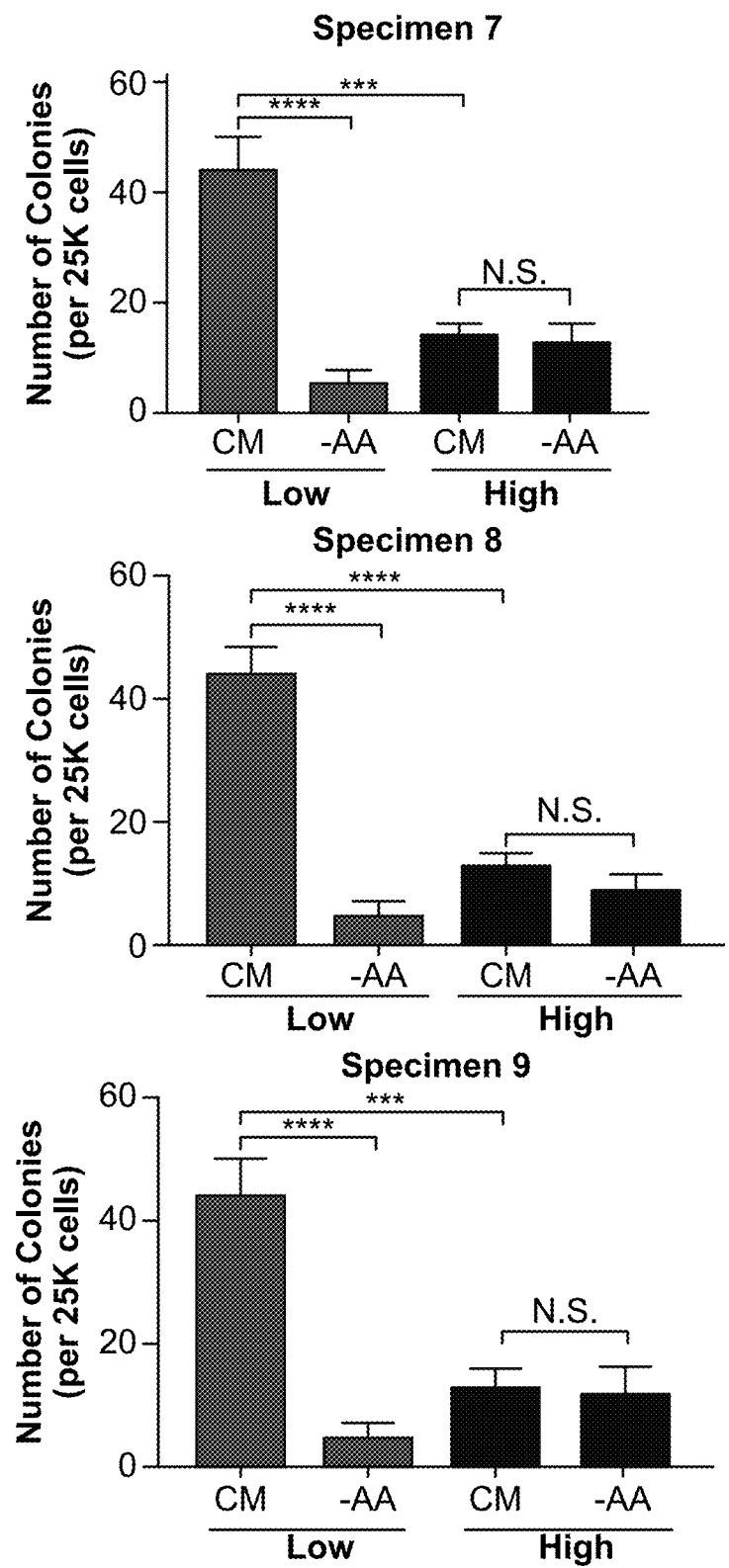
FIG. 6 (Cont. 1)

COMPOSITIONS AND METHODS FOR REDUCING CANCER STEM CELLS

RELATED APPLICATIONS

This application is a U.S. National Phase application, filed under U.S.C. § 371, of International Application No. PCT/US2019/056205, filed Oct. 15, 2019, which claims priority to, and the benefit of, U.S. Provisional Application No. 62/744,737, filed Oct. 12, 2018, U.S. Provisional Application No. 62/752,796, filed Oct. 30, 2018, and U.S. Provisional Application No. 62/774,090 filed Nov. 30, 2018. The contents of each of the aforementioned patent applications are incorporated herein by reference in their entireties.

GOVERNMENT LICENSE RIGHTS

This invention was made with government support under Grant Number R01CA200707 awarded by the National Institutes of Health. The government has certain rights in the invention.

BACKGROUND OF THE INVENTION

Within a population of cancer cells, there exists a distinct subset of cells known as cancer stems cells (CSCs). CSCs are capable of indefinite self-renewal and can differentiate into more mature cancer cells. Cancer patient prognosis is closely associated with CSC phenotype and biology. CSCs may be more resistant to traditional treatment methods including chemotherapy, radiation therapy, and other toxic therapies. Therefore, the CSCs can persist after initial treatment, leading to relapse and further metastases. Thus, there is a need in the art for compositions and methods for reducing and inducing cell death in cancer stem cells. The present disclosure addresses these needs.

SUMMARY OF THE INVENTION

The present disclosure provides a method of inducing cell death in cancer stem cells comprising administering an effective amount of a first metabolism modulating agent, an effective amount of a second metabolism modulating agent and an effective amount of an at least third metabolism modulating agent, wherein the first metabolism modulating agent is venetoclax, wherein the second metabolism modulating agent is azacitidine, wherein the at least third metabolism modulating agent is a compound set forth in Table 1, and wherein the first, second and at least third metabolism modulating agents are not the same compound.

The present disclosure provides a combination comprising a first metabolism modulating agent, a second metabolism modulating agent and an at least third metabolism modulating agent for use in inducing cell death in cancer stem cells, wherein the first metabolism modulating agent is venetoclax, wherein the second metabolism modulating agent is azacitidine, wherein the at least third metabolism modulating agent is a compound set forth in Table 1, and wherein the first, second and at least third metabolism modulating agents are not the same compound.

An at least third metabolism modulating agent can be etomoxir. An at least third metabolism modulating agent can be omacetaxine mepesuccinate An at least third metabolism modulating agent can be APO866.

The present disclosure provides a method of inducing cell death in cancer stem cells comprising administering an effective amount of a first metabolism modulating agent and an effective amount of an at least second metabolism modulating agent, wherein the first metabolism modulating agent is venetoclax, wherein the at least second metabolism modulating agent is a compound set forth in Table 1, and wherein the first and the at least second metabolism modulating agent are not the same compound.

The present disclosure provides a method of inducing cell death in cancer stem cells comprising administering an effective amount of a first metabolism modulating agent and an effective amount of an at least second metabolism modulating agent, wherein the first metabolism modulating agent is azacitidine, wherein the at least second metabolism modulating agent is a compound set forth in Table 1, and wherein the first and the at least second metabolism modulating agent are not the same compound.

The present disclosure provides a combination comprising a first metabolism modulating agent and an at least second metabolism modulating agent for use in inducing cell death in cancer stem cells, wherein the first metabolism modulating agent is venetoclax, wherein the at least second metabolism modulating agent is a compound set forth in Table 1, and wherein the first and the at least second metabolism modulating agent are not the same compound.

The present disclosure provides a combination comprising a first metabolism modulating agent and an at least second metabolism modulating agent for use in inducing cell death in cancer stem cells, wherein the first metabolism modulating agent is azacitidine, wherein the at least second metabolism modulating agent is a compound set forth in Table 1, and wherein the first and the at least second metabolism modulating agent are not the same compound.

An at least second metabolism modulating agent can be etomoxir. An at least second metabolism modulating agent can be omacetaxine mepesuccinate. An at least second metabolism modulating agent can be APO866.

The present disclosure provides a method of inducing cell death in cancer stem cells comprising administering an effective amount of at least one metabolism modulating agent, wherein the metabolism modulating agent is a compound set forth in Table 1.

The present disclosure provides a method of inducing cell death in cancer stem cells comprising administering an effective amount of at least one agent that modulates a cellular pathway, wherein the cellular pathway is a pathway set forth in Table 2.

The present disclosure provides a method of inducing cell death in cancer stem cells comprising administering an effective amount of venetoclax and an effective amount of at least one agent that modulates a cellular pathway, wherein the cellular pathway is a pathway set forth in Table 2.

The present disclosure provides a method of inducing cell death in cancer stem cells comprising administering an effective amount of azacitidine and an effective amount of at least one agent that modulates a cellular pathway, wherein the cellular pathway is a pathway set forth in Table 2.

The present disclosure provides a method of inducing cell death in cancer stem cells administering an effective amount of venetoclax, an effective amount of azacitidine, and at least one agent that modulates a cellular pathway, wherein the cellular pathway is a pathway set forth in Table 2.

The present disclosure provides at least one metabolism modulating agent for use in inducing cell death in cancer stem cells, wherein the metabolism modulating agent is a compound set forth in Table 1.

The present disclosure provides at least one agent that modulates a cellular pathway for use in inducing cell death in cancer stem cells, wherein the cellular pathway is a pathway set forth in Table 2.

The present disclosure provides a combination comprising venetoclax and at least one agent that modulates a cellular pathway for use in inducing cell death in cancer stem cells, wherein the cellular pathway is a pathway set forth in Table 2.

The present disclosure provides a combination comprising azacitidine and at least one agent that modulates a cellular pathway for use in inducing cell death in cancer stem cells, wherein the cellular pathway is a pathway set forth in Table 2.

The present disclosure provides a combination comprising venetoclax, azacitidine and at least one agent that modulates a cellular pathway for use in inducing cell death in cancer stem cells, wherein the cellular pathway is a pathway set forth in Table 2.

An at least one agent that modulates a cellular pathway can be etomoxir. An at least one agent that modulates a cellular pathway is omacetaxine mepesuccinate An at least one agent that modulates a cellular pathway can be APO866.

Cancer stems cells can be leukemia stem cells.

Inducing cell death in cancer stem cells can comprise the treatment of a cancer in a subject. Inducing cell death in cancer stem cells can result in the treatment of a cancer in a subject. A cancer can be acute myeloid leukemia.

The present disclosure provides a method of inducing cell death in cancer stem cells comprising administering an effective amount of at least one metabolism modulating agent, wherein the metabolism modulating agent is a compound set forth in Table 1.

The present disclosure provides a method of inducing cell death in cancer stem cells comprising administering an effective amount of a first metabolism modulating agent and an effective amount of an at least second metabolism modulating agent, wherein the first metabolism modulating agent is venetoclax, wherein the at least second metabolism modulating agent is a compound set forth in Table 1, and wherein the first and the at least second metabolism modulating agent are not the same compound.

The present disclosure provides a method of a method of inducing cell death in cancer stem cells comprising administering an effective amount of a first metabolism modulating agent, an effective amount of a second metabolism modulating agent and an effective amount of an at least third metabolism modulating agent, wherein the first metabolism modulating agent is venetoclax, wherein the second metabolism modulating agent is azacitidine, wherein the at least third metabolism modulating agent is a compound set forth in Table 1, and wherein the first, second and at least third metabolism modulating agents are not the same compound.

The present disclosure provides a method of a method of inducing cell death in cancer stem cells comprising administering an effective amount of at least one agent that modulates a cellular pathway, wherein the cellular pathway is a pathway set forth in Table 2.

The present disclosure provides a method of inducing cell death in cancer stem cells comprising administering an effective amount of venetoclax and an effective amount of at least one agent that modulates a cellular pathway, wherein the cellular pathway is a pathway set forth in Table 2.

The present disclosure provides a method of inducing cell death in cancer stem cells comprising administering an effective amount of venetoclax, an effective amount of azacitidine, and at least one agent that modulates a cellular pathway, wherein the cellular pathway is a pathway set forth in Table 2.

The cancer stems cells can be leukemia stem cells.

Any of the above aspects can be combined with any other aspect.

Unless otherwise defined, all technical and scientific terms used herein have the same meaning as commonly understood by one of ordinary skill in the art to which this disclosure belongs. In the Specification, the singular forms also include the plural unless the context clearly dictates otherwise; as examples, the terms "a," "an," and "the" are understood to be singular or plural and the term "or" is understood to be inclusive. By way of example, "an element" means one or more element. Throughout the specification the word "comprising," or variations such as "comprises" or "comprising," will be understood to imply the inclusion of a stated element, integer or step, or group of elements, integers or steps, but not the exclusion of any other element, integer or step, or group of elements, integers or steps. About can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Although methods and materials similar or equivalent to those described herein can be used in the practice or testing of the present disclosure, suitable methods and materials are described below. All publications, patent applications, patents, and other references mentioned herein are incorporated by reference in their entirety. The references cited herein are not admitted to be prior art to the claimed invention. In the case of conflict, the present Specification, including definitions, will control. In addition, the materials, methods, and examples are illustrative only and are not intended to be limiting. Other features and advantages of the disclosure will be apparent from the following detailed description and claim.

BRIEF DESCRIPTION OF THE DRAWINGS

The above and further features will be more clearly appreciated from the following detailed description when taken in conjunction with the accompanying drawings.

Each dot represents an individual patient sample treated in vitro. Graphs represent the mean+/−StDev. Statistical analysis was performed using two-tailed Student's t-test. ****$p<0.001$.

Figure 28:
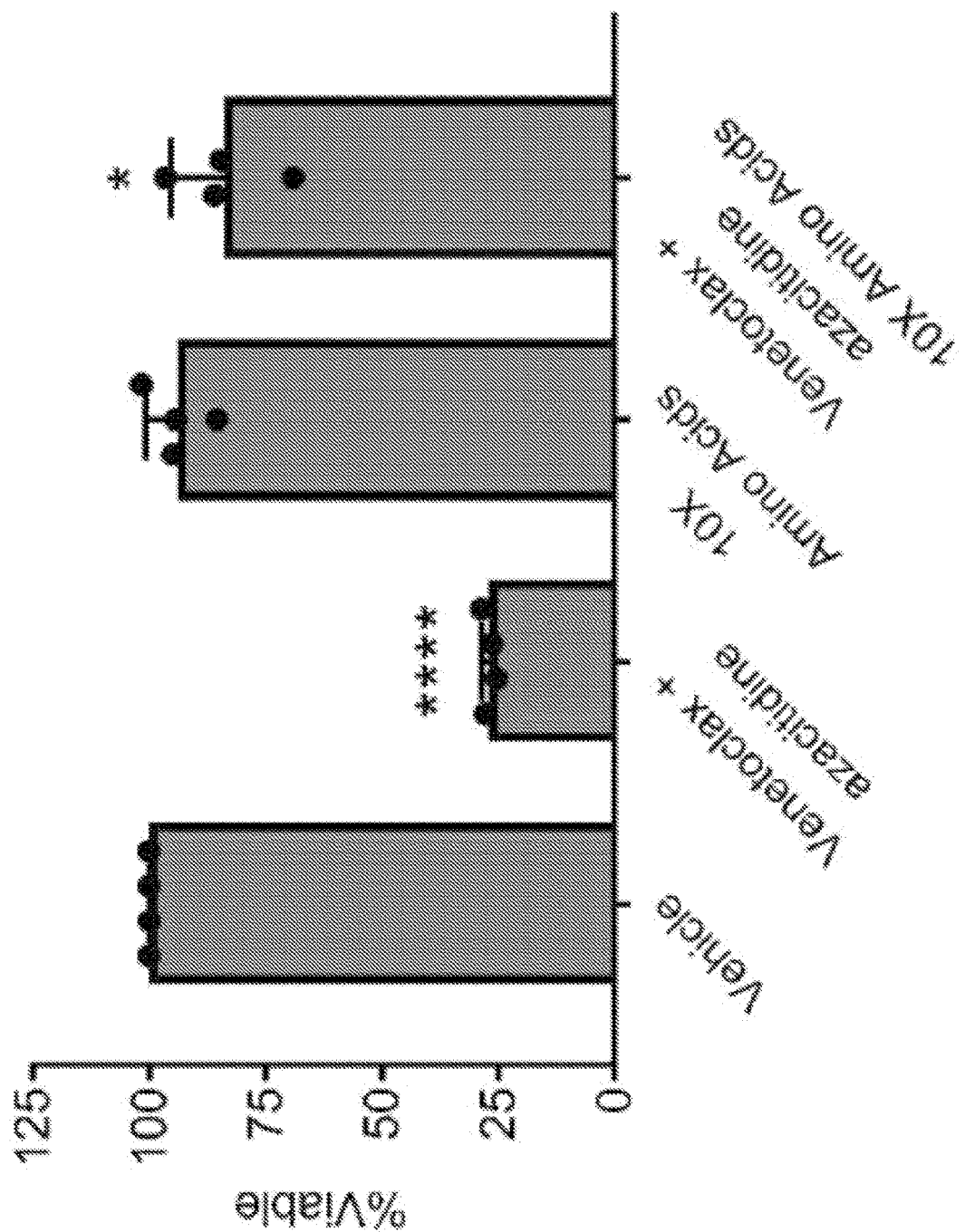

FIG. 28 is a chart showing the cell viability of ROS-low LSCs that were cultured in media containing ten times the levels of amino acids found in normal human plasma for 4 hours and then treated with vehicle or venetoclax (500 nM) and azacitidine (2.5 µM). Cell viability was measured at 24 hours. Each dot represents an individual patient sample treated in vitro. Graphs represent the mean+/−StDev. Statistical analysis was performed using two-tailed Student's t-test. ****$p<0.001$.

Figure 29:
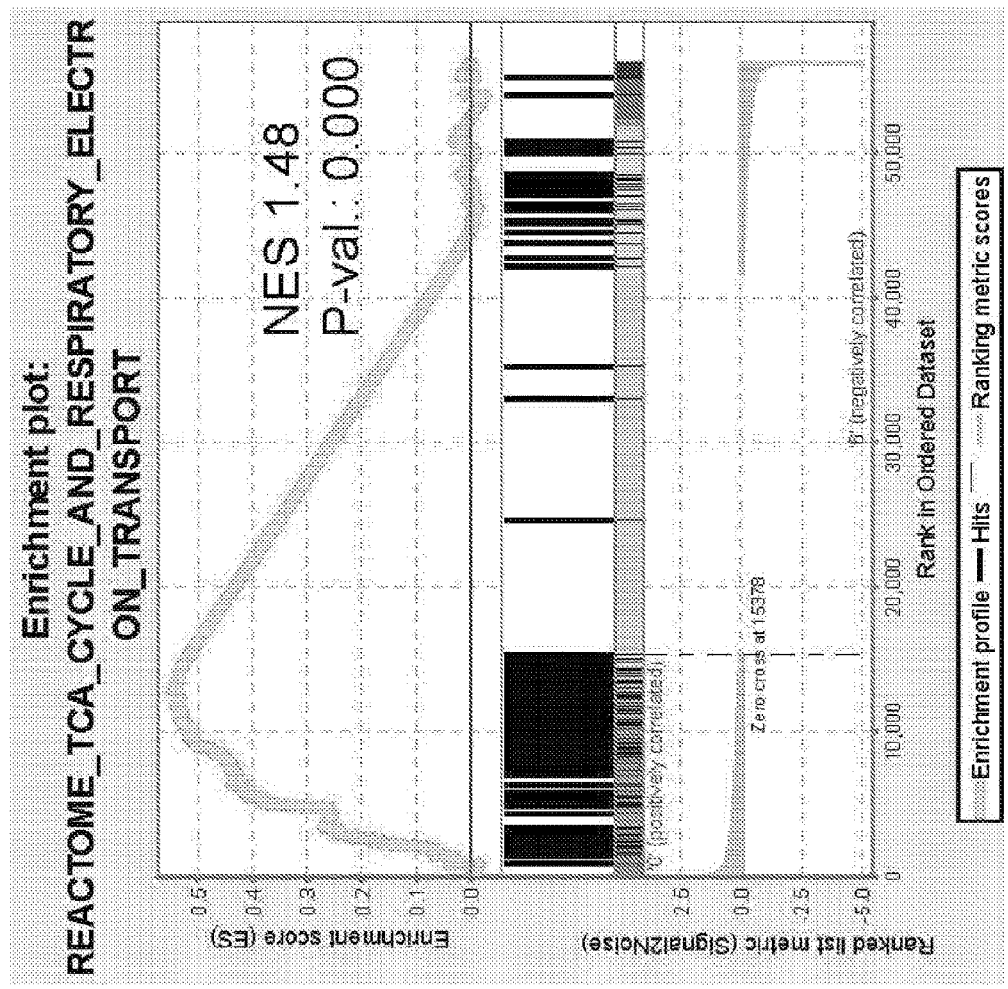

FIG. 29 is a gene set enrichment plot for OXPHOS related genes in LSCs pre and 5-7 hours post venetoclax+azacitidine treatment.

Figure 30:
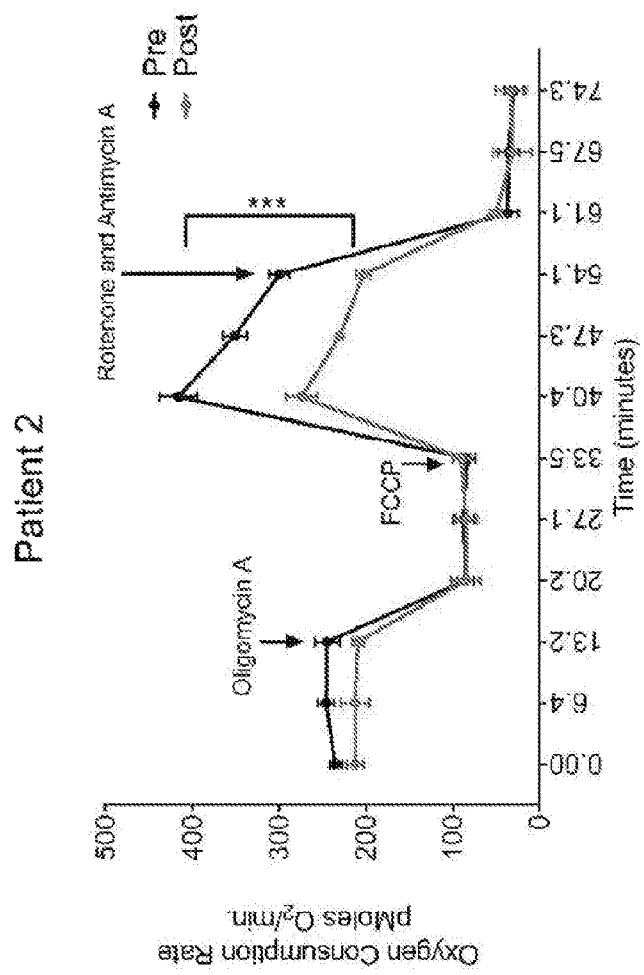
Figure 30:
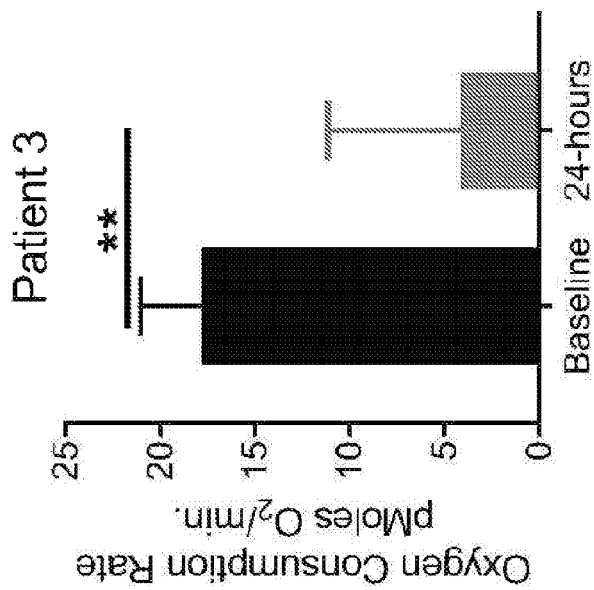

FIG. 30 is a series of charts showing (left chart) the basal oxygen consumption levels in AML blasts isolated from a patient pre and 24-hour post venetoclax+azacitidine treatment and (right chart) the basal and stressed oxygen consumption (OCR) levels in AML blasts isolated from a patient pre and 24 hours post venetoclax+azacitidine treatment.

Figure 31:
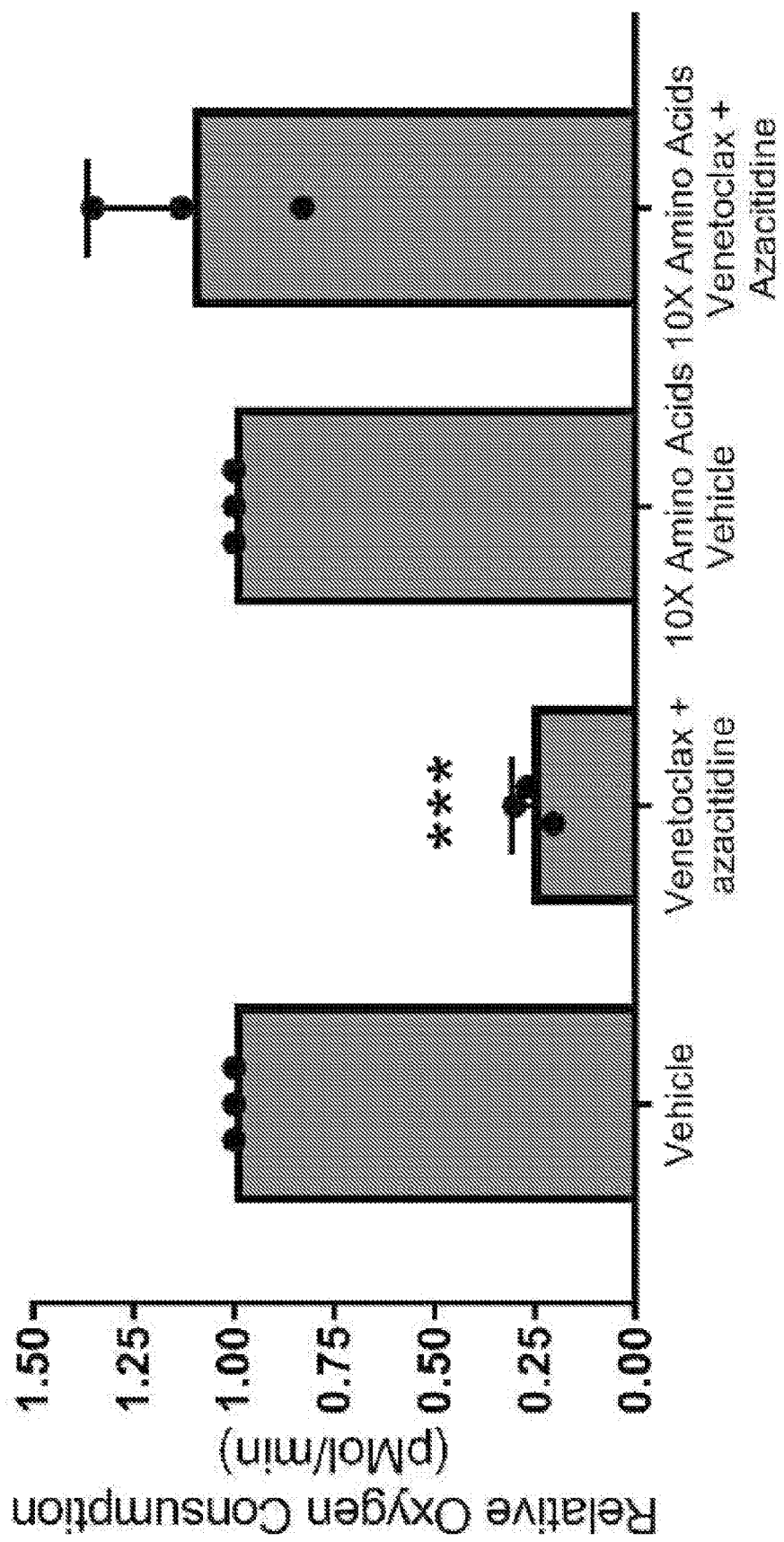
Figure 32:
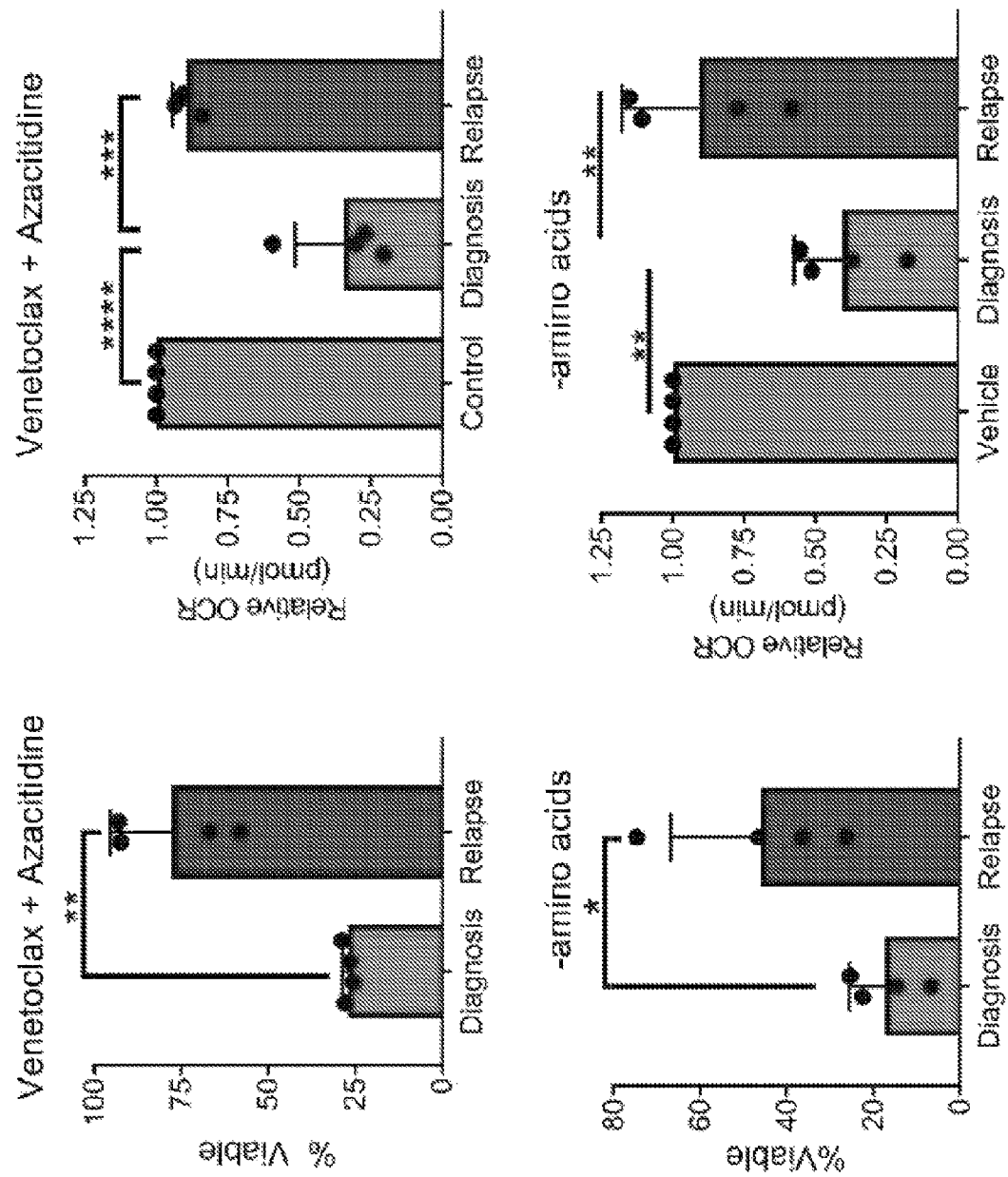

FIG. 31 is a chart showing the oxygen consumption measured in sorted ROS-low LSCs cultured in normal media or in media containing 10 times the levels of amino acids found in human serum for 4 hours and then treated with venetoclax (500 nM) and azacitidine (2.5 µM) for 4 hours. Each dot represents an individual patient sample treated in vitro. Graphs represent the mean+/−StDev. Statistical analysis was performed using two-way ANOVA and two-tailed Student's t-test where applicable. *$p<0.005$ FIG. 32 is a series of charts showing (top left) the viability of LSCs isolated from de novo or relapse/refractory AML patients and treated with 500 nM venetoclax with 2.5 µM azacitidine for 24 hours; (top right) relative OXPHOS levels from LSCs isolated from de novo or relapse/refractory AML patients and treated with 500 nM venetoclax with 2.5 µM azacitidine for 4 hours; (bottom left) the viability of LSCs isolated from de novo or relapse/refractory AML patients cultured without amino acids for 24 hours; and (bottom right) the relative OXPHOS levels from LSCs isolated from de novo or relapse/refractory AML patients and cultured without amino acids for 4 hours. Statistical analysis was performed using two-way ANOVA and two-tailed Student's t test where applicable. $p<0.01$, *$p<0.005$, **$p<0.001$.

Figure 33:
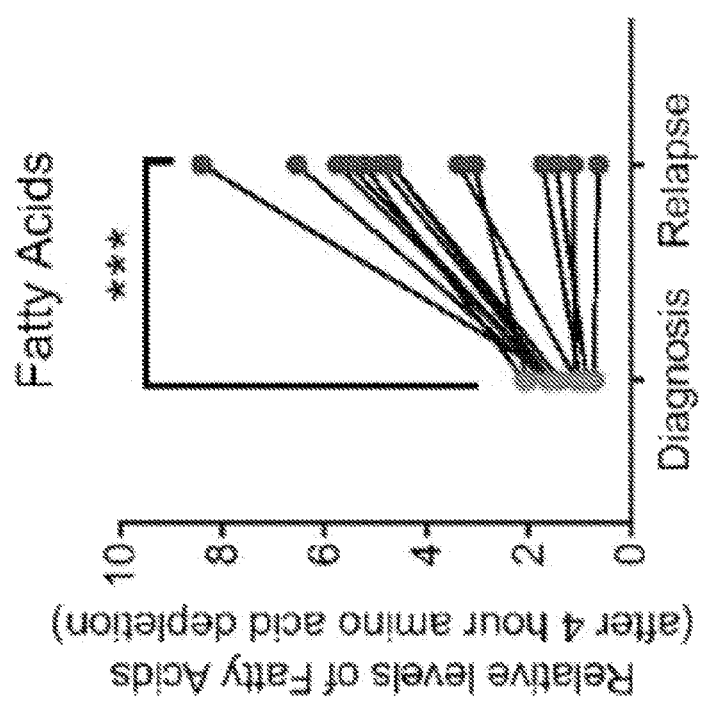

FIG. 33 is a chart showing the fatty acid levels from LSCs isolated from de novo or relapse/refractory AML patients and cultured without amino acids for 4 hours. Statistical analysis was performed using two-way ANOVA and two-tailed Student's t test where applicable. ***$p<0.005$.

Figure 34:
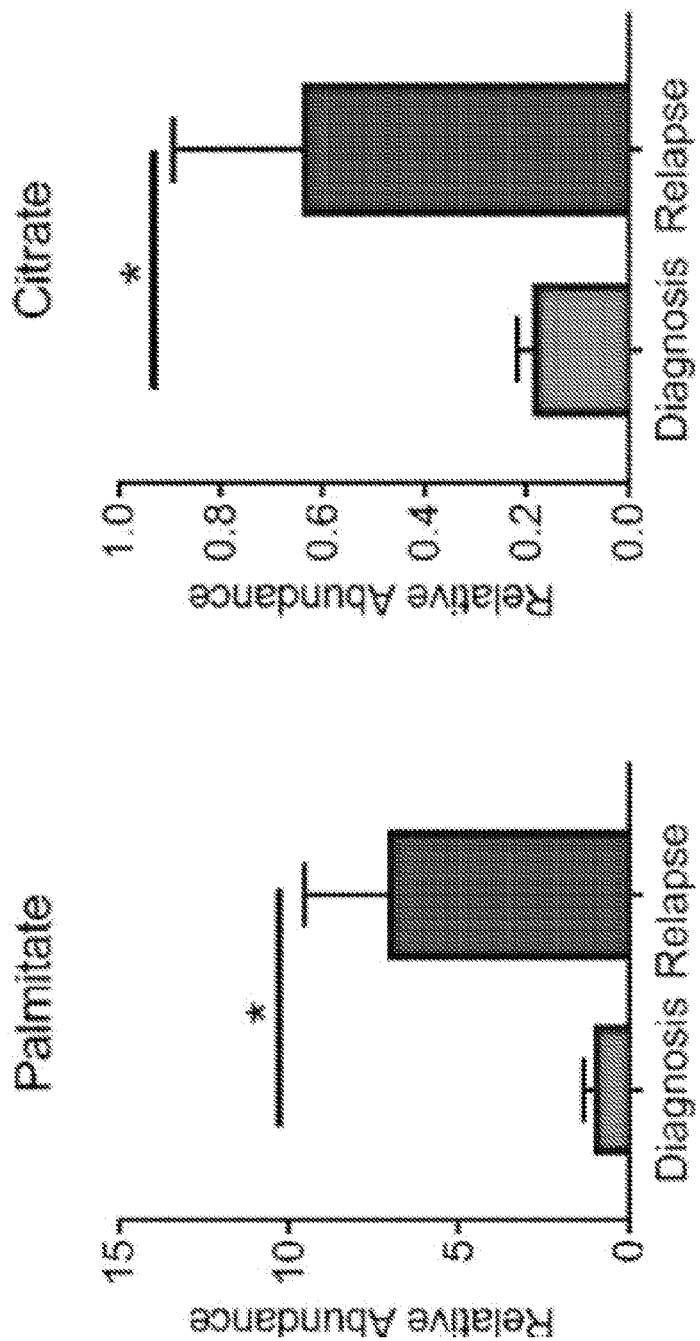

FIG. 34 is a series of charts showing (left chart) palmitate $13C_{16}$ levels in LSCs isolated from de novo or relapse/refractory AML patients and cultured without amino acids for 4 hours and cultured with palmitate $13C_{16}$ for an additional 8 hours and (right chart) citrate $13C_6$ levels in LSCs isolated from de novo or relapse/refractory AML patients and cultured without amino acids for 4 hours and cultured with palmitate $13C_{16}$ for an additional 8 hours.

Figure 35:
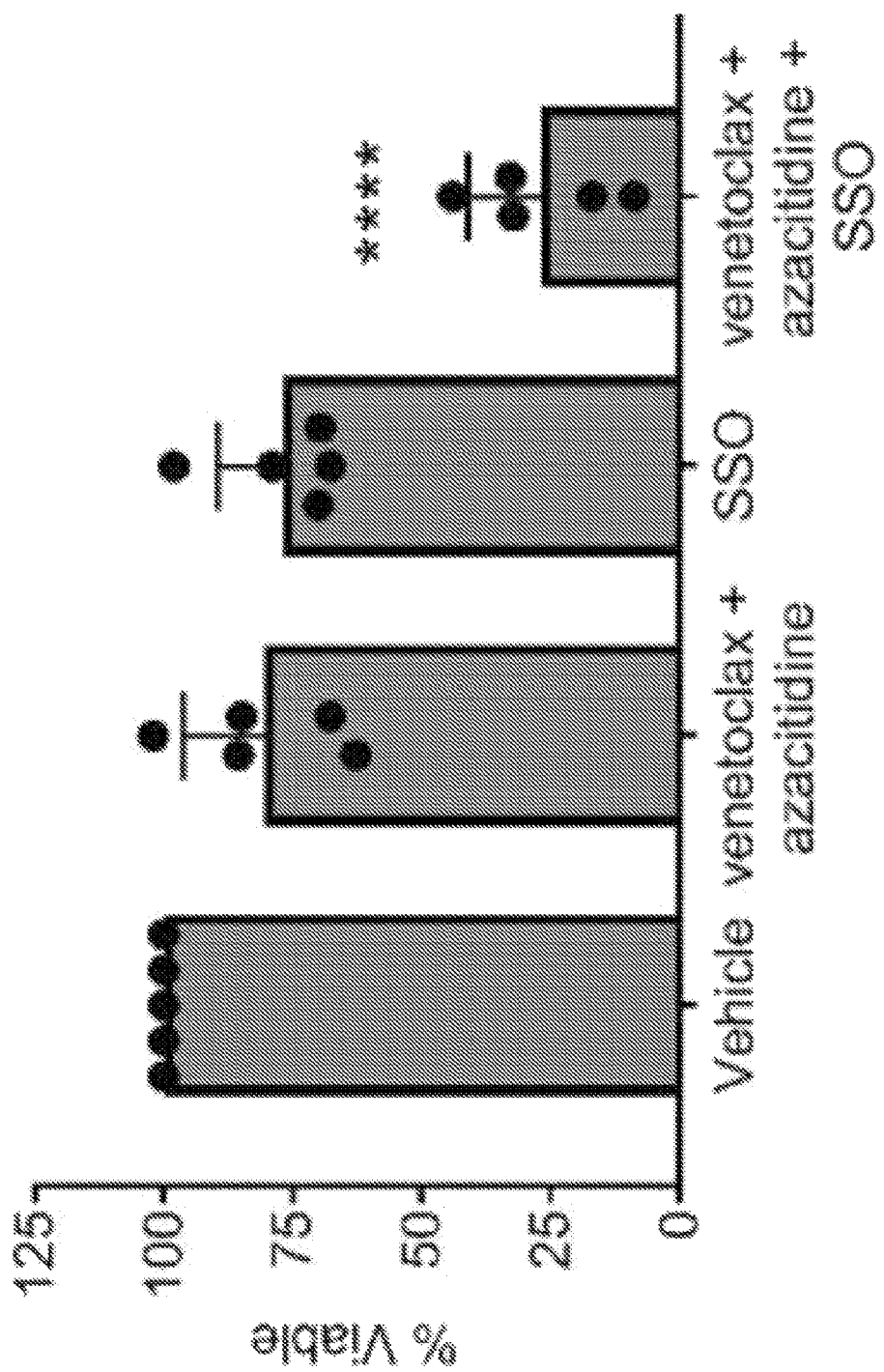

FIG. 35 is a chart showing the Viability of LSCs isolated from relapse/refractory AML patients and treated with 500 nM venetoclax with 2.5 µM azacitidine, 50 µM SSO, or venetoclax+azacitidine and SSO for 24 hours. Statistical analysis was performed using two-way ANOVA and two-tailed Student's t test where applicable. ****$p<0.001$.

Figure 36:
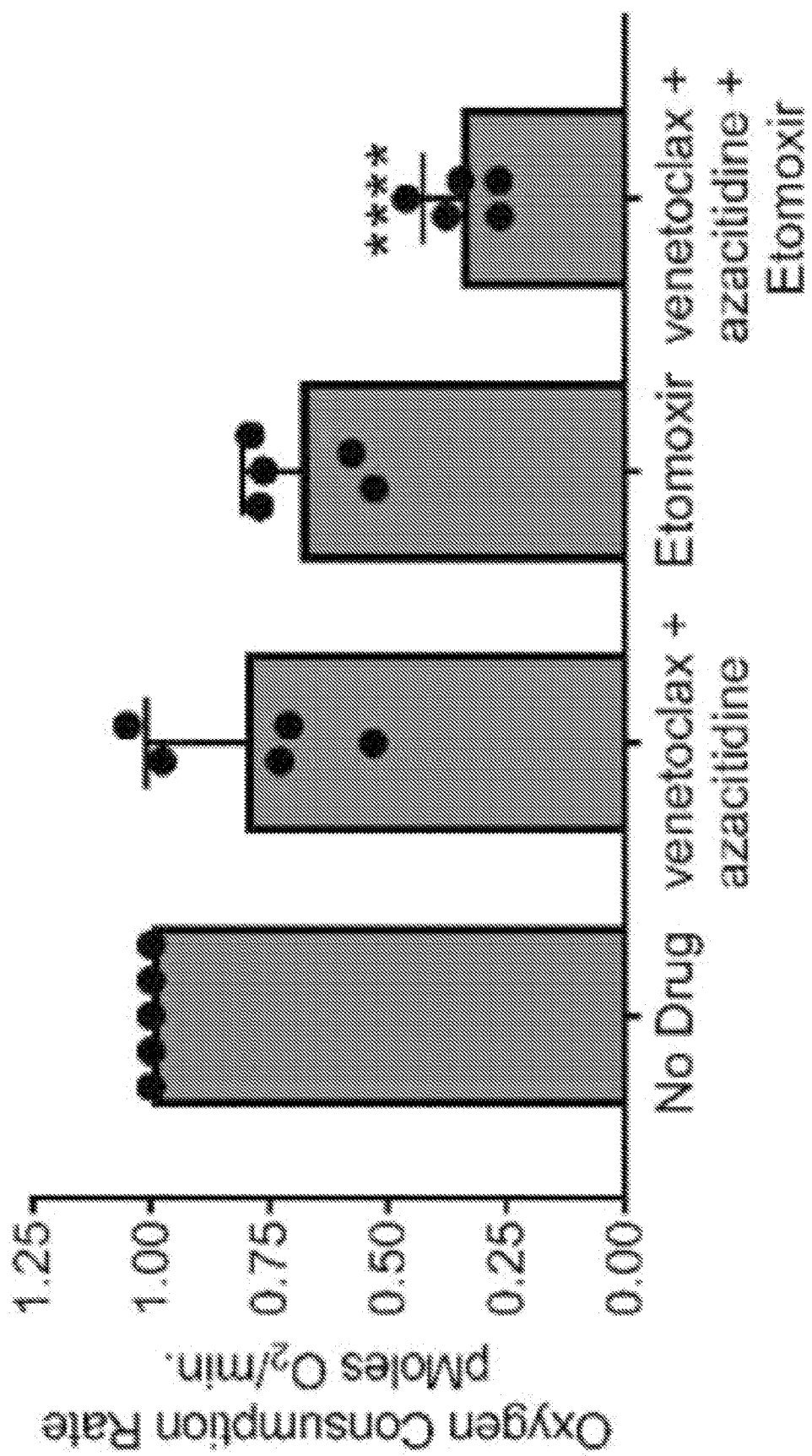

FIG. 36 is a chart showing the OXPHOS levels in LSCs isolated from relapse/refractory AML patients and treated with 500 nM venetoclax+2.5 µM azacitidine, 50 µM SSO, or venetoclax+azacitidine and SSO for 4 hours. Each dot represents an individual patient sample treated in vitro. Statistical analysis was performed using two-way ANOVA and two-tailed Student's t test where applicable. ****$p<0.001$.

Figure 37:
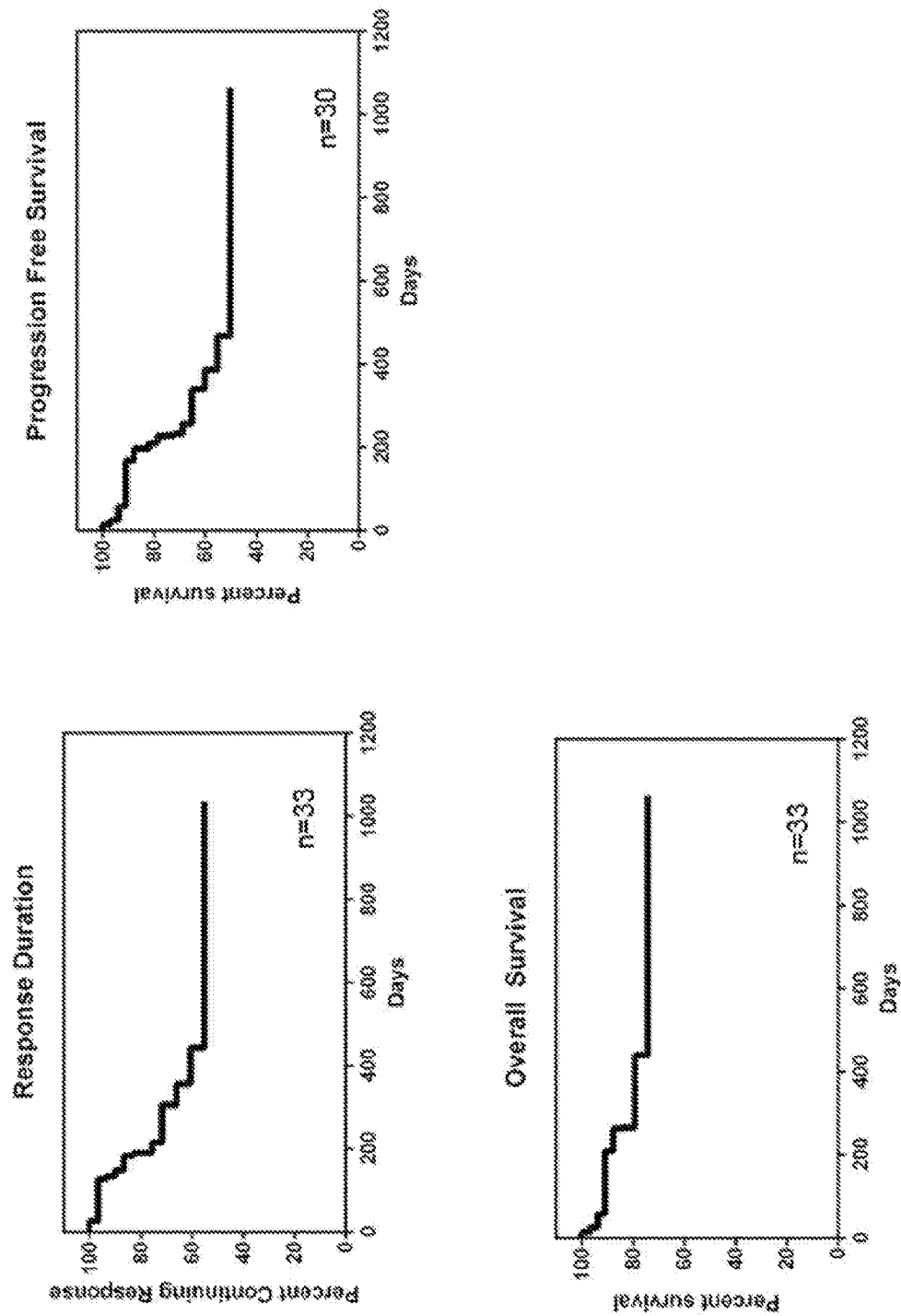

FIG. 37 is a series of charts showing (top left chart) duration of response for the 33 responding patients (median response duration was not reached); (top right chart) progression free survival for the 30 responding patients (median time to progression or death was not reached); (bottom left chart) overall survival for all treated patients (median overall survival was not reached).

Figure 38:
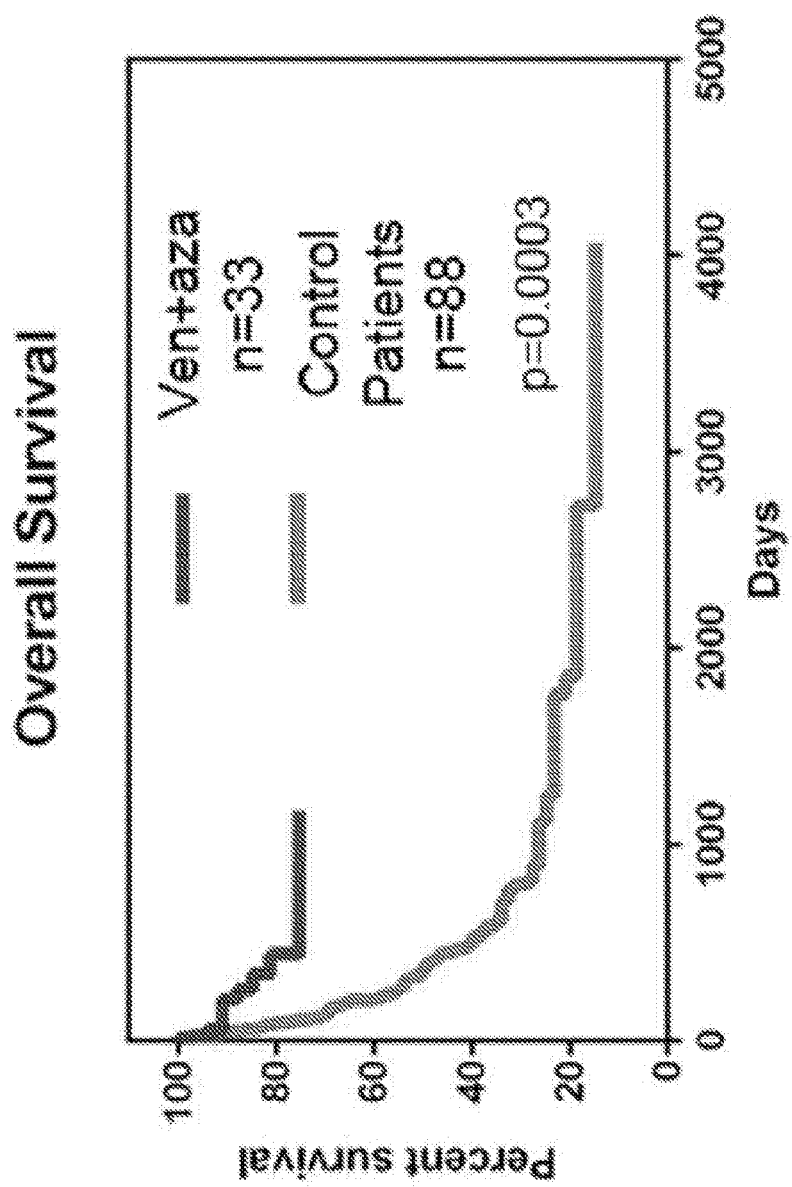

FIG. 38 is a chart showing an overall survival comparison of 33 treated patients with venetoclax+azacitidine (blue line, ven+aza) versus any other treatment in 88 older previously untreated AML patients treated consecutively at a single institution (red line, control patients). Control patients had a significantly worse survival in comparison to venetoclax+azacitidine patients.

Figure 39:
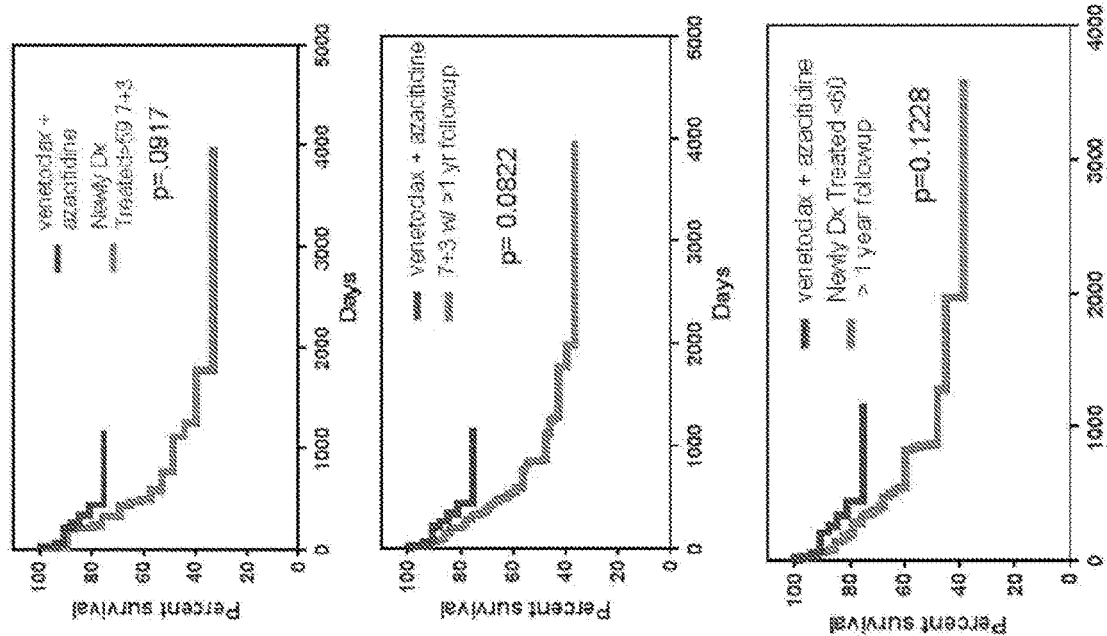

FIG. 39 is a series of Kaplan Meier curves showing overall survival comparison of the 33 older newly diagnosed patients treated with venetoclax+azacitidine (blue line) compared to (top chart) 39 older patients (>59) with newly diagnosed intermediate to adverse risk AML who received induction chemotherapy; (middle chart) 94 newly diagnosed intermediate to adverse risk AML patients of any age who received induction chemotherapy; (bottom chart) 62 younger (<60) newly diagnosed intermediate to adverse risk AML patients who received induction chemotherapy. Log-rank (Mantel-Cox) test, n=33.

Figure 40:
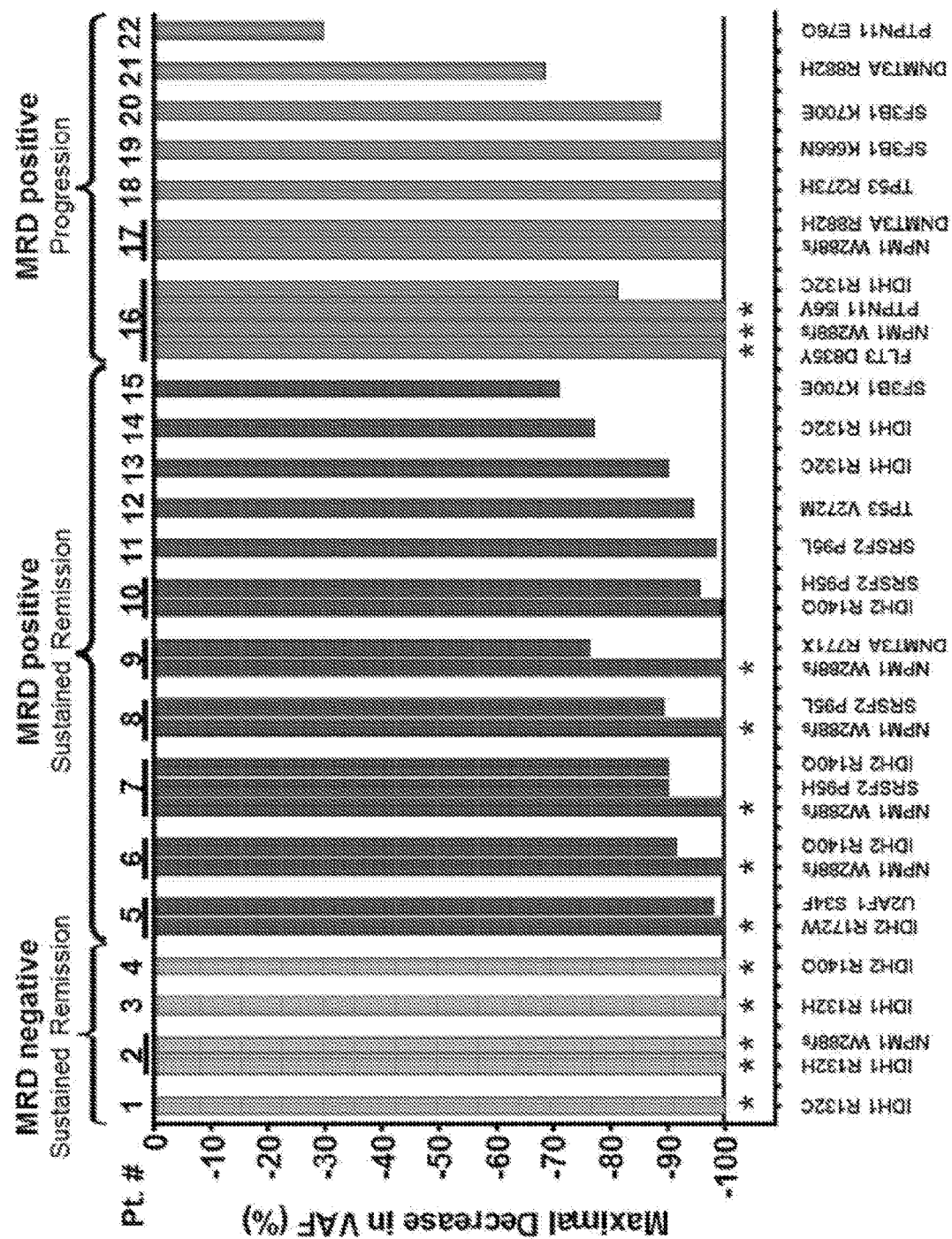

FIG. 40 is a chart showing measurable residual disease (MRD) monitoring of 22 patients who had a clinical response and an amenable mutation for droplet digital PCR performed with each bone marrow biopsy. Each patient had one to four mutations monitored; each number represents a patient, each gene monitored is shown as a bar beneath the patient number and annotated along the X-axis. The length of the bar represents the maximal decrease in variant allele frequency (VAF); 100% is equivalent to MRD negativity. Genes that achieved MRD negativity are annotated with an asterisk. Green bars represent patients who achieved MRD negativity and have not progressed. Blue bars represent patients who have not achieved MRD negativity and have not progressed. Red bars represent patients who did not achieve MRD negativity and subsequently progressed. No patients who achieved MRD negativity in all genes analyzed have progressed. All patients who have progressed did not achieve MRD negativity in at least one measurable gene.

Figure 41:
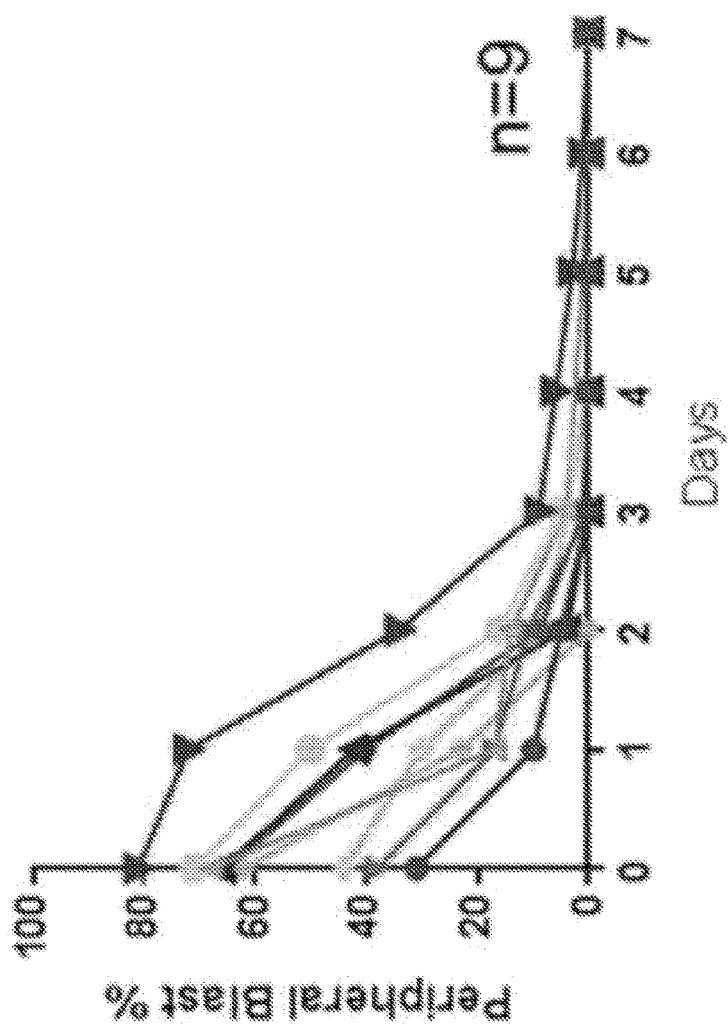

FIG. 41 is a chart showing the temporal blast counts during the first week of therapy for nine patients who began treatment with >20% peripheral blasts at diagnosis (assessed by complete blood count with manual differential). The table below chart shows the proportion of patients at 0% and the average percent reduction of blasts for each day of analysis.

Figure 42:
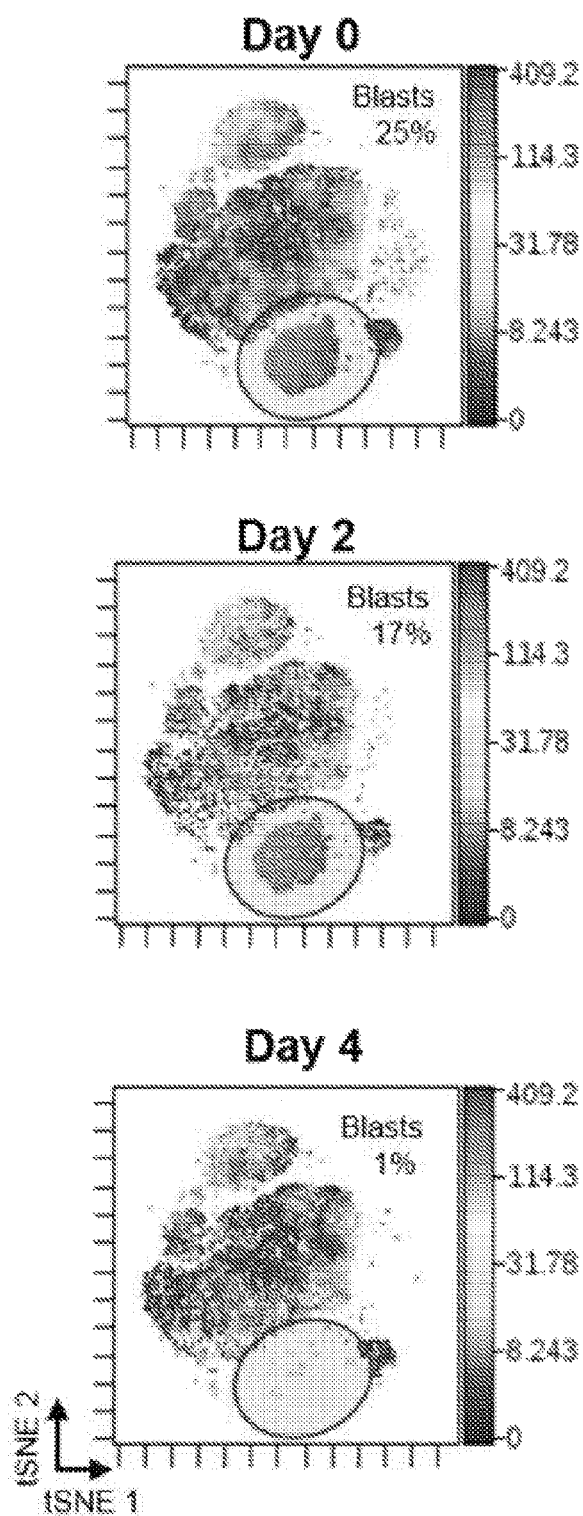

FIG. 42 is a series of charts showing the mass cytometry analysis of peripheral blood at Day 0, 2, and 4 for a representative patient. AML blasts are indicated by the red shaded area, with blast percentages shown (n=1).

Figure 43:
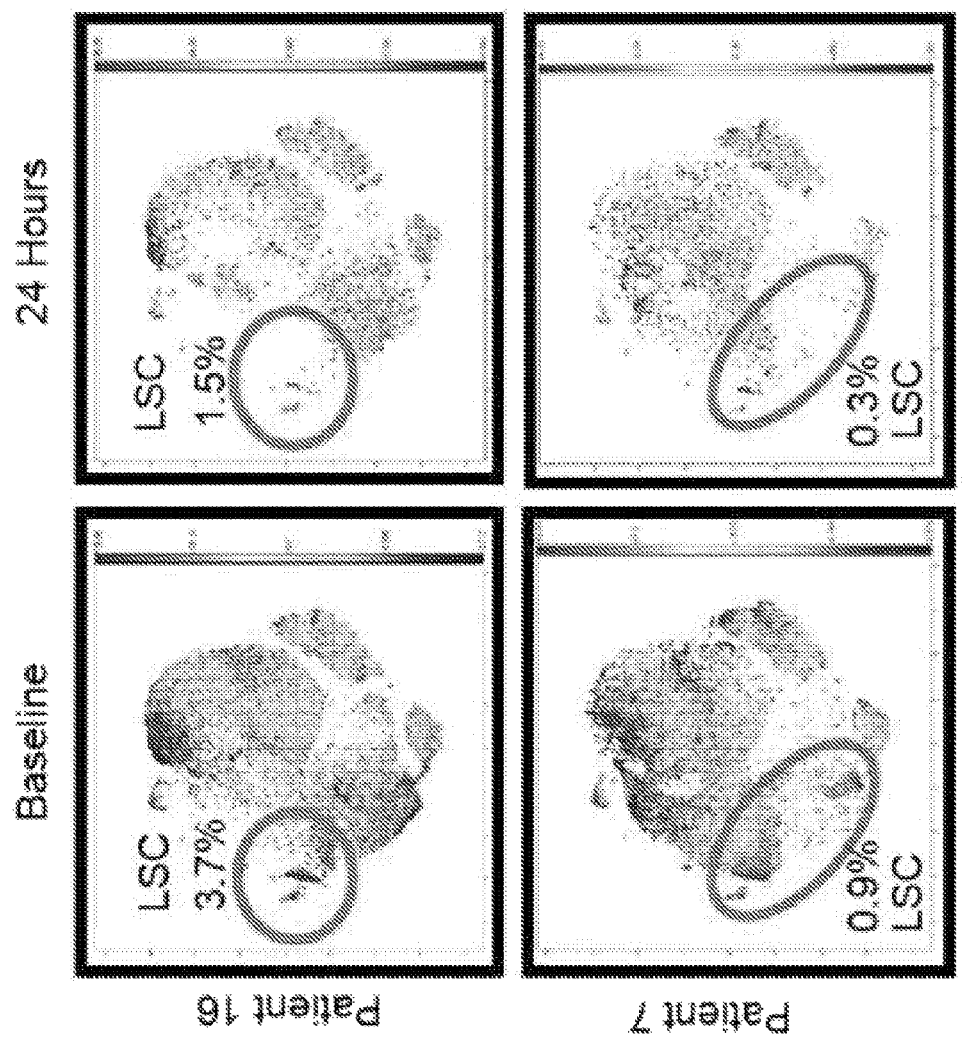

FIG. 43 is a series of charts showing the mass cytometry analysis of peripheral blood at baseline and 24 hours for patients 7 and 16. Red circles indicate the phenotypically-defined LSC population (CD34+, CD38−, Lin−, CD123+).

Figure 44:
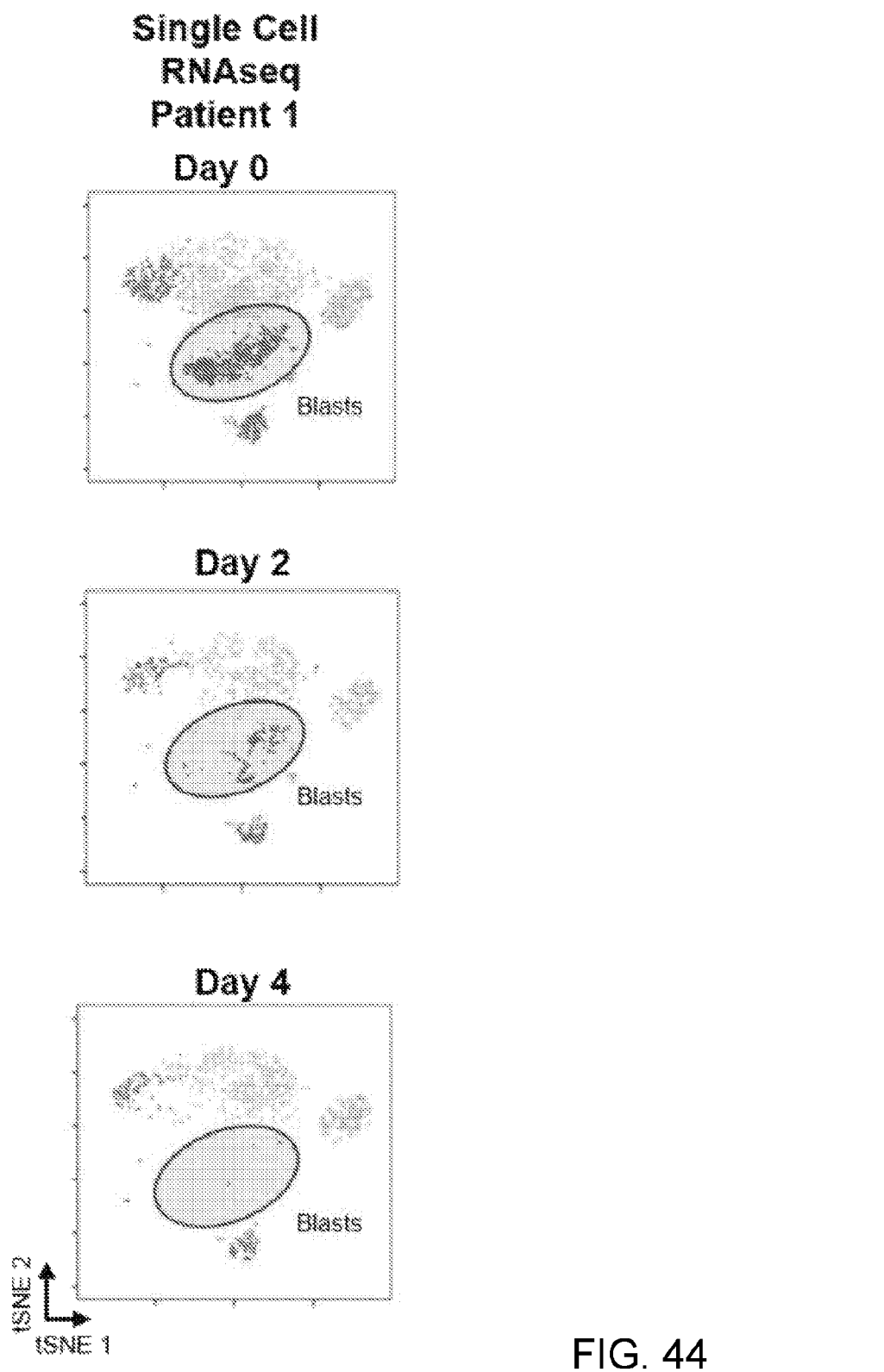

FIG. 44 is a series of tSNE plots of single cell transcriptomics measured at baseline, day two post treatment and day four post treatment with blasts as defined by gene signature in circled (red circle).

Figure 45:
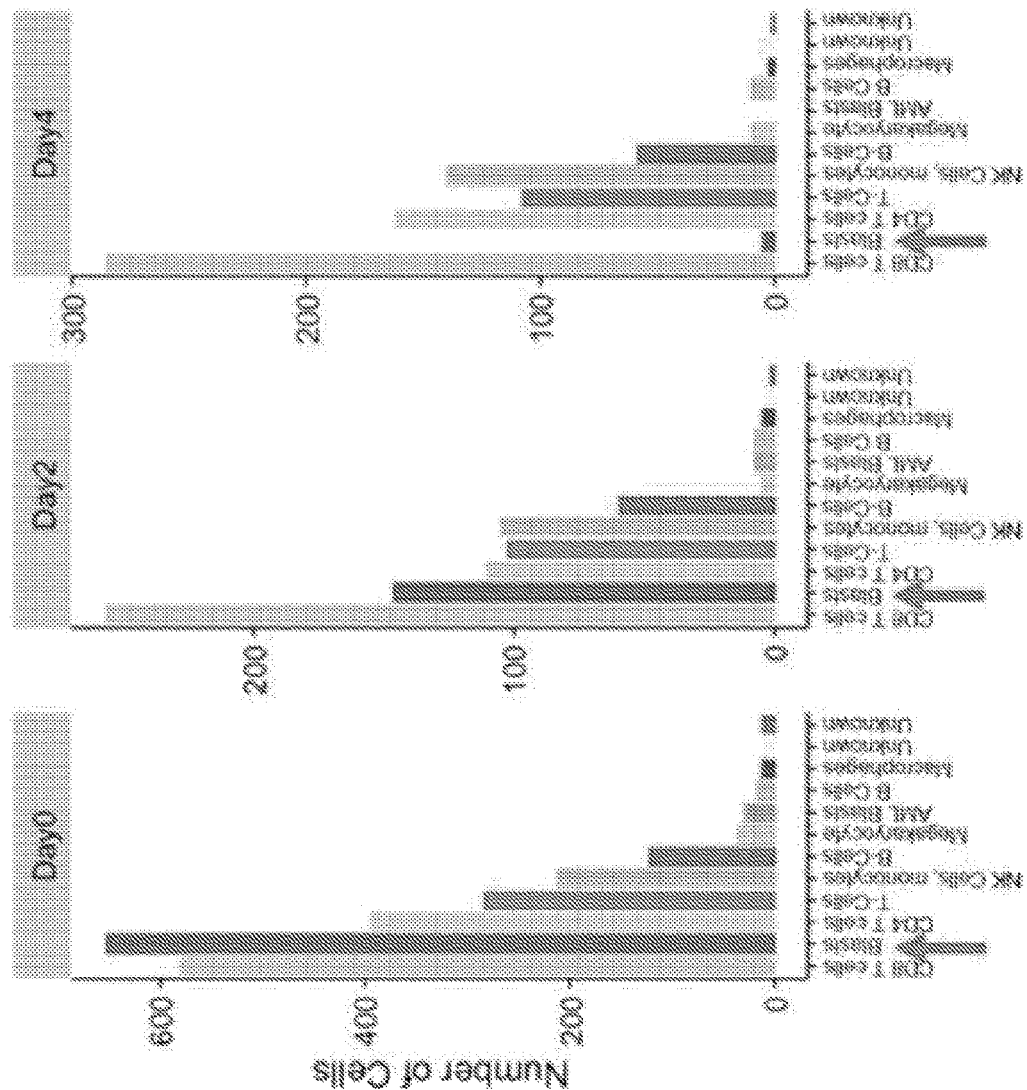

FIG. 45 is a series of charts showing the number of cells in clusters of tSNE plot by time point. Blast cluster (indicated by red arrow) shows a decrease at day two and disappearance of cells by day four.

Figure 46:
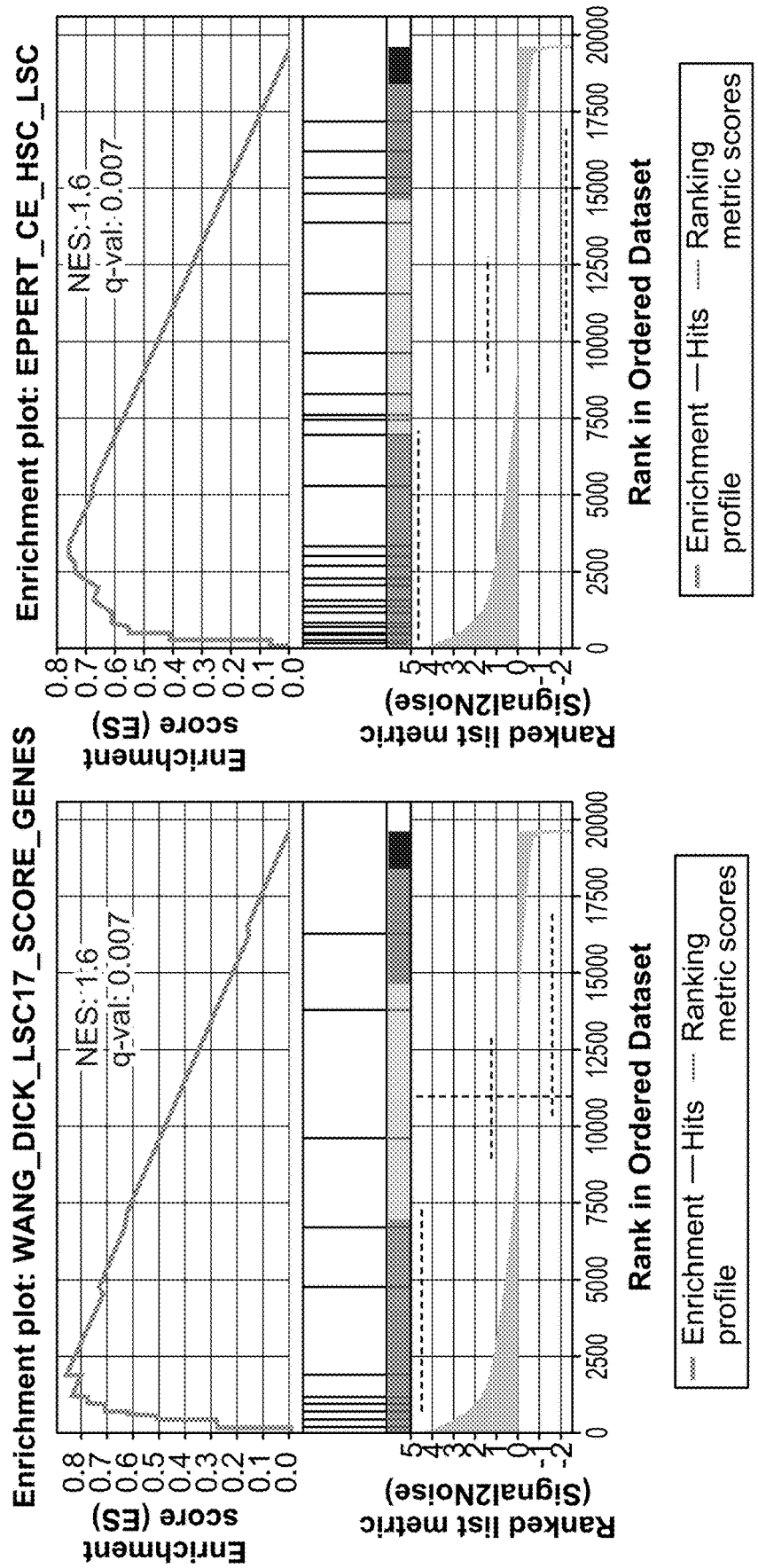

FIG. 46 is a series of GSEA enrichment plots of blast cluster compared to all other clusters in baseline sample tSNE plots showing the cluster is significantly enriched for two different LSC gene signatures.

Figure 47:
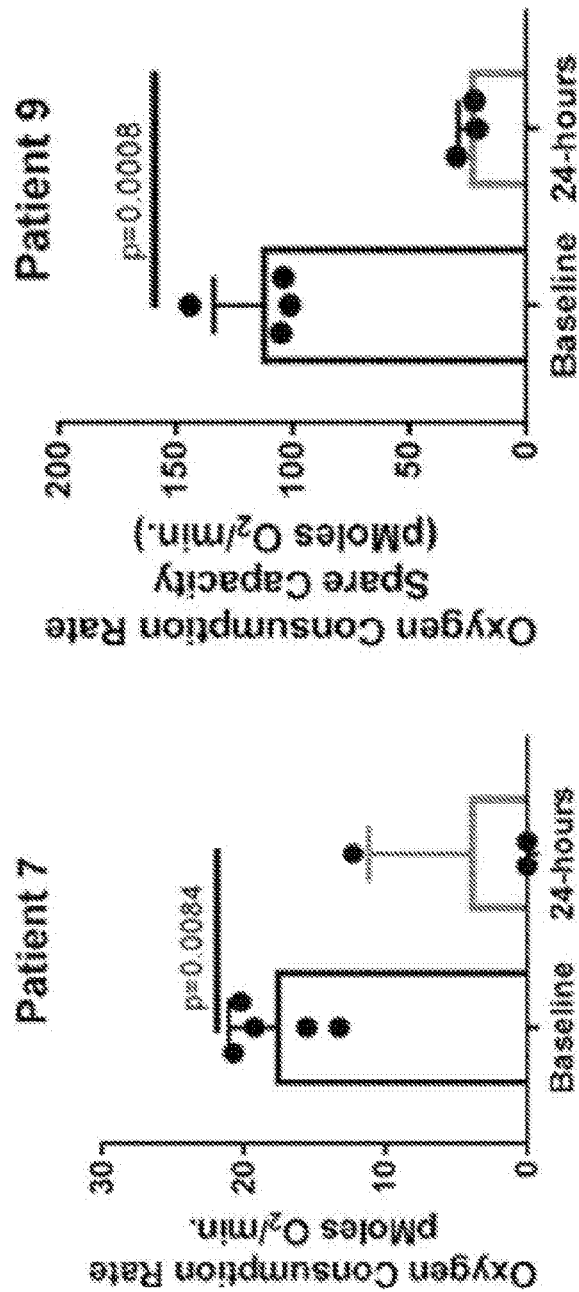

FIG. 47 is a series of charts showing oxygen consumption rate as a measure of OXPHOS activity measured pre and 24 hours post venetoclax+azacitidine treatment in the leukemia cells isolated from an AML patient, revealing a significant reduction in OXPHOS levels (left chart) and the oxygen consumption rate measured in the leukemia cells of one patient before and 24 hours after treatment by using FCCP to uncouple the electron transport chain and maximize oxidative phosphorylation (right chart).

Figure 48:
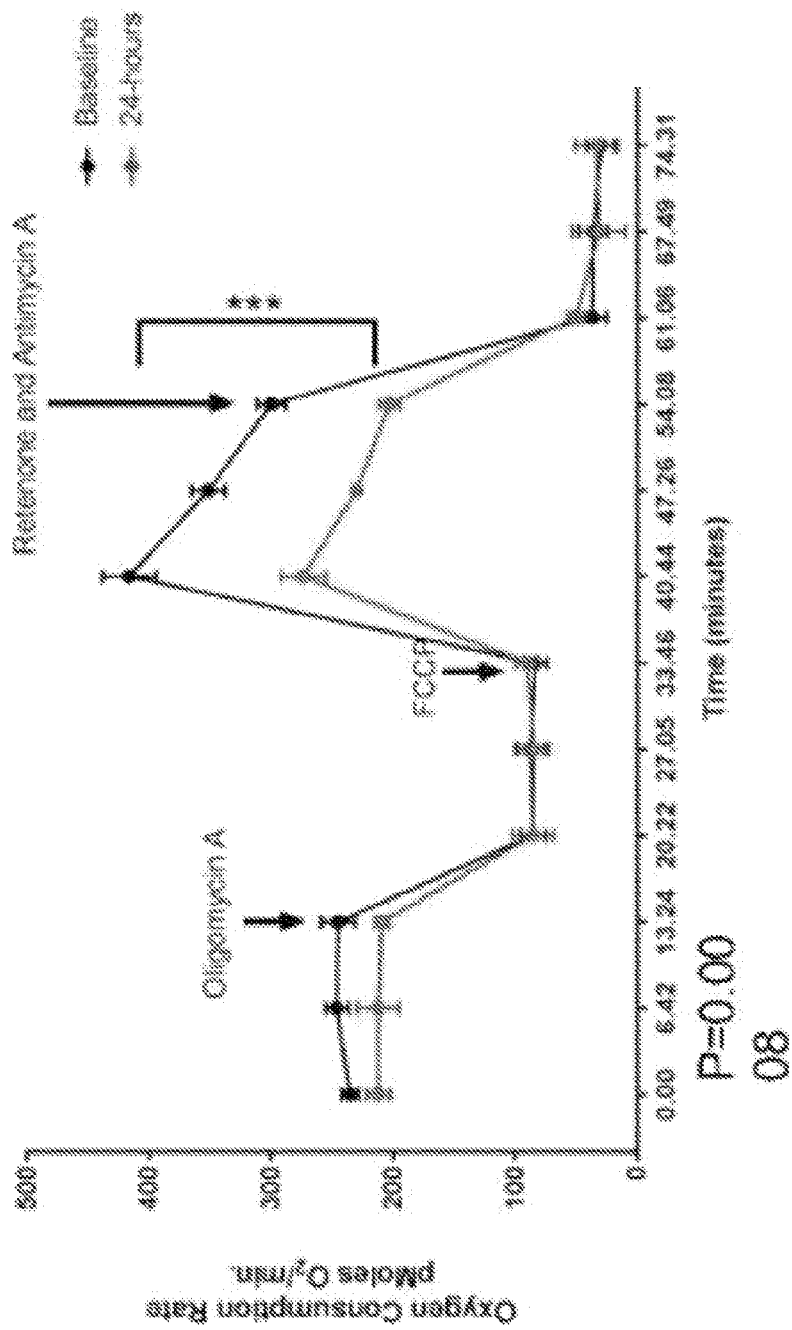

FIG. 48 is a chart showing the respirometry tracks of cells isolated from a patient at 24 hours post treatment with venetoclax+azacitidine (n=3-4 technical replicates). The chart shows that the decrease in spare respiration is caused by a reduction in overall OXPHOS upon electron transport chain uncoupling. Significance was determined by an unpaired two-tailed Student's t-test.

Figure 49:
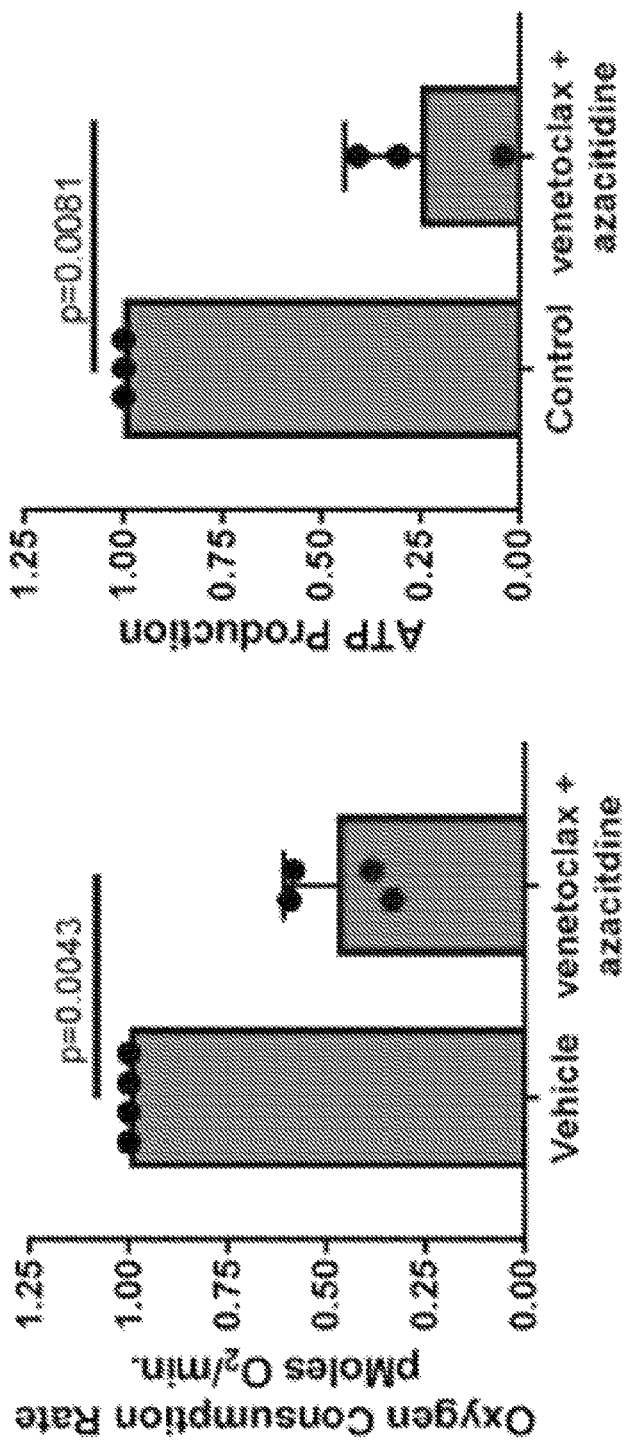

FIG. 49 is a series of charts showing the oxygen consumption levels measured in ROS-low LSCs isolated from 4 primary AML specimens A, B, C, and D treated with 500 nM venetoclax+2.5 μM azacitidine in vitro for 4 hours (left chart) and ATP production measured in ROS-low LSCs isolated from 3 primary AML samples A, B, and C treated with 500 nM venetoclax+2.5 μM azacitidine in vitro for 4 hours (right chart).

Figure 50:
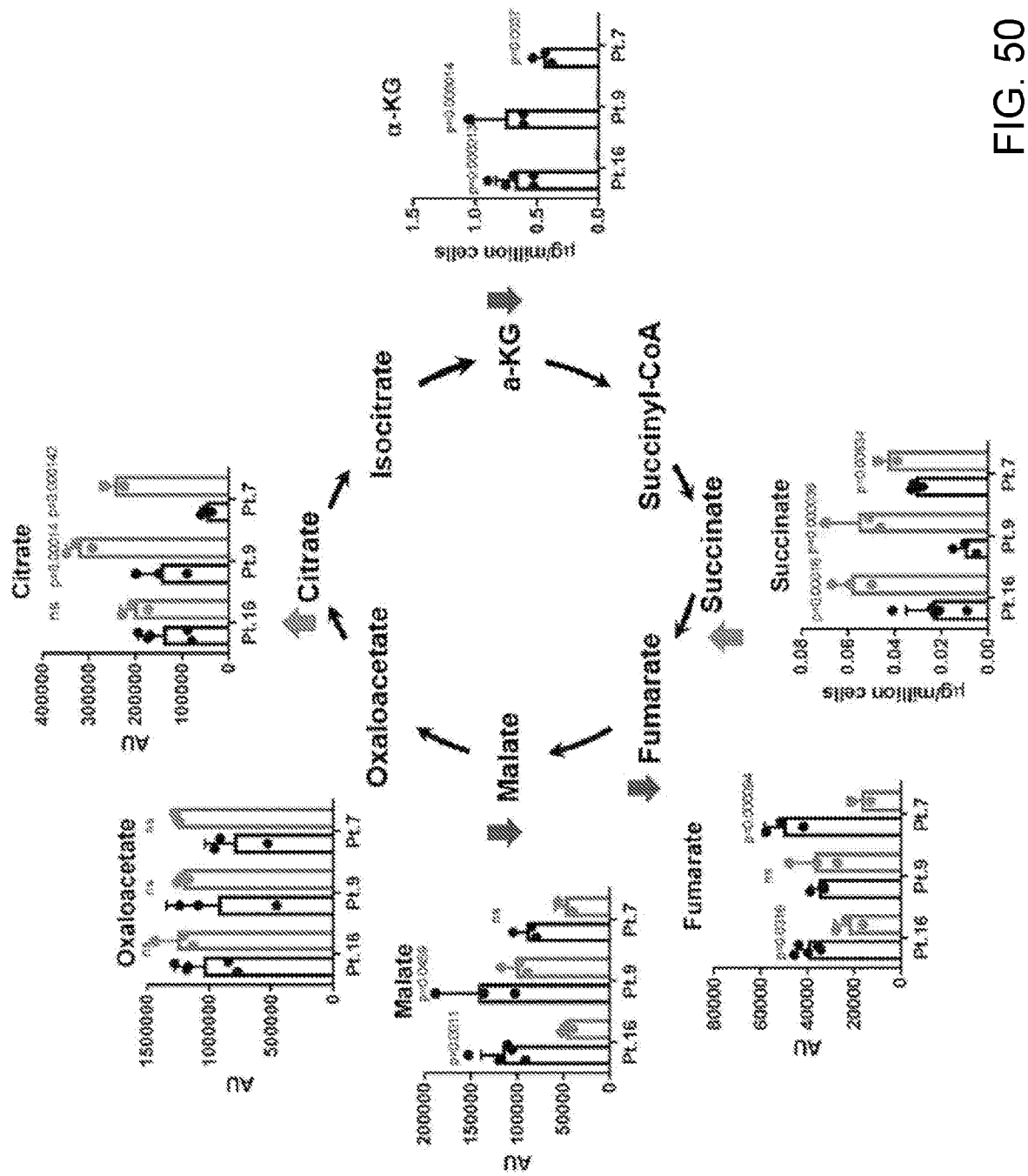

FIG. 50 is a series of charts showing the levels of TCA cycle intermediates, alpha-ketoglutarate, succinate, citrate, fumarate, malate, oxaloacetate in patients pre and 24 hours post venetoclax+azacitidine treatment.

Figure 51:
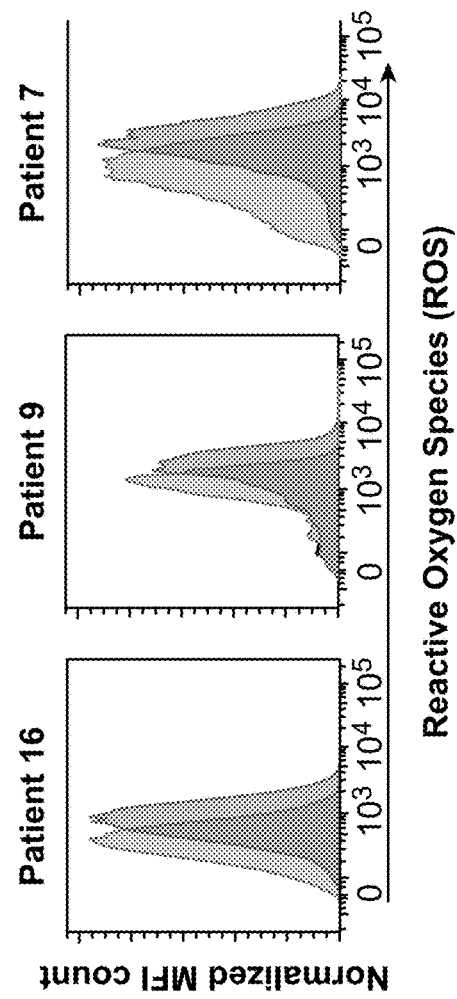
Figure 51:
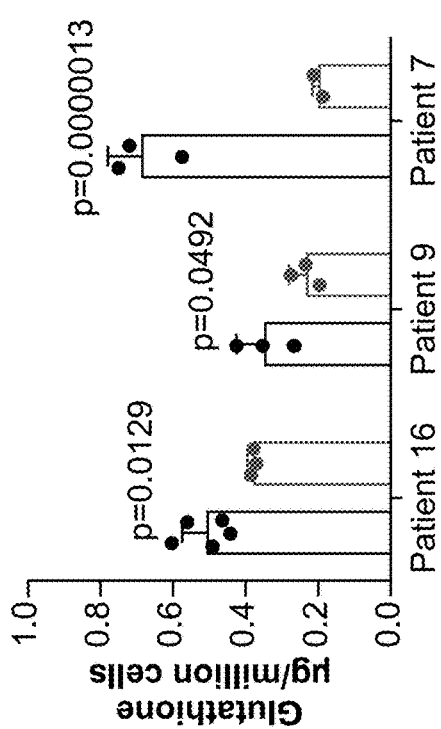

FIG. 51 is a chart (left panel) showing the levels of glutathione in patients pre and 24 hours post venetoclax+azacitidine treatment and a series of charts (right panel) showing the cellular reactive oxygen species (ROS) in leukemia cells from patients pre (red shaded histogram, left histogram) and 24 hours post (blue shaded histogram, right histogram) venetoclax+azacitidine treatment (as determined by labeling with CellROX™).

Figure 52:
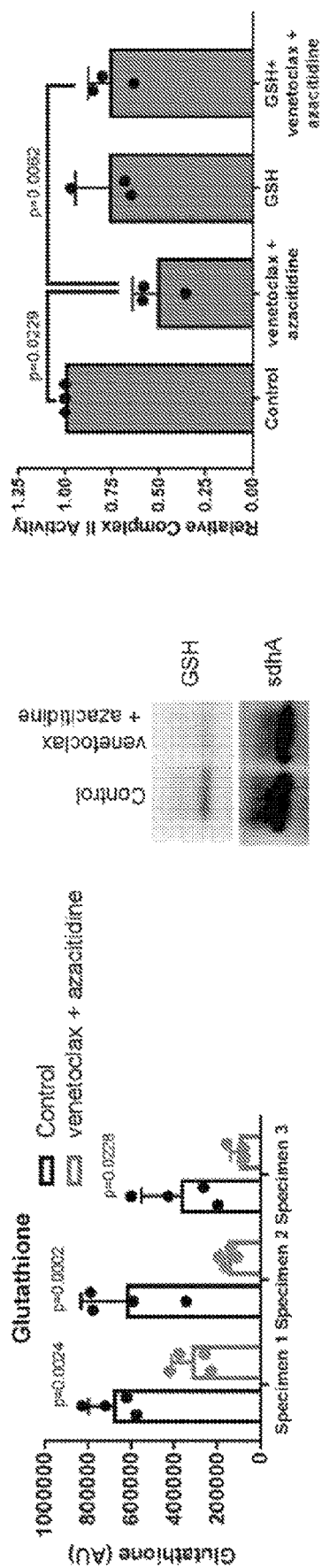

FIG. 52 is a chart showing the glutathione levels measured in ROS-low LSCs isolated from 3 primary AML specimens treated with 500 nM venetoclax+2.5 μM azacitidine in vitro for 4 hours (left chart); a series of western blot images of GSH modification of sdhA isolated from leukemia cells treated with 500 nM venetoclax+2.5 μM azacitidine in vitro for 4 hours (middle panel); and a chart showing the relative ETC complex II activity measured in 3 AML specimens pretreated with cell permeable glutathione or vehicle and then treated with 500 nM venetoclax+2.5 μM azacitidine in vitro for 4 hours (right chart).

Figure 53:
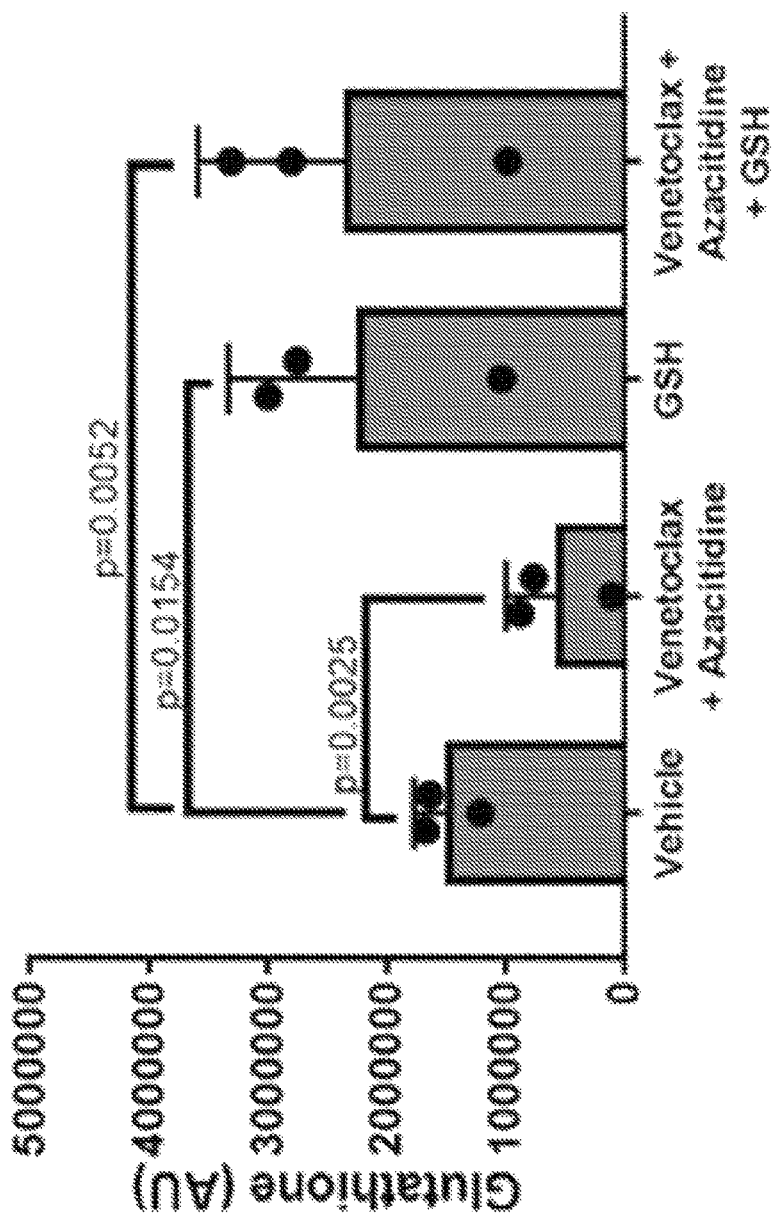

FIG. 53 is a chart showing levels of glutathione measured in LSCs isolated from 3 AML samples, pretreated with cell permeable glutathione or vehicle and then treated with 500 nM venetoclax+2.5 μM azacitidine in vitro for 4 hours.

Figure 54:
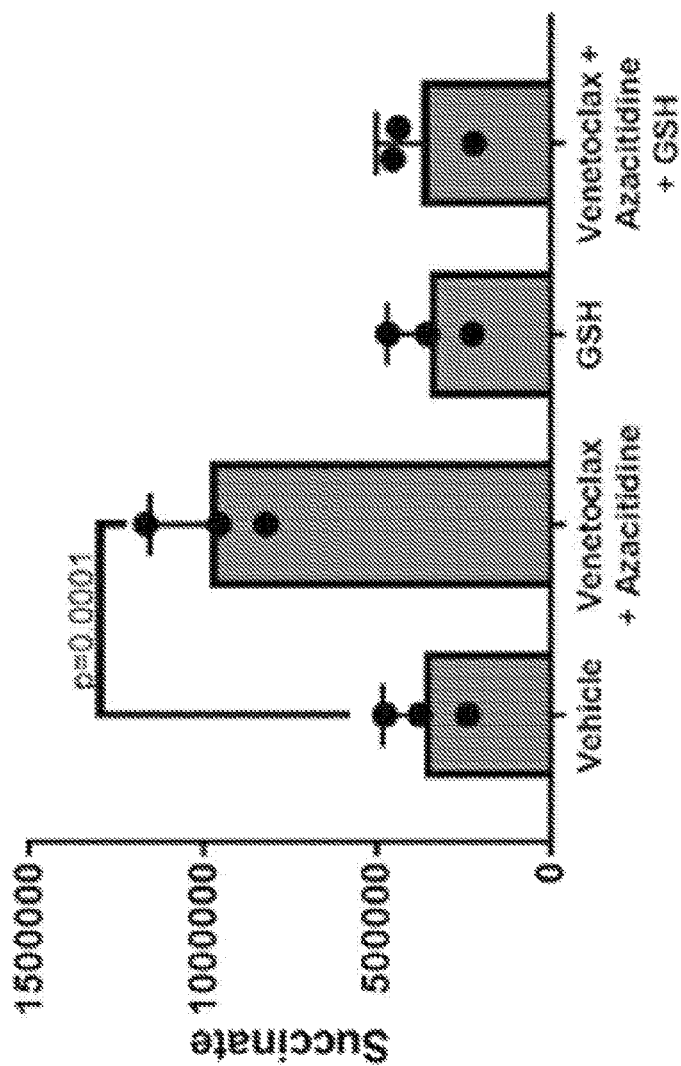

FIG. 54 is a chart showing levels of succinate measured in LSCs isolated from 3 AML samples pretreated with cell permeable glutathione or vehicle and then treated with 500 nM venetoclax+2.5 μM azacitidine in vitro for 4 hours.

Figure 55:
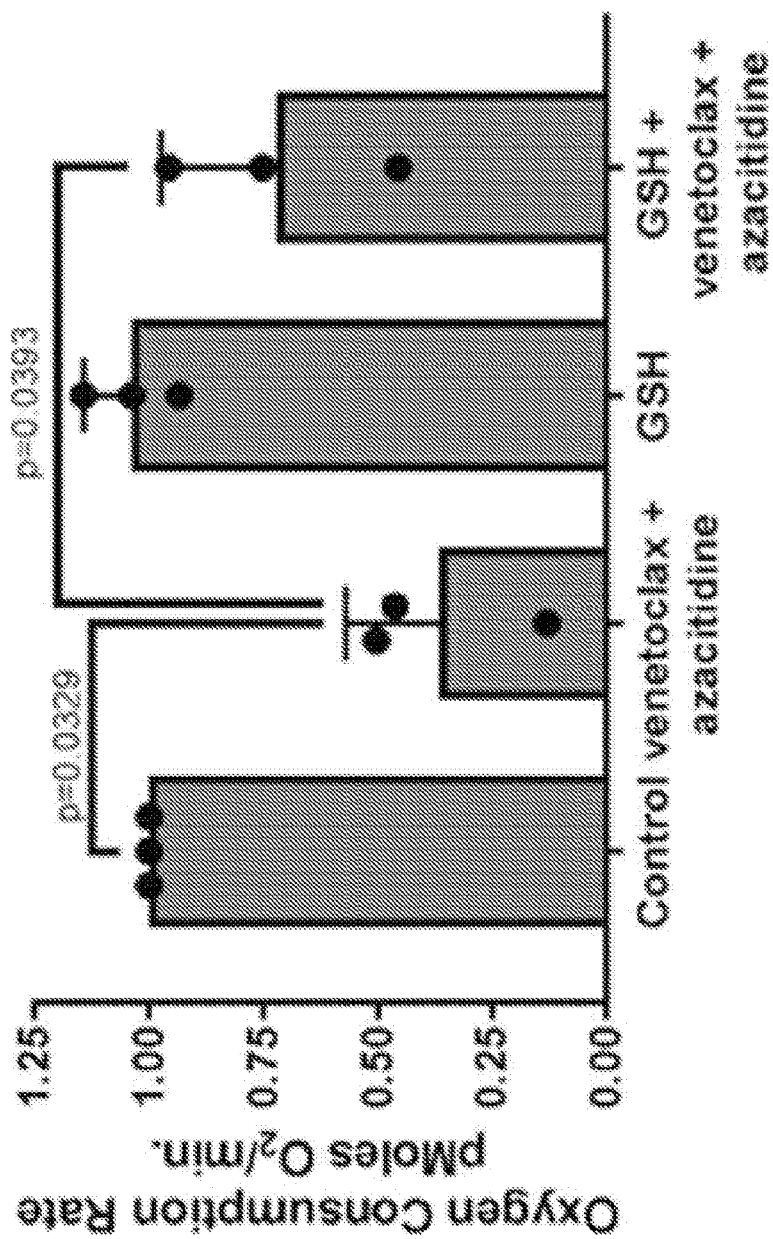

FIG. 55 is a chart showing the relative oxygen consumption measured in 3 AML samples pretreated with cell permeable glutathione or vehicle and then treated with 500 nM venetoclax+2.5 μM azacitidine in vitro for 4 hours.

Figure 56:
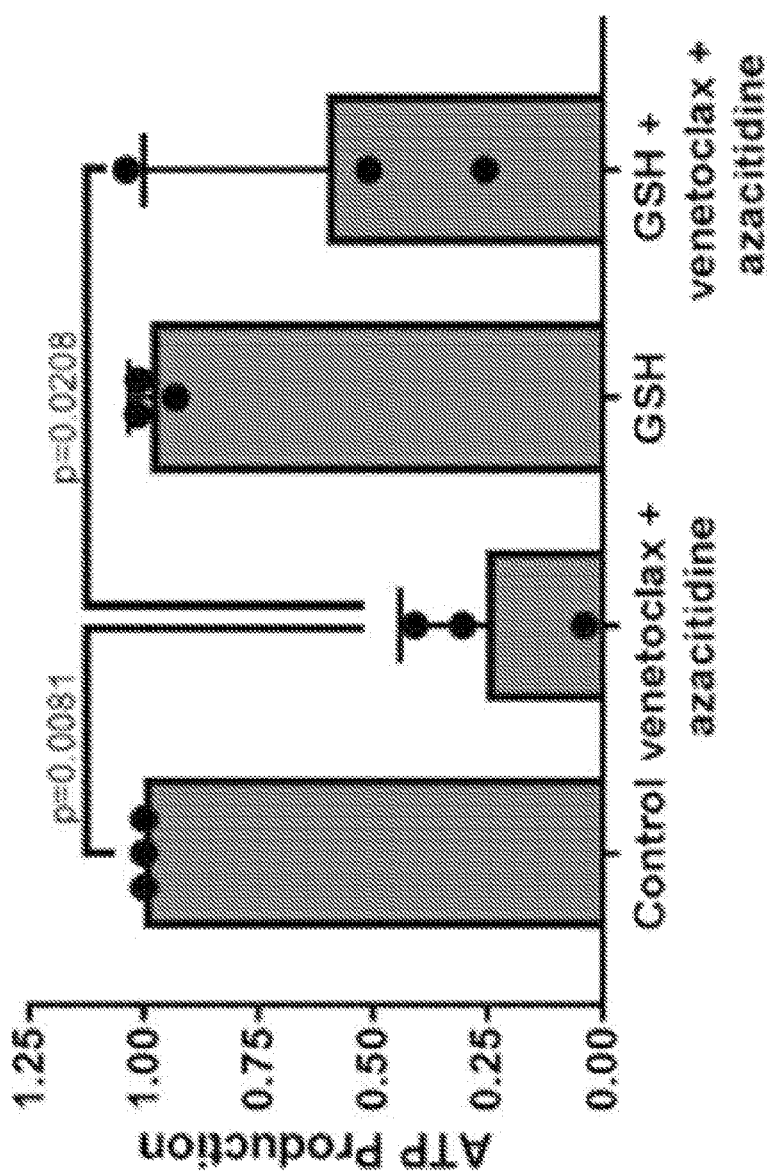

FIG. 56 is a chart showing relative ATP production measured in 3 AML samples pretreated with cell permeable glutathione or vehicle and then treated with 500 nM venetoclax+2.5 μM azacitidine in vitro for 4 hours.

Figure 57:
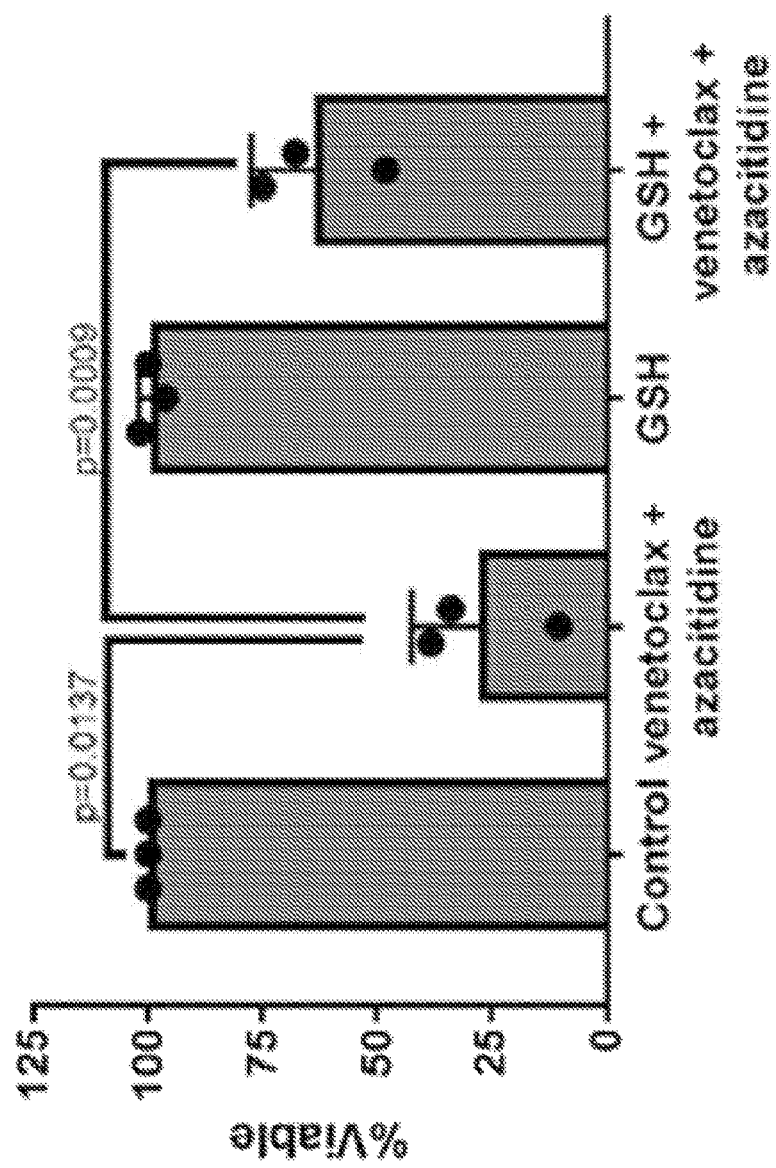

FIG. 57 is a chart showing the relative cell viability measured in 3 AML samples pretreated with cell permeable glutathione or vehicle and then treated with 500 nM venetoclax+2.5 μM azacitidine in vitro for 4 hours.

Figure 58:
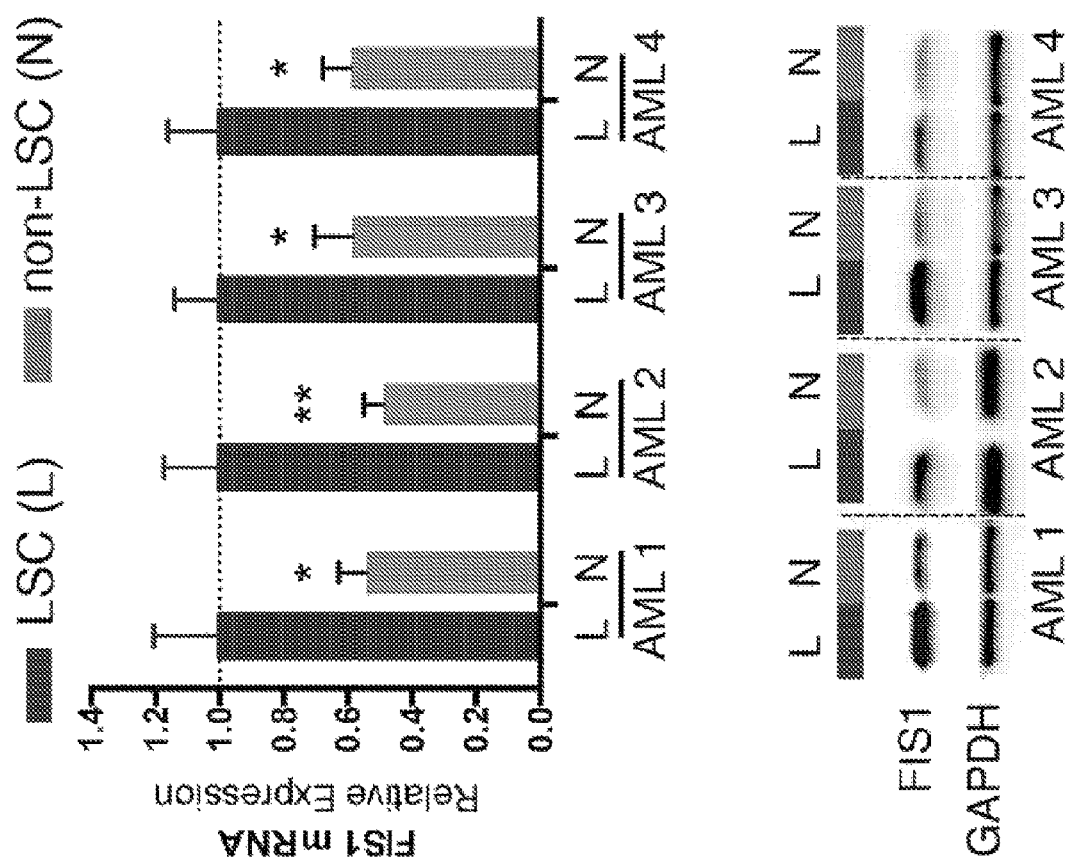

FIG. 58 is a chart showing qPCR results of the relative expression of the FIS1 gene in sorted ROS-low LSCs (L) versus ROS-high non-LSCs (N) (Mean±SD (n=3), type 2, two-tailed t test, *p<0.05; **p<0.01) and a series of western blot results showing expression of FIS1 protein in sorted ROS-low LSCs (L) versus ROS-high non-LSCs (N).

Figure 59:
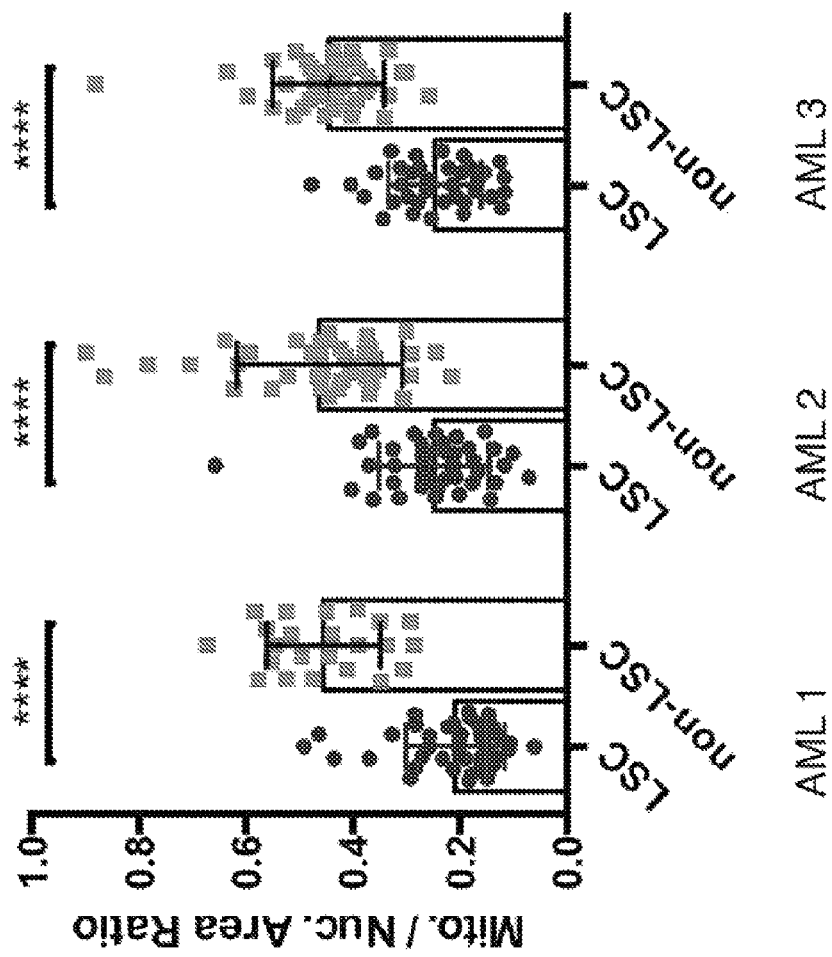

FIG. 59 is a chart showing the mitochondrial to nuclear area ratio in LSCs versus non-LSCs in 3 primary AML samples. Each dot represents an individual cell. Mean±SD, type 3, two-tailed t test. ****p<0.0001

Figure 60:
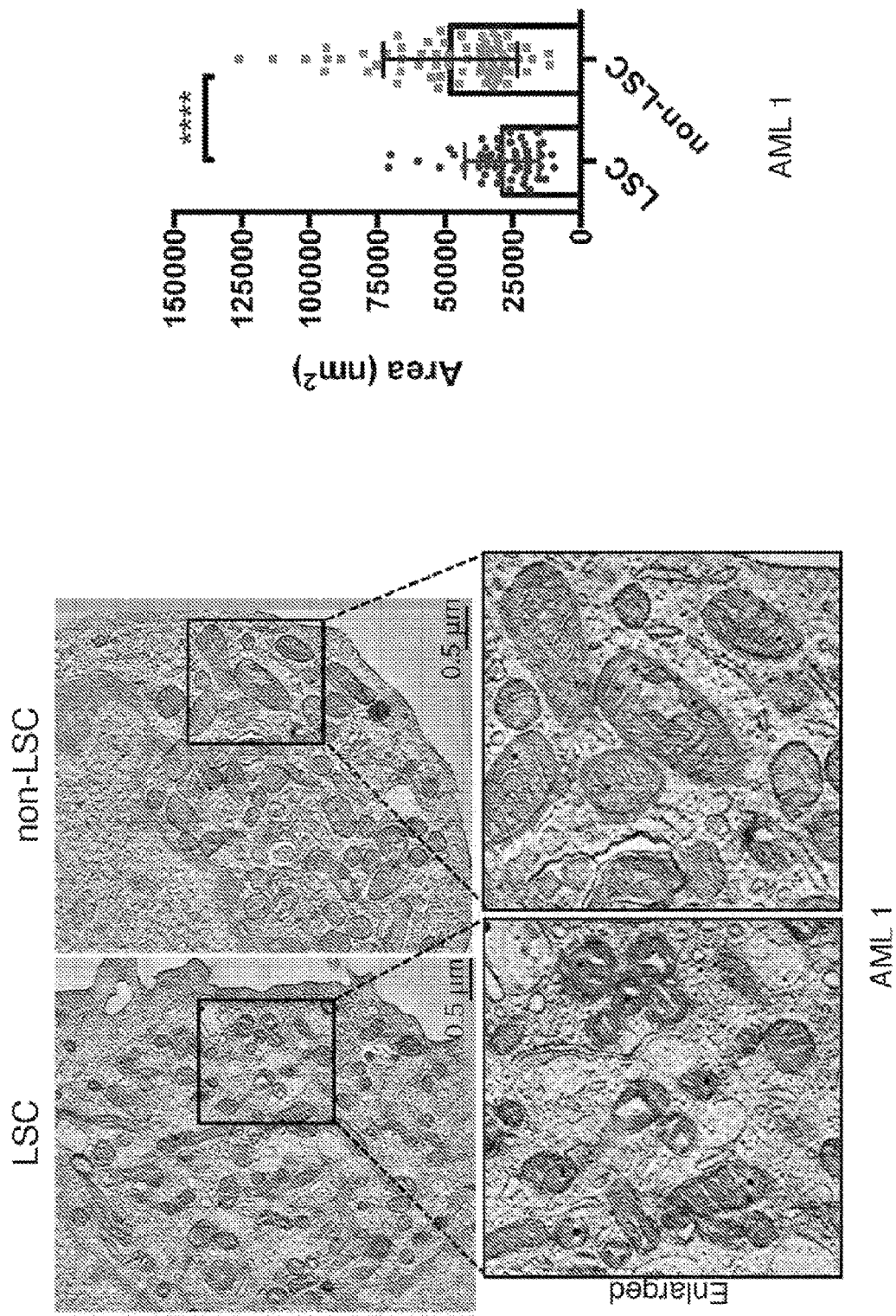

FIG. 60 is a series of TEM images showing the morphology of mitochondria in ROS-low LSCs and ROS-high non-LSCs (blue and red dotted lines outline the mitochondrial shape) and a chart showing the Quantification of the mitochondrial cross-section area from the TEM images of AML 1. Each dot represents a single mitochondrion. Mean±SD, type 3, two-tailed t test. ****p<0.0001.

Figure 61:
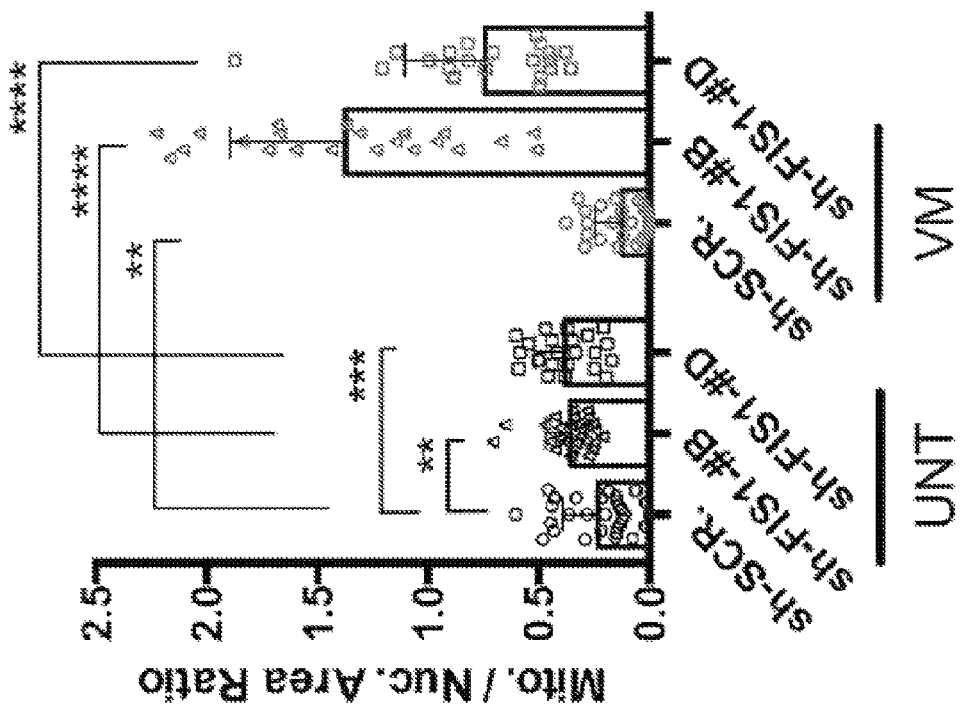
Figure 61:
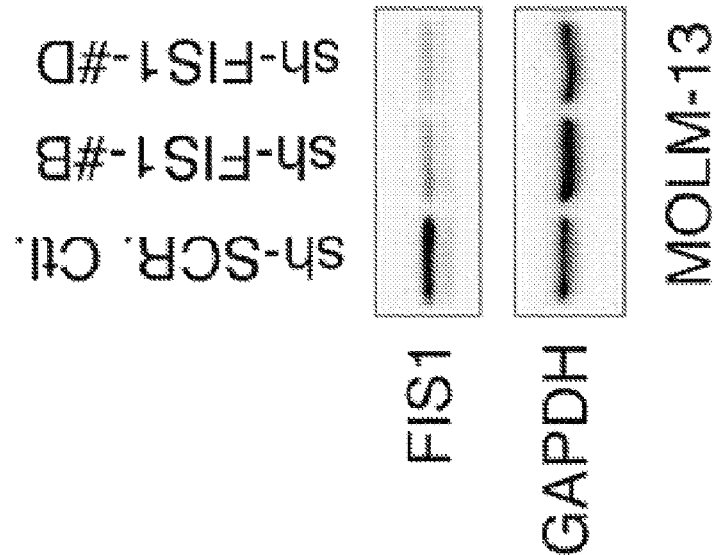

FIG. 61 is a series of western blot images showing the knockdown efficiency of sh-FIS1 in MOLM-13 cells (left) and a chart showing the mitochondrial to nuclear area ratio in MOLM-13 cells (right). Each dot represents an individual cell. Mean+SD, type 3, two-tailed t test. p<0.01; *p<0.001; ****p<0.0001.

Figure 62:
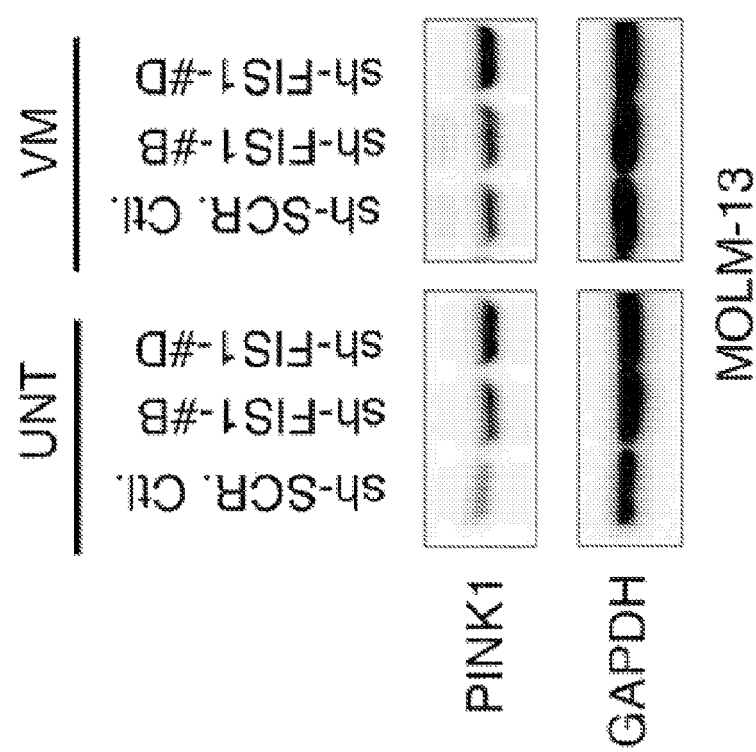

FIG. 62 is a series of western blot images showing the expression of PINK1 in MOLM-13 cells on day 6 following shRNA-mediated knockdown of FIS1 with or without 5 mM valinomycin treatment for 3 hr.

Figure 63:
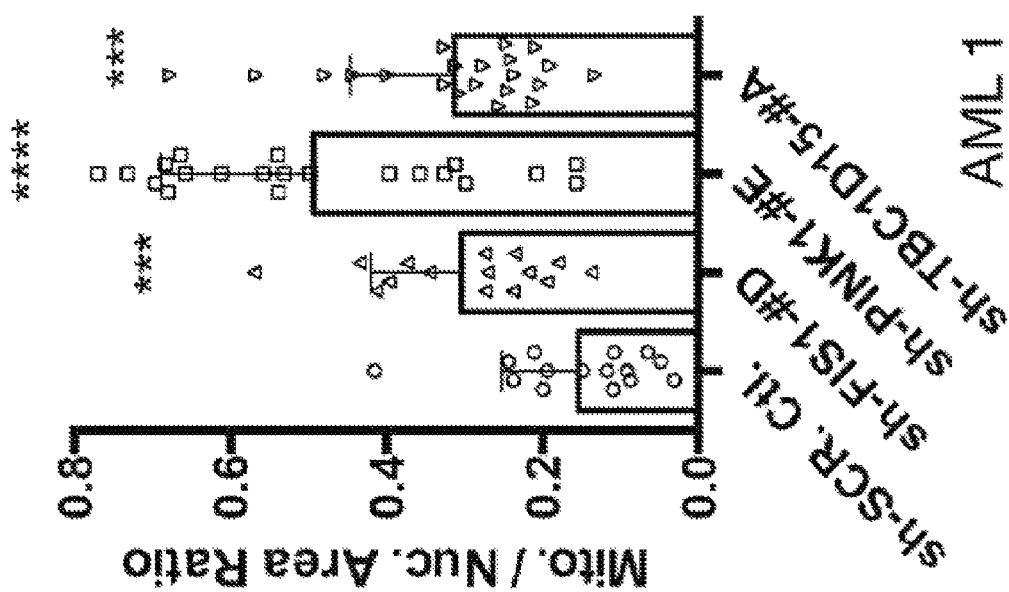

FIG. 63 is a chart showing the mitochondrial to nuclear area ratio in primary AML cells with knockdown of FIS1, PINK1, or TBC1D15. Each dot represents an individual cell. Mean+SD, type 3, two-tailed t test. *p<0.001; **p<0.0001

Figure 64:
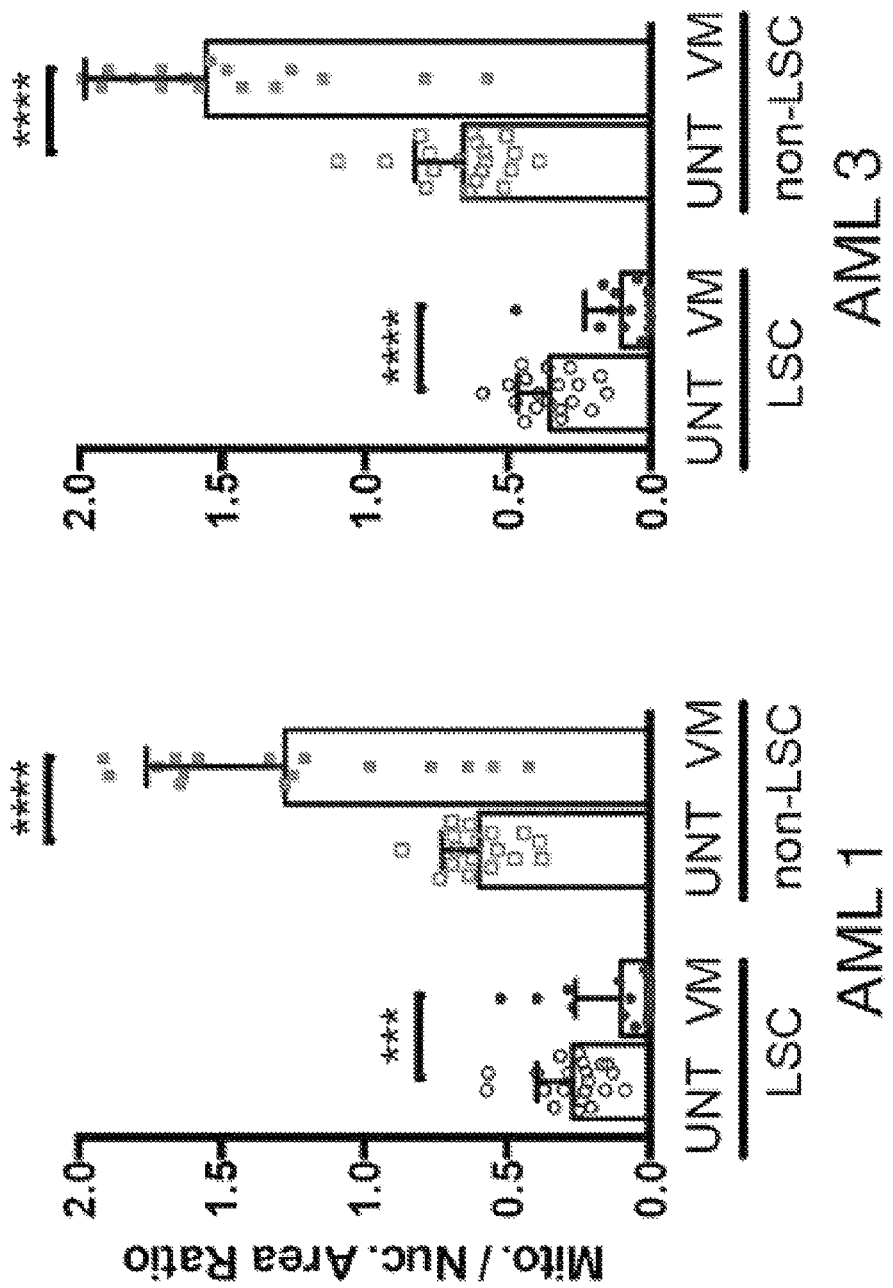

FIG. 64 is a series of charts showing the mitochondrial to nuclear area ratio in LSCs versus non-LSCs isolated from primary AML samples under basal and valinomycin-treated conditions. Each dot represents an individual cell. Mean+SD, type 3, two-tailed t test. *p<0.001; **p.

Figure 65:
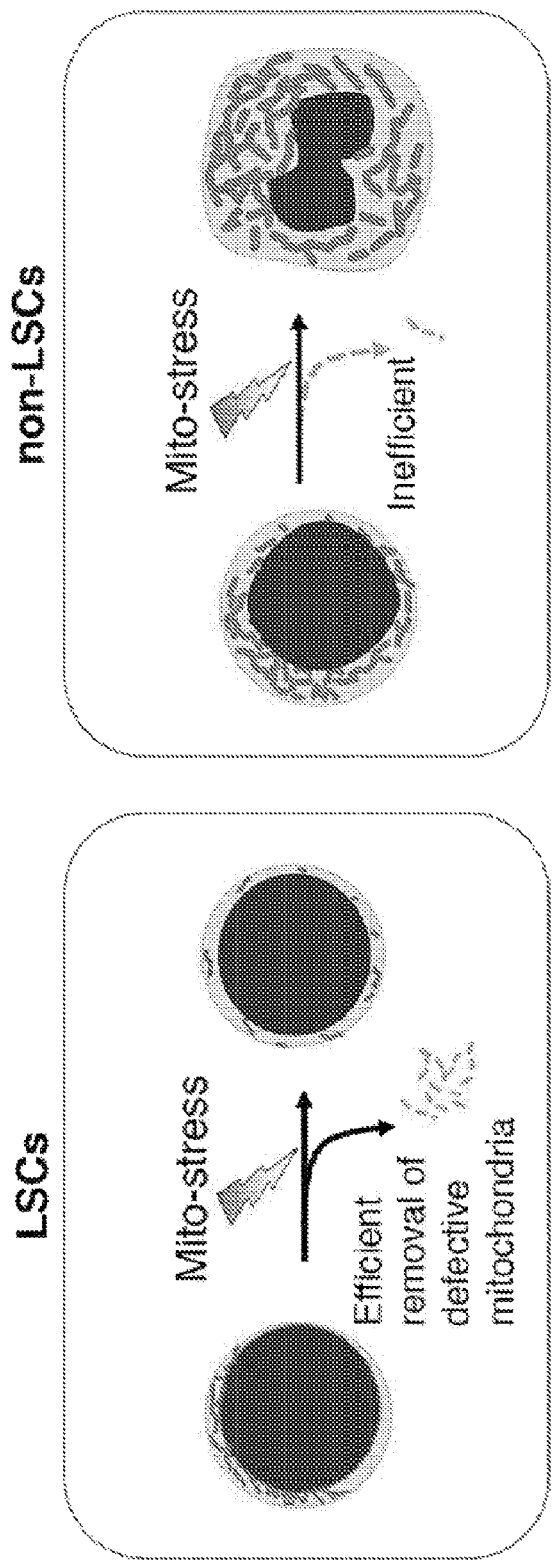

FIG. 65 is a diagram summarizing the mitochondrial morphology changes seen in LSCs versus non-LSCs with or without mitochondrial stress.

Figure 66:
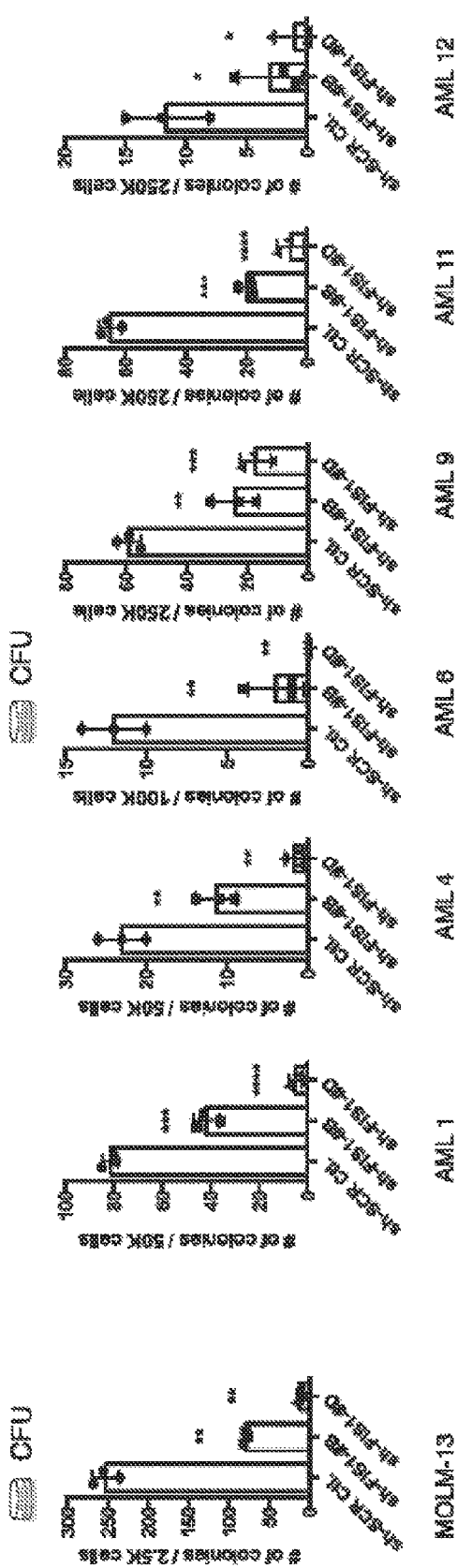

FIG. 66 is a series of charts showing the colony-forming ability of MOLM-13 cells following shRNA-mediated knockdown of FIS1 (far left chart) and the colony-forming ability of primary AML cells following shRNA-mediated knockdown of FIS1 (right six charts).

Figure 67:
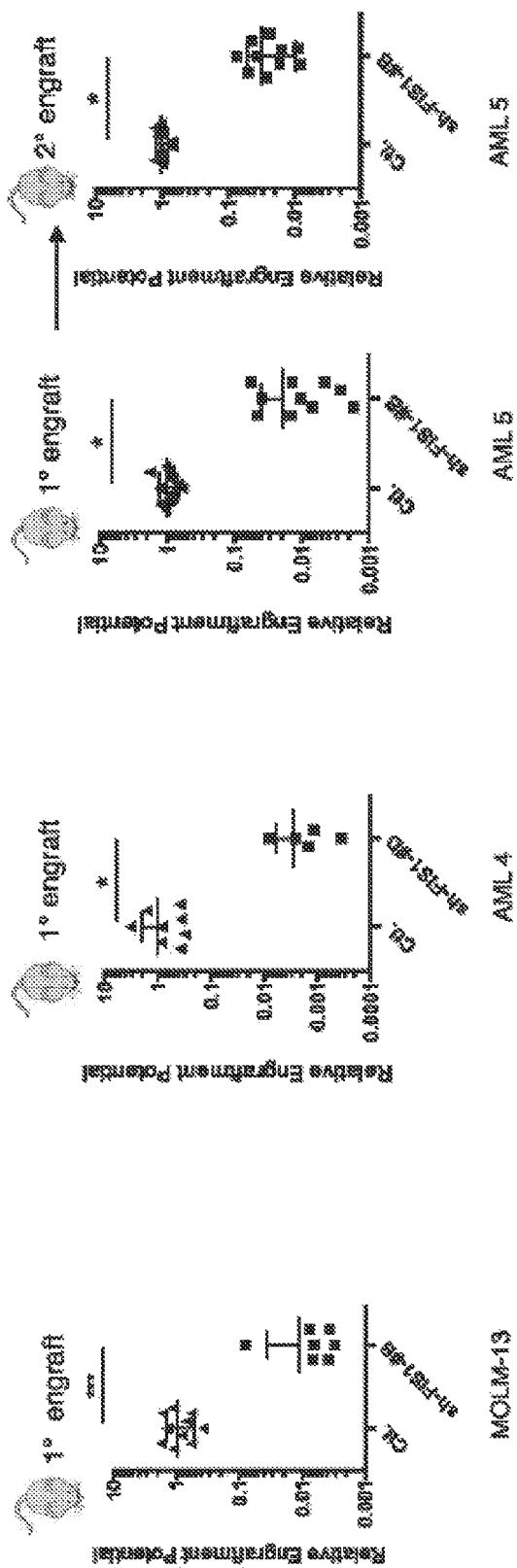

FIG. 67 is a series of charts showing the normalized relative engraftment potential of MOLM-13 cells with or without FIS1 knockdown (far left char), normalized relative engraftment potential of primary AML 4 with or without FIS1 knockdown (second chart from the left), and Normalized relative engraftment potential of primary AML 5 with or without FIS1 knockdown (1° and 2° indicate primary and secondary xenograft experiments respectively; right two charts).

Figure 68:
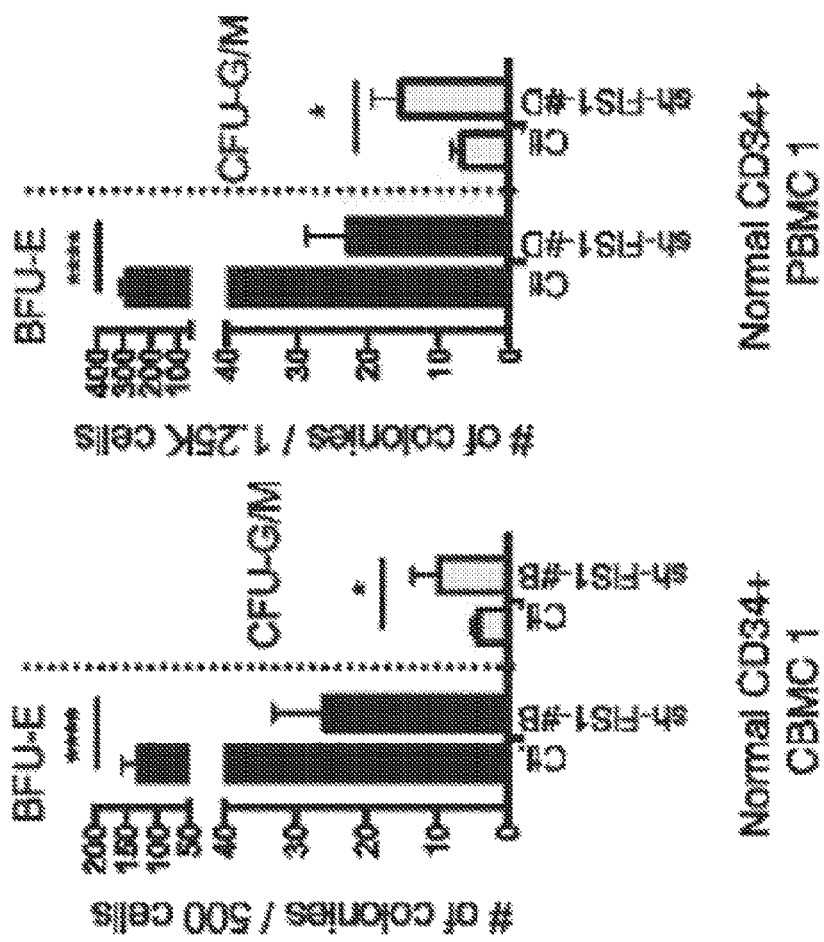

FIG. 68 is a series of charts showing the number of BFU-E and CFU-G/M colonies produced by normal CD34+ CBMCs or PBMCs in methylcellulose. Mean±SD (n=3), type 2, two-tailed t test. *p<0.05; ****p<0.0001.

Figure 69:
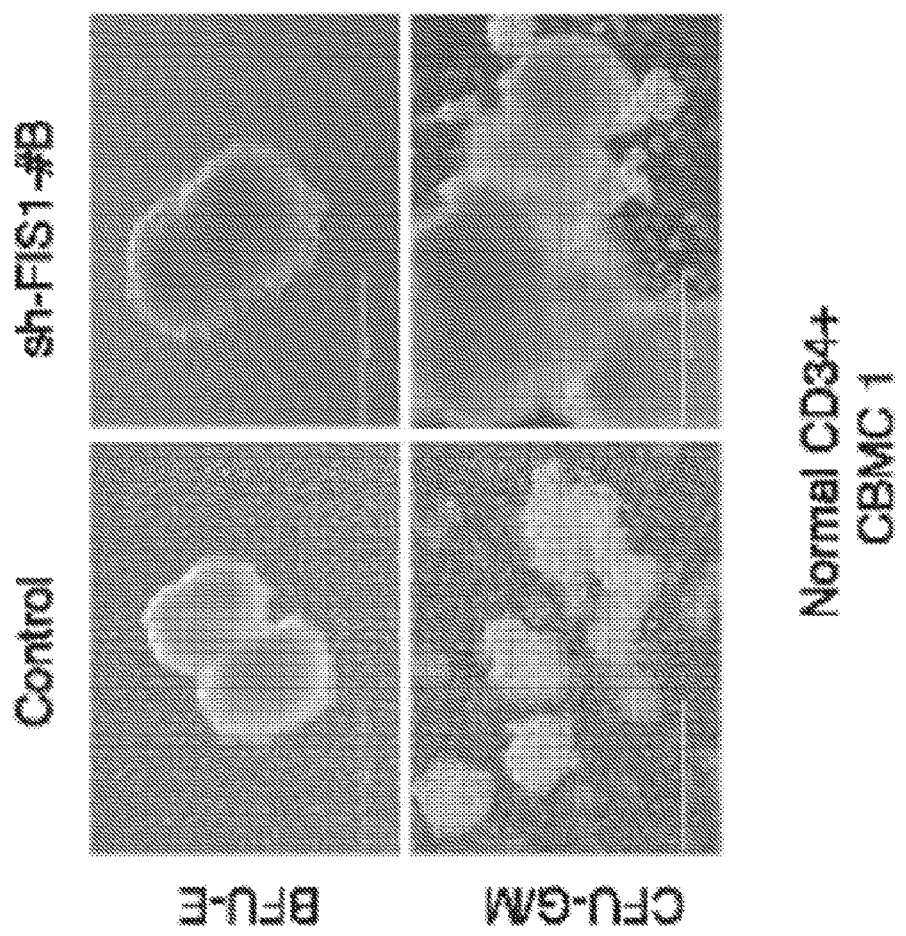

FIG. 69 is a series of images showing the morphology of BFU-E and CFU-G/M colonies.

Figure 70:
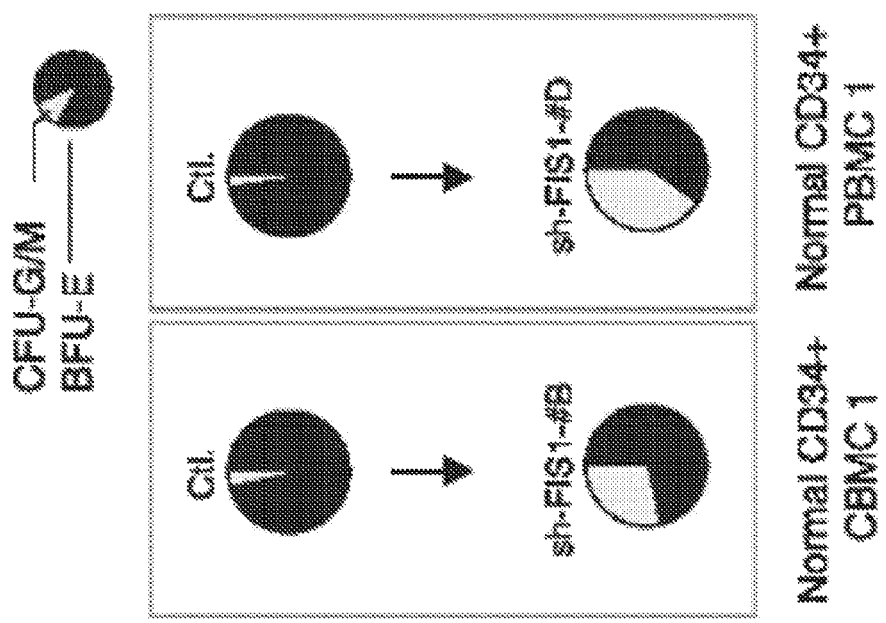

FIG. 70 is a series of charts showing changes in proportion of CFU-G/M and BFU-E colonies induced by FIS1 knockdown.

Figure 71:
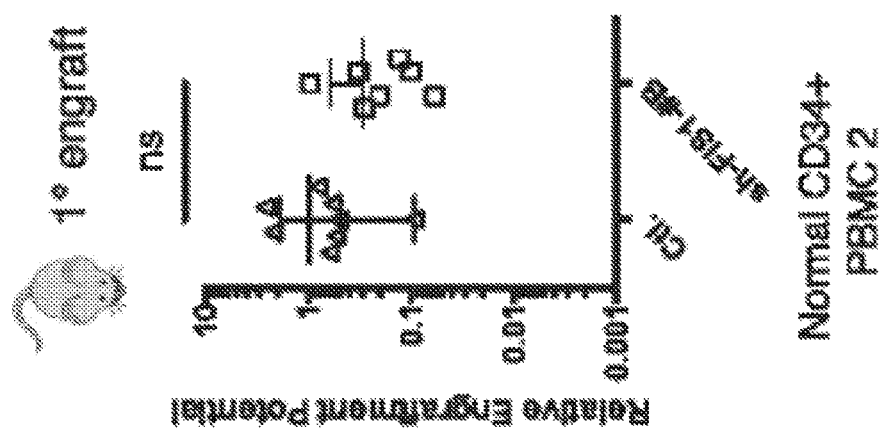

FIG. 71 is a chart showing the normalized relative engraftment potential of normal CD34+ PBMCs with or without FIS1 knockdown. Each dot represents an individual mouse, and lines represent mean±SD; type 2, two-tailed t test. Ns, not significant.

Figure 72:
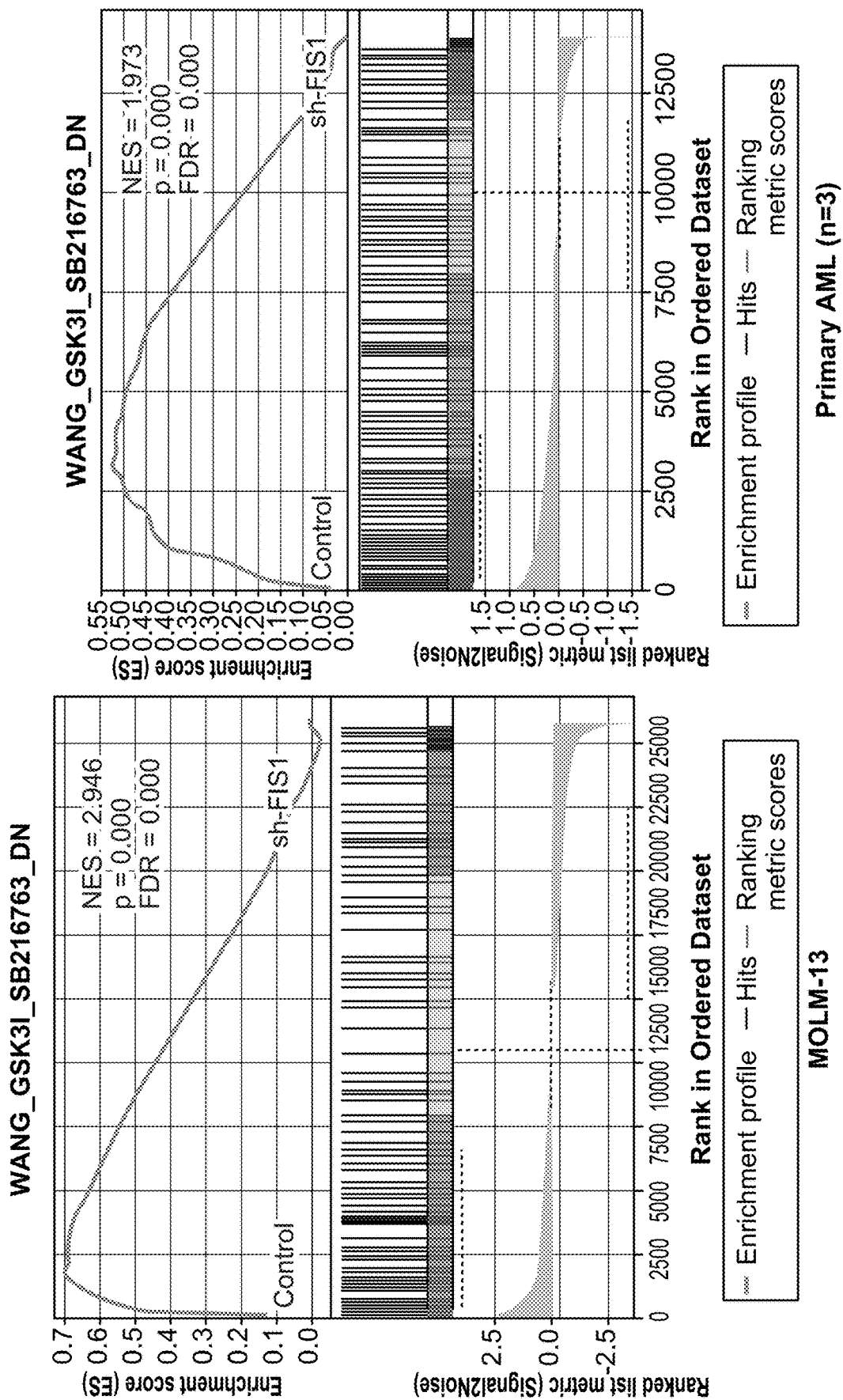

FIG. 72 is a series of GSEA enrichment plots showing that loss of FIS1 in MOLM-13 (3 technical replicates) and primary AML cells (3 biological replicates) results in downregulation of the WANG_GSK3I_SB216732_DN gene set. sh-FIS1 represents sh-FIS1-#B and sh-FIS1-#D together.

Figure 73:
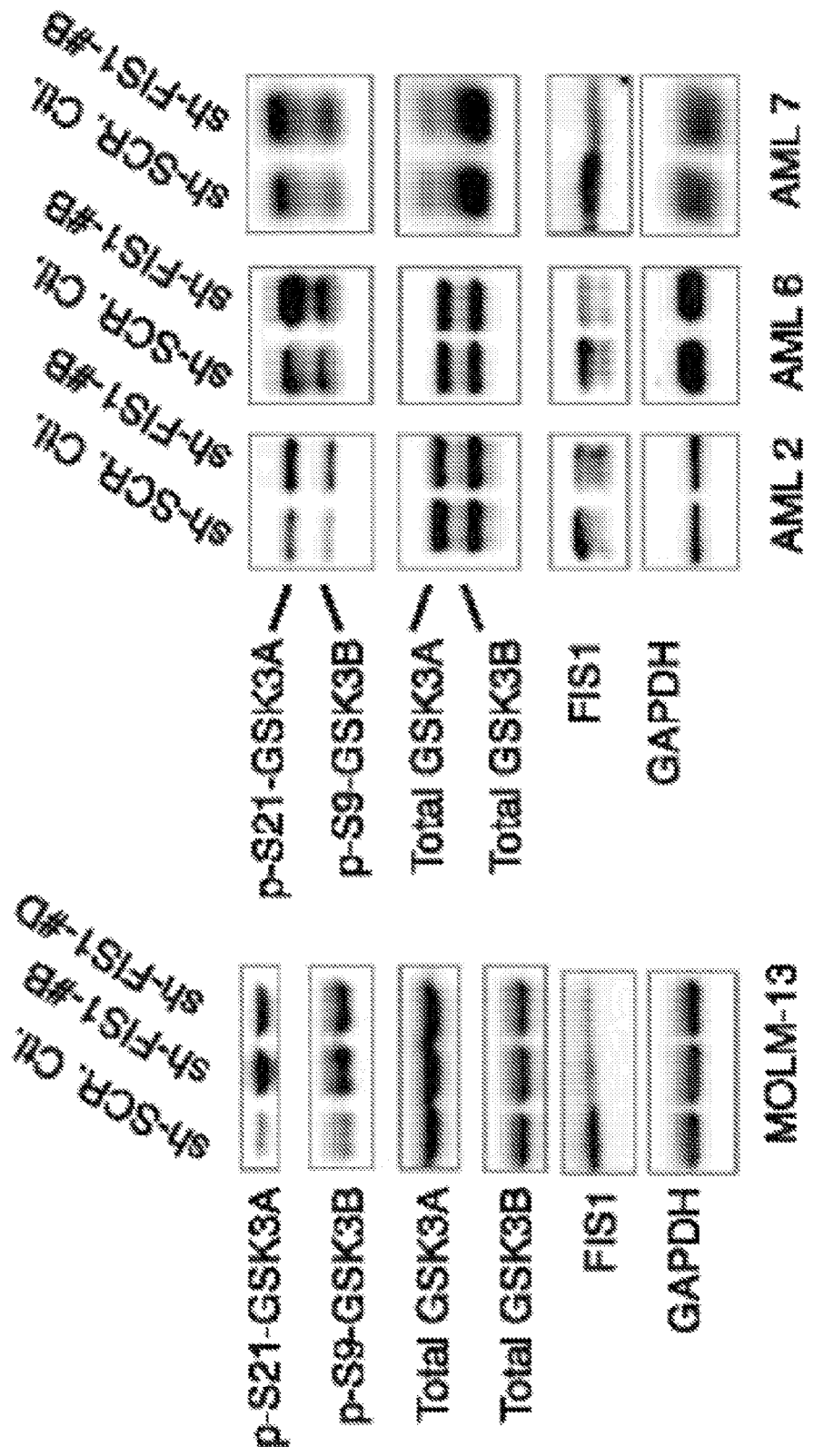

FIG. 73 is a series of western blot images showing the activity of GSK3 signaling in MOLM-13 and primary AML cells on day 6 following FIS1 knockdown.

Figure 74:
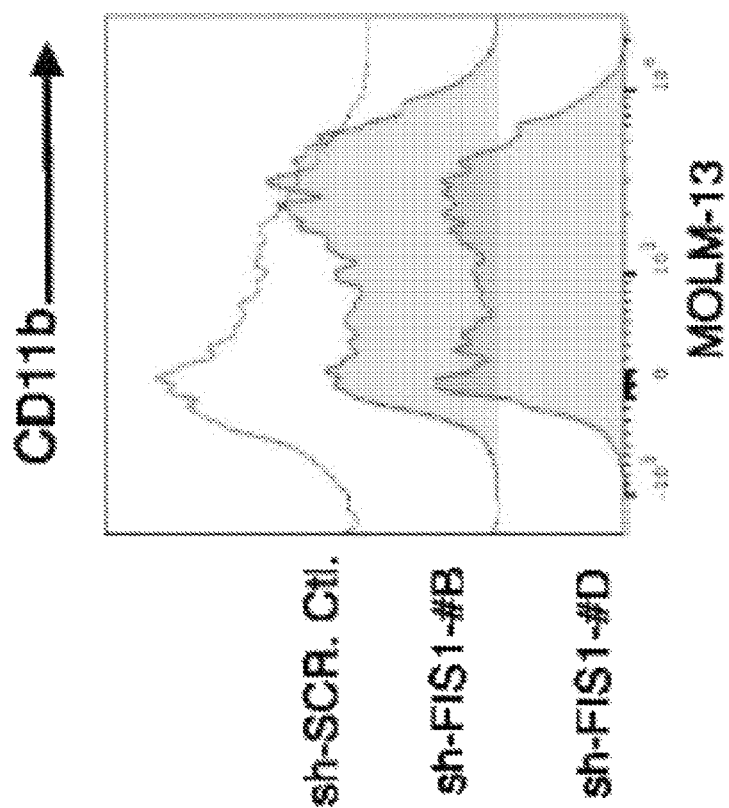

FIG. 74 is a histogram showing flow cytometry analysis of CD11b expression in MOLM-13 cells on day 6 following FIS1 knockdown.

Figure 75:
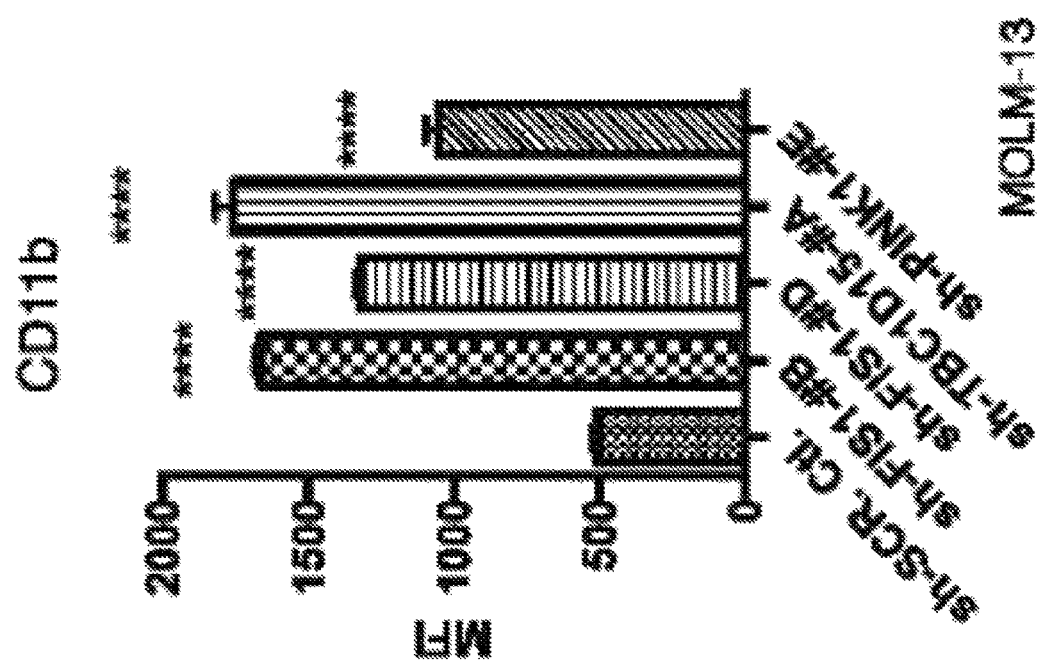

FIG. 75 is a chart showing the quantification of the CD11b flow stain signal in MOLM-13 cells on day 6 following knockdown of each target gene. Mean±SD, (n=3), type 2, two-tailed t test. ****p<0.0001.

Figure 76:
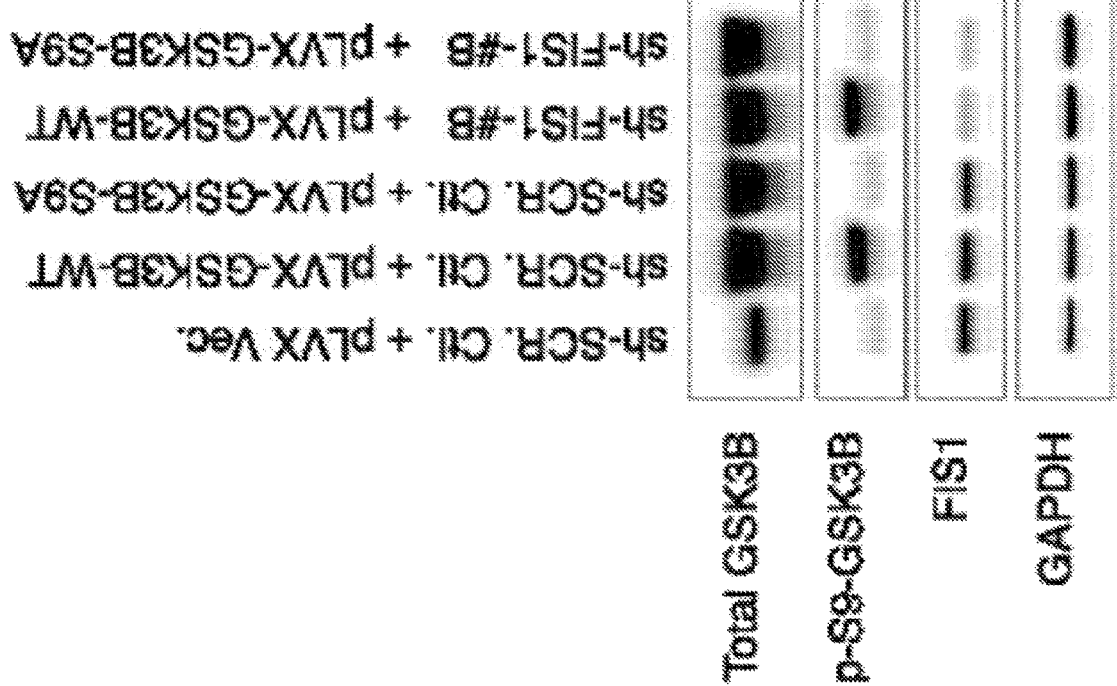

FIG. 76 is a series of western blot images showing expression of total GSK3B, p-S9-GSK3B, and FIS1 in MOLM-13 cells engineered to express GSK3B-WT or GSK3B-S9A alleles with or without FIS1 knockdown.

Figure 77:
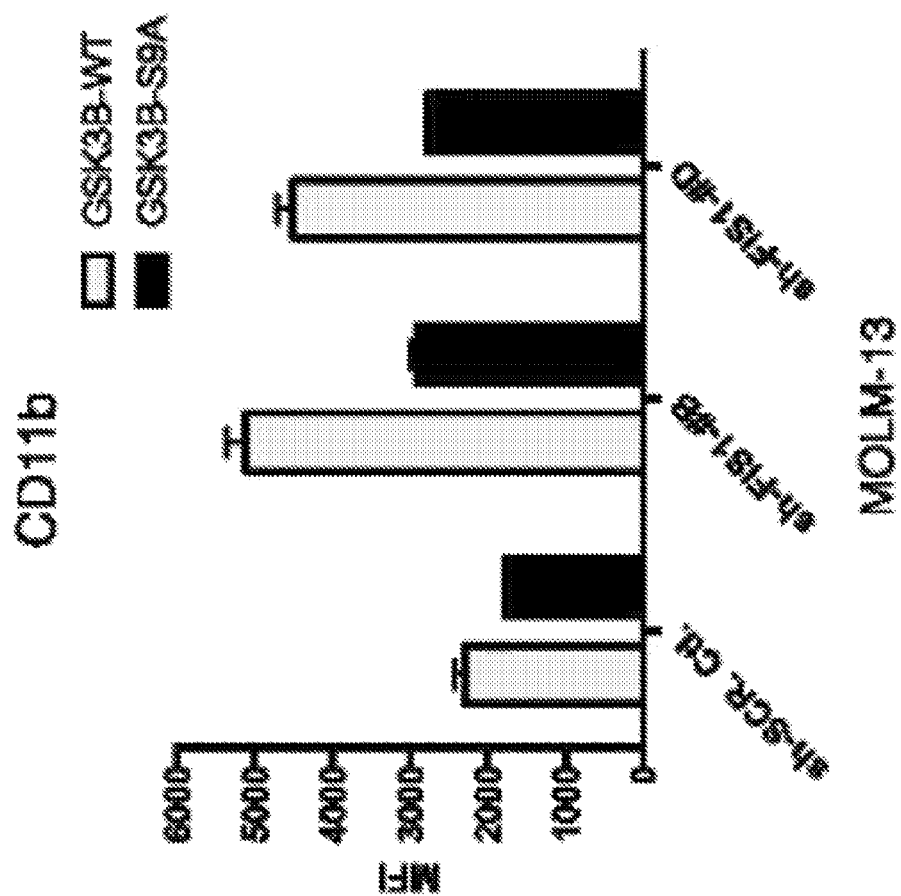

FIG. 77 is a chart showing the quantification of the CD11b flow stain signal in MOLM-13 cells on day 6 following simultaneous expression of GSK3B-WT or GSK3B-S9A alleles and knockdown of FIS1. Mean±SD, n=3.

Figure 78:
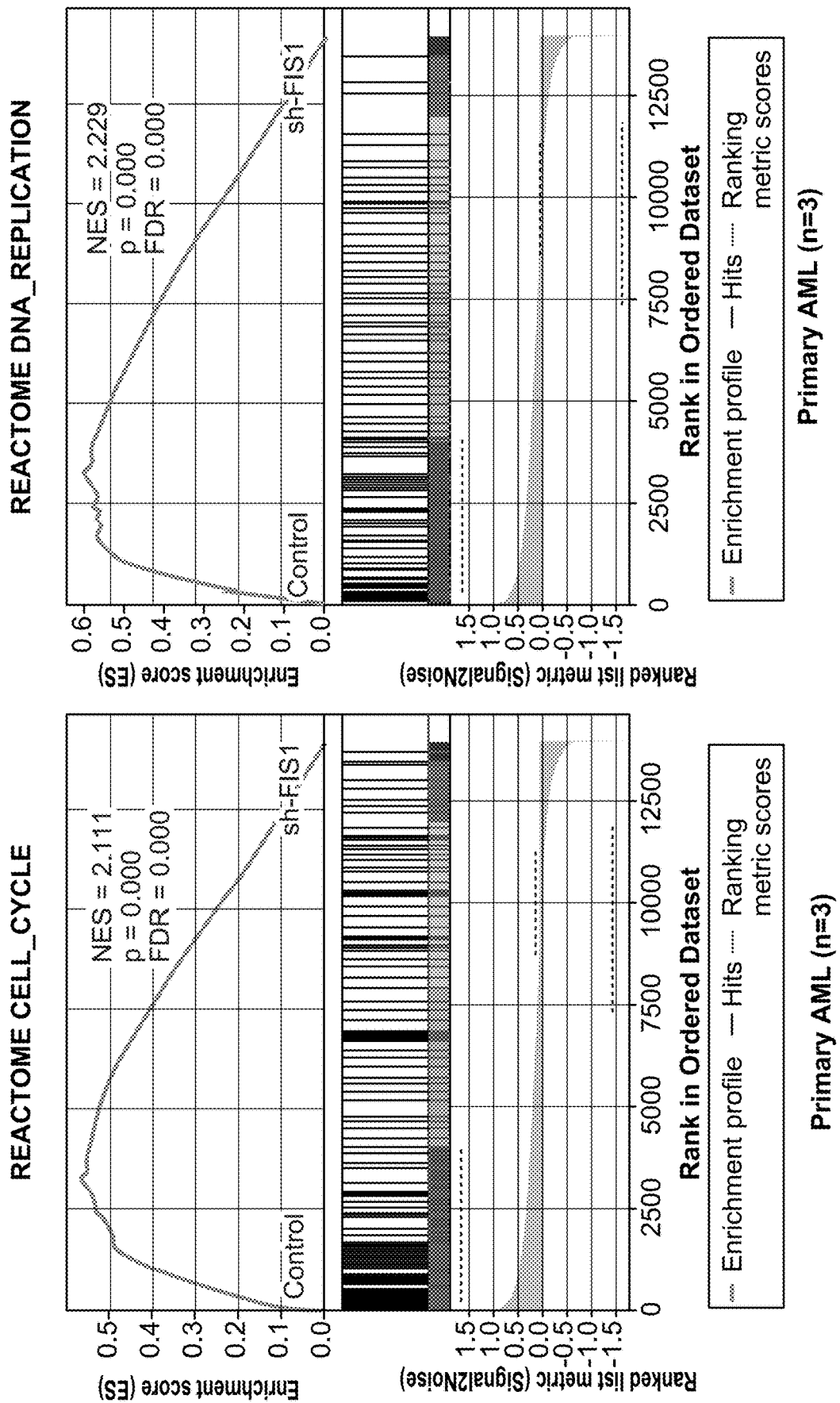
Figure 78:
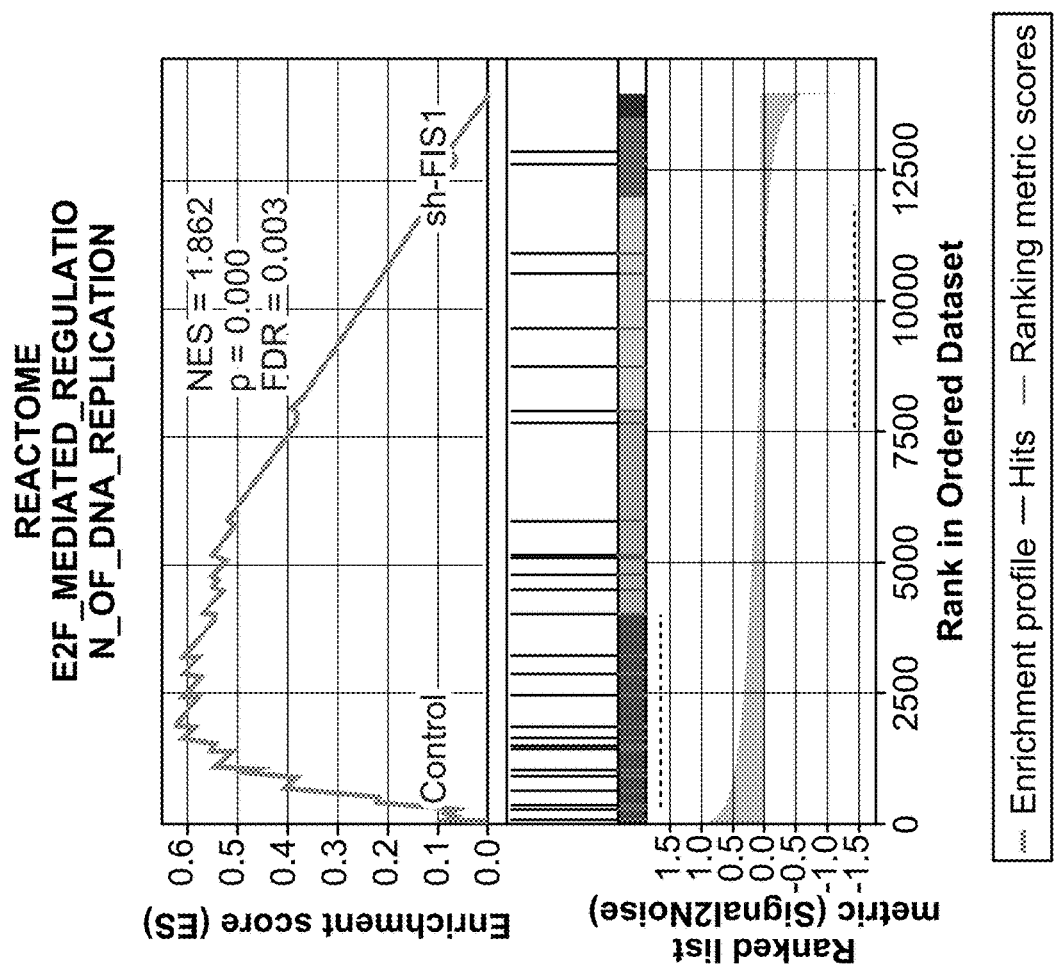

FIG. 78 is a series of GSEA enrichment plots showing that loss of FIS1 in primary AML cells results in downregulation of 3 cell cycle-related gene sets from the GSEA Reactome collection.

Figure 79:
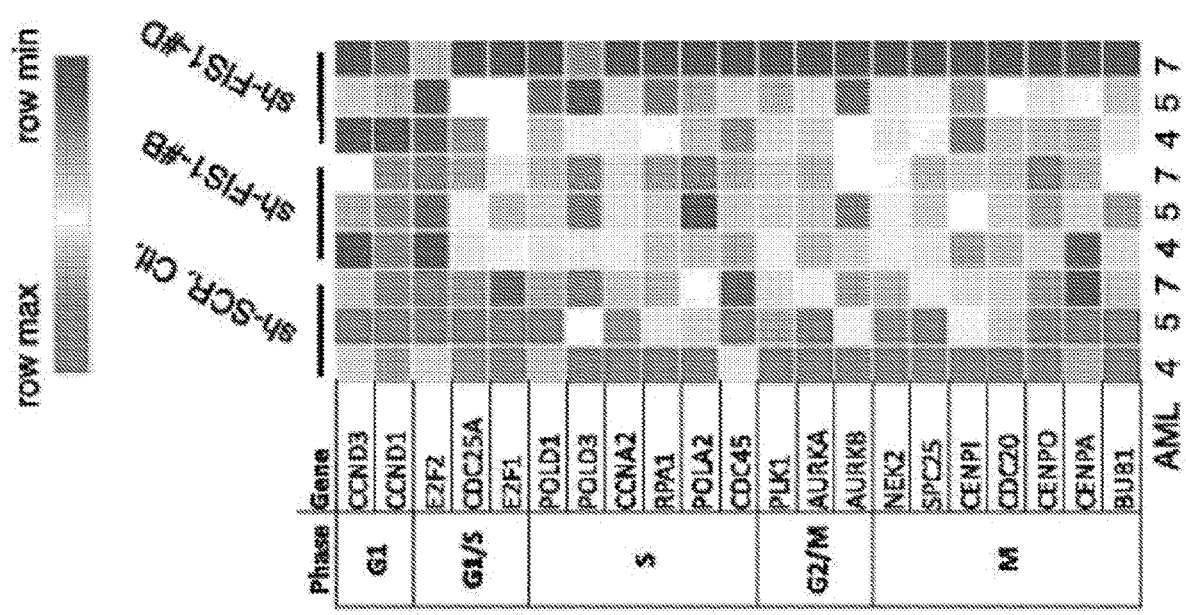

FIG. 79 is a heatmap showing the expression of representative cell cycle-related genes in primary AML cells with or without FIS1 knockdown. Data are generated from RNA-seq analysis.

Figure 80:
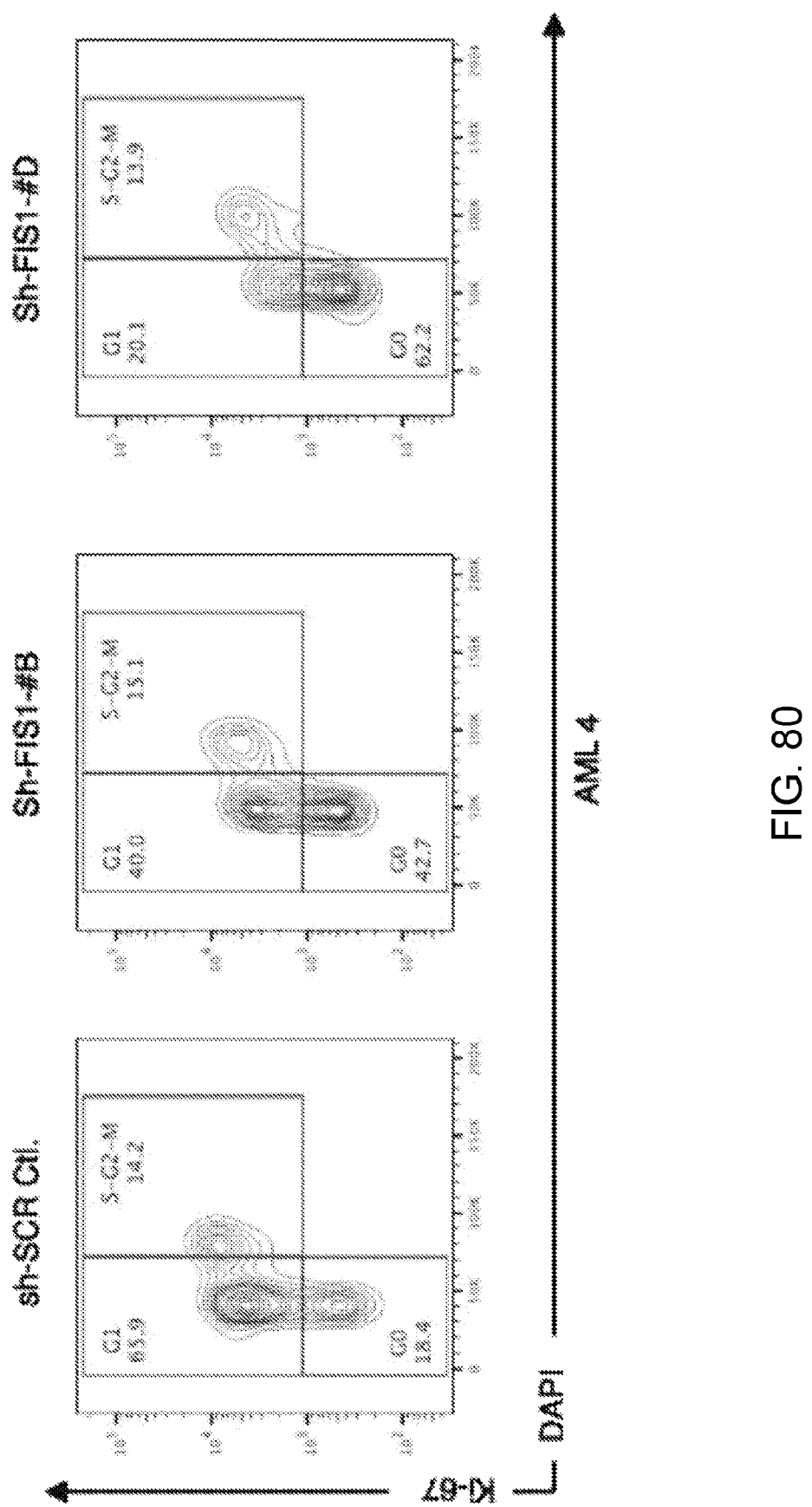

FIG. 80 is a series of charts showing flow cytometry analysis of cell cycle status in primary AML cells on day 6 following FIS1 knockdown. The cell cycle profile is revealed by Ki-67 and DAPI staining.

Figure 81:
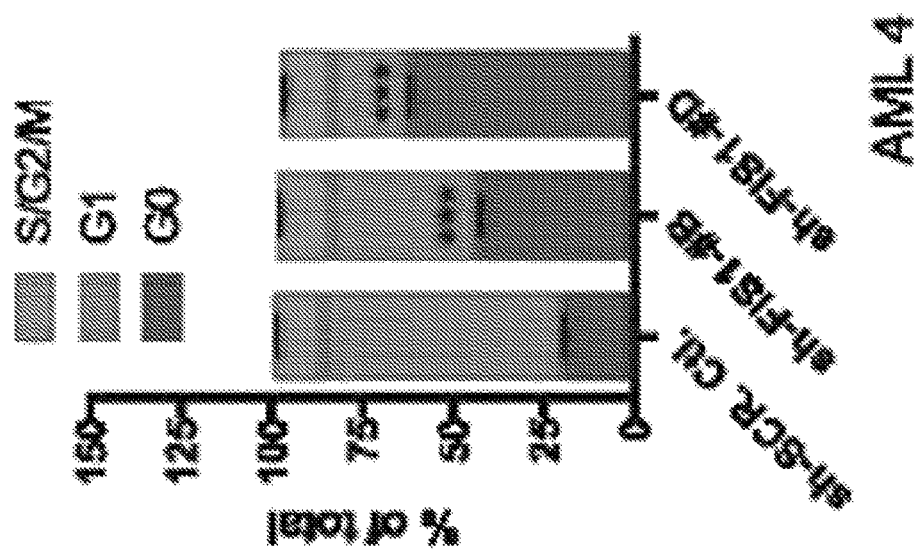

FIG. 81 is a chart showing the Quantification of the cell cycle profile shown in FIG. 80.

Figure 82:
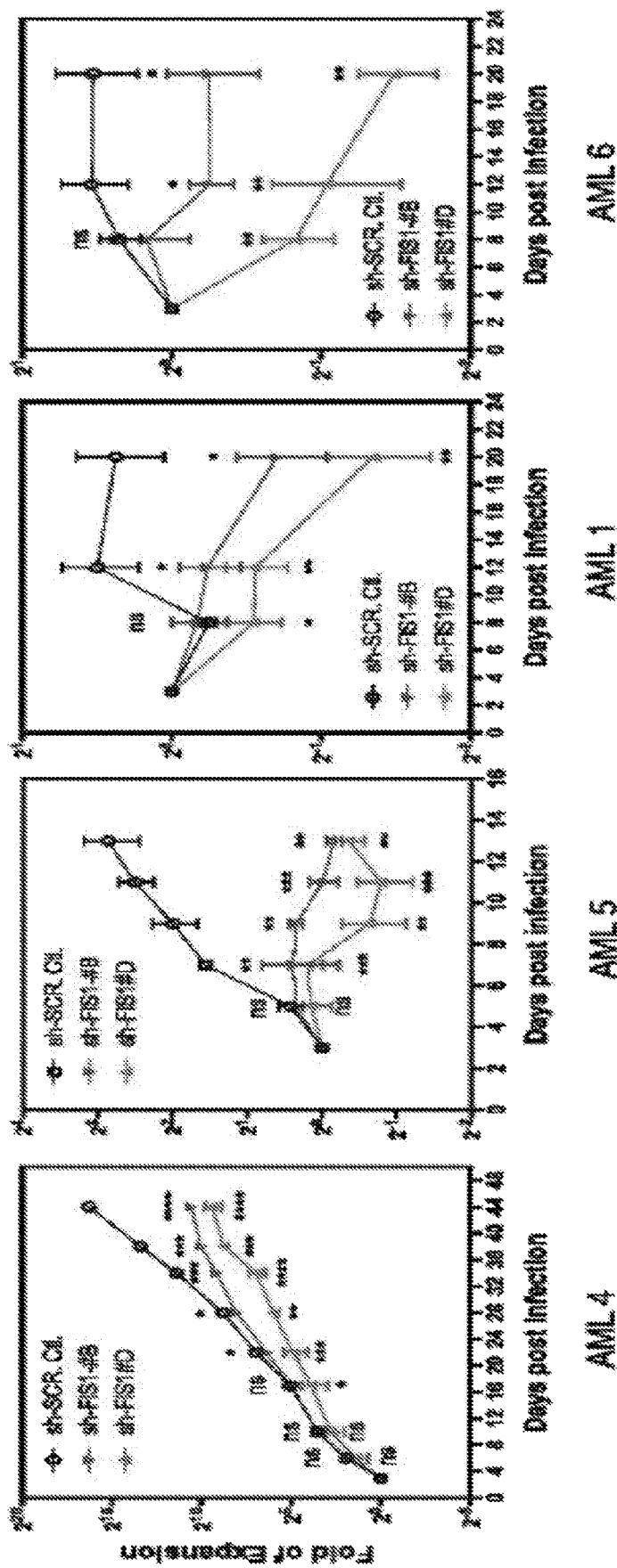

FIG. 82 is a series of charts showing the fold of expansion of primary AML cells cultured in complete serum-free medium, plotted in log 2 scale. Mean±SD, n=3. For each time point, knockdown clones are compared with the control using type 2, two-tailed t test. *p<0.05; p<0.01; *p<0.001; ****p<0.0001; ns, not significant.

Figure 83:
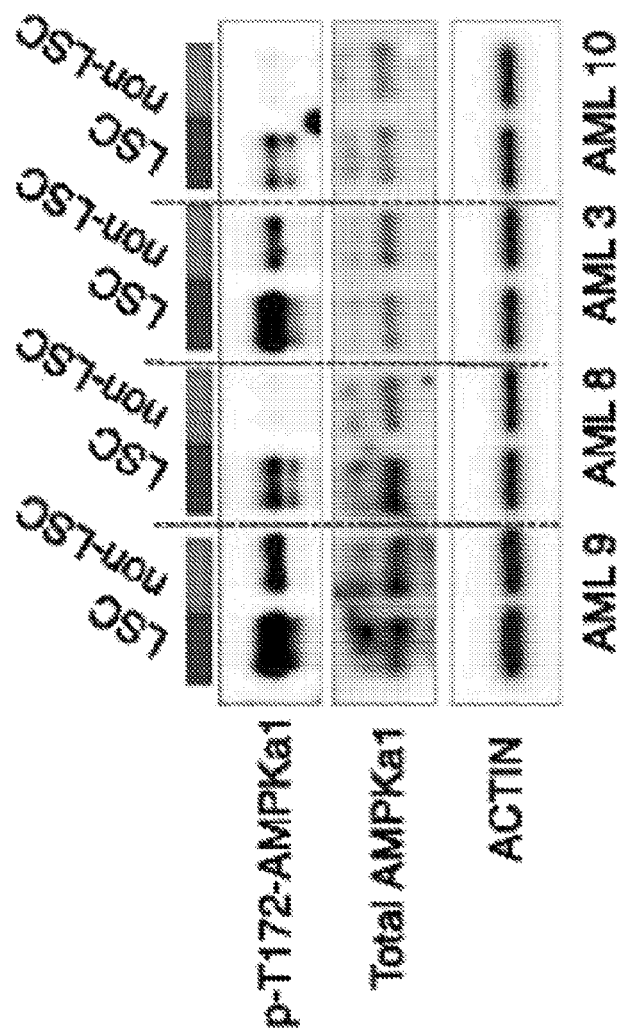

FIG. 83 is a series of western blot images showing the expression of p-T172-AMPKa1 and total AMPKa1 in ROS-low LSCs (L) versus ROS-high non-LSCs (N).

Figure 84:
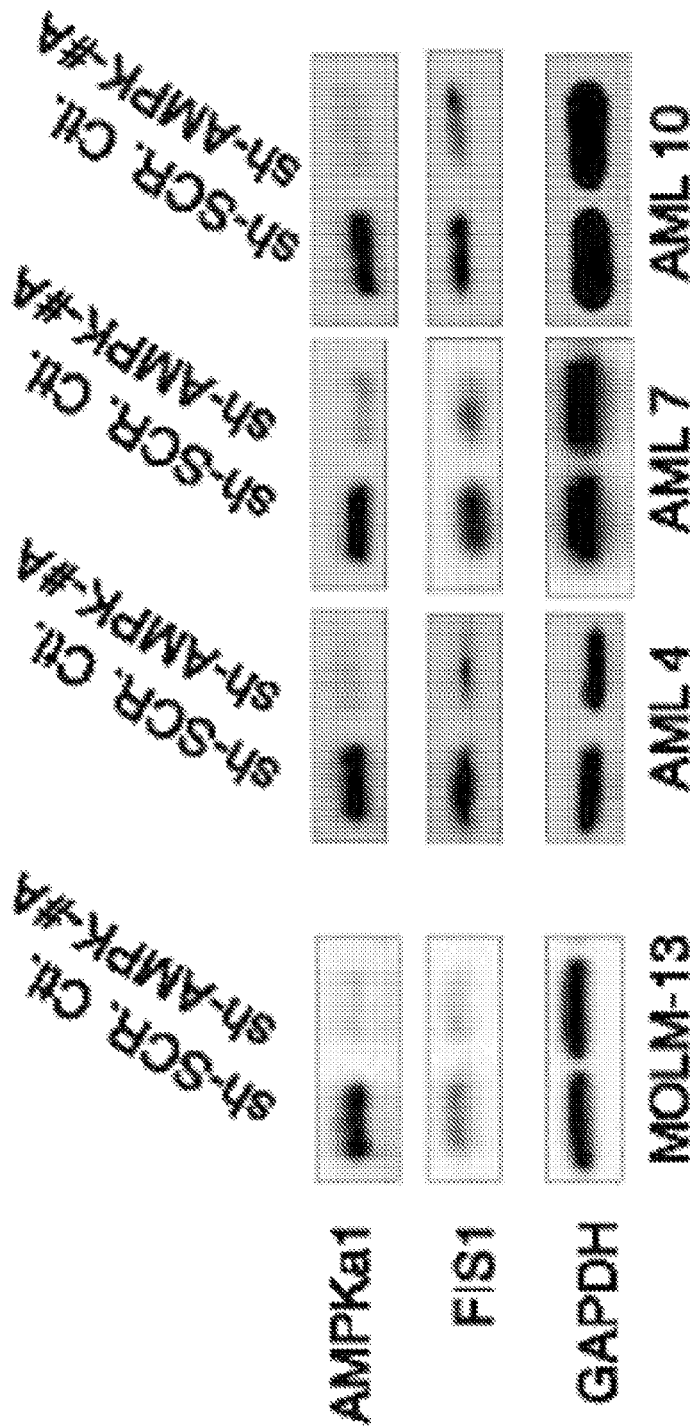

FIG. 84 is a series of western blot images showing the expression of FIS1 in MOLM-13 and primary AML cells on day 6 following AMPKa1(PRKAA1) knockdown.

Figure 85:
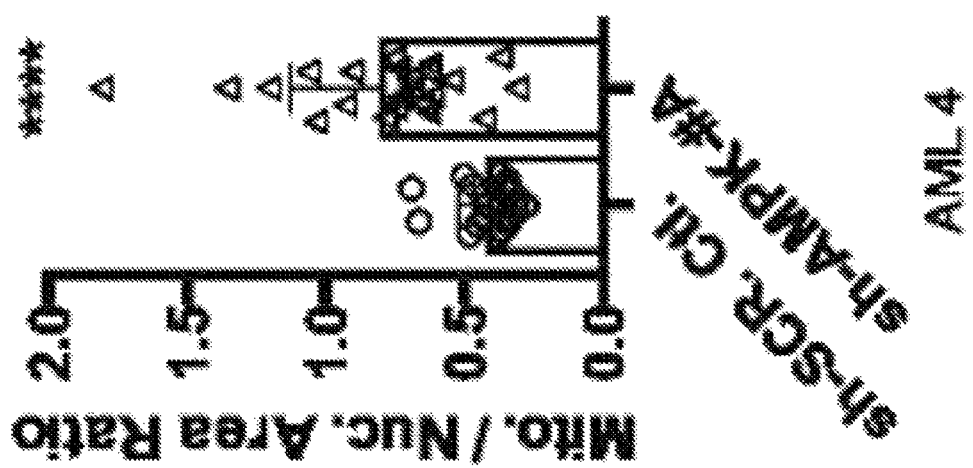

FIG. 85 is a chart showing the mitochondrial to nuclear area ratio in control and shAMPK AML cells. Each dot represents a single cell. Mean+SD, type 3, two-tailed t test.

Figure 86:
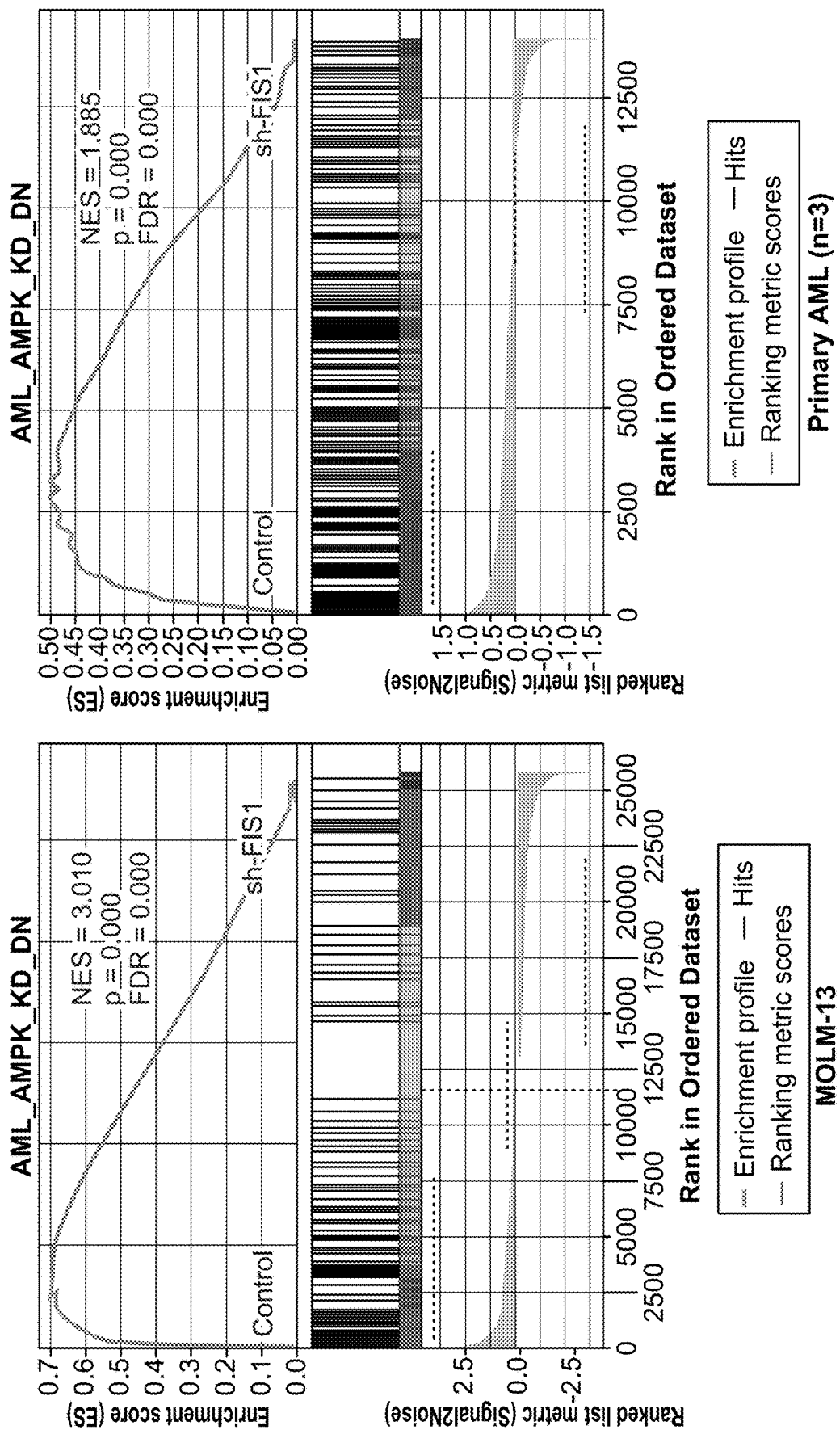

FIG. 86 is a series of GSEA enrichment plots showing that loss of FIS1 in MOLM-13 (3 technical replicates) and primary AML cells (3 biological replicates) results in downregulation of the AML_AMPK_KD_DN gene set. sh-FIS1 represents sh-FIS1-#B and sh-FIS1-#D together.

Figure 87:
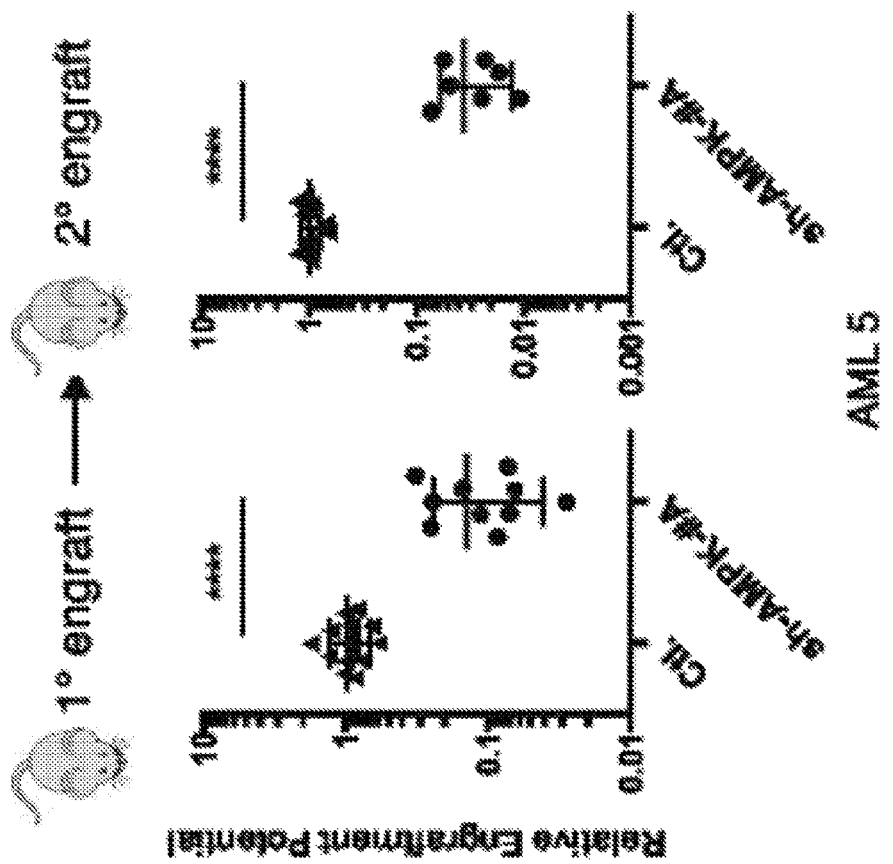
Figure 87:
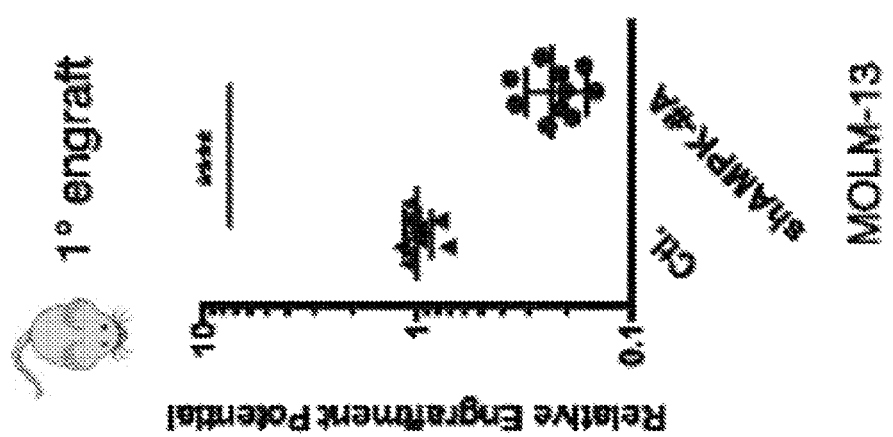

FIG. 87 is a series of charts showing relative engraftment potential of MOLM-13 cells with or without AMPK knockdown (left chart) and the normalized relative engraftment potential of primary AML patient 5 cells with or without AMPK knockdown (middle and right chart). 1° and 2° indicate primary and secondary xenograft experiments, respectively. Each dot represents an individual mouse, and lines represent mean±SD. Type 2, two-tailed t test. ****p<0.0001.

Figure 88:
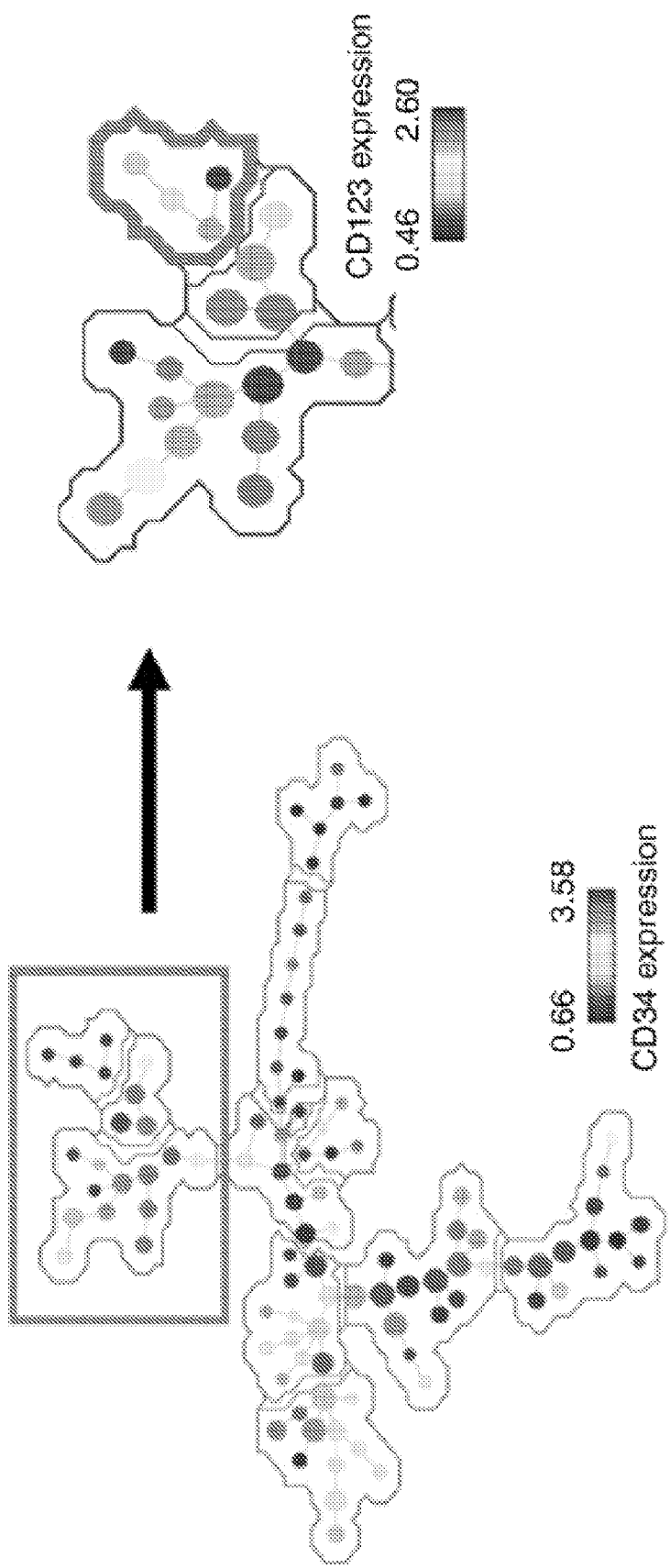

FIG. 88 is a series of network maps of different cellular subpopulations generated by analyzing the expression of 14 different cell surface markers in cells from high-risk myelodysplastic syndrome (MDS) patient samples. The left panel is shaded based on CD34 expression and the right panel is shaded based on CD123 expression.

Figure 89:
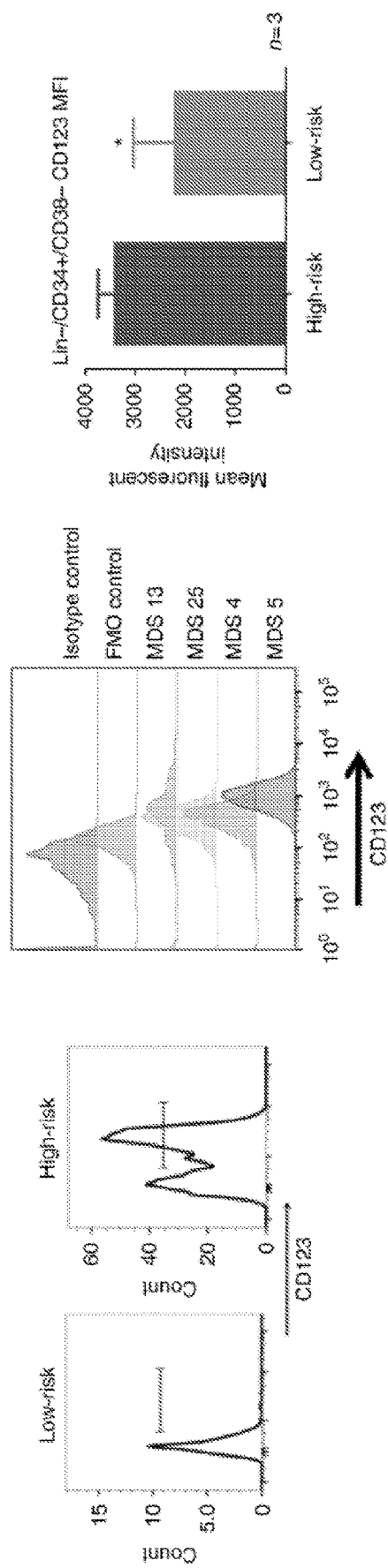

FIG. 89 shows a series of graphs of flow cytometric analysis of CD34+/CD38−/Lin− MDS bone marrow cells labeled with CD123. The left panel shows a comparison of representative low versus high-risk samples. The middle panel shows additional high-risk MDS samples in comparison to an isotype control. The right panel shows aggregate data of CD123 mean fluorescent intensity in high-risk vs. low-risk MDS patient samples showing a significant increase in high-risk MDS. *p<0.05 (two-tail t-test) error bars are S.D.

Figure 90:
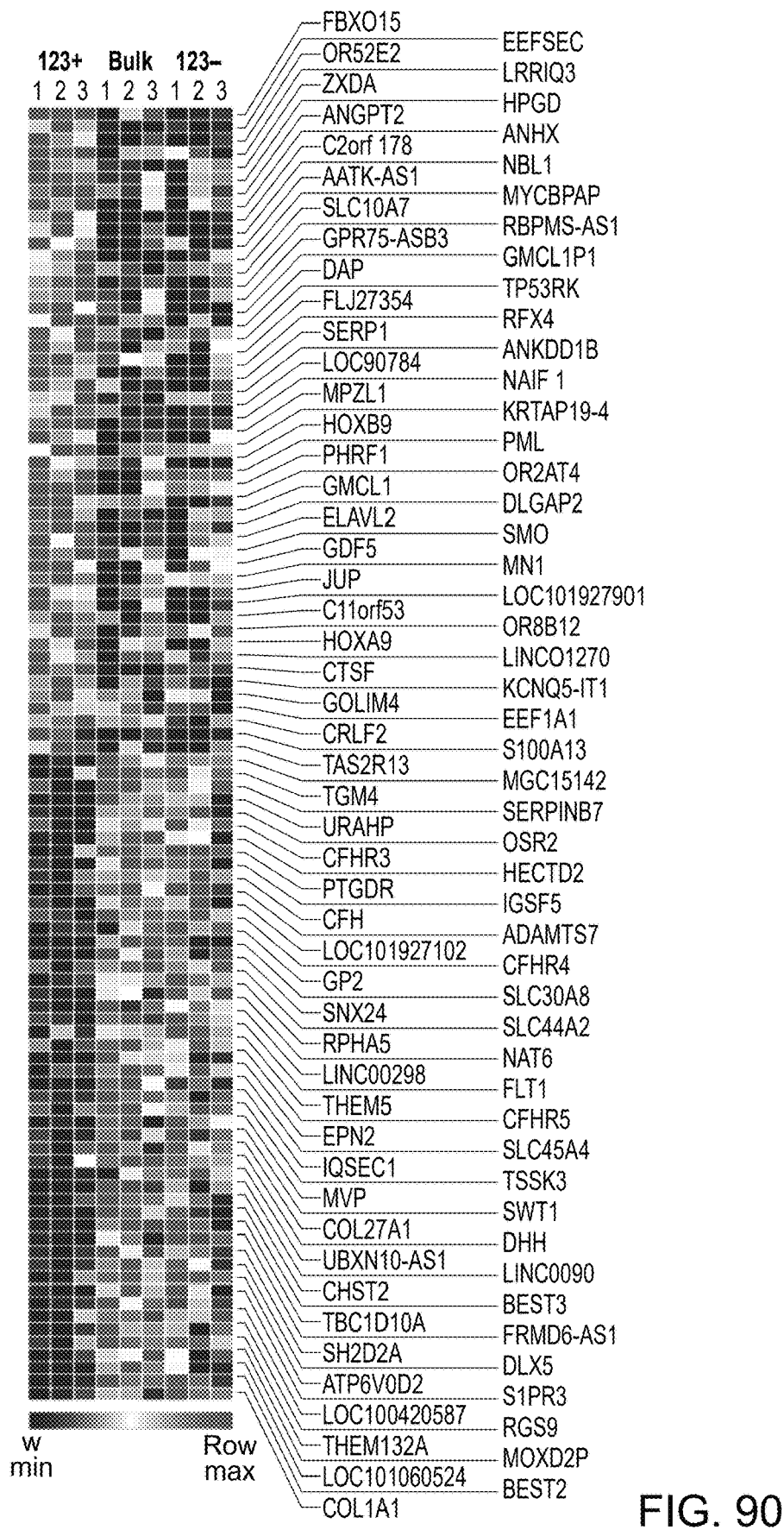

FIG. 90 is a heat map showing the top 50 up and downregulated genes in Lin−/CD34+/CD38−/CD123+ (123+), Lin−/CD34+/CD38−/CD123− (123−) and whole bone marrow mononuclear cells (bulk).

Figure 91:
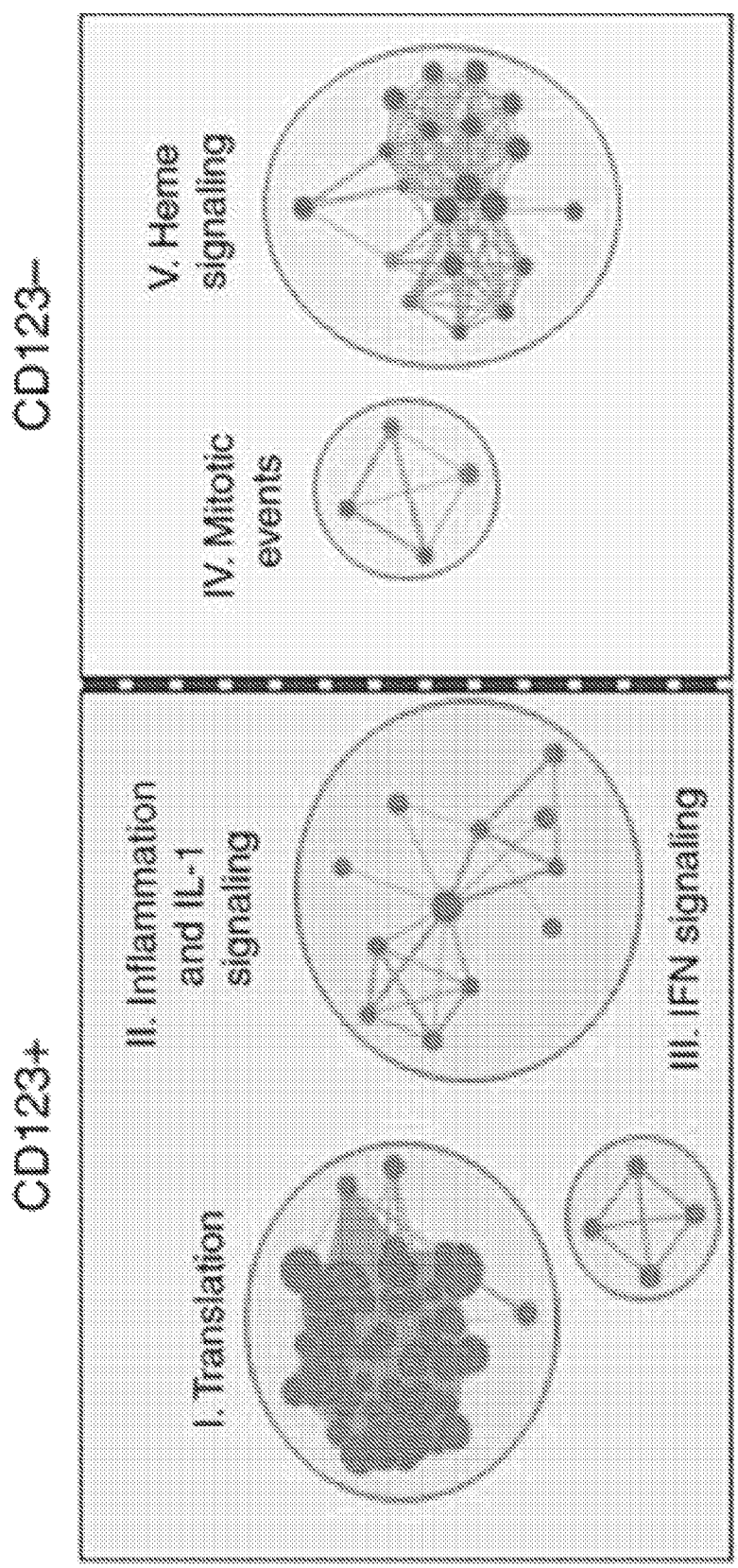

FIG. 91 is an enrichment map algorithm showing the top pathways and groups of pathways in CD123+ versus CD123− cells.

Figure 92:
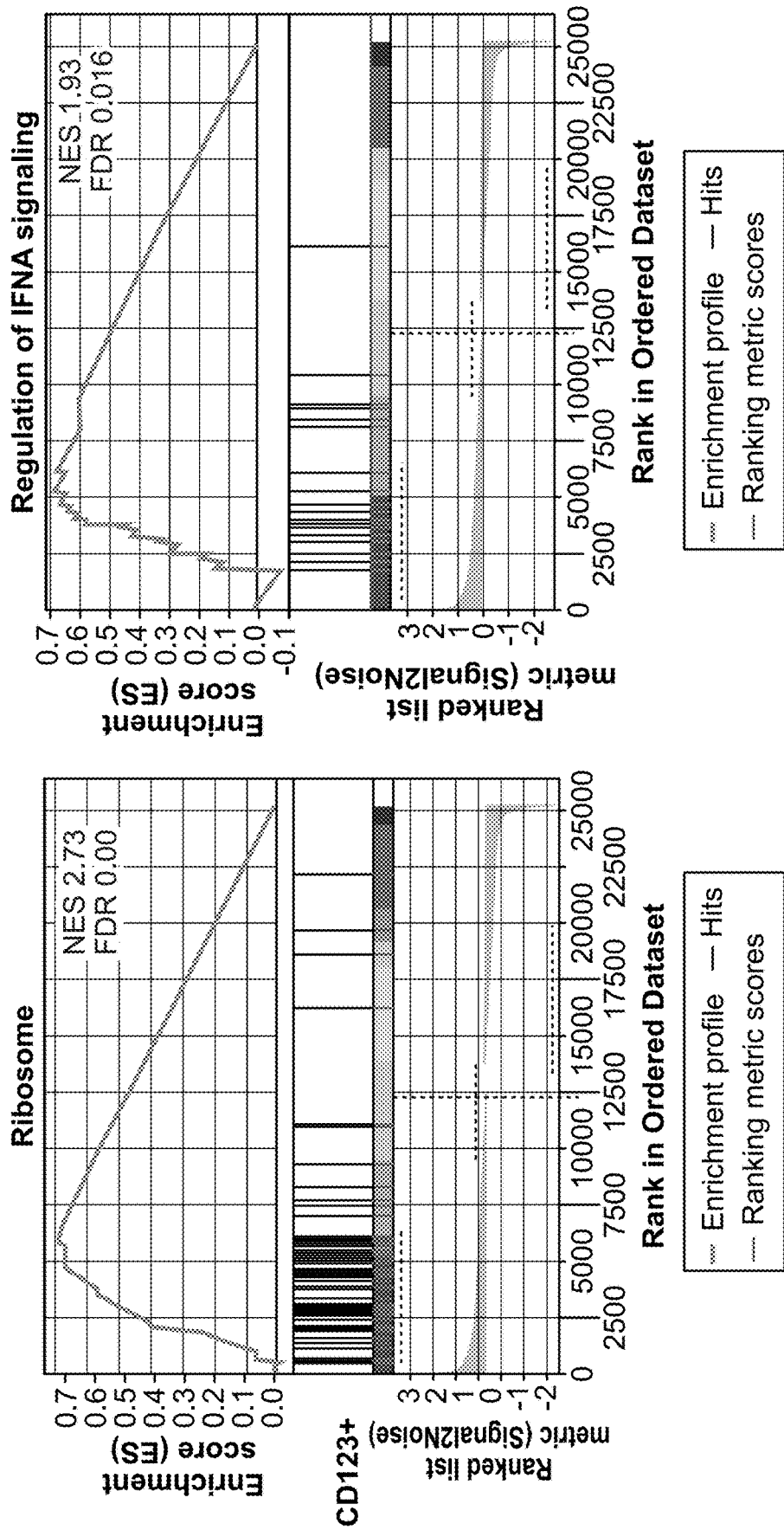
Figure 92:
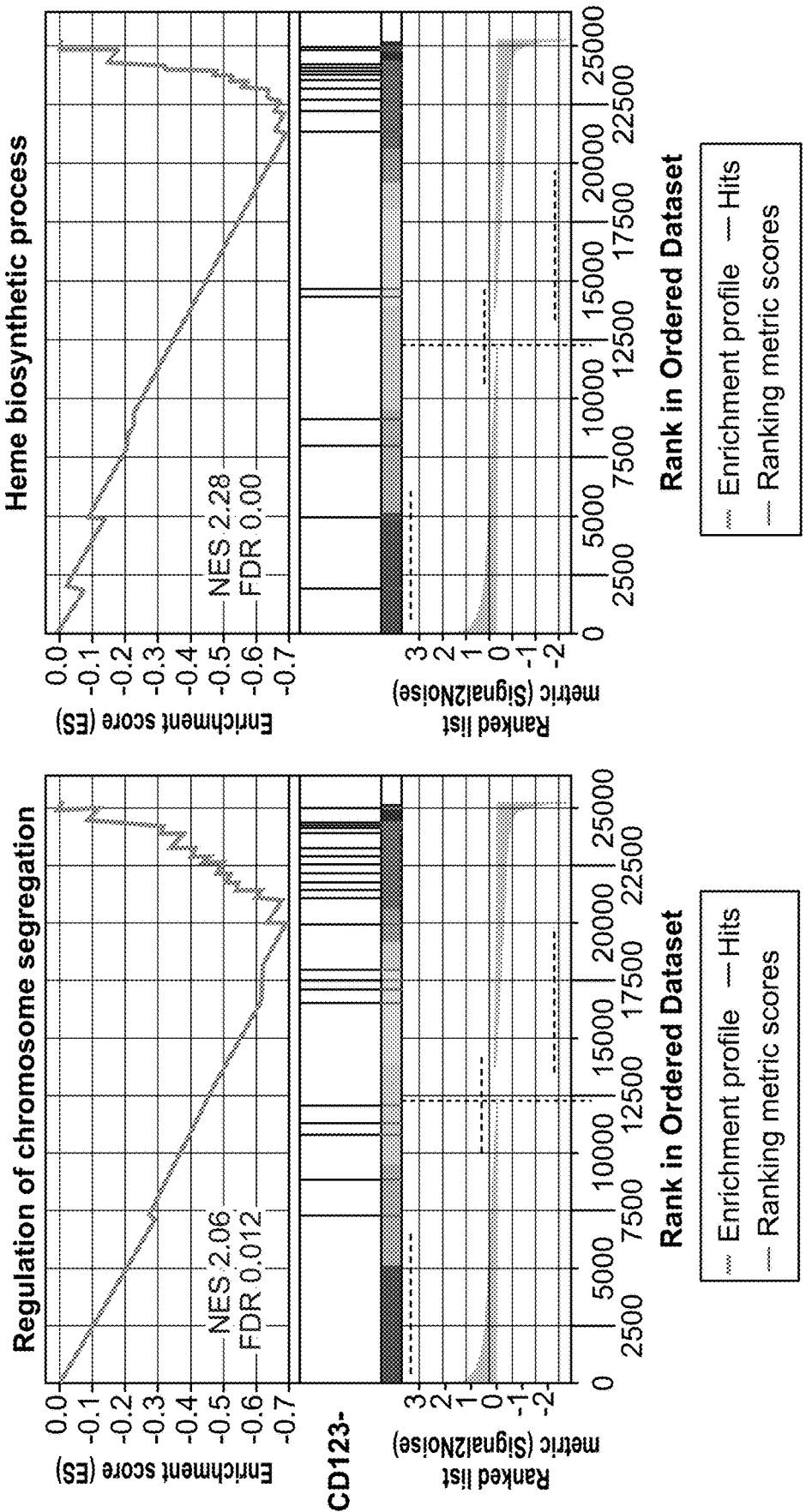

FIG. 92 is a series of GSEA enrichment plots (top row: CD123+ cells, bottom row: CD123− cells) showing that the ribosome signature was the most significantly enriched gene set in CD123+ cells (top left panel), that the regulation of IFNA signaling gene set was highly enriched in CD123+ cells (top right panel), that the regulation of chromosome segregation gene set was highly enriched in CD123− cells (bottom left panel) and that the Heme biosynthetic pathway was highly enriched in CD123− cells (bottom right panel).

Figure 93:
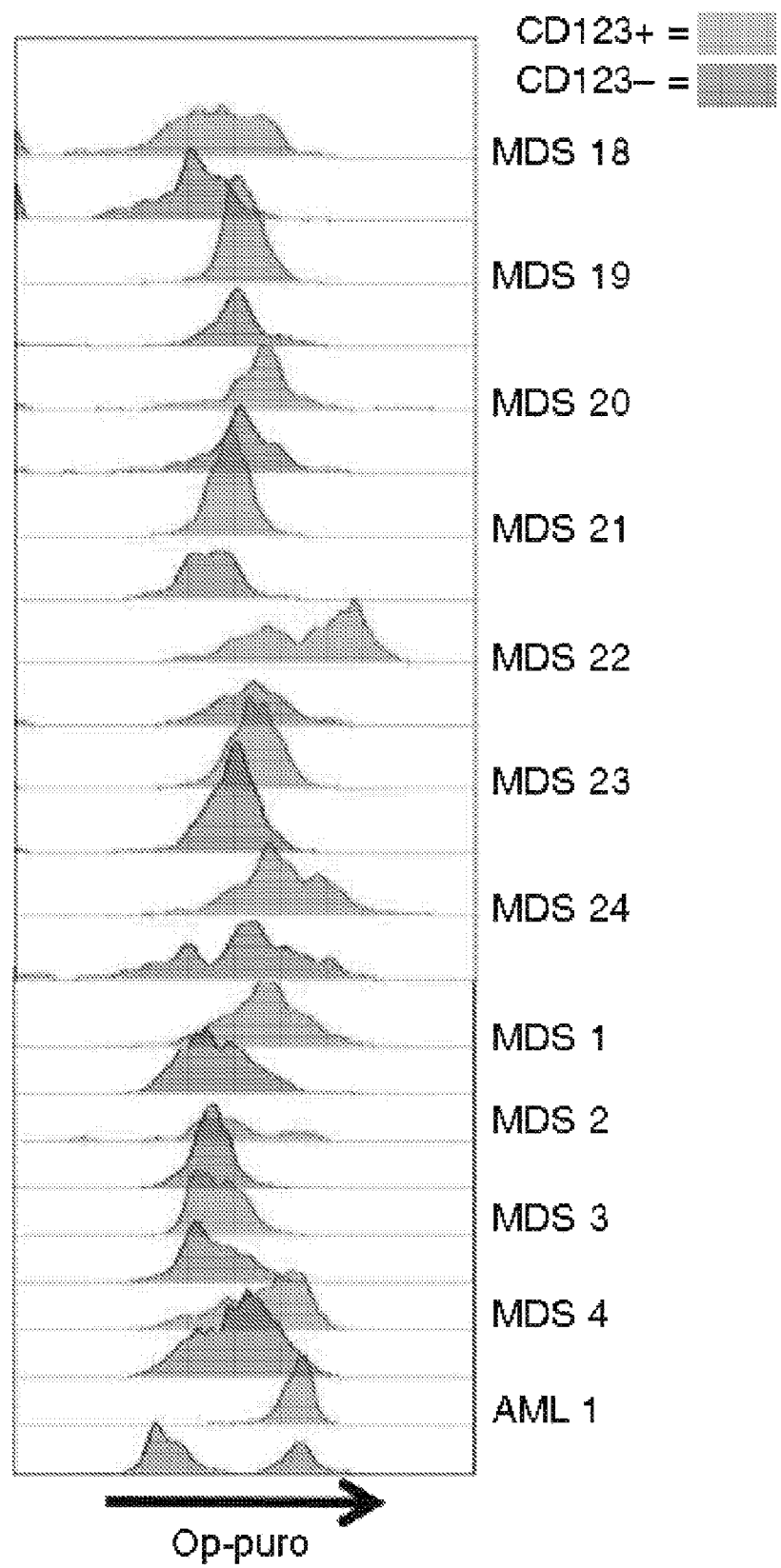

FIG. 93 is a series of histograms comparing protein synthesis (as measured by op-puromycin) in CD123+ cells and CD123− cells from 11 Lin−/CD34+/CD38− high-risk bone marrow samples.

Figure 94:
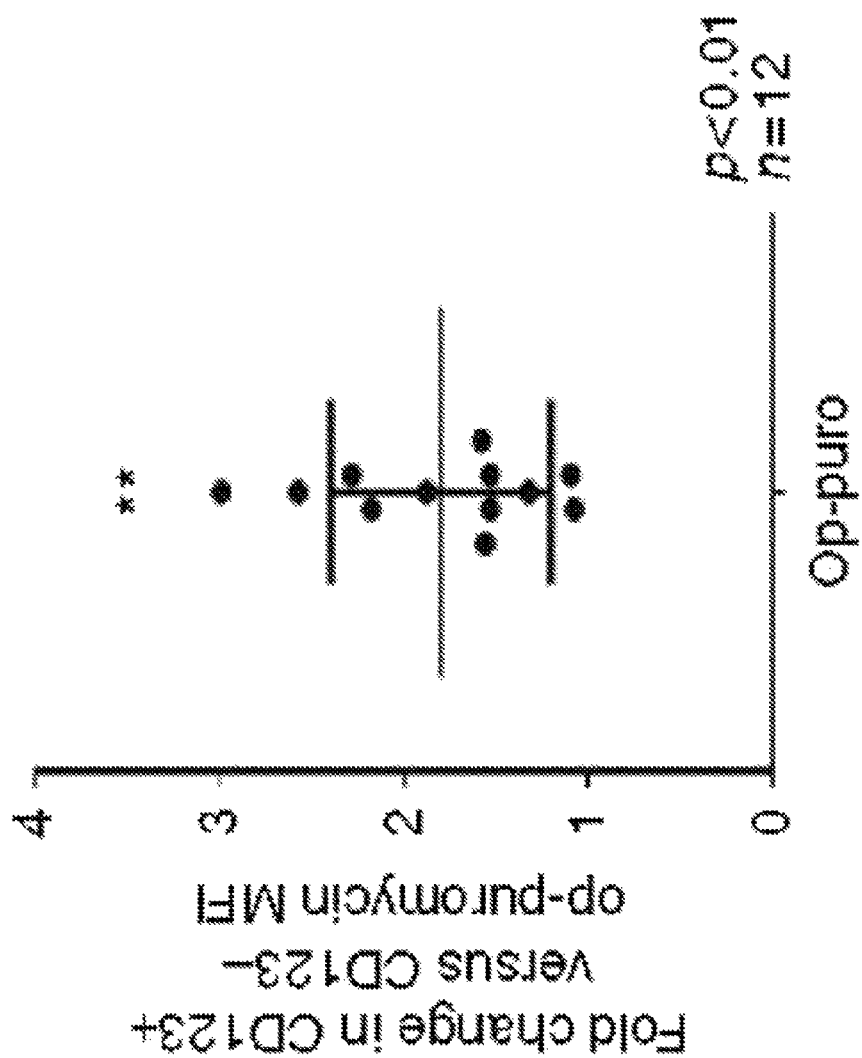

FIG. 94 is a graph showing the ratio of the mean fluorescence of op-puromycin in CD123+ versus CD123− cells.

Figure 95:
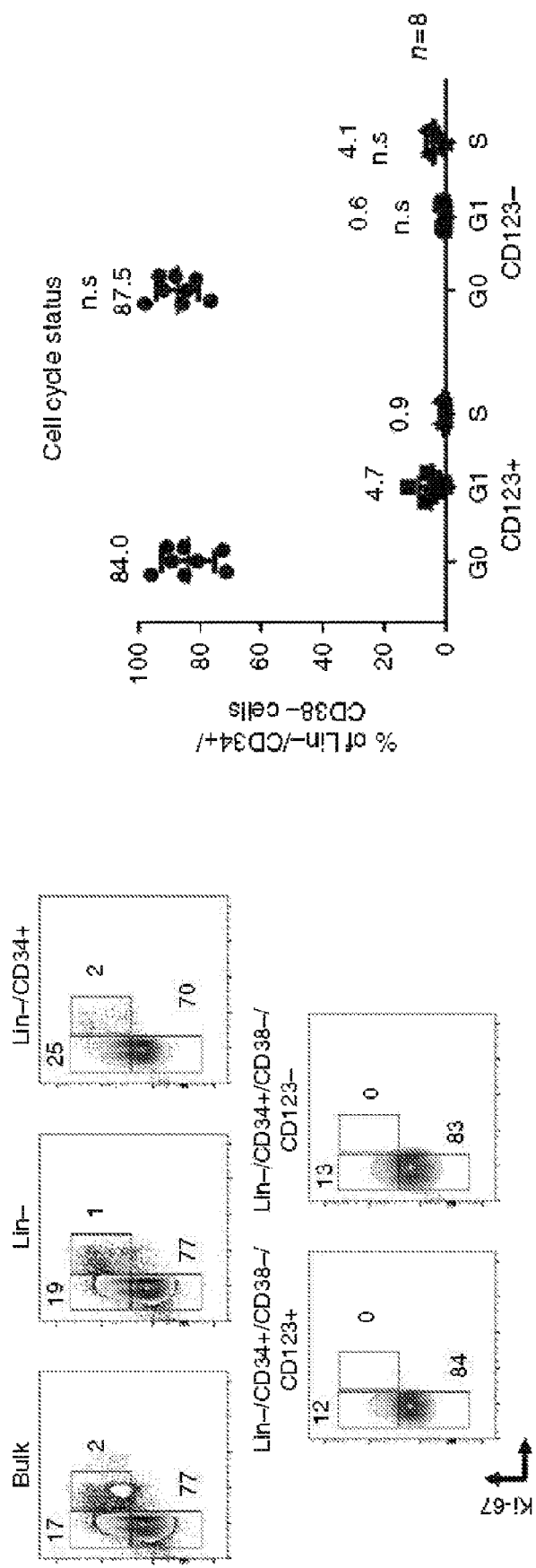

FIG. 95 is a series of graphs of the cell cycle analysis of a representative MDS sample showing bulk, lin−, lin−/CD34+ and CD123+/CD123− stem cell populations. The right panel shows aggregate data comparing cell cycle in eight separate patient specimens in CD123+ versus CD123− cells. **p<0.05 (two-tail t-test) error bars are S.D.

Figure 96:
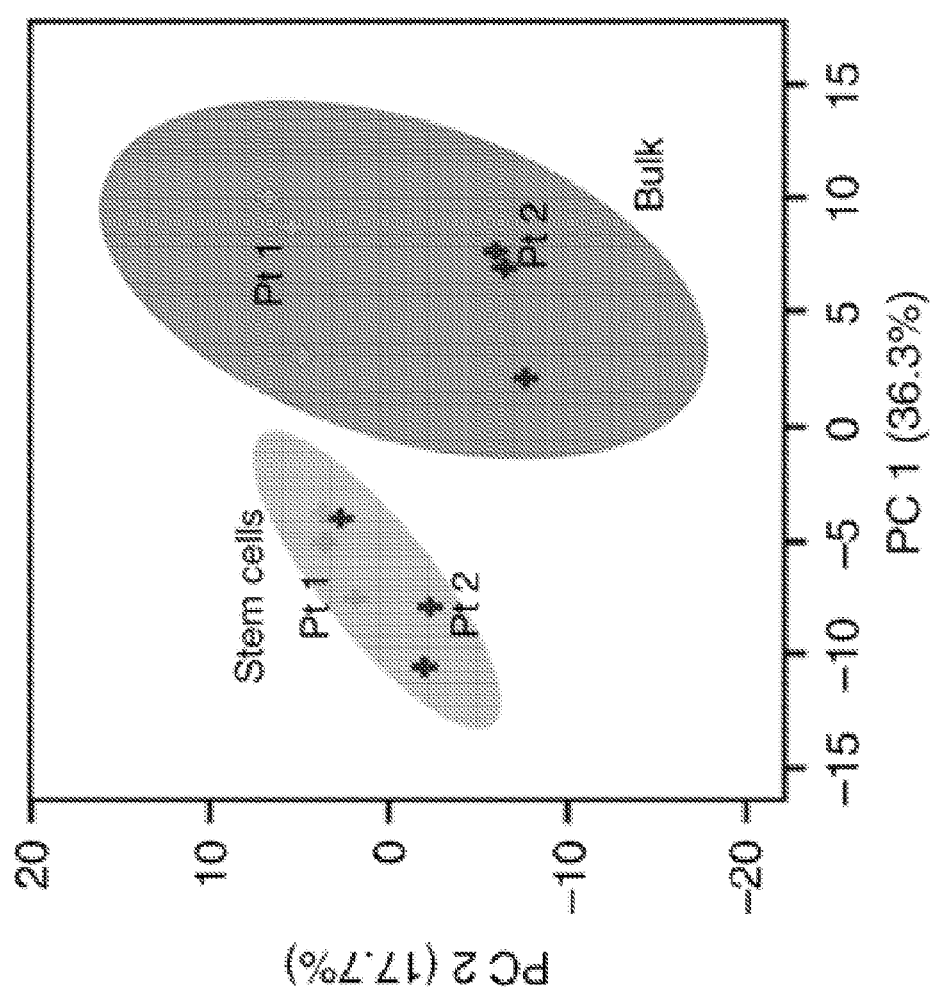

FIG. 96 is a graph showing the principle component analysis of all measured metabolites in CD123+ MDS stem cells and bulk Lin− cells.

Figure 97:
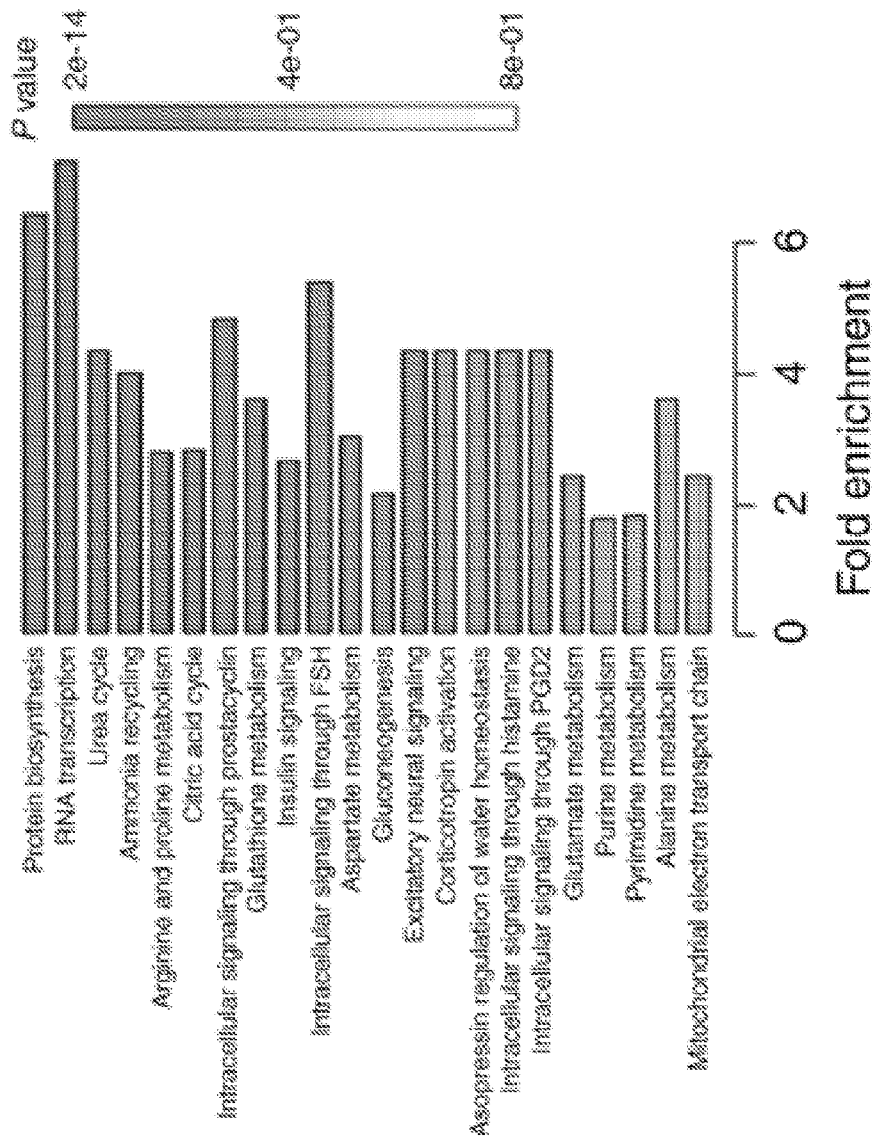

FIG. 97 is a chart showing the pathways most enriched in CD123+ MDS cells compared to CD123− population as determined by Metaboanalyst software analysis of metabolomics data.

Figure 98:
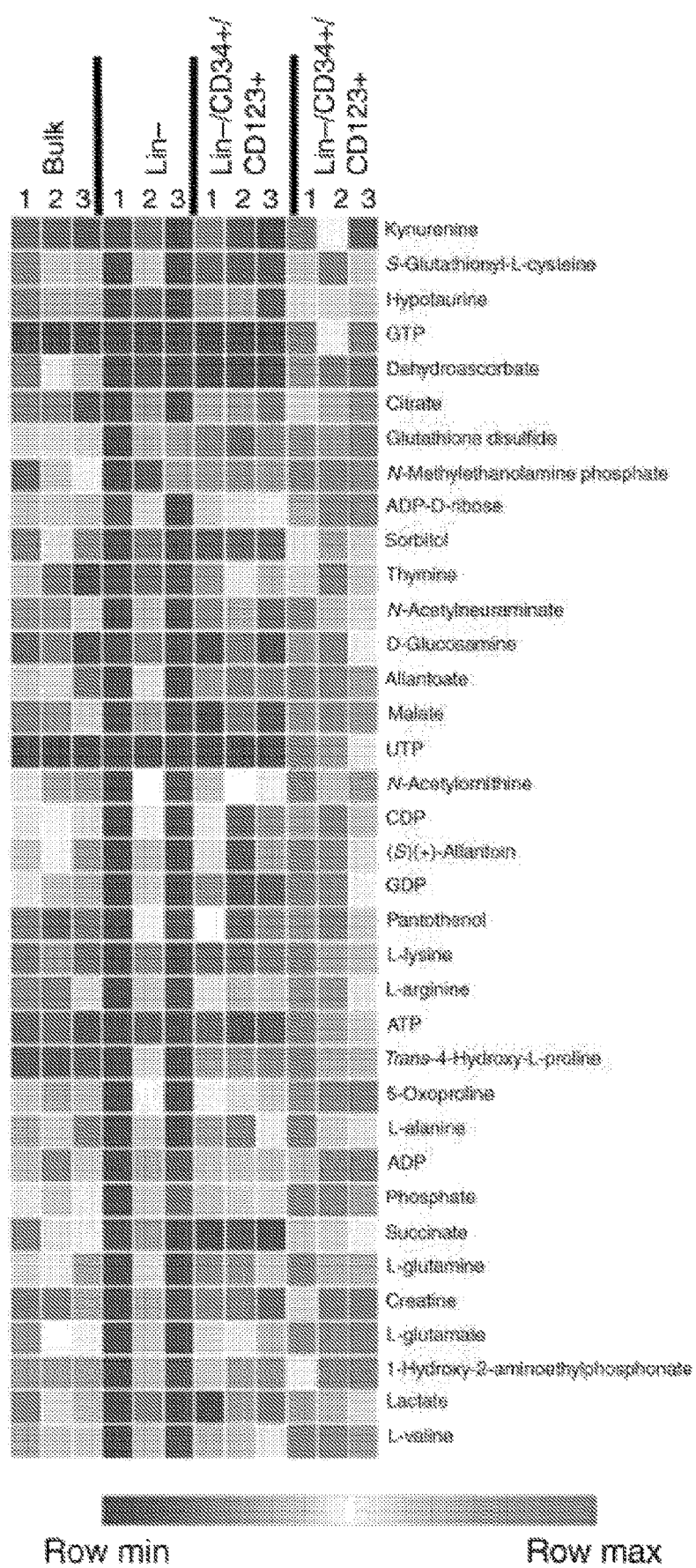

FIG. 98 is a heat map of major metabolite differences including ATP, Glutamate, and TCA cycle intermediates in Bulk, Lin−, Lin−/CD34+/CD123+ and Lin−/CD34+/CD123+ cells from MDS patient samples.

Figure 99:
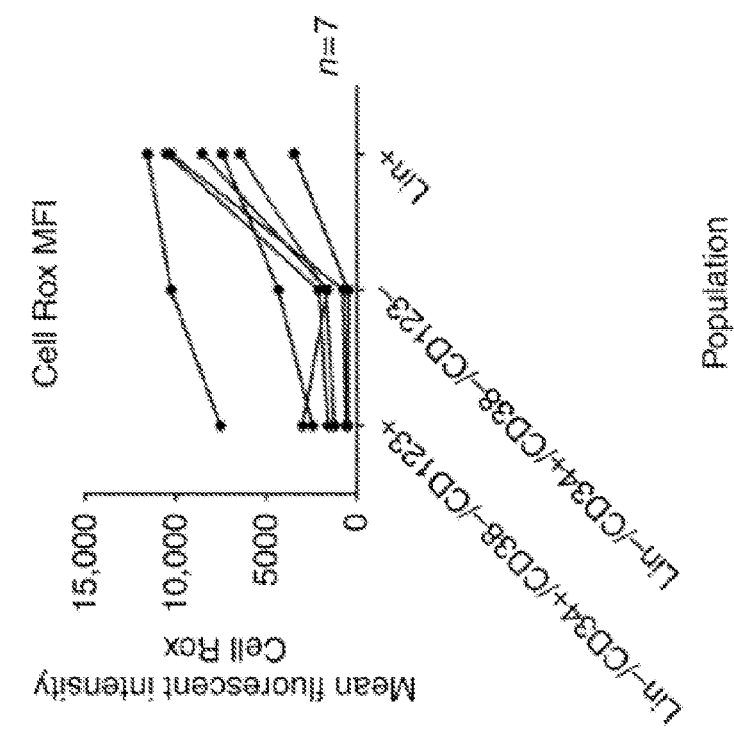
Figure 99:
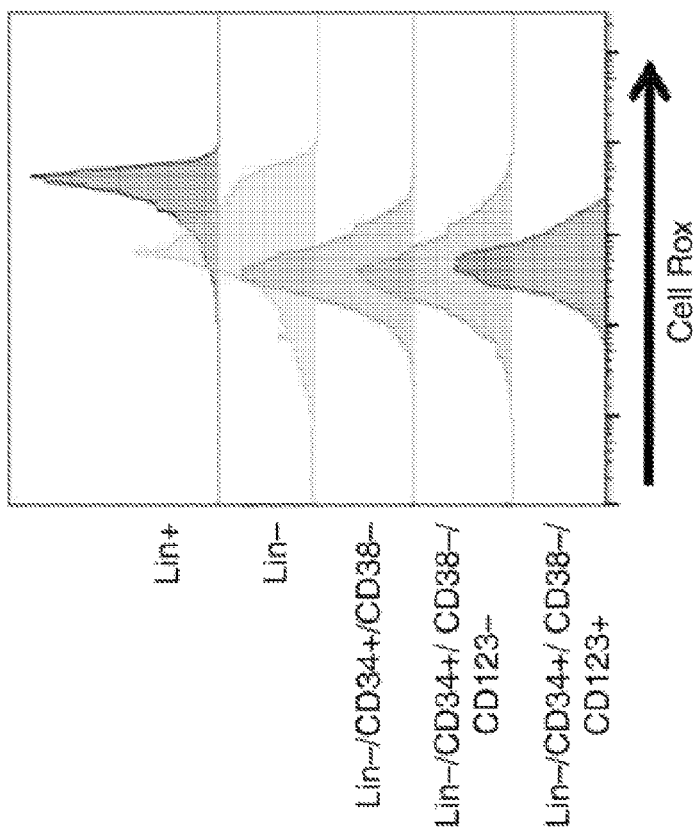

FIG. 99 is a series of charts showing oxidative state analysis as indicated by CellROX dye labeling in variety of cell subpopulations isolated from MDS patient samples (left panel) and aggregate data of CellROX labeling indicating no significant difference between the CD123+ versus CD123− cell populations (right panel).

Figure 100:
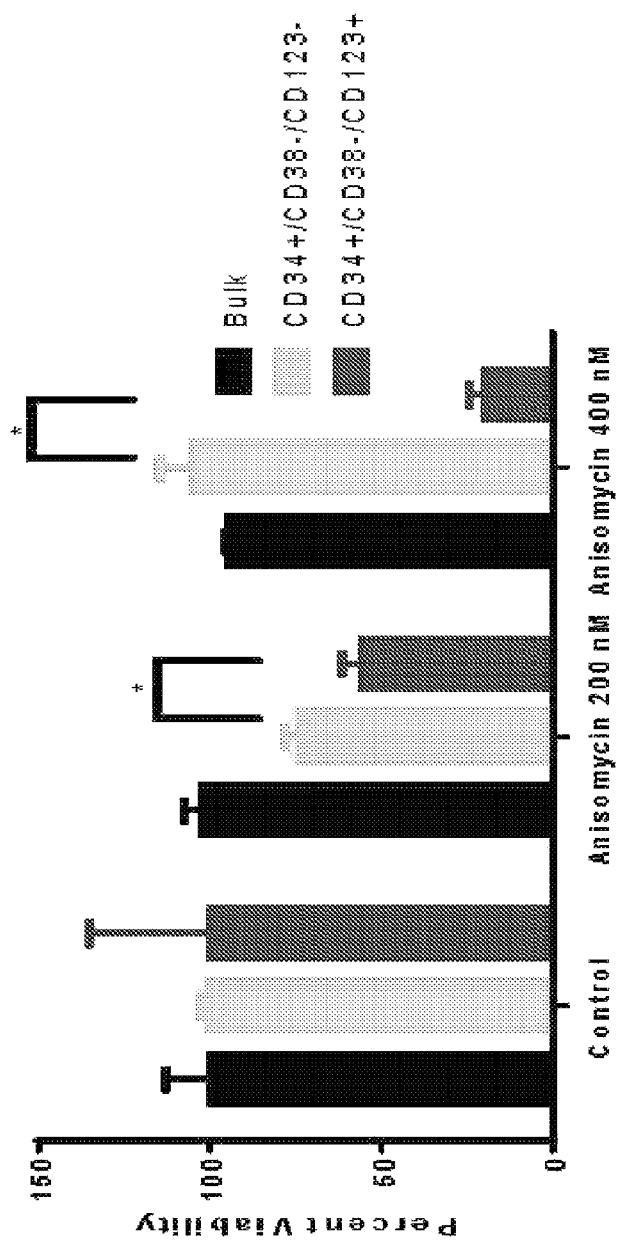

FIG. 100 is a chart showing the viability of various cell populations isolated from MDS patient samples after treatment with Anisomycin. *<p0.05 (t-test) error bars are s.d. n=3.

Figure 101:
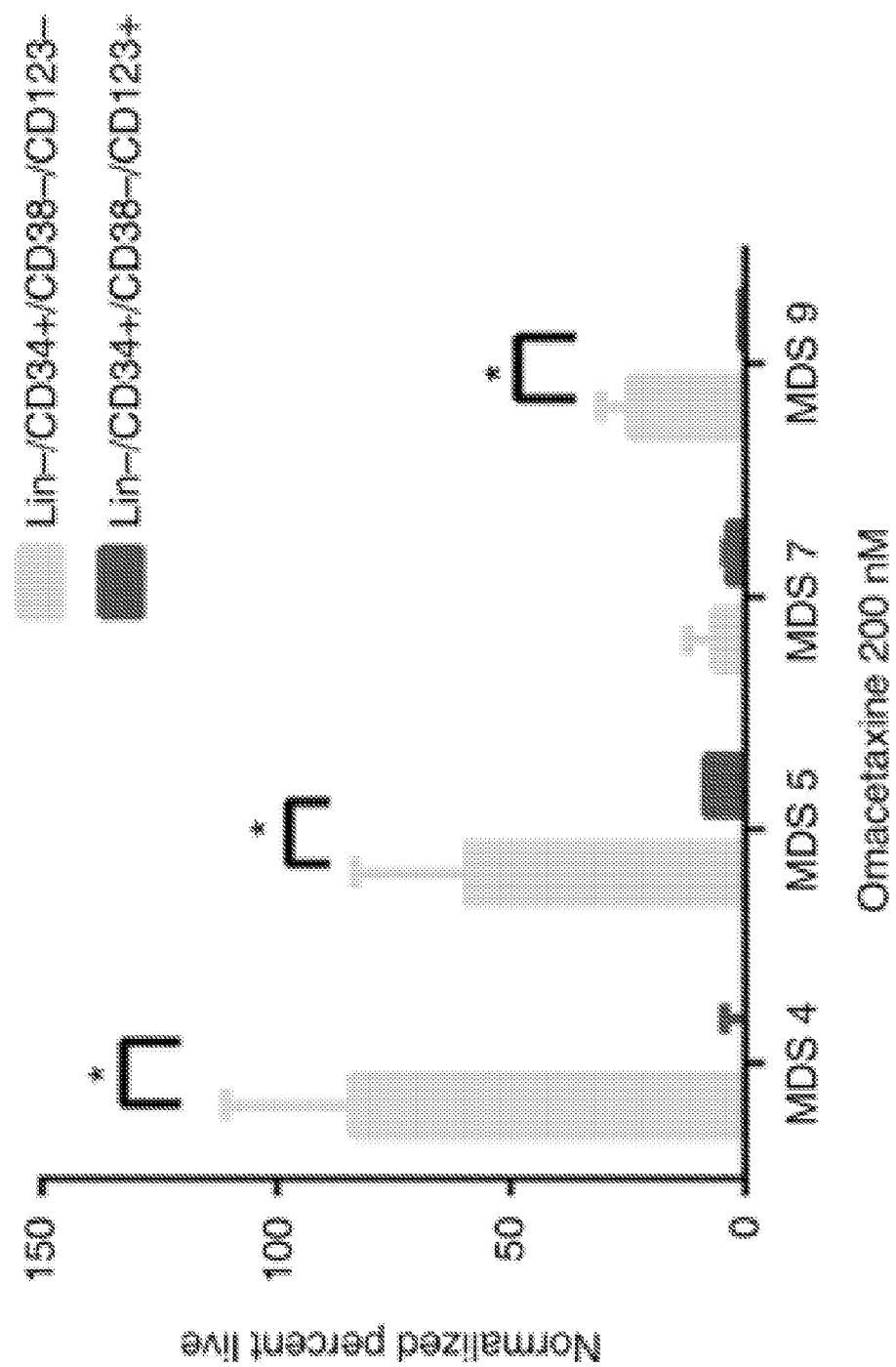

FIG. 101 is a chart showing the viability of various cell populations isolated from MDS patient samples after treatment with omacetaxine. *p<0.05 (two-tail t-test) error bars are S.D.

Figure 102:
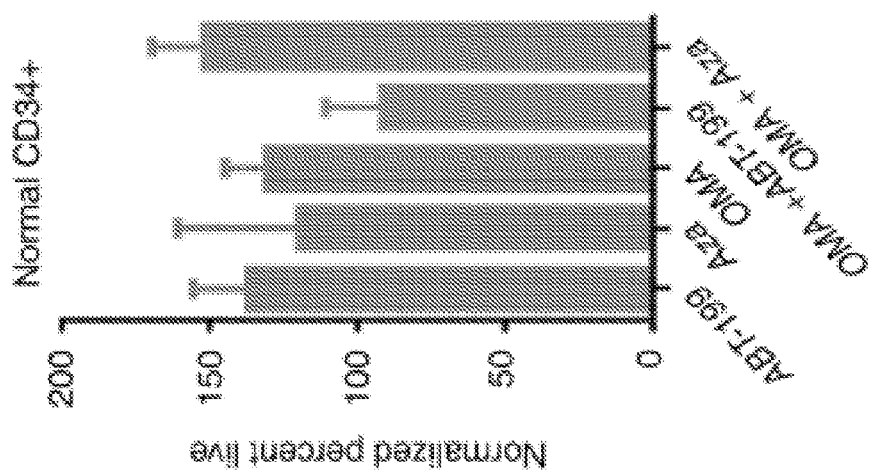
Figure 102:
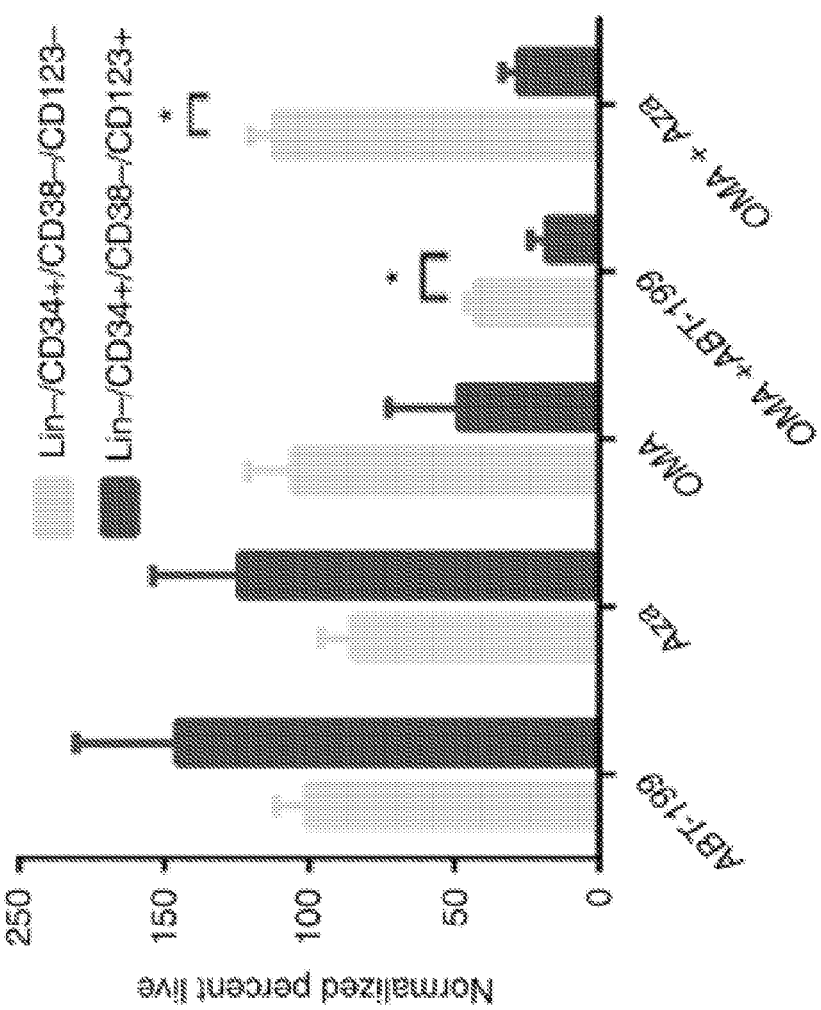

FIG. 102 is a series of charts showing the viability of a various cell populations isolated from MDS patient samples following overnight culture in varying drug conditions (left panel) in comparison to normal bone marrow CD34+ cells (right panel). Drug conditions include treatment with ABT-199 (venetoclax; 200 nm), OMA (omacetaxine, 200 nM), Aza (azacitidine, 2.5 µM) and combination therapies of OMA+ABT-199 and OMA+Aza. * indicates p<0.01; bars represent mean±S.D. from three replicates.

Figure 103:
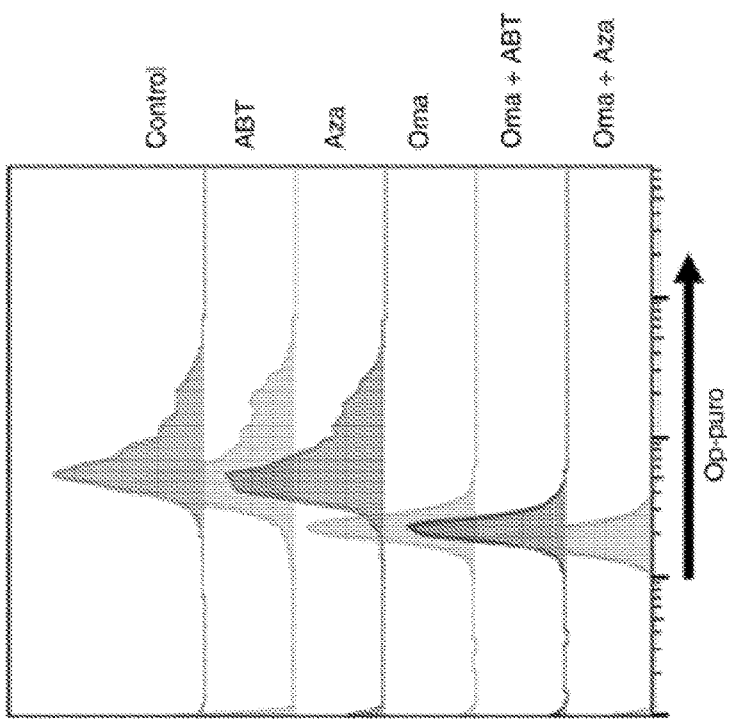
Figure 103:
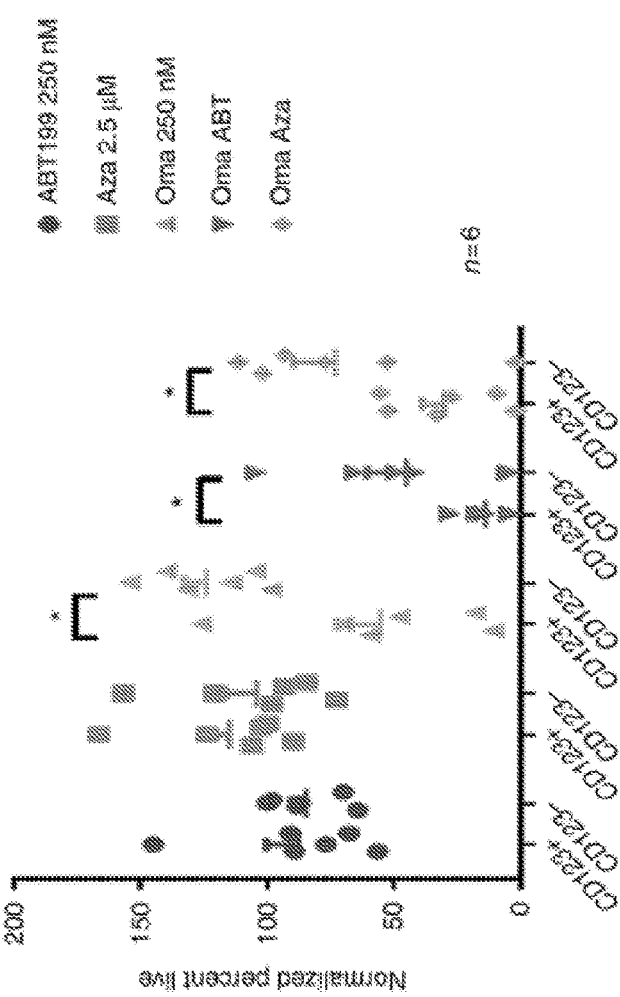

FIG. 103 is a series of charts showing (left panel) the viability of CD123+ and CD123− cells isolated from MDS patient samples treated with various drug conditions and (right panel) protein synthesis levels following 4 hours of treatment with omacetaxine, ABT-199, azacitidine, omacetaxine plus ABT-199, or omacetaxine plus azacitidine as indicated by OP-puromycin labeling. *p<0.05 (two-tail t-test) error bars are S.D.

Figure 104:
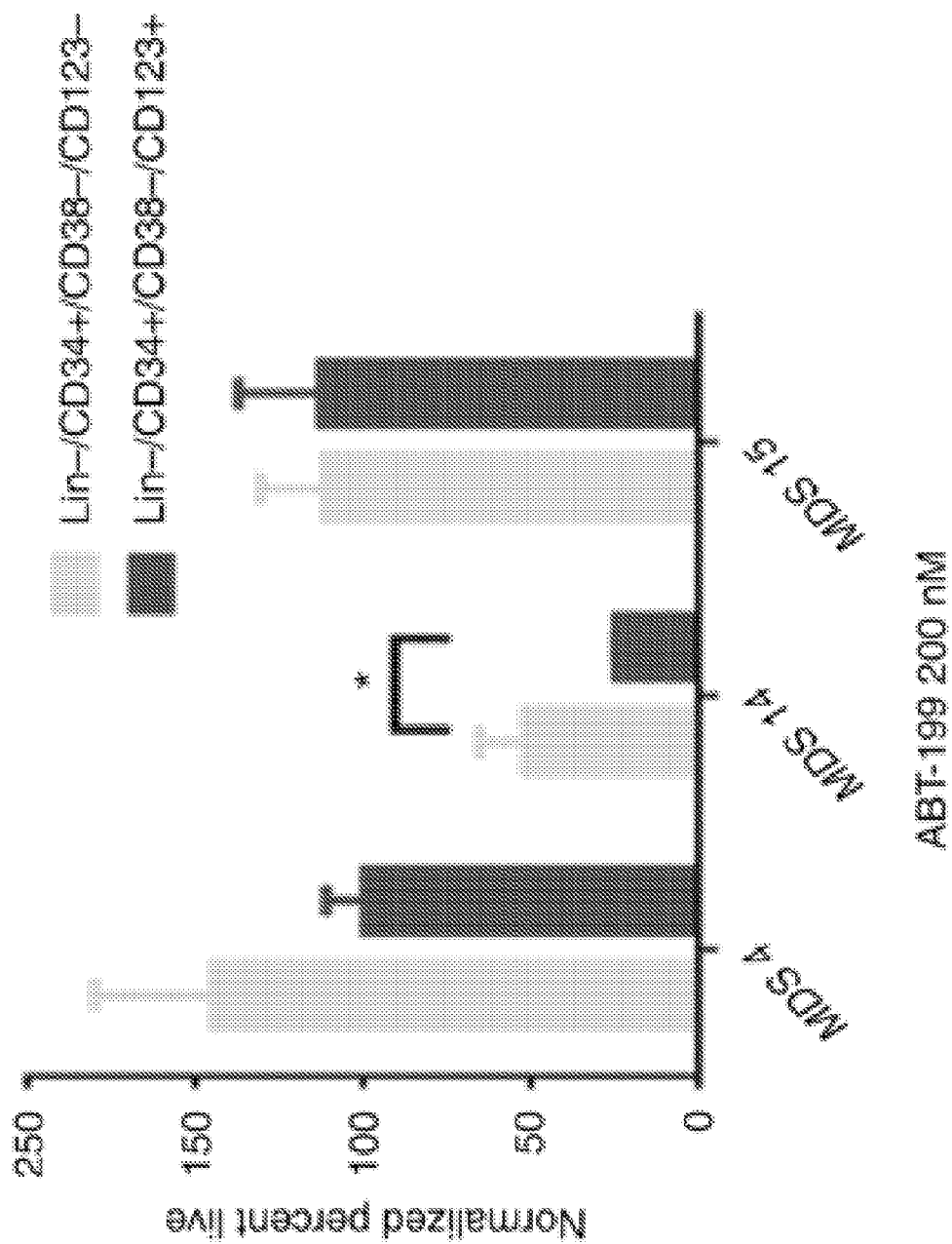

FIG. 104 is a chart showing the viability of various cell populations isolated from MDS patient samples after treatment with ABT-199 (venetoclax) at 200 nm. *<p0.05 (t-test) error bars are s.d. n=3.

Figure 105:
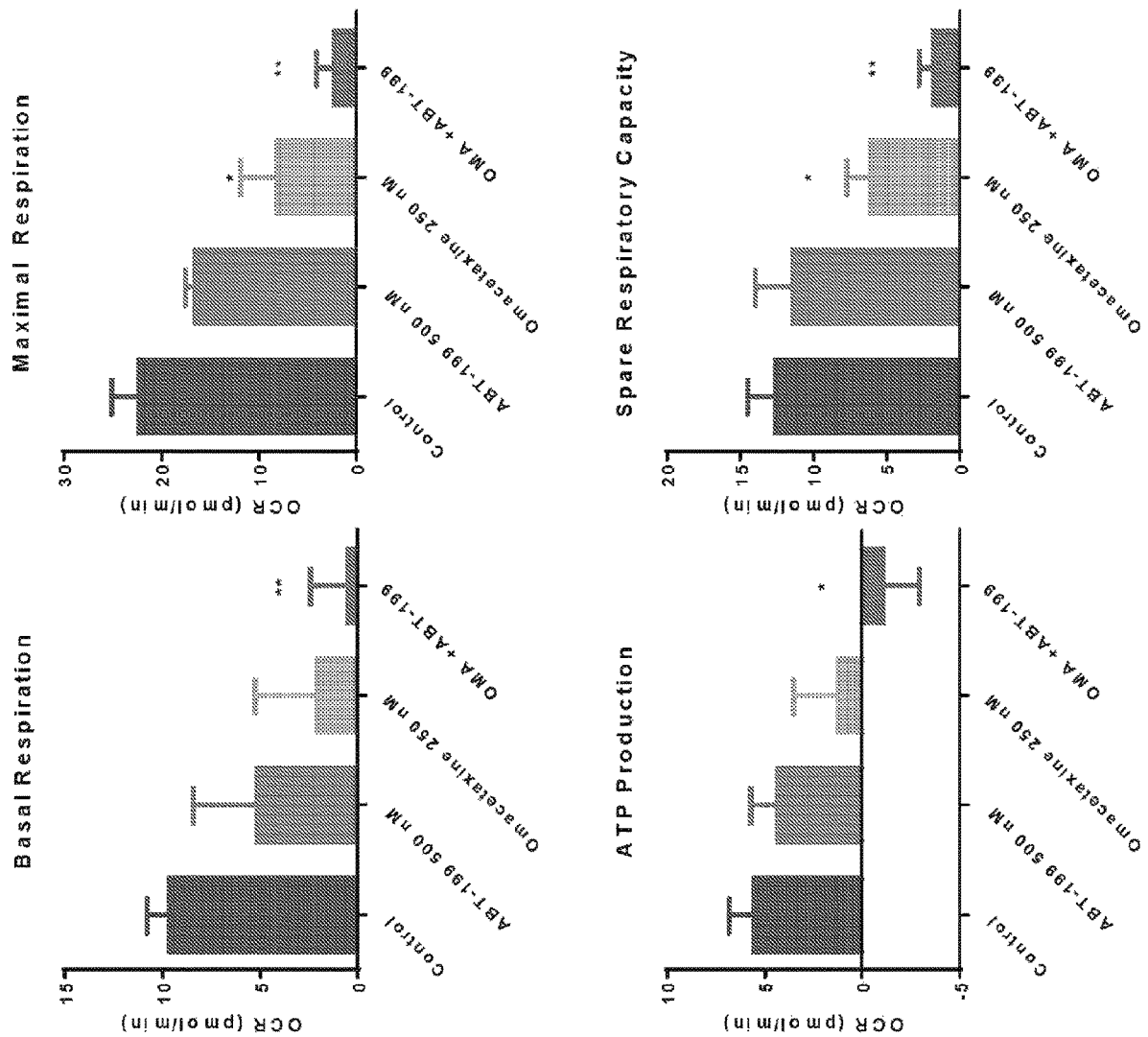

FIG. 105 shows a series of flow cytometry plots of the in vivo engraftment of high-risk primary MDS bone marrow cells. Four independent high risk MDS patient samples were engrafted in mice and were analyzed by staining with an anti-human CD45 antibody.

Figure 106:
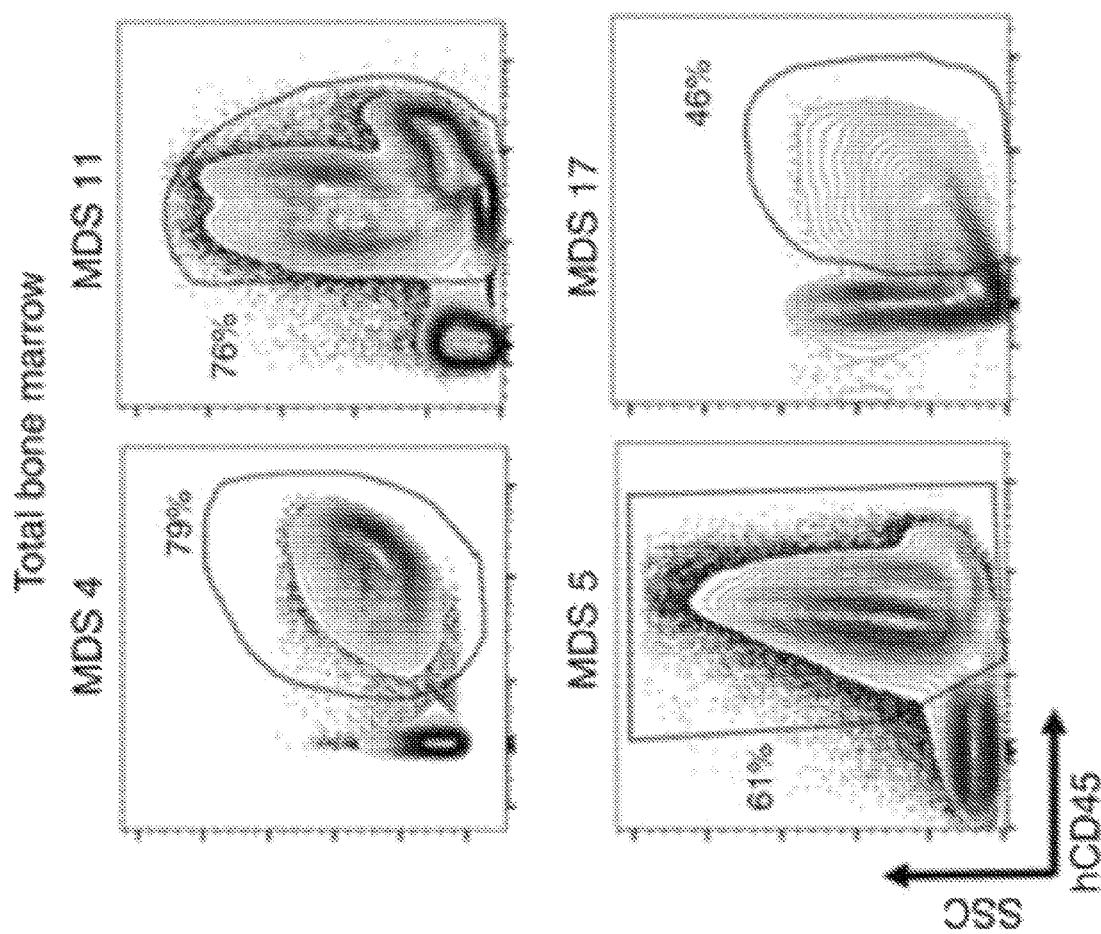

FIG. 106 shows representative plots of the human CD45 staining of mouse marrow post-engraftment from four separate primary human MDS specimens as described in Example 25 of the present disclosure.

Figure 107:
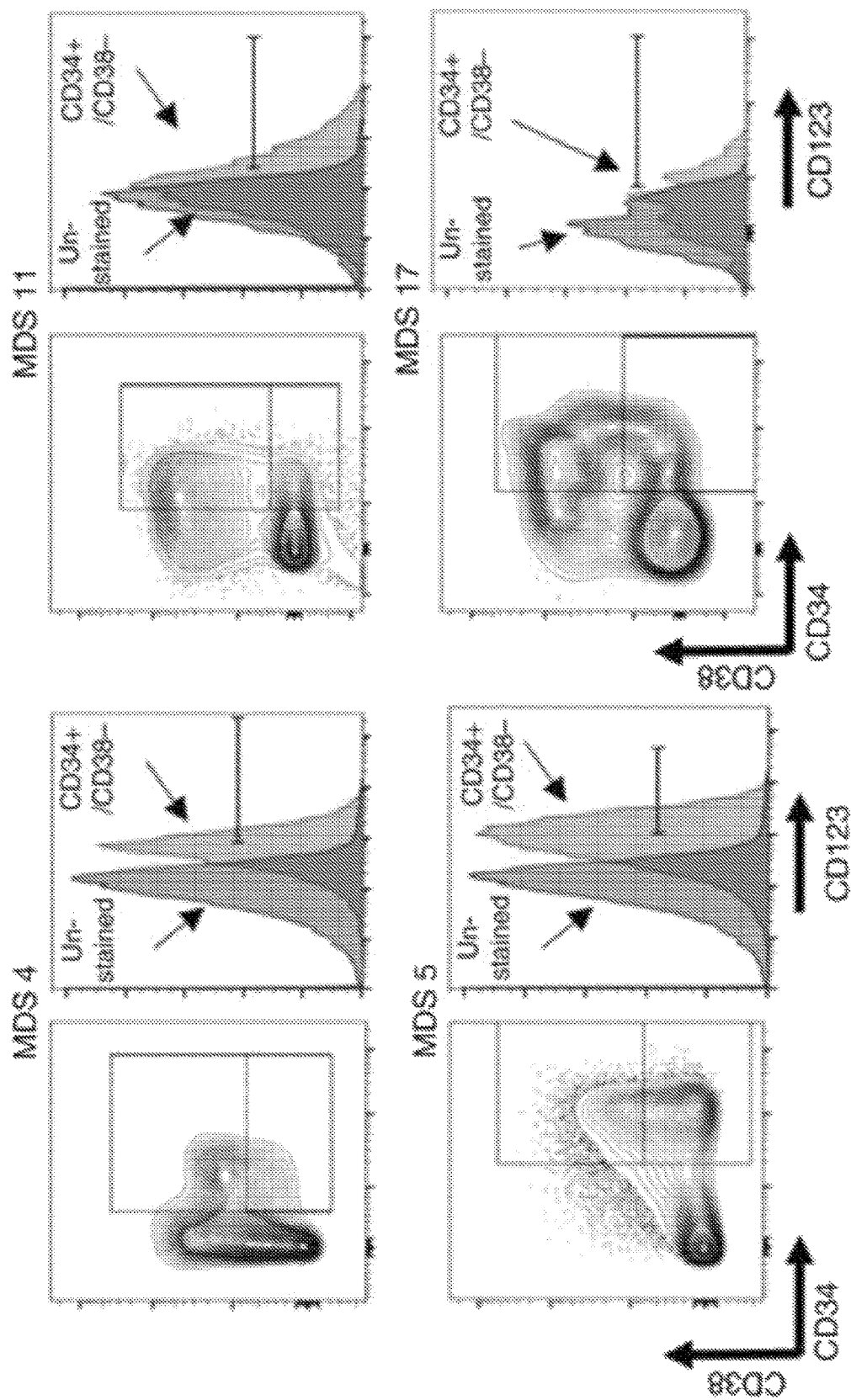

FIG. 107 shows a series of flow cytometry plots of the in vivo engraftment of high-risk primary MDS bone marrow specimens. Four independent high risk MDS patient samples were engrafted in mice and analyzed by staining with a combination of anti-human CD34 and anti-human CD38 antibodies and an anti-CD123 antibody.

Figure 108:
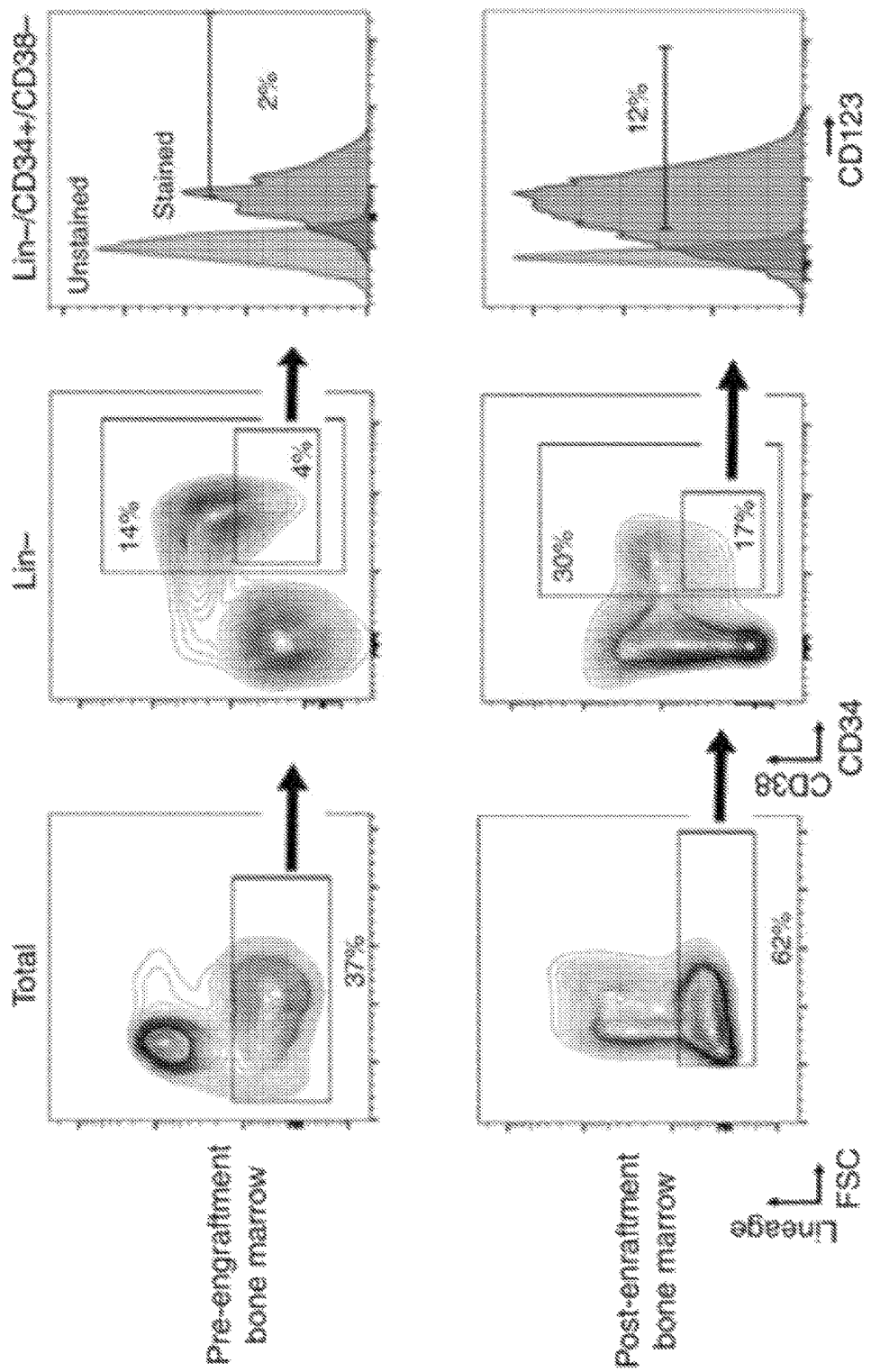

FIG. 108 shows a series of flow cytometry plots analyzing the immunophenotype of bone marrow samples pre- and post-engraftment in NSG-S mice.

Figure 109:
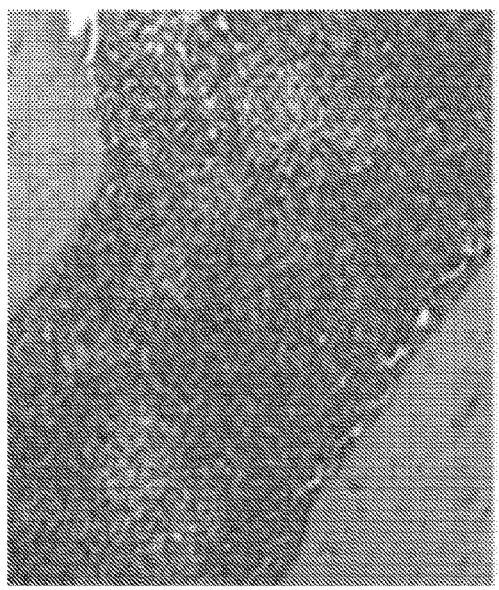
Figure 109:
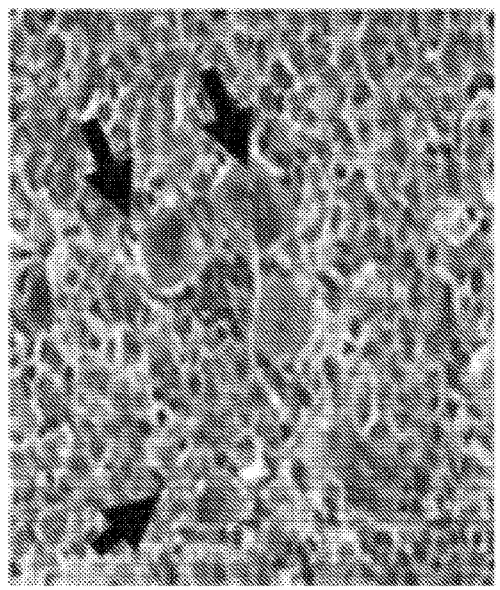

FIG. 109 is a series of images of the H&E staining of mouse femur post engraftment of high risk MDS patient samples. Arrows indicate hypolobated megakaryocytes indicative of acute disease evolving from antecedent MDS.

Figure 110:
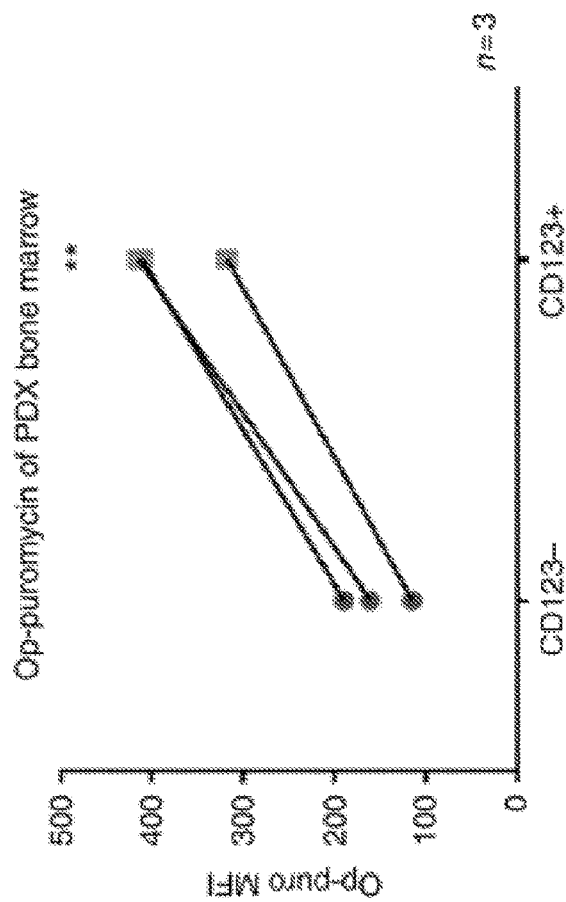
Figure 110:
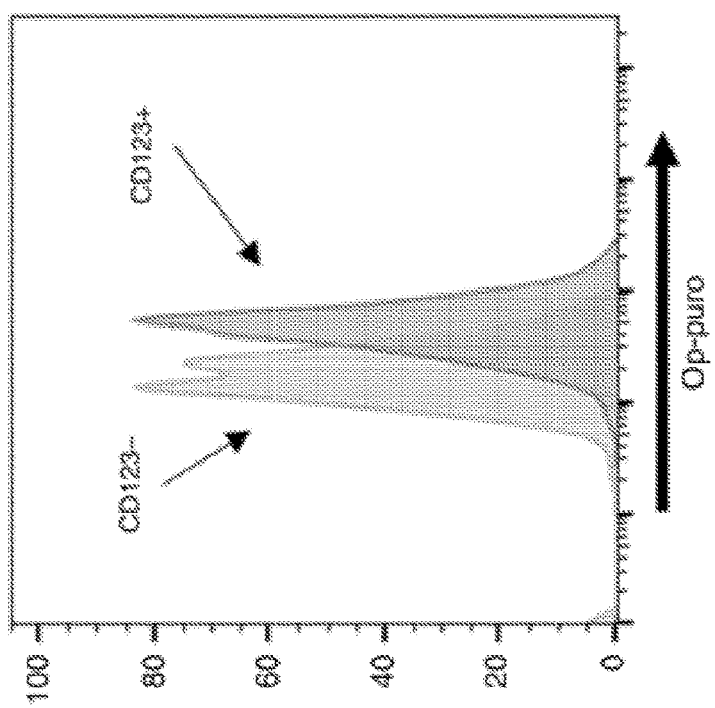
Figure 111:
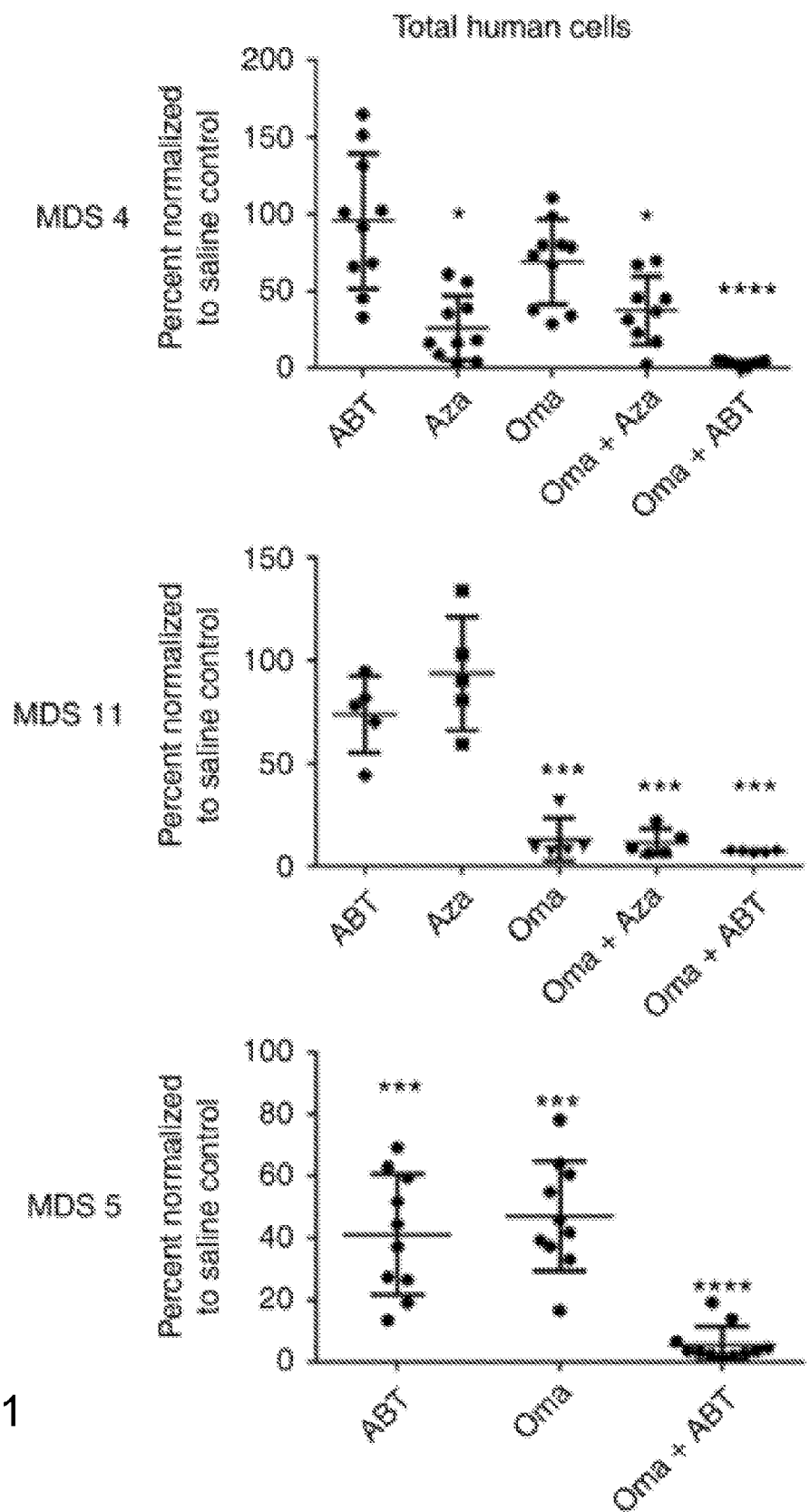

FIG. 110 is a series of plots showing (left panel) OP-puromycin labeling on CD123+ versus CD123− cells derived from the marrow of xenograft mice (gated on CD45+/Lin−/CD34+/CD38−) and (right panel) aggregate data showing three independent patient xenografts stained for OP-puromycin. ** indicates p<0.01 (two-tail t-test) error bars are S.D FIG. 111 is a series of plots showing the viability of total human cells (hCD45+) from MDS xenografts after treatment with omacetaxine mepesuccinate (Oma), ABT-119 (venetoclax), azacitidine (Aza) or combinations thereof. Engrafted cells were from high-risk MDS patient bone marrow samples. Graphs reflect total numbers of positive cells normalized to vehicle control animals.

Figure 112:
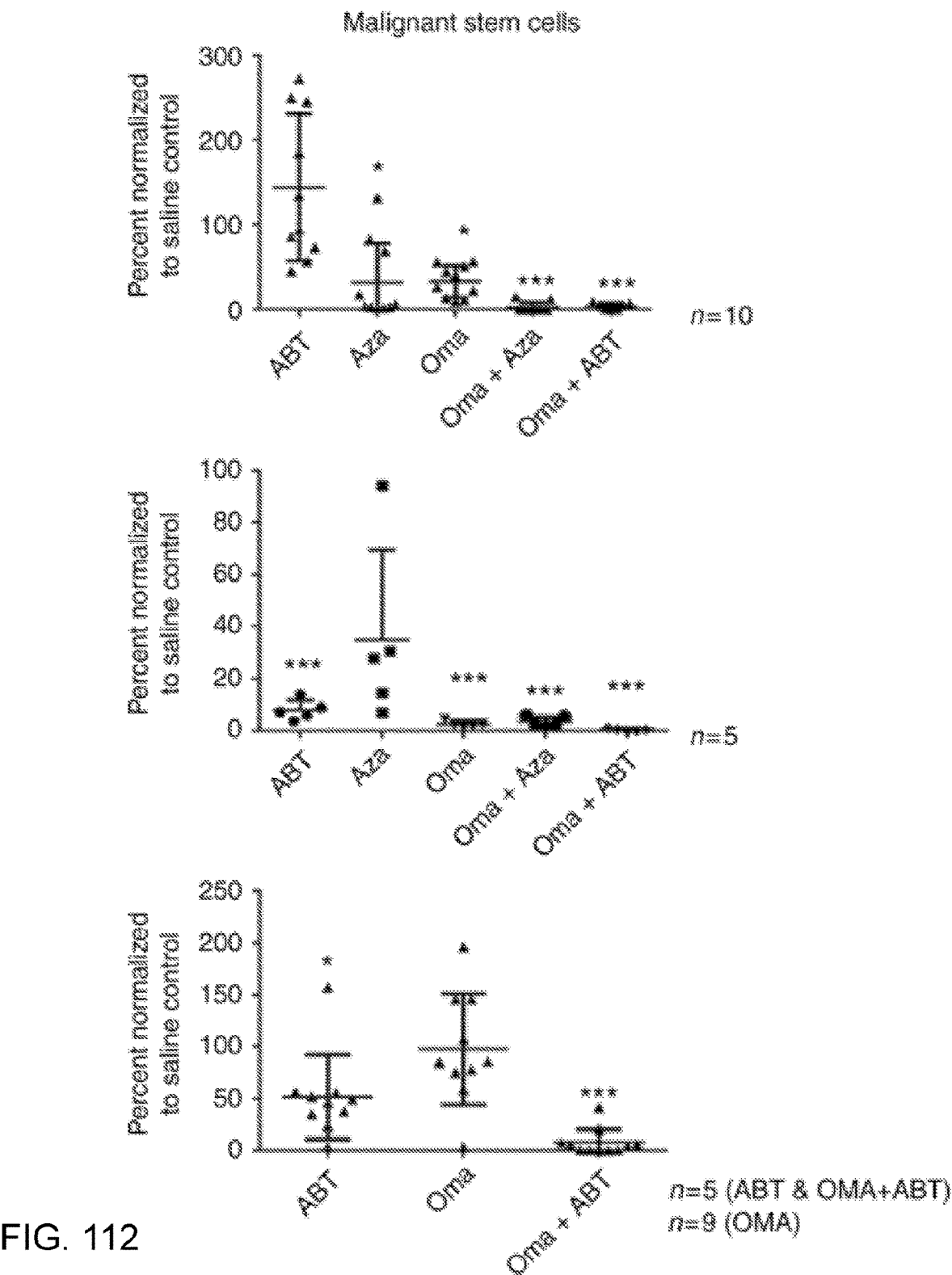

FIG. 112 is a series of plots showing the viability of malignant stem cells (hCD45+/Lin−/CD34+/CD38−/CD123+) from MDS xenografts after treatment with omacetaxine mepesuccinate (Oma), ABT-119 (venetoclax), azacitidine (Aza) or combinations thereof. Engrafted cells were from high-risk MDS patient bone marrow samples. Graphs reflect total numbers of positive cells normalized to vehicle control animals.

Figure 113:
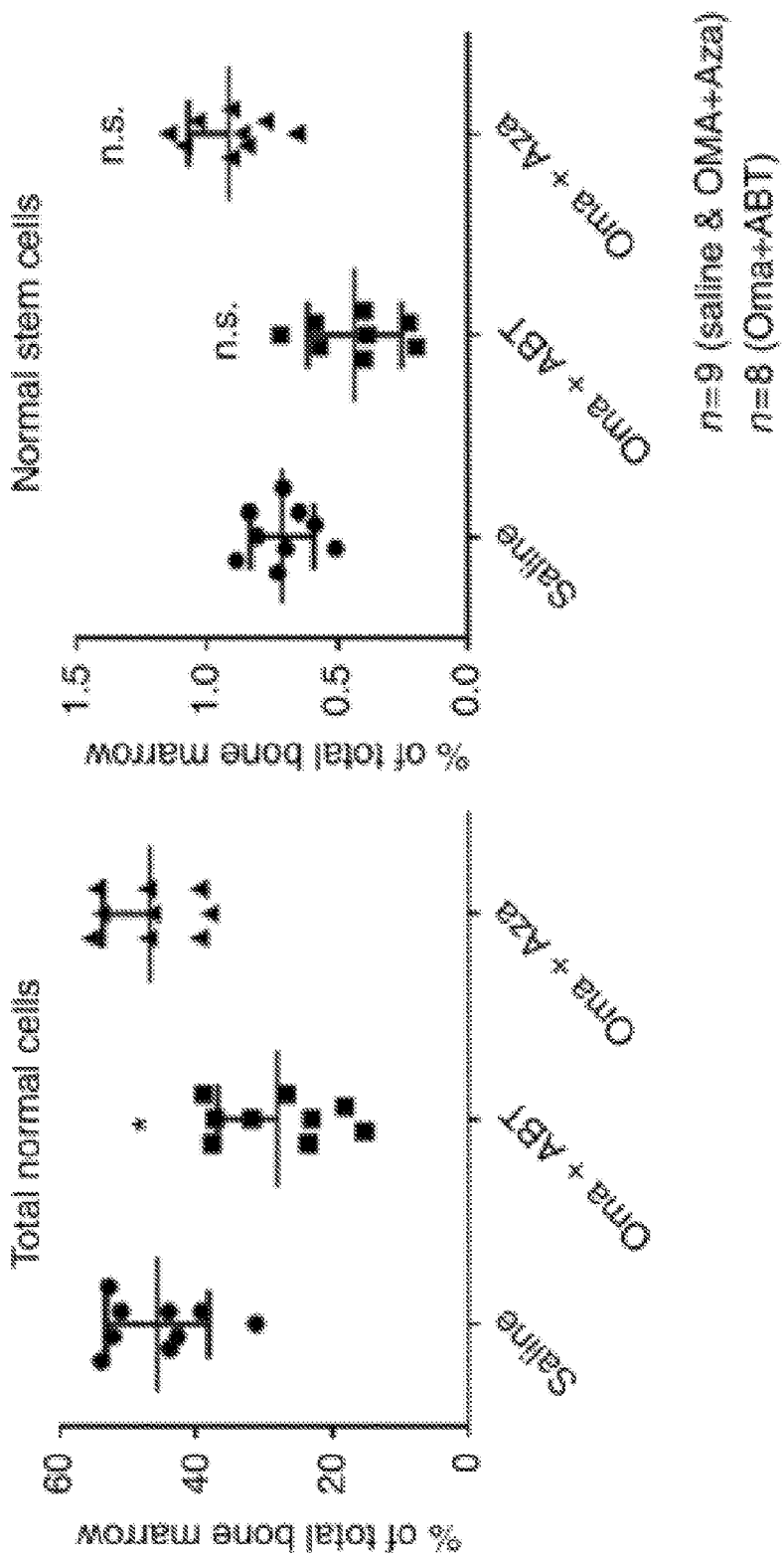

FIG. 113 is a series of plots showing the viability of total human cells (hCD45+; left panel) and normal stem cells (hCD45+/Lin−/CD34+/CD38−; right panel) from xenografts after treatment with omacetaxine mepesuccinate (Oma), ABT-119 (venetoclax), azacitidine (Aza) or combinations thereof. Engrafted cells were from normal human CD34+ samples. Graphs reflect total numbers of positive cells normalized to vehicle control animals.

Figure 114:
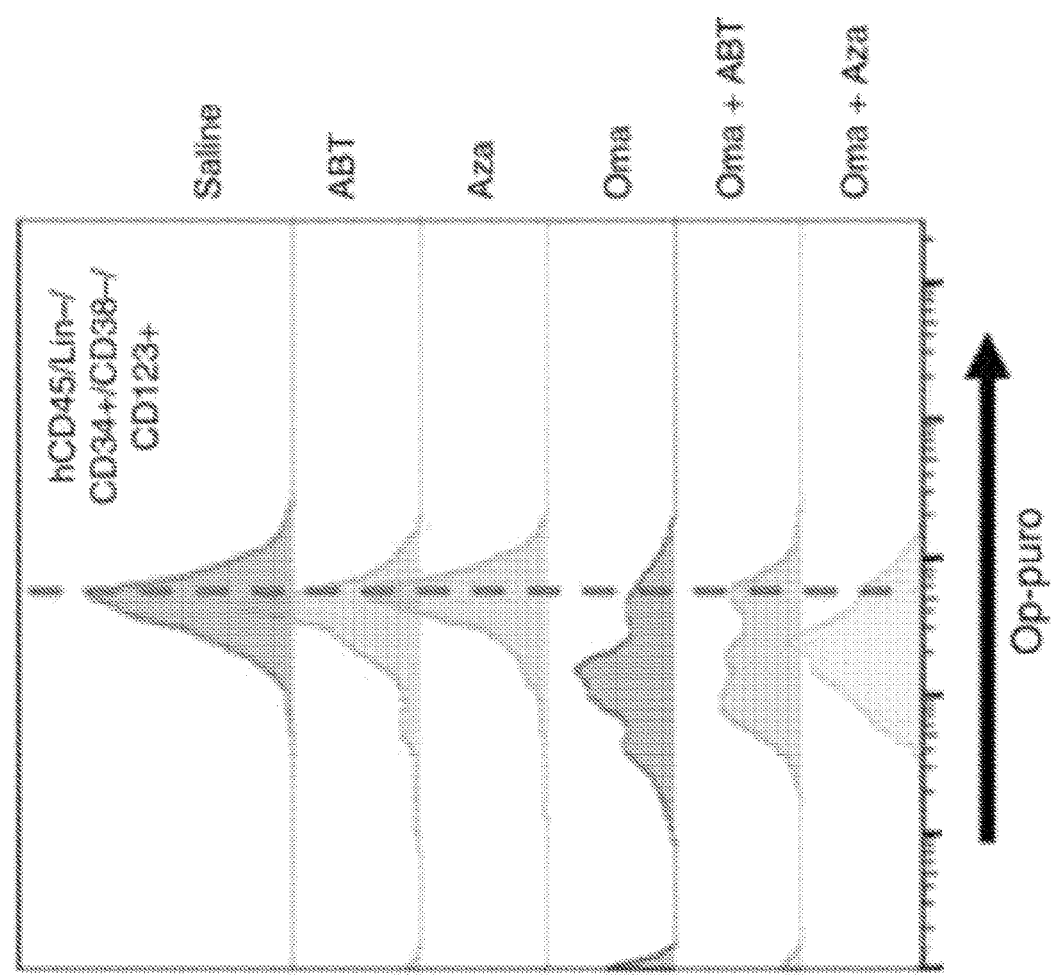

FIG. 114 is a graph showing OP-puromycin labeling of xenograft bone marrow cells following treatment with omacetaxine mepesuccinate (Oma), ABT-119 (venetoclax), azacitidine (Aza) or combinations thereof. Cells were gated on the hCD45+/Lin−/CD34+/CD38−/CD123+ population.

Figure 115:
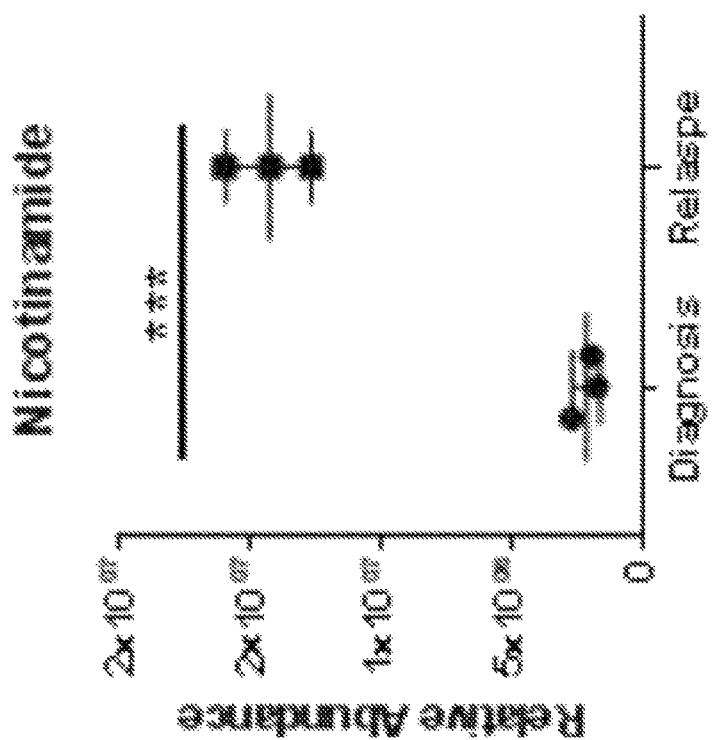

FIG. 115 is a graph showing nicotinamide levels in LSCs isolated from 3 de novo and 3 relapsed AML patient samples.

Figure 116:
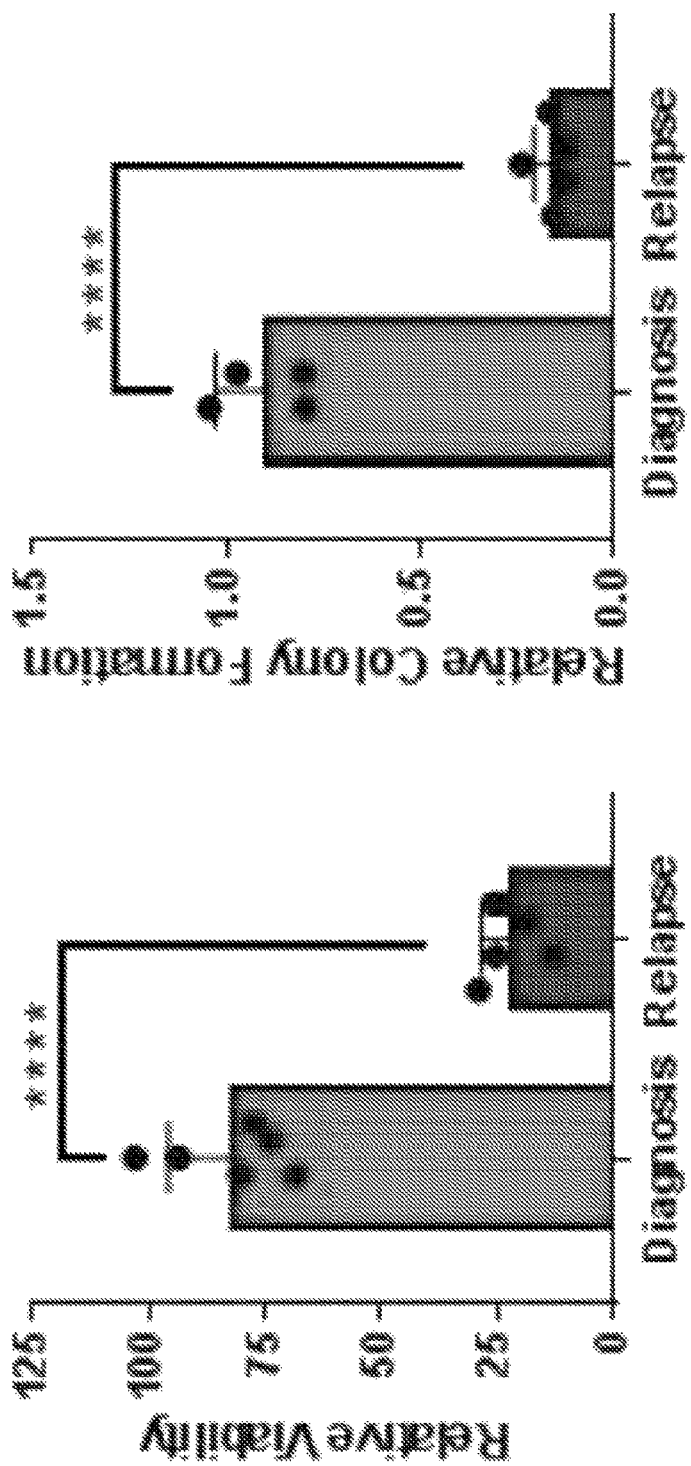

FIG. 116 is a series of graphs showing (left panel) relative viability and (right panel) relative colony formation of LSCs isolated from de novo and relapsed AML patient samples after treatment with Nampt inhibitor APO866 for 24 hours.

Figure 117:
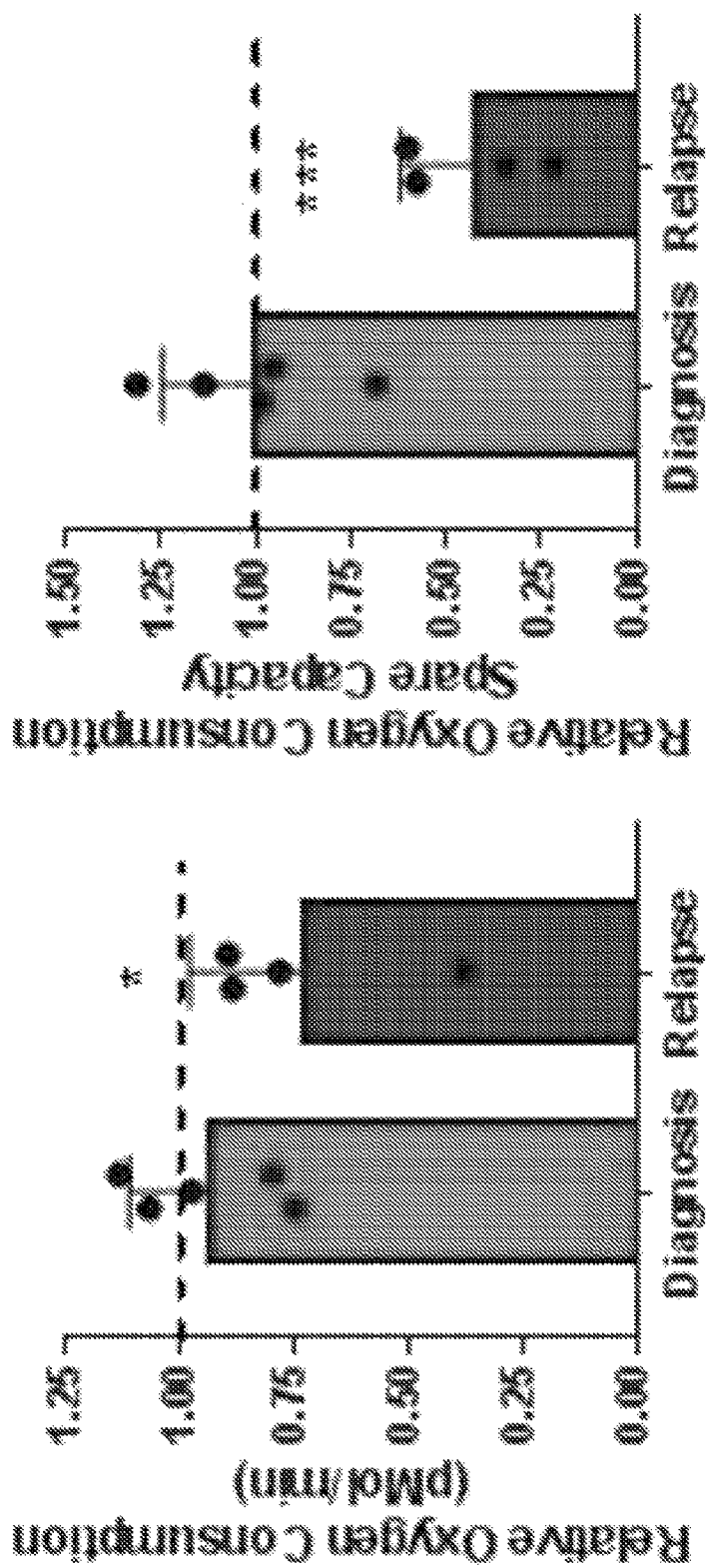

FIG. 117 is a series of graphs showing relative oxygen consumption and relative oxygen consumption spare capacity of LSCs isolated from de novo and relapsed AML patient samples after treatment with Nampt inhibitor APO866 for 4 hours.

Figure 118:
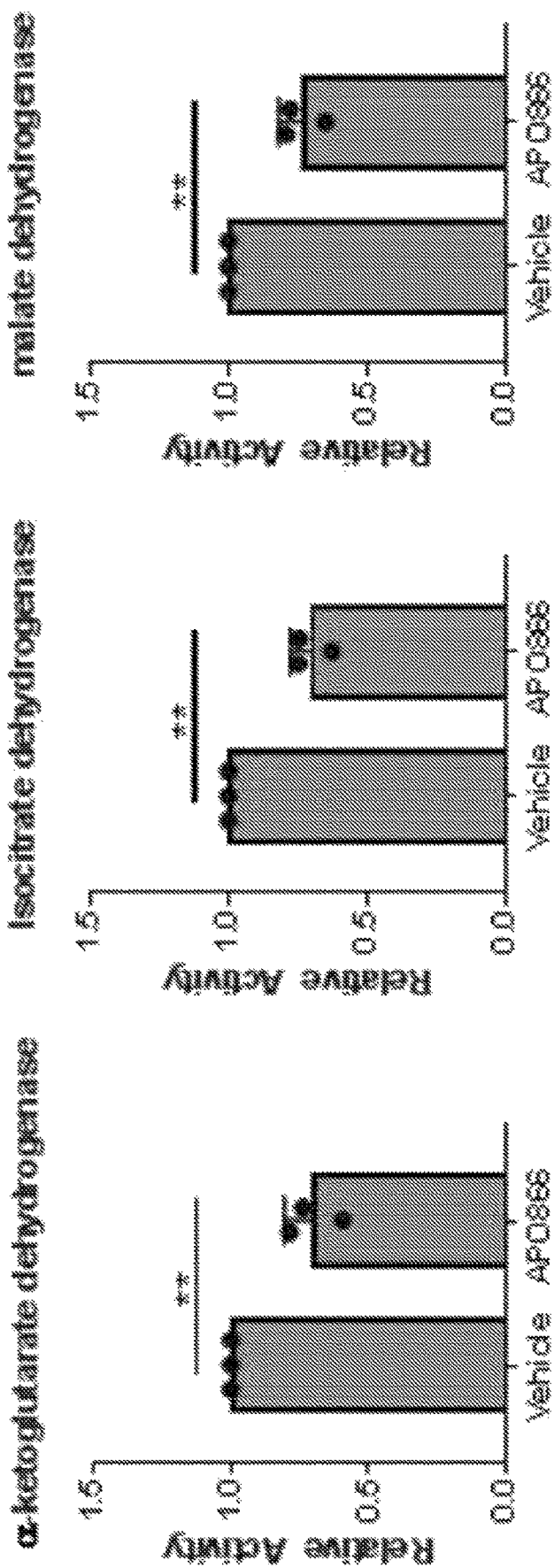

FIG. 118 is a series of graphs showing the relative activity of TCA cycle enzymes in LSCs isolated from relapsed AML patient samples after treatment with Nampt inhibitor APO866 for 4 hours.

Figure 119:
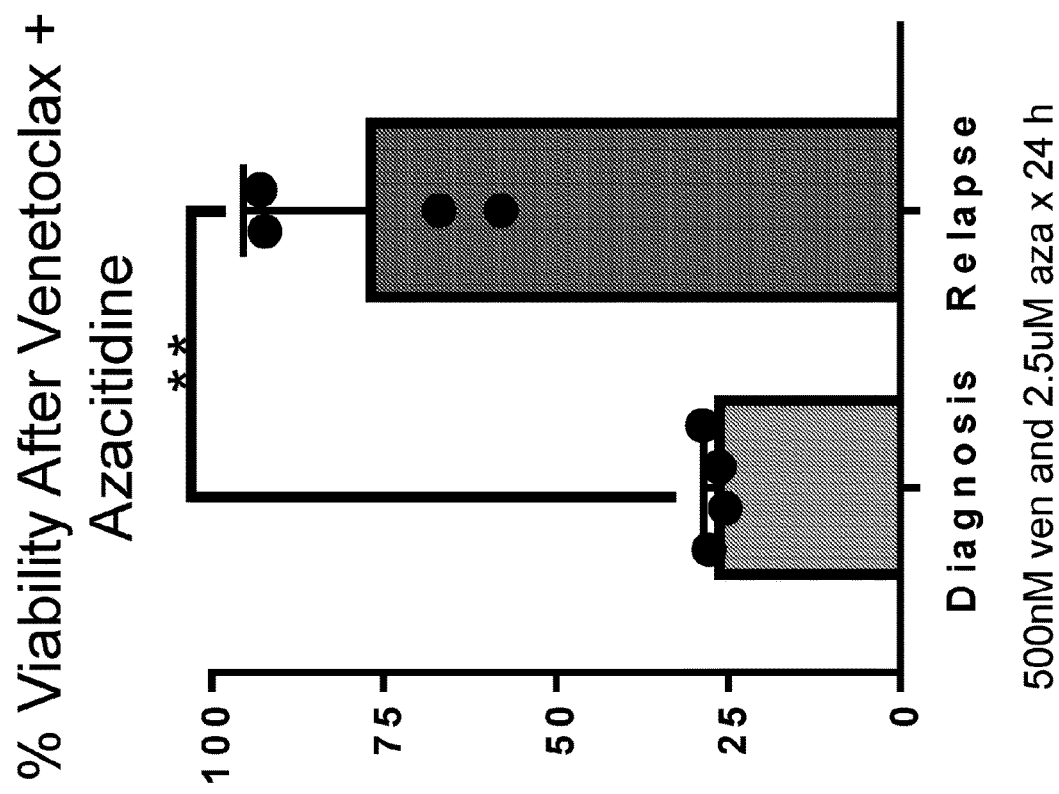

FIG. 119 is a graph showing the viability of venetoclax/azacitidine sensitive LSCs (diagnosis) and venetoclax/azacitidine resistant LSCs (relapse) treated with 500 nM venetoclax and 2.5 µM azacitidine for 24 hours.

Figure 120:
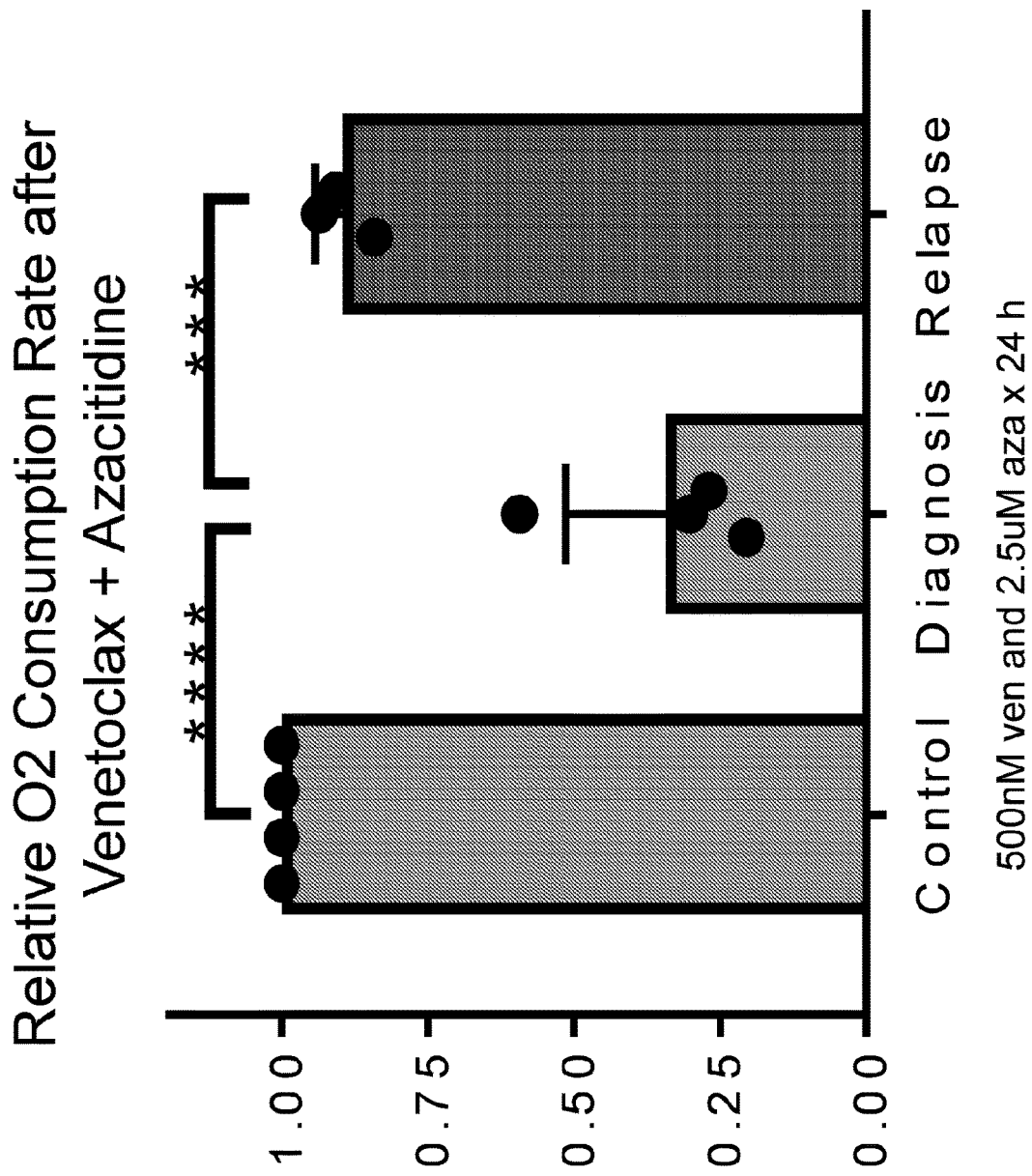

FIG. 120 is a graph showing the relative $O_2$ consumption rates of venetoclax/azacitidine sensitive LSCs (diagnosis) and venetoclax/azacitidine resistant LSCs (relapse) treated with 500 nM venetoclax and 2.5 µM azacitidine for 24 hours. The control indicates treatment with a vehicle control.

Figure 121:
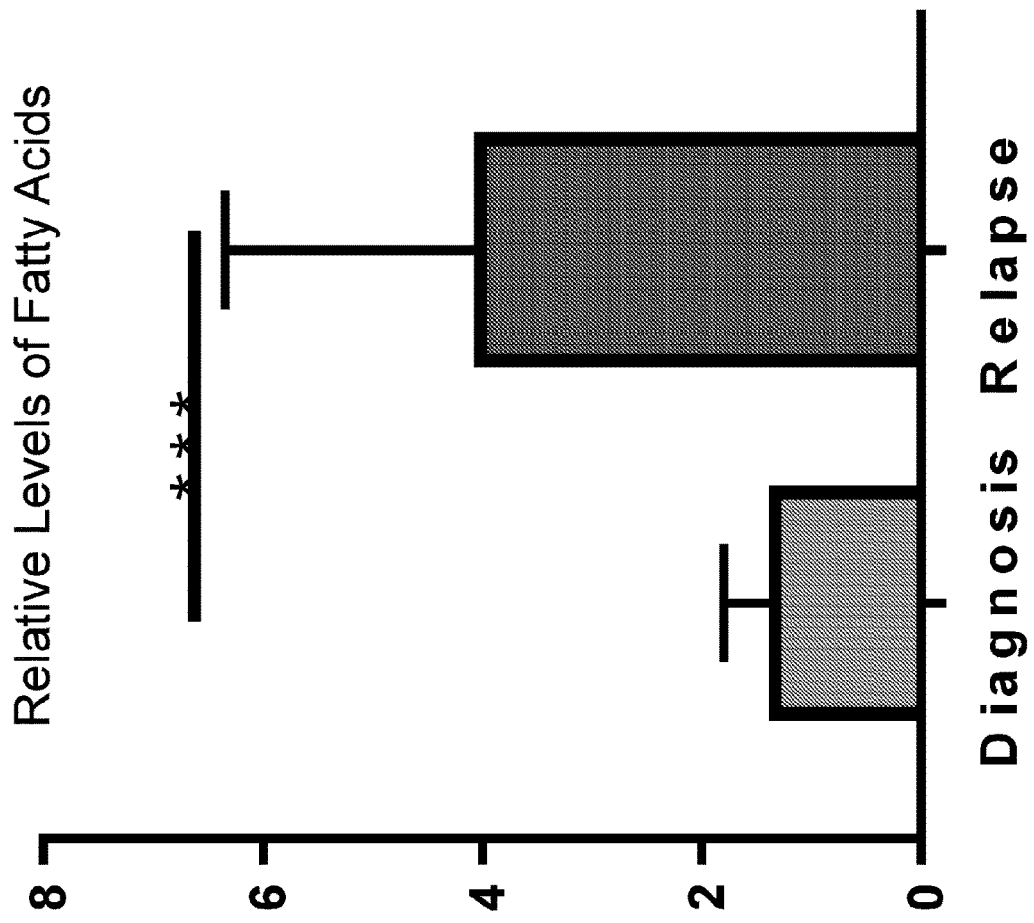

FIG. 121 is a graph showing the relative levels of fatty acids as measured by mass spectrometry in venetoclax/azacitidine sensitive LSCs (diagnosis) and venetoclax/azacitidine resistant LSCs (relapse) treated with venetoclax+azacitidine.

Figure 122:
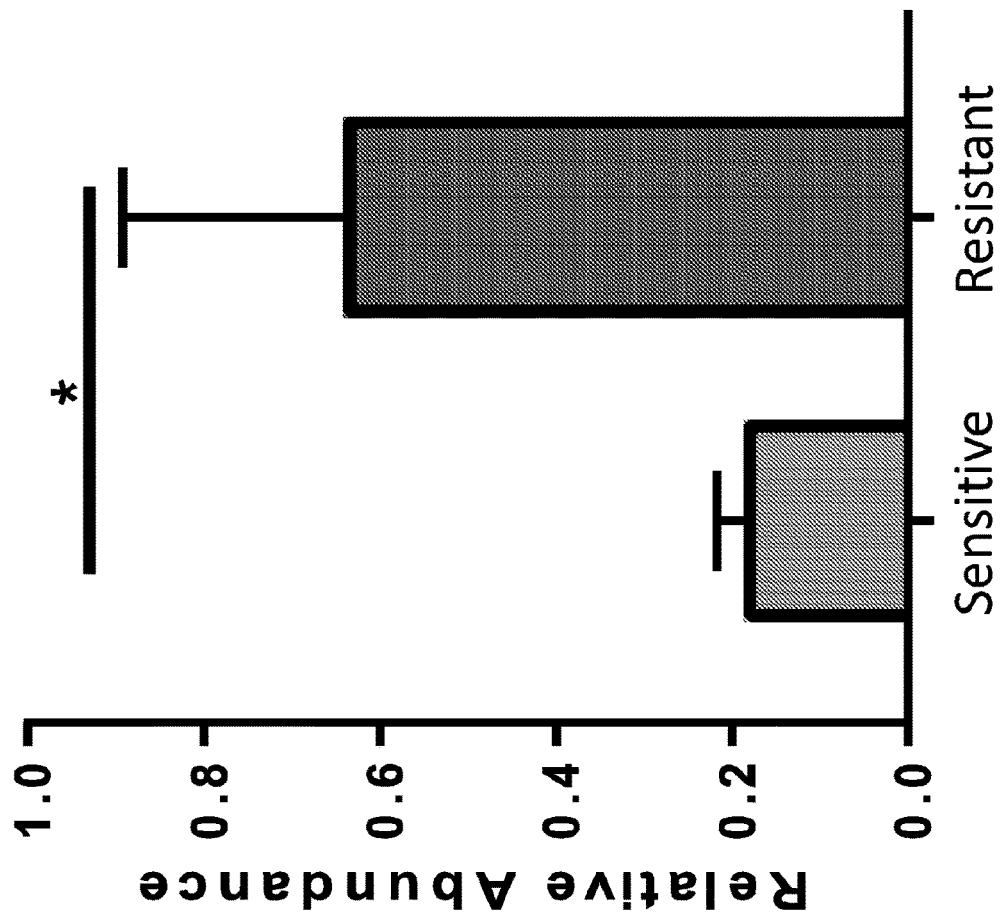

FIG. 122 is a graph showing the relative levels of citrate as measured by mass spectrometry in venetoclax/azacitidine sensitive LSCs (diagnosis) and venetoclax/azacitidine resistant LSCs (relapse) treated with venetoclax+azacitidine.

Figure 123:
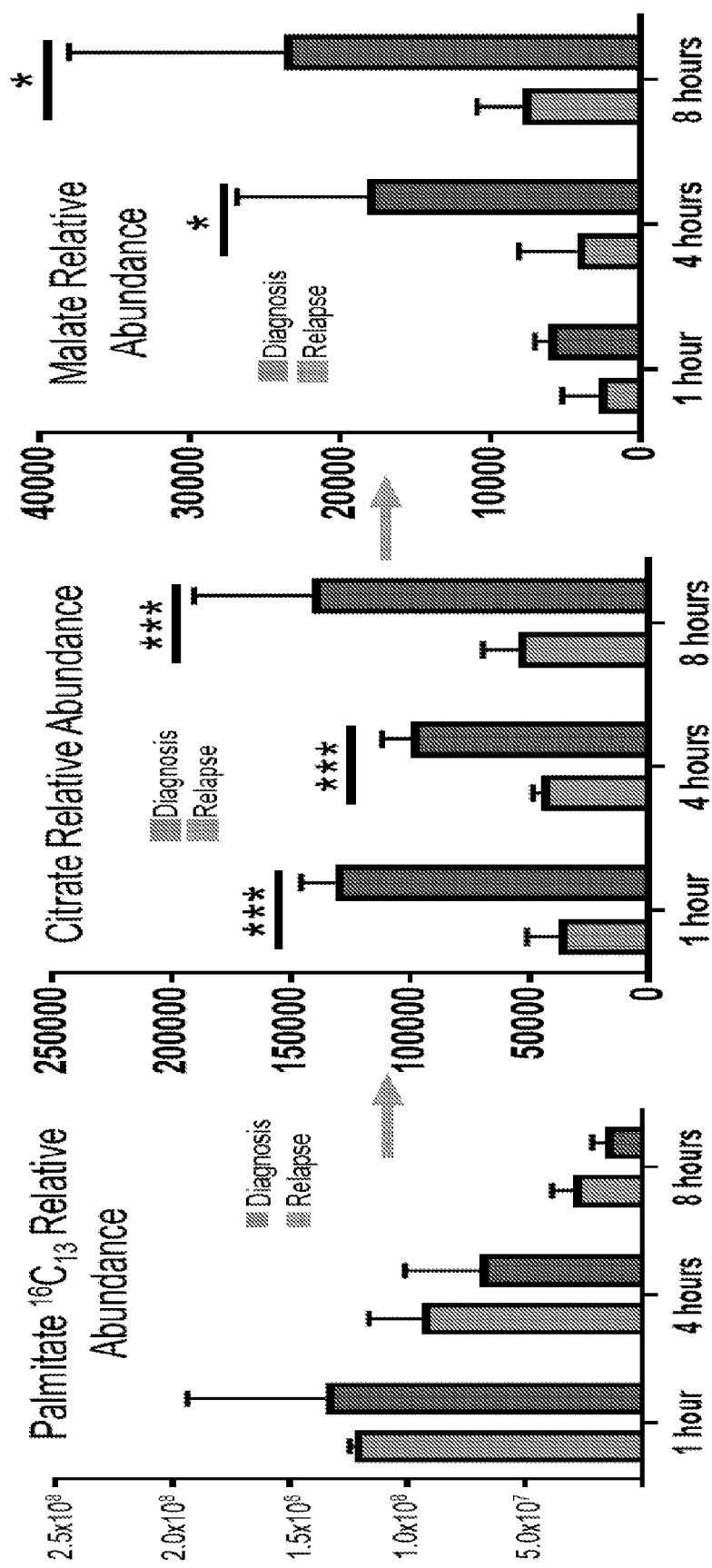

FIG. 123 is a series of graphs showing the metabolism of $^{13}C_{16}$ palmitate at 1, 4 or 8 hours in venetoclax/azacitidine sensitive LSCs (diagnosis) and venetoclax/azacitidine resistant LSCs (relapse).

Figure 124:
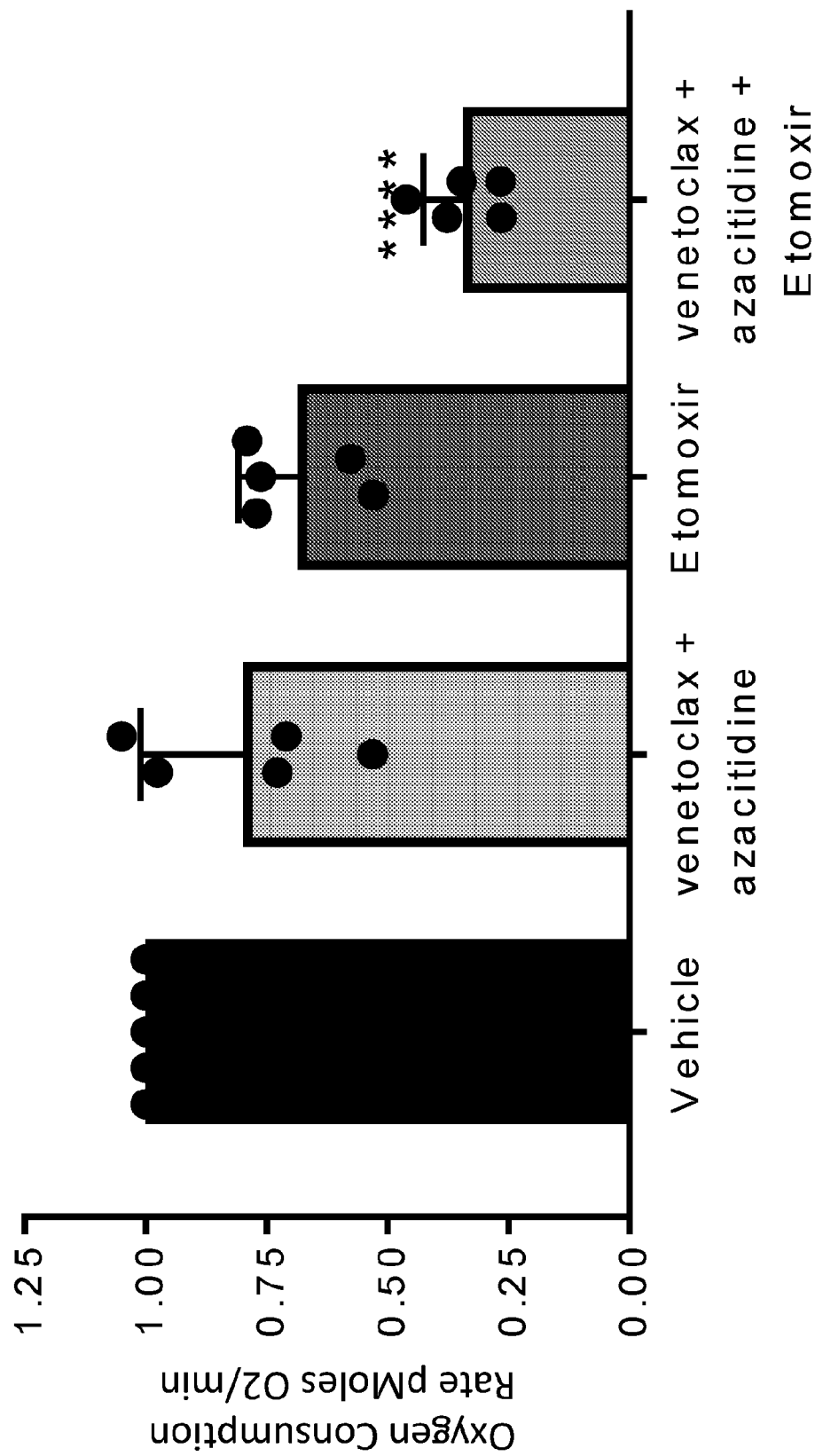

FIG. 124 a graph showing the relative oxygen consumption rate of venetoclax/azacitidine resistant LSCs treated with a vehicle control, venetoclax+azacitidine, etomoxir alone or a combination of venetoclax+azacitidine+etomoxir for four hours.

Figure 125:
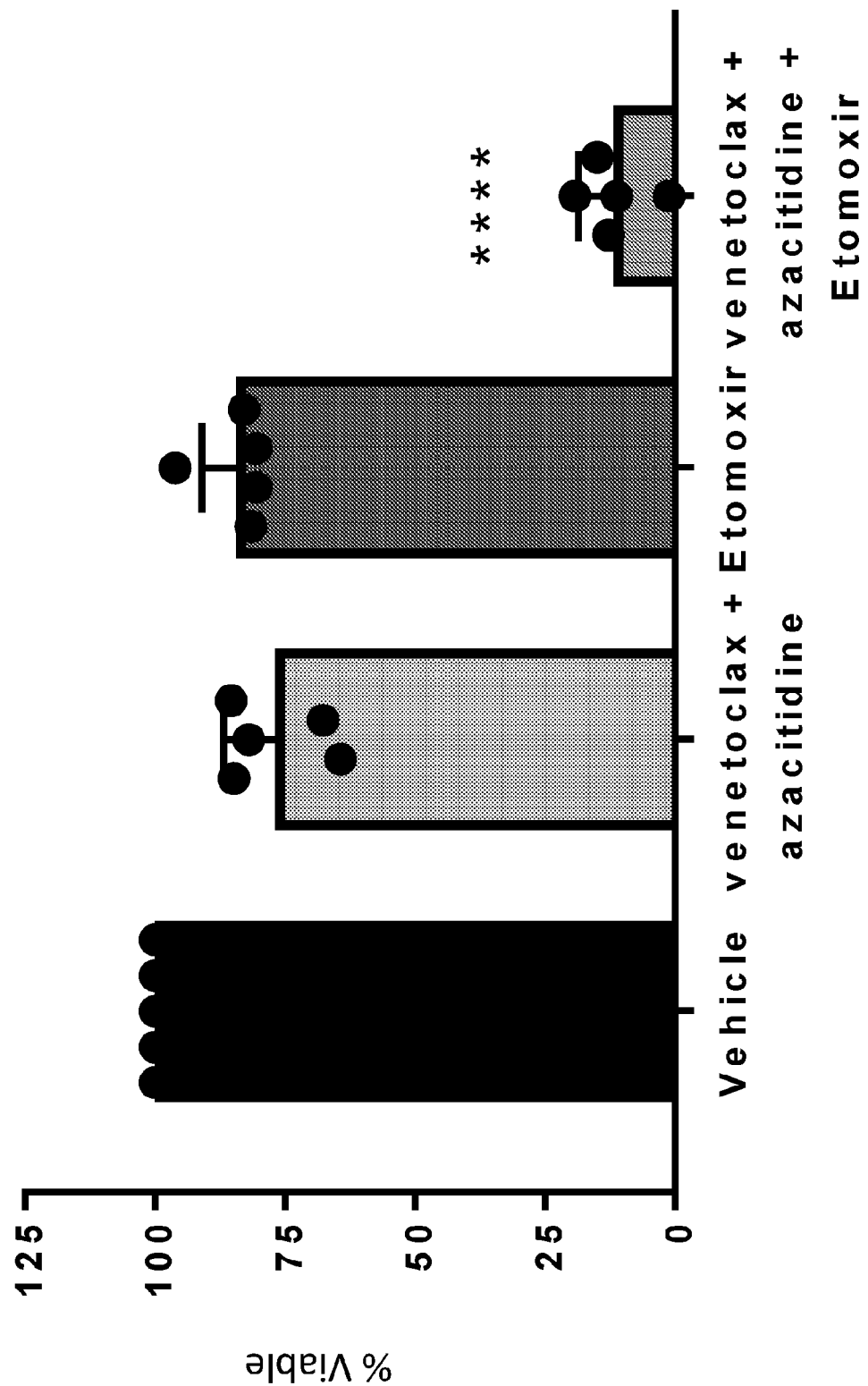

FIG. 125 is a graph showing the viability of venetoclax/azacitidine resistant LSCs treated with a vehicle control, venetoclax+azacitidine, etomoxir alone or a combination of venetoclax+azacitidine+etomoxir for 24 hours.

Figure 126:
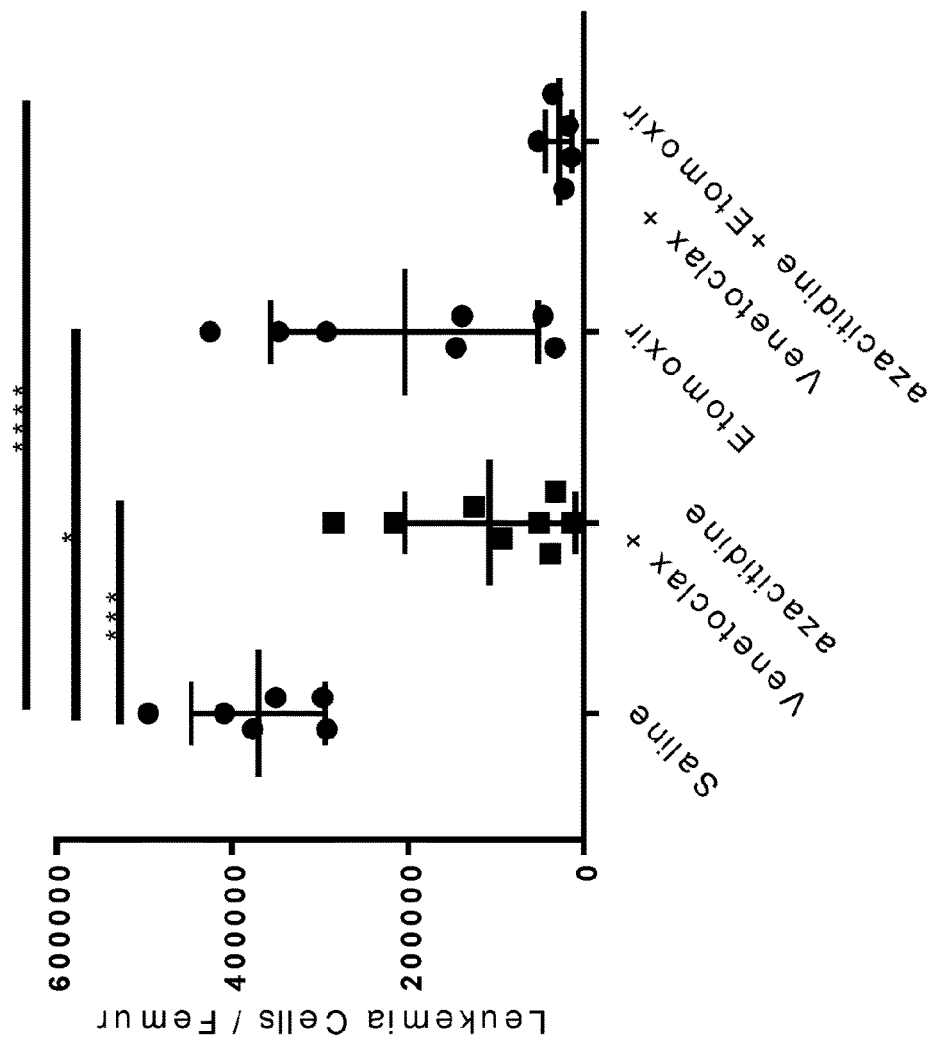

FIG. 126 is a graph showing the leukemia burden in PDX mice models treated with saline, venetoclax+azacitidine, etomoxir alone or a combination of venetoclax+azacitidine+etomoxir for two weeks.

Figure 127:
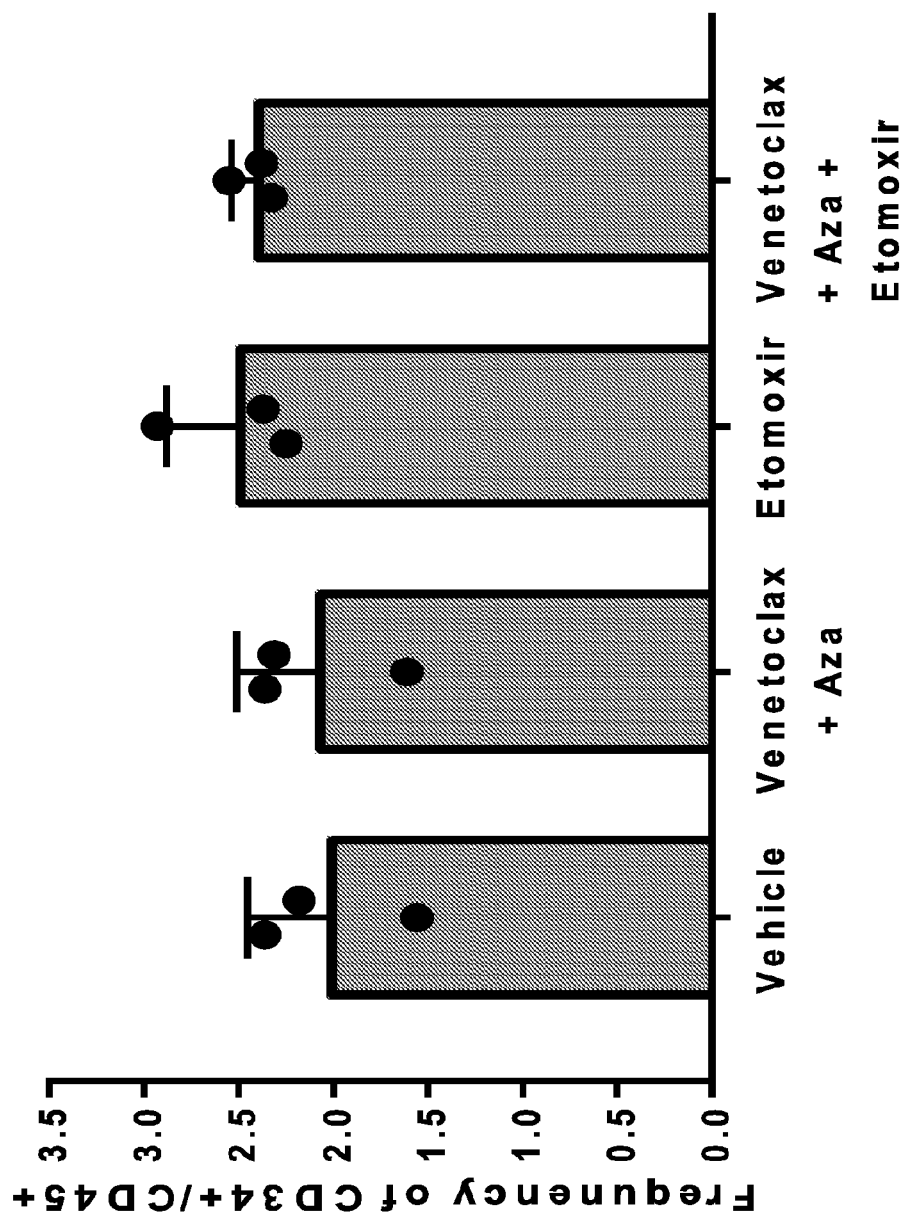

FIG. 127 is a graph showing the frequency of hematopoietic stem and progenitor cells in mobilized peripheral blood samples from PDX mice models after 24 hours of treatment with a vehicle control, venetoclax+azacitidine, etomoxir alone or a combination of venetoclax+azacitidine+etomoxir.

Figure 128:
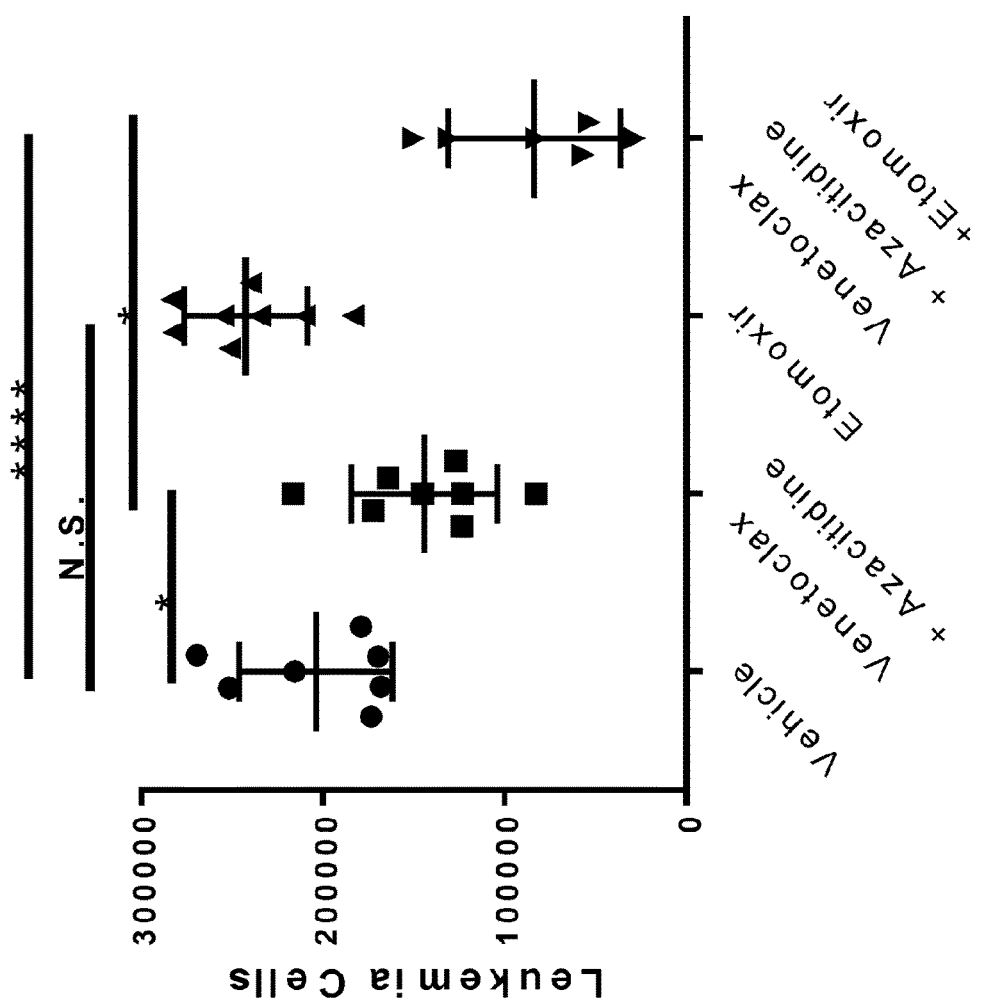

FIG. 128 is a graph showing the number of engrafted leukemia cells in a PDX mouse model after pre-treating the LSCs with a vehicle control, venetoclax+azacitidine, etomoxir alone or a combination of venetoclax+azacitidine+etomoxir prior to engraftment.

DETAILED DESCRIPTION OF THE INVENTION

Cancer is a physiological condition in mammals that is typically characterized by unregulated cell growth. Neoplastic cell growth and proliferation in the context of cancer can give rise to solid tumors or circulating populations of cancerous cells, which are sometimes referred to as a liquid tumor. Solid tumors and liquid tumors can comprise a variety of different types of cancerous cells, including cancer stem cells (CSCs). CSCs are cancer cells that possess characteristics that are typically associated with normal stem cells. These characteristics include, but are not limited to, self-renewal and differentiation into different cancer cell types. CSCs may have the ability to give rise to all cell types found within a particular cancer sample. Thus, CSCs are tumorigenic (tumor-forming).

Given their ability to self-renew and differentiate into any cancerous cell type, CSCs may be responsible for relapse of cancer after initial treatment and metastasis. CSCs may also be more resistant to chemotherapeutic agents, radiation or toxic conditions, making them difficult to eradicate. Given that CSCs may be central to relapse and metastasis, patient prognosis may be dependent on the extent to which cancer stem cells can be reduced/eradicated. The selective targeting of CSCs may provide a means of eliminating cancer in a patient, as after eradication of the CSCs the cancer could regress due to differentiation and/or cell death of the rest of the cancer cells that lack the self-renewal abilities of CSCs. Thus, there exists a need in the art for compositions and methods of reducing and/or inducing cell death in CSCs.

CSCs have been identified in a variety of cancers. These cancers can include but are not limited to, prostate cancer, lung cancer, liver cancer, pancreatic cancer, ovarian cancer, colon cancer, brain cancer, breast cancer, melanoma, multiple myeloma, non-melanoma skin cancer, acute myelogenous leukemia, carcinoma, lymphoma, blastoma, sarcoma, leukemia, adrenocortical carcinoma, bladder urothelial carcinoma, breast invasive carcinoma, cervical squamous cell carcinoma, endocervical adenocarcinoma, cholangiocarcinoma, colon adenocarcinoma, lymphoid neoplasm diffuse large B-cell lymphoma, esophageal carcinoma, glioblastoma multiforme, head and neck squamous cell carcinoma, kidney chromophobe, kidney renal clear cell carcinoma, kidney renal papillary cell carcinoma, acute myeloid leukemia, brain lower grade glioma, liver hepatocellular carcinoma, lung adenocarcinoma, lung squamous cell carcinoma, mesothelioma, ovarian serous cystadenocarcinoma, pancreatic adenocarcinoma, pheochromocytoma, paraganglioma, prostate adenocarcinoma, rectum adenocarcinoma, sarcoma, skin cutaneous melanoma, stomach adenocarcinoma, testicular germ cell tumors, thyroid carcinoma, thymoma, uterine carcinosarcoma, uveal melanoma, colorectal cancer, ovarian cancer, bladder cancer, renal cancer or gastric cancer. Further examples of cancer include neuroendocrine cancer, non-small cell lung cancer (NSCLC), small cell lung cancer, thyroid cancer, endometrial cancer, biliary cancer, esophageal cancer, anal cancer, salivary, cancer, vulvar cancer or cervical cancer, Acoustic Neuroma, Pilocytic Astrocytoma, Low-grade Astrocytoma, Anaplastic Astrocytoma, Glioblastoma multiforme (GBM), Chordoma, CNS Lymphoma, Craniopharyngioma, Brain Stem Glioma, Ependymoma, Mixed Glioma, Optic Nerve Glioma, Subependymoma, Medulloblastoma, Meningioma, Metastatic Brain Tumors, Oligodendroglioma, Pituitary Tumors, Primitive Neuroectodermal (PNET), Schwannoma, Brain Stem Glioma, Craniopharyngioma, Ependymoma, Juvenile Pilocytic Astrocytoma (JPA), Medulloblastoma, Optic Nerve Glioma, Pineal Tumor, Primitive Neuroectodermal.

Unlike other cancerous and non-cancerous cells, CSCs rely on oxidative phosphorylation (OXPHOS) rather than glycolysis for metabolism and energy production. In particular, CSCs from brain cancer, breast cancer, pancreatic cancer and acute myeloid leukemia are reliant on OXPHOS. Conversely, normal hematopoietic stem cells are heavily reliant on glycolysis. Thus, perturbing and/or inhibiting OXPHOS provides a means of selectively targeting, reducing and inducing cell death in CSCs.

Additionally, the OXPHOS activity in CSCs is primarily reliant on amino acid catabolism into the TCA cycle as opposed to other pathways such as fatty acid metabolism into the TCA cycle. As shown in Examples 1-6 herein, CSCs from acute myeloid leukemia (AML), which are also known as leukemia stem cells (LSCs), have increased amino acid levels, increased amino acid uptake, and enrichment of metabolic pathways involved in amino acid metabolism as compared to AML blast cells. Additionally, unlike AML blast cells, LSCs are dependent upon amino acids for viability and survival. As shown in Examples 5 and 6 herein, the dependence of LSCs on amino acids is due to the fact that LSCs preferentially rely on amino acids to fuel OXPHOS through catabolism of amino acids into the tricarboxylic acid (TCA) cycle. As show in Examples 4-6 herein, other cells, including AML blast cells, do not as heavily rely on amino acid catabolism into the TCA cycle. Unlike LSCs, AMC-blasts and other cells are more metabolically flexible and able to fuel energy needs using other pathways including fatty acid metabolism into the TCA cycle and glycolysis. Furthermore, as shown in Example 4 herein, amino acid dependence is unique to LSCs and is not seen in normal hematopoietic stem cells. Thus, the examples presented herein indicate that CSCs can be selectively targeted and reduced, and that cell death can be induced in CSCs by modulating metabolism, including amino acid metabolism and OXPHOS activity. In fact, as shown in Examples 7-9 and 12-14 herein, a combination therapy of venetoclax and azacitidine (venetoclax+azacitidine) selectively targets and kills LSCs by decreasing amino acid levels, thereby decreasing OXPHOS activity. Furthermore, as shown in Example 10, LSCs from relapsed patients upregulate other metabolism pathways to compensate for inhibition of amino acid metabolism, indicating that therapies that target and inhibit these compensatory pathways in relapse LSCs and CSCs are an effective treatment in cancer relapse.

The examples presented herein demonstrate that modulating metabolism, including amino acid metabolism, is an effective means of selectively reducing and/or inducing cell death in CSCs, including LSCs. Thus, the present disclosure provides compositions and methods for reducing and/or inducing cell death in CSCs comprising compounds that modulate metabolism. Additionally, the present disclosure provides compositions and methods for reducing and/or inducing cell death in CSCs comprising compounds that modulate cellular pathways that are directly or indirectly connected with metabolism.

Furthermore, as shown in Examples 15-21, proper FIS1 activity, proper AMPK activity, proper mitochondrial dynamics, proper mitochondrial morphology and proper mitophagy activity are needed in LSCs to maintain self-renewal properties. Thus, the present disclosure provides compositions and methods for reducing and/or inducing cell death in CSCs comprising compounds that modulate FIS1 activity, AMPK activity, mitochondrial dynamics, mitochondrial morphology, mitophagy activity, or any combination thereof.

Additionally, as shown in Examples 22-25, stem cells from myelodysplastic syndrome (MDS) patients, a disorder that often matures into cancer such as AML, can be effectively targeted and reduced by inhibiting protein synthesis. Thus, the present disclosure provides compositions and methods for reducing and/or inducing cell death in CSCs comprising compounds that modulate protein synthesis.

Also, as shown in Example 26, LSCs from relapsed AML patient samples are dependent on nicotinamide metabolism, and the inhibition of nicotinamide metabolism, such as through the use of a Nampt inhibitor, can effectively induce cell death in LSCs. Thus, the present disclosure provides compositions and methods for reducing and/or inducing cell death in CSCs comprising compounds that modulate nicotinamide metabolism, such as, but not limited to, Nampt inhibitors.

In some aspects, the present disclosure provides a method of inducing cell death in cancer stem cells comprising administering an effective amount of at least one metabolism modulating agent. In some aspects, the present disclosure provides a method of treating cancer in a subject comprising administering an effective amount of at least one metabolism modulating agent. In some aspects, the present disclosure provides a method of treating AML, in a subject comprising administering an effective amount of at least one metabolism modulating agent. The metabolism modulating agent can be any of the compounds set forth in Table 1. A metabolism modulating agent can be a hypomethylating agent. Hypomethylating agents can include, but are not limited to azacitidine, cytarabine, decitabine and any other hypomethylating agent known in the art. A metabolism modulating agent can be a BCL-2 inhibitor. BCL-2 inhibitors can include, but are not limited to, venetoclax, navitoclax, and any other BCL-2 inhibitor known in the art.

TABLE 1

| metabolism modulating agents | |
|---|---|
| Compound | Compound |
| Venetoclax (ABT-199) | AT7519 |
| Navitoclax (ABT-263) | SNS-032 |
| AMG 176 | Sunitinib |
| Temsirolimus (CCI-779, Torisel) | UCN-01 |
| Everolimus | Cytoxan |
| TAK228 (formerly MLN0128) | BI 894999 (NCT02516553) |

TABLE 1-continued

| metabolism modulating agents | |
|---|---|
| Compound | Compound |
| Disulfiram | RO6870810 |
| As$_2$O$_3$ (arsenic trioxide) | JQ1 |
| Bortezomib | Panobinostat |
| Enasidenib (Idhifa) | Belinostat |
| AG-221 | Tazemetostat (EPZ-6438) |
| AG-120 | BI-D1870 |
| Sorafenib | T-3775440 |
| Midostaurin | ORY1001 |
| Quizartinib | KPT-330 |
| Crenolanib | Anakinra |
| AZD8186 | Tocilizumab |
| MK-2206 (Akt) | Bendamustine |
| A-674563 (Akt) | Niclosamide |
| Dasatinib | Statins |
| Ruxolitinib | Lenalidomide (CC-5013, Revlimid) |
| Doramapimod | Sunitinib malate (SU011248 L-malate; Sutent) |
| Ralimetinib | Sorafenib tosylate (BAY 43-9006 tosylate; BAY 54-9085) |
| ARRY 614 | Motesanib |
| Selumetinib | Foretinib |
| Ulixertinib (BVD-523) | Linifanib |
| PMD-026 | Osimertinib (AZD9291) |
| Selumetinib | Rociletinib (CO-1686) |
| Palbociclib | Canertinib (CI-1033) |
| Abemaciclib | Mozobil |
| Ribociclib | BL-8040 (BKT140) |
| Flavopiridol | Ulocuplumab (BMD-936564/MDX-1338) |
| Mefloquine | Sorbitan sesquioleate |
| Omacetaxine mepesuccinate | anisomycin |
| APO866 | CHS-828 |
| CHS-828 prodrug | TP201565 |
| EB1627/GMX1777 | |
| LSN3154567 | etomoxir |
| azacitidine | decitabine |
| cytarabine | gemcitabine |
| a BCL-2 inhibitor | a hypomethylating agent |

The present disclosure provides at least one metabolism modulating agent for use in the inducement of cell death in cancer stem cells, wherein the at least one metabolism modulating agent is for administration to a subject in need thereof in a therapeutically effective amount. The present disclosure provides at least one metabolism modulating agent for use in the treatment of cancer in a subject, wherein the at least one metabolism modulating agent is for administration to the subject in a therapeutically effective amount. The present disclosure provides at least one metabolism modulating agent for use in the treatment of AML in a subject, wherein the at least one metabolism modulating agent is for administration to the subject in a therapeutically effective amount.

The present disclosure provides at least one metabolism modulating agent for the manufacture of a medicament for inducing cell death in cancer stem cells, wherein the at least one metabolism modulating agent is for administration to a subject in need thereof in a therapeutically effective amount. The present disclosure provides at least one metabolism modulating agent for the manufacture of a medicament for treating cancer in a subject, wherein the at least one metabolism modulating agent is for administration to the subject in a therapeutically effective amount. The present disclosure provides at least one metabolism modulating agent for the manufacture of a medicament for treating AML in a subject, wherein the at least one metabolism modulating agent is for administration to the subject in a therapeutically effective amount.

In another aspect, the present disclosure provides a method of inducing cell death in cancer stem cells comprising administering an effective amount of a first metabolism modulating agent and an effective amount of an at least second metabolism modulating agent, wherein the first metabolism modulating agent is venetoclax, wherein the at least second metabolism modulating agent is a compound set forth in Table 1, and wherein the first and the at least second metabolism modulating agent are not the same compound.

The present disclosure provides a combination comprising a first metabolism modulating agent and an at least second metabolism modulating agent for use in the inducement of cell death in cancer stem cells, wherein the first metabolism modulating agent is venetoclax, wherein the at least second metabolism modulating agent is a compound set forth in table 1, wherein the first and the at least second metabolism modulating agent are not the same compound, and wherein the first metabolism modulating agent and the at least second metabolism modulating agent are for administration to a subject in need thereof in a therapeutically effective amount. The present disclosure provides a first metabolism modulating agent for use in the inducement of cell death in cancer stem cells, the inducement comprising administering a combination comprising the first metabolism modulating agent and an at least second metabolism modulating agent, wherein the first metabolism modulating agent is venetoclax, wherein the at least second metabolism modulating agent is a compound set forth in table 1, wherein the first and the at least second metabolism modulating agent are not the same compound, and wherein the first metabolism modulating agent and the at least second metabolism modulating agent are for administration to a subject in need thereof in a therapeutically effective amount. The present disclosure provides an at least second metabolism modulating agent for use in the inducement of cell death in cancer stem cells, the inducement comprising administering a combination comprising a first metabolism modulating agent and the at least second metabolism modulating agent, wherein the first metabolism modulating agent is venetoclax, wherein the at least second metabolism modulating agent is a compound set forth in table 1, wherein the first and the at least second metabolism modulating agent are not the same compound, and wherein the first metabolism modulating agent and the at least second metabolism modulating agent are for administration to a subject in need thereof in a therapeutically effective amount. The present disclosure provides a combination comprising a first metabolism modulating agent and an at least second metabolism modulating agent for the manufacture of a medicament for inducing cell death in cancer stem cells, wherein the first metabolism modulating agent is venetoclax, wherein the at least second metabolism modulating agent is a compound set forth in table 1, wherein the first and the at least second metabolism modulating agent are not the same compound, and wherein the first metabolism modulating agent and the at least second metabolism modulating agent are for administration to a subject in need thereof in a therapeutically effective amount.

In another aspect, the present disclosure provides a method of treating cancer in a subject comprising administering an effective amount of a first metabolism modulating agent and an effective amount of an at least second metabolism modulating agent, wherein the first metabolism modulating agent is venetoclax, wherein the at least second metabolism modulating agent is a compound set forth in Table 1, and wherein the first and the at least second metabolism modulating agent are not the same compound.

The present disclosure provides a combination comprising a first metabolism modulating agent and an at least second metabolism modulating agent for use in the treatment of cancer in a subject, wherein the first metabolism modulating agent is venetoclax, wherein the at least second metabolism modulating agent is a compound set forth in table 1, wherein the first and the at least second metabolism modulating agent are not the same compound, and wherein the first metabolism modulating agent and the at least second metabolism modulating agent are for administration to a subject in need thereof in a therapeutically effective amount. The present disclosure provides a first metabolism modulating agent for use in the treatment of cancer in a subject, the treatment comprising administering a combination comprising the first metabolism modulating agent and an at least second metabolism modulating agent, wherein the first metabolism modulating agent is venetoclax, wherein the at least second metabolism modulating agent is a compound set forth in table 1, wherein the first and the at least second metabolism modulating agent are not the same compound, and wherein the first metabolism modulating agent and the at least second metabolism modulating agent are for administration to a subject in need thereof in a therapeutically effective amount. The present disclosure provides a combination comprising an at least second metabolism modulating agent for use in the treatment of cancer in a subject, the treatment comprising administering a combination comprising a first metabolism modulating agent and the at least second metabolism modulating agent, wherein the first metabolism modulating agent is venetoclax, wherein the at least second metabolism modulating agent is a compound set forth in table 1, wherein the first and the at least second metabolism modulating agent are not the same compound, and wherein the first metabolism modulating agent and the at least second metabolism modulating agent are for administration to a subject in need thereof in a therapeutically effective amount. The present disclosure provides a combination comprising a first metabolism modulating agent and an at least second metabolism modulating agent for the manufacture of a medicament for treating cancer in a subject, wherein the first metabolism modulating agent is venetoclax, wherein the at least second metabolism modulating agent is a compound set forth in table 1, wherein the first and the at least second metabolism modulating agent are not the same compound, and wherein the first metabolism modulating agent and the at least second metabolism modulating agent are for administration to a subject in need thereof in a therapeutically effective amount.

In another aspect, the present disclosure provides a method of treating AML in a subject comprising administering an effective amount of a first metabolism modulating agent and an effective amount of an at least second metabolism modulating agent, wherein the first metabolism modulating agent is venetoclax, wherein the at least second metabolism modulating agent is a compound set forth in Table 1, and wherein the first and the at least second metabolism modulating agent are not the same compound.

The present disclosure provides a combination comprising a first metabolism modulating agent and an at least second metabolism modulating agent for use in the treatment of AML in a subject, wherein the first metabolism modulating agent is venetoclax, wherein the at least second metabolism modulating agent is a compound set forth in table 1, wherein the first and the at least second metabolism modulating agent are not the same compound, and wherein the first metabolism modulating agent and the at least second metabolism modulating agent are for administration to a subject in need thereof in a therapeutically effective amount. The present disclosure provides a first metabolism modulating agent for use in the treatment of AML in a subject, the treatment comprising administering a combination comprising the first metabolism modulating agent and an at least second metabolism modulating agent, wherein the first metabolism modulating agent is venetoclax, wherein the at least second metabolism modulating agent is a compound set forth in table 1, wherein the first and the at least second metabolism modulating agent are not the same compound, and wherein the first metabolism modulating agent and the at least second metabolism modulating agent are for administration to a subject in need thereof in a therapeutically effective amount. The present disclosure provides a combination comprising an at least second metabolism modulating agent for use in the treatment of AML in a subject, the treatment comprising administering a combination comprising a first metabolism modulating agent and the at least second metabolism modulating agent, wherein the first metabolism modulating agent is venetoclax, wherein the at least second metabolism modulating agent is a compound set forth in table 1, wherein the first and the at least second metabolism modulating agent are not the same compound, and wherein the first metabolism modulating agent and the at least second metabolism modulating agent are for administration to a subject in need thereof in a therapeutically effective amount. The present disclosure provides a combination comprising a first metabolism modulating agent and an at least second metabolism modulating agent for the manufacture of a medicament for treating AML in a subject, wherein the first metabolism modulating agent is venetoclax, wherein the at least second metabolism modulating agent is a compound set forth in table 1, wherein the first and the at least second metabolism modulating agent are not the same compound, and wherein the first metabolism modulating agent and the at least second metabolism modulating agent are for administration to a subject in need thereof in a therapeutically effective amount.

In another aspect, the present disclosure provides a method of inducing cell death in cancer stem cells comprising administering an effective amount of a first metabolism modulating agent and an effective amount of an at least second metabolism modulating agent, wherein the first metabolism modulating agent is azacitidine, wherein the at least second metabolism modulating agent is a compound set forth in Table 1, and wherein the first and the at least second metabolism modulating agent are not the same compound.

The present disclosure provides a combination comprising a first metabolism modulating agent and an at least second metabolism modulating agent for use in the inducement of cell death in cancer stem cells, wherein the first metabolism modulating agent is azacitidine, wherein the at least second metabolism modulating agent is a compound set forth in table 1, wherein the first and the at least second metabolism modulating agent are not the same compound, and wherein the first metabolism modulating agent and the at least second metabolism modulating agent are for administration to a subject in need thereof in a therapeutically effective amount. The present disclosure provides a first metabolism modulating agent for use in the inducement of cell death in cancer stem cells, the inducement comprising administering a combination comprising the first metabolism modulating agent and an at least second metabolism modulating agent, wherein the first metabolism modulating agent is azacitidine, wherein the at least second metabolism modulating agent is a compound set forth in table 1, wherein the first and the at least second metabolism modulating agent are not the same compound, and wherein the first metabolism modulating agent and the at least second metabolism modulating agent are for administration to a subject in need thereof in a therapeutically effective amount. The present disclosure provides an at least second metabolism modulating agent for use in the inducement of cell death in cancer stem cells, the inducement comprising administering a combination comprising a first metabolism modulating agent and the at least second metabolism modulating agent, wherein the first metabolism modulating agent is azacitidine, wherein the at least second metabolism modulating agent is a compound set forth in table 1, wherein the first and the at least second metabolism modulating agent are not the same compound, and wherein the first metabolism modulating agent and the at least second metabolism modulating agent are for administration to a subject in need thereof in a therapeutically effective amount. The present disclosure provides a combination comprising a first metabolism modulating agent and an at least second metabolism modulating agent for the manufacture of a medicament for inducing cell death in cancer stem cells, wherein the first metabolism modulating agent is azacitidine, wherein the at least second metabolism modulating agent is a compound set forth in table 1, wherein the first and the at least second metabolism modulating agent are not the same compound, and wherein the first metabolism modulating agent and the at least second metabolism modulating agent are for administration to a subject in need thereof in a therapeutically effective amount.

In another aspect, the present disclosure provides a method of treating cancer in a subject comprising administering an effective amount of a first metabolism modulating agent and an effective amount of an at least second metabolism modulating agent, wherein the first metabolism modulating agent is azacitidine, wherein the at least second metabolism modulating agent is a compound set forth in Table 1, and wherein the first and the at least second metabolism modulating agent are not the same compound.

The present disclosure provides a combination comprising a first metabolism modulating agent and an at least second metabolism modulating agent for use in the treatment of cancer in a subject, wherein the first metabolism modulating agent is azacitidine, wherein the at least second metabolism modulating agent is a compound set forth in table 1, wherein the first and the at least second metabolism modulating agent are not the same compound, and wherein the first metabolism modulating agent and the at least second metabolism modulating agent are for administration to a subject in need thereof in a therapeutically effective amount. The present disclosure provides a first metabolism modulating agent for use in the treatment of cancer in a subject, the treatment comprising administering a combination comprising the first metabolism modulating agent and an at least second metabolism modulating agent, wherein the first metabolism modulating agent is azacitidine, wherein the at least second metabolism modulating agent is a compound set forth in table 1, wherein the first and the at least second metabolism modulating agent are not the same compound, and wherein the first metabolism modulating agent and the at least second metabolism modulating agent are for administration to a subject in need thereof in a therapeutically effective amount. The present disclosure provides a combination comprising an at least second metabolism modulating agent for use in the treatment of cancer in a subject, the treatment comprising administering a combination comprising a first metabolism modulating agent and the at least second metabolism modulating agent, wherein the first metabolism modulating agent is azacitidine, wherein the at least second metabolism modulating agent is a compound set forth in table 1, wherein the first and the at least second metabolism modulating agent are not the same compound, and wherein the first metabolism modulating agent and the at least second metabolism modulating agent are for administration to a subject in need thereof in a therapeutically effective amount. The present disclosure provides a combination comprising a first metabolism modulating agent and an at least second metabolism modulating agent for the manufacture of a medicament for treating cancer in a subject, wherein the first metabolism modulating agent is azacitidine, wherein the at least second metabolism modulating agent is a compound set forth in table 1, wherein the first and the at least second metabolism modulating agent are not the same compound, and wherein the first metabolism modulating agent and the at least second metabolism modulating agent are for administration to a subject in need thereof in a therapeutically effective amount.

In another aspect, the present disclosure provides a method of treating AML in a subject comprising administering an effective amount of a first metabolism modulating agent and an effective amount of an at least second metabolism modulating agent, wherein the first metabolism modulating agent is azacitidine, wherein the at least second metabolism modulating agent is a compound set forth in Table 1, and wherein the first and the at least second metabolism modulating agent are not the same compound.

The present disclosure provides a combination comprising a first metabolism modulating agent and an at least second metabolism modulating agent for use in the treatment of AML in a subject, wherein the first metabolism modulating agent is azacitidine, wherein the at least second metabolism modulating agent is a compound set forth in table 1, wherein the first and the at least second metabolism modulating agent are not the same compound, and wherein the first metabolism modulating agent and the at least second metabolism modulating agent are for administration to a subject in need thereof in a therapeutically effective amount. The present disclosure provides a first metabolism modulating agent for use in the treatment of AML in a subject, the treatment comprising administering a combination comprising the first metabolism modulating agent and an at least second metabolism modulating agent, wherein the first metabolism modulating agent is azacitidine, wherein the at least second metabolism modulating agent is a compound set forth in table 1, wherein the first and the at least second metabolism modulating agent are not the same compound, and wherein the first metabolism modulating agent and the at least second metabolism modulating agent are for administration to a subject in need thereof in a therapeutically effective amount. The present disclosure provides a combination comprising an at least second metabolism modulating agent for use in the treatment of AML in a subject, the treatment comprising administering a combination comprising a first metabolism modulating agent and the at least second metabolism modulating agent, wherein the first metabolism modulating agent is azacitidine, wherein the at least second metabolism modulating agent is a compound set forth in table 1, wherein the first and the at least second metabolism modulating agent are not the same compound, and wherein the first metabolism modulating agent and the at least second metabolism modulating agent are for administration to a subject in need thereof in a therapeutically effective amount. The present disclosure provides a combination comprising a first metabolism modulating agent and an at least second metabolism modulating agent for the manufacture of a medicament for treating AML in a subject, wherein the first metabolism modulating agent is azacitidine, wherein the at least second metabolism modulating agent is a compound set forth in table 1, wherein the first and the at least second metabolism modulating agent are not the same compound, and wherein the first metabolism modulating agent and the at least second metabolism modulating agent are for administration to a subject in need thereof in a therapeutically effective amount.

In yet another aspect, the present disclosure provides a method of inducing cell death in cancer stem cells comprising administering an effective amount of a first metabolism modulating agent, an effective amount of a second metabolism modulating agent and an effective amount of an at least third metabolism modulating agent, wherein the first, second and at least third metabolism modulating agents are not the same compound.

The present disclosure provides a combination comprising a first metabolism modulating agent, a second metabolism modulating agent and an at least third metabolism modulating agent for use in the inducement of cell death in cancer stem cells, wherein the first, second and at least third metabolism modulating agents are not the same compound, and wherein the first, second and at least third metabolism modulating agents are for administration to a subject in need thereof in a therapeutically effective amount. The present disclosure provides a first metabolism modulating agent for use in the inducement of cell death in cancer stem cells, the inducement comprising administering a combination comprising the first metabolism modulating agent, a second metabolism modulating agent and an at least third metabolism modulating agent, wherein the first, second and at least third metabolism modulating agents are not the same compound, and wherein the first, second and at least third metabolism modulating agents are for administration to a subject in need thereof in a therapeutically effective amount. The present disclosure provides a combination comprising a first metabolism modulating agent, a second metabolism modulating agent and an at least third metabolism modulating agent for the manufacture of a medicament for inducing cell death in cancer stem cells, wherein the first, second and at least third metabolism modulating agents are not the same compound, and wherein the first, second and at least third metabolism modulating agents are for administration to a subject in need thereof in a therapeutically effective amount.

In yet another aspect, the present disclosure provides a method of treating cancer in a subject comprising administering an effective amount of a first metabolism modulating agent, an effective amount of a second metabolism modulating agent and an effective amount of an at least third metabolism modulating agent, wherein the first, second and at least third metabolism modulating agents are not the same compound.

The present disclosure provides a combination comprising a first metabolism modulating agent, a second metabolism modulating agent and an at least third metabolism modulating agent for use in the treatment of cancer in a subject, wherein the first, second and at least third metabolism modulating agents are not the same compound, and wherein the first, second and at least third metabolism modulating agents are for administration to a subject in need thereof in a therapeutically effective amount. The present disclosure provides a first metabolism modulating agent for use in the treatment of cancer in a subject, the treatment comprising administering a combination comprising the first metabolism modulating agent, a second metabolism modulating agent and an at least third metabolism modulating agent, wherein the first, second and at least third metabolism modulating agents are not the same compound, and wherein the first, second and at least third metabolism modulating agents are for administration to a subject in need thereof in a therapeutically effective amount. The present disclosure provides a combination comprising a first metabolism modulating agent, a second metabolism modulating agent and an at least third metabolism modulating agent for the manufacture of a medicament for treating cancer in a subject, wherein the first, second and at least third metabolism modulating agents are not the same compound, and wherein the first, second and at least third metabolism modulating agents are for administration to a subject in need thereof in a therapeutically effective amount.

In yet another aspect, the present disclosure provides a method of treating AML in a subject comprising administering an effective amount of a first metabolism modulating agent, an effective amount of a second metabolism modulating agent and an effective amount of an at least third metabolism modulating agent, wherein the first, second and at least third metabolism modulating agents are not the same compound.

The present disclosure provides a combination comprising a first metabolism modulating agent, a second metabolism modulating agent and an at least third metabolism modulating agent for use in the treatment of AML in a subject, wherein the first, second and at least third metabolism modulating agents are not the same compound, and wherein the first, second and at least third metabolism modulating agents are for administration to a subject in need thereof in a therapeutically effective amount. The present disclosure provides a first metabolism modulating agent for use in the treatment of AML in a subject, the treatment comprising administering a combination comprising the first metabolism modulating agent, a second metabolism modulating agent and an at least third metabolism modulating agent, wherein the first, second and at least third metabolism modulating agents are not the same compound, and wherein the first, second and at least third metabolism modulating agents are for administration to a subject in need thereof in a therapeutically effective amount. The present disclosure provides a combination comprising a first metabolism modulating agent, a second metabolism modulating agent and an at least third metabolism modulating agent for the manufacture of a medicament for treating AML in a subject, wherein the first, second and at least third metabolism modulating agents are not the same compound, and wherein the first, second and at least third metabolism modulating agents are for administration to a subject in need thereof in a therapeutically effective amount.

In yet another aspect, the present disclosure provides a method of inducing cell death in cancer stem cells comprising administering an effective amount of a first metabolism modulating agent, an effective amount of a second metabolism modulating agent and an effective amount of an at least third metabolism modulating agent, wherein the first metabolism modulating agent is venetoclax, wherein the second metabolism modulating agent is azacitidine, wherein the first, second and at least third metabolism modulating agents are not the same compound.

The present disclosure provides a combination of a first metabolism modulating agent, a second metabolism modulating agent and an at least third metabolism modulating agent for use in the inducement of cell death in cancer stem cells, wherein the first metabolism modulating agent is venetoclax, wherein the second metabolism modulating agent is azacitidine, wherein the first, second and at least third metabolism modulating agents are not the same compound, and wherein the first, second and at least third metabolism modulating agents are for administration to a subject in need thereof in a therapeutically effective amount. The present disclosure provides a first metabolism modulating agent for use in the inducement of cell death in cancer stem cells, the inducement comprising administering a combination comprising the first metabolism modulating agent, a second metabolism modulating agent and an at least third metabolism modulating agent, wherein the first metabolism modulating agent is venetoclax, wherein the second metabolism modulating agent is azacitidine, wherein the first, second and at least third metabolism modulating agents are not the same compound, and wherein the first, second and at least third metabolism modulating agents are for administration to a subject in need thereof in a therapeutically effective amount. The present disclosure provides a second metabolism modulating agent for use in the inducement of cell death in cancer stem cells, the inducement comprising administering a combination comprising a first metabolism modulating agent, the second metabolism modulating agent and an at least third metabolism modulating agent, wherein the first metabolism modulating agent is venetoclax, wherein the second metabolism modulating agent is azacitidine, wherein the first, second and at least third metabolism modulating agents are not the same compound, and wherein the first, second and at least third metabolism modulating agents are for administration to a subject in need thereof in a therapeutically effective amount. The present disclosure provides an at least third metabolism modulating agent for use in the inducement of cell death in cancer stem cells, the inducement comprising administering a combination comprising a first metabolism modulating agent, a second metabolism modulating agent and the at least third metabolism modulating agent, wherein the first metabolism modulating agent is venetoclax, wherein the second metabolism modulating agent is azacitidine, wherein the first, second and at least third metabolism modulating agents are not the same compound, and wherein the first, second and at least third metabolism modulating agents are for administration to a subject in need thereof in a therapeutically effective amount. The present disclosure provides a combination of a first metabolism modulating agent, a second metabolism modulating agent and an at least third metabolism modulating agent for the manufacture of a medicament for inducing cell death in cancer stem cells, wherein the first metabolism modulating agent is venetoclax, wherein the second metabolism modulating agent is azacitidine, wherein the first, second and at least third metabolism modulating agents are not the same compound, and wherein the first, second and at least third metabolism modulating agents are for administration to a subject in need thereof in a therapeutically effective amount.

In yet another aspect, the present disclosure provides a method of treating cancer in a subject comprising administering an effective amount of a first metabolism modulating agent, an effective amount of a second metabolism modulating agent and an effective amount of an at least third metabolism modulating agent, wherein the first metabolism modulating agent is venetoclax, wherein the second metabolism modulating agent is azacitidine, wherein the first, second and at least third metabolism modulating agents are not the same compound.

The present disclosure provides a combination of a first metabolism modulating agent, a second metabolism modulating agent and an at least third metabolism modulating agent for use in the treatment of cancer in a subject, wherein the first metabolism modulating agent is venetoclax, wherein the second metabolism modulating agent is azacitidine, wherein the first, second and at least third metabolism modulating agents are not the same compound, and wherein the first, second and at least third metabolism modulating agents are for administration to a subject in need thereof in a therapeutically effective amount. The present disclosure provides a first metabolism modulating agent for use in the treatment of cancer in a subject, the treatment comprising administering a combination comprising the first metabolism modulating agent, a second metabolism modulating agent and an at least third metabolism modulating agent, wherein the first metabolism modulating agent is venetoclax, wherein the second metabolism modulating agent is azacitidine, wherein the first, second and at least third metabolism modulating agents are not the same compound, and wherein the first, second and at least third metabolism modulating agents are for administration to a subject in need thereof in a therapeutically effective amount. The present disclosure provides a second metabolism modulating agent for use in the treatment of cancer in a subject, the treatment comprising administering a combination comprising a first metabolism modulating agent, the second metabolism modulating agent and an at least third metabolism modulating agent, wherein the first metabolism modulating agent is venetoclax, wherein the second metabolism modulating agent is azacitidine, wherein the first, second and at least third metabolism modulating agents are not the same compound, and wherein the first, second and at least third metabolism modulating agents are for administration to a subject in need thereof in a therapeutically effective amount. The present disclosure provides an at least third metabolism modulating agent for use in the treatment of cancer in a subject, the treatment comprising administering a combination comprising a first metabolism modulating agent, a second metabolism modulating agent and the at least third metabolism modulating agent, wherein the first metabolism modulating agent is venetoclax, wherein the second metabolism modulating agent is azacitidine, wherein the first, second and at least third metabolism modulating agents are not the same compound, and wherein the first, second and at least third metabolism modulating agents are for administration to a subject in need thereof in a therapeutically effective amount. The present disclosure provides a combination of a first metabolism modulating agent, a second metabolism modulating agent and an at least third metabolism modulating agent for the manufacture of a medicament for treating cancer in a subject, wherein the first metabolism modulating agent is venetoclax, wherein the second metabolism modulating agent is azacitidine, wherein the first, second and at least third metabolism modulating agents are not the same compound, and wherein the first, second and at least third metabolism modulating agents are for administration to a subject in need thereof in a therapeutically effective amount.

In yet another aspect, the present disclosure provides a method of treating AML in a subject comprising administering an effective amount of a first metabolism modulating agent, an effective amount of a second metabolism modulating agent and an effective amount of an at least third metabolism modulating agent, wherein the first metabolism modulating agent is venetoclax, wherein the second metabolism modulating agent is azacitidine, wherein the first, second and at least third metabolism modulating agents are not the same compound.

The present disclosure provides a combination of a first metabolism modulating agent, a second metabolism modulating agent and an at least third metabolism modulating agent for use in the treatment of AML in a subject, wherein the first metabolism modulating agent is venetoclax, wherein the second metabolism modulating agent is azacitidine, wherein the first, second and at least third metabolism modulating agents are not the same compound, and wherein the first, second and at least third metabolism modulating agents are for administration to a subject in need thereof in a therapeutically effective amount. The present disclosure provides a first metabolism modulating agent for use in the treatment of AML in a subject, the treatment comprising administering a combination comprising the first metabolism modulating agent, a second metabolism modulating agent and an at least third metabolism modulating agent, wherein the first metabolism modulating agent is venetoclax, wherein the second metabolism modulating agent is azacitidine, wherein the first, second and at least third metabolism modulating agents are not the same compound, and wherein the first, second and at least third metabolism modulating agents are for administration to a subject in need thereof in a therapeutically effective amount. The present disclosure provides a second metabolism modulating agent for use in the treatment of AML in a subject, the treatment comprising administering a combination comprising a first metabolism modulating agent, the second metabolism modulating agent and an at least third metabolism modulating agent, wherein the first metabolism modulating agent is venetoclax, wherein the second metabolism modulating agent is azacitidine, wherein the first, second and at least third metabolism modulating agents are not the same compound, and wherein the first, second and at least third metabolism modulating agents are for administration to a subject in need thereof in a therapeutically effective amount. The present disclosure provides an at least third metabolism modulating agent for use in the treatment of AML in a subject, the treatment comprising administering a combination comprising a first metabolism modulating agent, a second metabolism modulating agent and the at least third metabolism modulating agent, wherein the first metabolism modulating agent is venetoclax, wherein the second metabolism modulating agent is azacitidine, wherein the first, second and at least third metabolism modulating agents are not the same compound, and wherein the first, second and at least third metabolism modulating agents are for administration to a subject in need thereof in a therapeutically effective amount. The present disclosure provides a combination of a first metabolism modulating agent, a second metabolism modulating agent and an at least third metabolism modulating agent for the manufacture of a medicament for treating AML, in a subject, wherein the first metabolism modulating agent is venetoclax, wherein the second metabolism modulating agent is azacitidine, wherein the first, second and at least third metabolism modulating agents are not the same compound, and wherein the first, second and at least third metabolism modulating agents are for administration to a subject in need thereof in a therapeutically effective amount.

In yet another aspect, the present disclosure provides a method of inducing cell death in cancer stem cells comprising administering an effective amount of a first metabolism modulating agent, an effective amount of a second metabolism modulating agent and an effective amount of an at least third metabolism modulating agent, wherein the first metabolism modulating agent is venetoclax, wherein the second metabolism modulating agent is azacitidine, wherein the at least third metabolism modulating agent is a compound set forth in Table 1, and wherein the first, second and at least third metabolism modulating agents are not the same compound.

The present disclosure provides a combination of a first metabolism modulating agent, a second metabolism modulating agent and an at least third metabolism modulating agent for use in the inducement of cell death in cancer stem cells, wherein the first metabolism modulating agent is venetoclax, wherein the second metabolism modulating agent is azacitidine, wherein the at least third metabolism modulating agent is a compound set forth in Table 1, wherein the first, second and at least third metabolism modulating agents are not the same compound, and wherein the first, second and at least third metabolism modulating agents are for administration to a subject in need thereof in a therapeutically effective amount. The present disclosure provides a first metabolism modulating agent for use in the inducement of cell death in cancer stem cells, the inducement comprising administering a combination comprising the first metabolism modulating agent, a second metabolism modulating agent and an at least third metabolism modulating agent, wherein the first metabolism modulating agent is venetoclax, wherein the second metabolism modulating agent is azacitidine, wherein the at least third metabolism modulating agent is a compound set forth in Table 1, wherein the first, second and at least third metabolism modulating agents are not the same compound, and wherein the first, second and at least third metabolism modulating agents are for administration to a subject in need thereof in a therapeutically effective amount. The present disclosure provides a second metabolism modulating agent for use in the inducement of cell death in cancer stem cells, the inducement comprising administering a combination comprising a first metabolism modulating agent, the second metabolism modulating agent and an at least third metabolism modulating agent, wherein the first metabolism modulating agent is venetoclax, wherein the second metabolism modulating agent is azacitidine, wherein the at least third metabolism modulating agent is a compound set forth in Table 1, wherein the first, second and at least third metabolism modulating agents are not the same compound, and wherein the first, second and at least third metabolism modulating agents are for administration to a subject in need thereof in a therapeutically effective amount. The present disclosure provides an at least third metabolism modulating agent for use in the inducement of cell death in cancer stem cells, the inducement comprising administering a combination comprising a first metabolism modulating agent, a second metabolism modulating agent and the at least third metabolism modulating agent, wherein the first metabolism modulating agent is venetoclax, wherein the second metabolism modulating agent is azacitidine, wherein the at least third metabolism modulating agent is a compound set forth in Table 1, wherein the first, second and at least third metabolism modulating agents are not the same compound, and wherein the first, second and at least third metabolism modulating agents are for administration to a subject in need thereof in a therapeutically effective amount. The present disclosure provides a combination of a first metabolism modulating agent, a second metabolism modulating agent and an at least third metabolism modulating agent for the manufacture of a medicament for inducing cell death in cancer stem cells, wherein the first metabolism modulating agent is venetoclax, wherein the second metabolism modulating agent is azacitidine, wherein the at least third metabolism modulating agent is a compound set forth in Table 1, wherein the first, second and at least third metabolism modulating agents are not the same compound, and wherein the first, second and at least third metabolism modulating agents are for administration to a subject in need thereof in a therapeutically effective amount.

In yet another aspect, the present disclosure provides a method of treating cancer in a subject comprising administering an effective amount of a first metabolism modulating agent, an effective amount of a second metabolism modulating agent and an effective amount of an at least third metabolism modulating agent, wherein the first metabolism modulating agent is venetoclax, wherein the second metabolism modulating agent is azacitidine, wherein the at least third metabolism modulating agent is a compound set forth in Table 1, and wherein the first, second and at least third metabolism modulating agents are not the same compound.

The present disclosure provides a combination of a first metabolism modulating agent, a second metabolism modulating agent and an at least third metabolism modulating agent for use in the treatment of cancer in a subject, wherein the first metabolism modulating agent is venetoclax, wherein the second metabolism modulating agent is azacitidine, wherein the at least third metabolism modulating agent is a compound set forth in Table 1, wherein the first, second and at least third metabolism modulating agents are not the same compound, and wherein the first, second and at least third metabolism modulating agents are for administration to a subject in need thereof in a therapeutically effective amount. The present disclosure provides a first metabolism modulating agent for use in the treatment of cancer in a subject, the treatment comprising administering a combination comprising the first metabolism modulating agent, a second metabolism modulating agent and an at least third metabolism modulating agent, wherein the first metabolism modulating agent is venetoclax, wherein the second metabolism modulating agent is azacitidine, wherein the at least third metabolism modulating agent is a compound set forth in Table 1, wherein the first, second and at least third metabolism modulating agents are not the same compound, and wherein the first, second and at least third metabolism modulating agents are for administration to a subject in need thereof in a therapeutically effective amount. The present disclosure provides a second metabolism modulating agent for use in the treatment of cancer in a subject, the treatment comprising administering a combination comprising a first metabolism modulating agent, the second metabolism modulating agent and an at least third metabolism modulating agent, wherein the first metabolism modulating agent is venetoclax, wherein the second metabolism modulating agent is azacitidine, wherein the at least third metabolism modulating agent is a compound set forth in Table 1, wherein the first, second and at least third metabolism modulating agents are not the same compound, and wherein the first, second and at least third metabolism modulating agents are for administration to a subject in need thereof in a therapeutically effective amount. The present disclosure provides an at least third metabolism modulating agent for use in the treatment of cancer in a subject, the treatment comprising administering a combination comprising a first metabolism modulating agent, a second metabolism modulating agent and the at least third metabolism modulating agent, wherein the first metabolism modulating agent is venetoclax, wherein the second metabolism modulating agent is azacitidine, wherein the at least third metabolism modulating agent is a compound set forth in Table 1, wherein the first, second and at least third metabolism modulating agents are not the same compound, and wherein the first, second and at least third metabolism modulating agents are for administration to a subject in need thereof in a therapeutically effective amount. The present disclosure provides a combination of a first metabolism modulating agent, a second metabolism modulating agent and an at least third metabolism modulating agent for the manufacture of a medicament for treating cancer in a subject, wherein the first metabolism modulating agent is venetoclax, wherein the second metabolism modulating agent is azacitidine, wherein the at least third metabolism modulating agent is a compound set forth in Table 1, wherein the first, second and at least third metabolism modulating agents are not the same compound, and wherein the first, second and at least third metabolism modulating agents are for administration to a subject in need thereof in a therapeutically effective amount.

In yet another aspect, the present disclosure provides a method of treating AML in a subject comprising administering an effective amount of a first metabolism modulating agent, an effective amount of a second metabolism modulating agent and an effective amount of an at least third metabolism modulating agent, wherein the first metabolism modulating agent is venetoclax, wherein the second metabolism modulating agent is azacitidine, wherein the at least third metabolism modulating agent is a compound set forth in Table 1, and wherein the first, second and at least third metabolism modulating agents are not the same compound.

The present disclosure provides a combination of a first metabolism modulating agent, a second metabolism modulating agent and an at least third metabolism modulating agent for use in the treatment of AML in a subject, wherein the first metabolism modulating agent is venetoclax, wherein the second metabolism modulating agent is azacitidine, wherein the at least third metabolism modulating agent is a compound set forth in Table 1, wherein the first, second and at least third metabolism modulating agents are not the same compound, and wherein the first, second and at least third metabolism modulating agents are for administration to a subject in need thereof in a therapeutically effective amount. The present disclosure provides a first metabolism modulating agent for use in the treatment of AML in a subject, the treatment comprising administering a combination comprising the first metabolism modulating agent, a second metabolism modulating agent and an at least third metabolism modulating agent, wherein the first metabolism modulating agent is venetoclax, wherein the second metabolism modulating agent is azacitidine, wherein the at least third metabolism modulating agent is a compound set forth in Table 1, wherein the first, second and at least third metabolism modulating agents are not the same compound, and wherein the first, second and at least third metabolism modulating agents are for administration to a subject in need thereof in a therapeutically effective amount. The present disclosure provides a second metabolism modulating agent for use in the treatment of AML in a subject, the treatment comprising administering a combination comprising a first metabolism modulating agent, the second metabolism modulating agent and an at least third metabolism modulating agent, wherein the first metabolism modulating agent is venetoclax, wherein the second metabolism modulating agent is azacitidine, wherein the at least third metabolism modulating agent is a compound set forth in Table 1, wherein the first, second and at least third metabolism modulating agents are not the same compound, and wherein the first, second and at least third metabolism modulating agents are for administration to a subject in need thereof in a therapeutically effective amount. The present disclosure provides an at least third metabolism modulating agent for use in the treatment of AML in a subject, the treatment comprising administering a combination comprising a first metabolism modulating agent, a second metabolism modulating agent and the at least third metabolism modulating agent, wherein the first metabolism modulating agent is venetoclax, wherein the second metabolism modulating agent is azacitidine, wherein the at least third metabolism modulating agent is a compound set forth in Table 1, wherein the first, second and at least third metabolism modulating agents are not the same compound, and wherein the first, second and at least third metabolism modulating agents are for administration to a subject in need thereof in a therapeutically effective amount. The present disclosure provides a combination of a first metabolism modulating agent, a second metabolism modulating agent and an at least third metabolism modulating agent for the manufacture of a medicament for treating AML in a subject, wherein the first metabolism modulating agent is venetoclax, wherein the second metabolism modulating agent is azacitidine, wherein the at least third metabolism modulating agent is a compound set forth in Table 1, wherein the first, second and at least third metabolism modulating agents are not the same compound, and wherein the first, second and at least third metabolism modulating agents are for administration to a subject in need thereof in a therapeutically effective amount.

In yet another aspect, the present disclosure provides a method of inducing cell death in cancer stem cells comprising administering an effective amount of a first metabolism modulating agent, an effective amount of a second metabolism modulating agent and an effective amount of an at least third metabolism modulating agent, wherein the first metabolism modulating agent is a BCL-2 inhibitor, and wherein the first, second and at least third metabolism modulating agents are not the same compound.

The present disclosure provides a combination of a first metabolism modulating agent, a second metabolism modulating agent and an at least third metabolism modulating agent for use in the inducement of cell death in cancer stem cells, wherein the first metabolism modulating agent is a BCL-2 inhibitor, and wherein the first, second and at least third metabolism modulating agents are not the same compound, and wherein the first, second and at least third metabolism modulating agents are for administration to a subject in need thereof in a therapeutically effective amount. The present disclosure provides a first metabolism modulating agent for use in the inducement of cell death in cancer stem cells, the inducement comprising administering a combination comprising the first metabolism modulating agent, a second metabolism modulating agent and an at least third metabolism modulating agent, wherein the first metabolism modulating agent is a BCL-2 inhibitor, and wherein the first, second and at least third metabolism modulating agents are not the same compound, and wherein the first, second and at least third metabolism modulating agents are for administration to a subject in need thereof in a therapeutically effective amount. The present disclosure provides a second metabolism modulating agent for use in the inducement of cell death in cancer stem cells, the inducement comprising administering a combination comprising a first metabolism modulating agent, the second metabolism modulating agent and an at least third metabolism modulating agent, wherein the first metabolism modulating agent is a BCL-2 inhibitor, and wherein the first, second and at least third metabolism modulating agents are not the same compound, and wherein the first, second and at least third metabolism modulating agents are for administration to a subject in need thereof in a therapeutically effective amount. The present disclosure provides an at least third metabolism modulating agent for use in the inducement of cell death in cancer stem cells, the inducement comprising administering a combination comprising a first metabolism modulating agent, a second metabolism modulating agent and the at least third metabolism modulating agent, wherein the first metabolism modulating agent is a BCL-2 inhibitor, and wherein the first, second and at least third metabolism modulating agents are not the same compound, and wherein the first, second and at least third metabolism modulating agents are for administration to a subject in need thereof in a therapeutically effective amount. The present disclosure provides a combination of a first metabolism modulating agent, a second metabolism modulating agent and an at least third metabolism modulating agent for the manufacture of a medicament for inducing cell death in cancer stem cells, wherein the first metabolism modulating agent is a BCL-2 inhibitor, and wherein the first, second and at least third metabolism modulating agents are not the same compound, and wherein the first, second and at least third metabolism modulating agents are for administration to a subject in need thereof in a therapeutically effective amount.

In yet another aspect, the present disclosure provides a method of treating cancer in a subject comprising administering an effective amount of a first metabolism modulating agent, an effective amount of a second metabolism modulating agent and an effective amount of an at least third metabolism modulating agent, wherein the first metabolism modulating agent is a BCL-2 inhibitor, and wherein the first, second and at least third metabolism modulating agents are not the same compound.

The present disclosure provides a combination of a first metabolism modulating agent, a second metabolism modulating agent and an at least third metabolism modulating agent for use in the treatment of cancer in a subject, wherein the first metabolism modulating agent is a BCL-2 inhibitor, and wherein the first, second and at least third metabolism modulating agents are not the same compound, and wherein the first, second and at least third metabolism modulating agents are for administration to a subject in need thereof in a therapeutically effective amount. The present disclosure provides a first metabolism modulating agent for use in the treatment of cancer in a subject, the treatment comprising administering a combination comprising the first metabolism modulating agent, a second metabolism modulating agent and an at least third metabolism modulating agent, wherein the first metabolism modulating agent is a BCL-2 inhibitor, and wherein the first, second and at least third metabolism modulating agents are not the same compound, and wherein the first, second and at least third metabolism modulating agents are for administration to a subject in need thereof in a therapeutically effective amount. The present disclosure provides a second metabolism modulating agent for use in the treatment of cancer in a subject, the treatment comprising administering a combination comprising a first metabolism modulating agent, the second metabolism modulating agent and an at least third metabolism modulating agent, wherein the first metabolism modulating agent is a BCL-2 inhibitor, and wherein the first, second and at least third metabolism modulating agents are not the same compound, and wherein the first, second and at least third metabolism modulating agents are for administration to a subject in need thereof in a therapeutically effective amount. The present disclosure provides an at least third metabolism modulating agent for use in the treatment of cancer in a subject, the treatment comprising administering a combination comprising a first metabolism modulating agent, a second metabolism modulating agent and the at least third metabolism modulating agent, wherein the first metabolism modulating agent is a BCL-2 inhibitor, and wherein the first, second and at least third metabolism modulating agents are not the same compound, and wherein the first, second and at least third metabolism modulating agents are for administration to a subject in need thereof in a therapeutically effective amount. The present disclosure provides a combination of a first metabolism modulating agent, a second metabolism modulating agent and an at least third metabolism modulating agent for the manufacture of a medicament for treating cancer in a subject, wherein the first metabolism modulating agent is a BCL-2 inhibitor, and wherein the first, second and at least third metabolism modulating agents are not the same compound, and wherein the first, second and at least third metabolism modulating agents are for administration to a subject in need thereof in a therapeutically effective amount.

In yet another aspect, the present disclosure provides a method of treating AML in a subject comprising administering an effective amount of a first metabolism modulating agent, an effective amount of a second metabolism modulating agent and an effective amount of an at least third metabolism modulating agent, wherein the first metabolism modulating agent is a BCL-2 inhibitor, and wherein the first, second and at least third metabolism modulating agents are not the same compound.

The present disclosure provides a combination of a first metabolism modulating agent, a second metabolism modulating agent and an at least third metabolism modulating agent for use in the treatment of AML in a subject, wherein the first metabolism modulating agent is a BCL-2 inhibitor, and wherein the first, second and at least third metabolism modulating agents are not the same compound, and wherein the first, second and at least third metabolism modulating agents are for administration to a subject in need thereof in a therapeutically effective amount. The present disclosure provides a first metabolism modulating agent for use in the treatment of AML in a subject, the treatment comprising administering a combination comprising the first metabolism modulating agent, a second metabolism modulating agent and an at least third metabolism modulating agent, wherein the first metabolism modulating agent is a BCL-2 inhibitor, and wherein the first, second and at least third metabolism modulating agents are not the same compound, and wherein the first, second and at least third metabolism modulating agents are for administration to a subject in need thereof in a therapeutically effective amount. The present disclosure provides a second metabolism modulating agent for use in the treatment of AML in a subject, the treatment comprising administering a combination comprising a first metabolism modulating agent, the second metabolism modulating agent and an at least third metabolism modulating agent, wherein the first metabolism modulating agent is a BCL-2 inhibitor, and wherein the first, second and at least third metabolism modulating agents are not the same compound, and wherein the first, second and at least third metabolism modulating agents are for administration to a subject in need thereof in a therapeutically effective amount. The present disclosure provides an at least third metabolism modulating agent for use in the treatment of AML in a subject, the treatment comprising administering a combination comprising a first metabolism modulating agent, a second metabolism modulating agent and the at least third metabolism modulating agent, wherein the first metabolism modulating agent is a BCL-2 inhibitor, and wherein the first, second and at least third metabolism modulating agents are not the same compound, and wherein the first, second and at least third metabolism modulating agents are for administration to a subject in need thereof in a therapeutically effective amount. The present disclosure provides a combination of a first metabolism modulating agent, a second metabolism modulating agent and an at least third metabolism modulating agent for the manufacture of a medicament for treating AML in a subject, wherein the first metabolism modulating agent is a BCL-2 inhibitor, and wherein the first, second and at least third metabolism modulating agents are not the same compound, and wherein the first, second and at least third metabolism modulating agents are for administration to a subject in need thereof in a therapeutically effective amount.

In yet another aspect, the present disclosure provides a method of inducing cell death in cancer stem cells comprising administering an effective amount of a first metabolism modulating agent, an effective amount of a second metabolism modulating agent and an effective amount of an at least third metabolism modulating agent, wherein the first metabolism modulating agent is a BCL-2 inhibitor, wherein the second metabolism modulating agent is a hypomethylating agent, wherein the at least third metabolism modulating agent is a compound set forth in Table 1, and wherein the first, second and at least third metabolism modulating agents are not the same compound.

The present disclosure provides a combination of a first metabolism modulating agent, a second metabolism modulating agent and an at least third metabolism modulating agent for use in the inducement of cell death in cancer stem cells, wherein the first metabolism modulating agent is a BCL-2 inhibitor, wherein the second metabolism modulating agent is a hypomethylating agent, wherein the at least third metabolism modulating agent is a compound set forth in Table 1, and wherein the first, second and at least third metabolism modulating agents are not the same compound, and wherein the first, second and at least third metabolism modulating agents are for administration to a subject in need thereof in a therapeutically effective amount. The present disclosure provides a first metabolism modulating agent for use in the inducement of cell death in cancer stem cells, the inducement comprising administering a combination comprising the first metabolism modulating agent, a second metabolism modulating agent and an at least third metabolism modulating agent, wherein the first metabolism modulating agent is a BCL-2 inhibitor, wherein the second metabolism modulating agent is a hypomethylating agent, wherein the at least third metabolism modulating agent is a compound set forth in Table 1, and wherein the first, second and at least third metabolism modulating agents are not the same compound, and wherein the first, second and at least third metabolism modulating agents are for administration to a subject in need thereof in a therapeutically effective amount. The present disclosure provides a second metabolism modulating agent for use in the inducement of cell death in cancer stem cells, the inducement comprising administering a combination comprising a first metabolism modulating agent, the second metabolism modulating agent and an at least third metabolism modulating agent, wherein the first metabolism modulating agent is a BCL-2 inhibitor, wherein the second metabolism modulating agent is a hypomethylating agent, wherein the at least third metabolism modulating agent is a compound set forth in Table 1, and wherein the first, second and at least third metabolism modulating agents are not the same compound, and wherein the first, second and at least third metabolism modulating agents are for administration to a subject in need thereof in a therapeutically effective amount. The present disclosure provides an at least third metabolism modulating agent for use in the inducement of cell death in cancer stem cells, the inducement comprising administering a combination comprising a first metabolism modulating agent, a second metabolism modulating agent and the at least third metabolism modulating agent, wherein the first metabolism modulating agent is a BCL-2 inhibitor, wherein the second metabolism modulating agent is a hypomethylating agent, wherein the at least third metabolism modulating agent is a compound set forth in Table 1, and wherein the first, second and at least third metabolism modulating agents are not the same compound, and wherein the first, second and at least third metabolism modulating agents are for administration to a subject in need thereof in a therapeutically effective amount. The present disclosure provides a combination of a first metabolism modulating agent, a second metabolism modulating agent and an at least third metabolism modulating agent for the manufacture of a medicament for inducing cell death in cancer stem cells, wherein the first metabolism modulating agent is a BCL-2 inhibitor, wherein the second metabolism modulating agent is a hypomethylating agent, wherein the at least third metabolism modulating agent is a compound set forth in Table 1, and wherein the first, second and at least third metabolism modulating agents are not the same compound, and wherein the first, second and at least third metabolism modulating agents are for administration to a subject in need thereof in a therapeutically effective amount.

In yet another aspect, the present disclosure provides a method of treating cancer in a subject comprising administering an effective amount of a first metabolism modulating agent, an effective amount of a second metabolism modulating agent and an effective amount of an at least third metabolism modulating agent, wherein the first metabolism modulating agent is a BCL-2 inhibitor, wherein the second metabolism modulating agent is a hypomethylating agent, wherein the at least third metabolism modulating agent is a compound set forth in Table 1, and wherein the first, second and at least third metabolism modulating agents are not the same compound.

The present disclosure provides a combination of a first metabolism modulating agent, a second metabolism modulating agent and an at least third metabolism modulating agent for use in the treatment of cancer in a subject, wherein the first metabolism modulating agent is a BCL-2 inhibitor, wherein the second metabolism modulating agent is a hypomethylating agent, wherein the at least third metabolism modulating agent is a compound set forth in Table 1, and wherein the first, second and at least third metabolism modulating agents are not the same compound, and wherein the first, second and at least third metabolism modulating agents are for administration to a subject in need thereof in a therapeutically effective amount. The present disclosure provides a first metabolism modulating agent for use in the treatment of cancer in a subject, the treatment comprising administering a combination comprising the first metabolism modulating agent, a second metabolism modulating agent and an at least third metabolism modulating agent, wherein the first metabolism modulating agent is a BCL-2 inhibitor, wherein the second metabolism modulating agent is a hypomethylating agent, wherein the at least third metabolism modulating agent is a compound set forth in Table 1, and wherein the first, second and at least third metabolism modulating agents are not the same compound, and wherein the first, second and at least third metabolism modulating agents are for administration to a subject in need thereof in a therapeutically effective amount. The present disclosure provides a second metabolism modulating agent for use in the treatment of cancer in a subject, the treatment comprising administering a combination comprising a first metabolism modulating agent, the second metabolism modulating agent and an at least third metabolism modulating agent, wherein the first metabolism modulating agent is a BCL-2 inhibitor, wherein the second metabolism modulating agent is a hypomethylating agent, wherein the at least third metabolism modulating agent is a compound set forth in Table 1, and wherein the first, second and at least third metabolism modulating agents are not the same compound, and wherein the first, second and at least third metabolism modulating agents are for administration to a subject in need thereof in a therapeutically effective amount. The present disclosure provides an at least third metabolism modulating agent for use in the treatment of cancer in a subject, the treatment comprising administering a combination comprising a first metabolism modulating agent, a second metabolism modulating agent and the at least third metabolism modulating agent, wherein the first metabolism modulating agent is a BCL-2 inhibitor, wherein the second metabolism modulating agent is a hypomethylating agent, wherein the at least third metabolism modulating agent is a compound set forth in Table 1, and wherein the first, second and at least third metabolism modulating agents are not the same compound, and wherein the first, second and at least third metabolism modulating agents are for administration to a subject in need thereof in a therapeutically effective amount. The present disclosure provides a combination of a first metabolism modulating agent, a second metabolism modulating agent and an at least third metabolism modulating agent for the manufacture of a medicament for treating cancer in a subject, wherein the first metabolism modulating agent is a BCL-2 inhibitor, wherein the second metabolism modulating agent is a hypomethylating agent, wherein the at least third metabolism modulating agent is a compound set forth in Table 1, and wherein the first, second and at least third metabolism modulating agents are not the same compound, and wherein the first, second and at least third metabolism modulating agents are for administration to a subject in need thereof in a therapeutically effective amount.

In yet another aspect, the present disclosure provides a method of treating AML in a subject comprising administering an effective amount of a first metabolism modulating agent, an effective amount of a second metabolism modulating agent and an effective amount of an at least third metabolism modulating agent, wherein the first metabolism modulating agent is a BCL-2 inhibitor, wherein the second metabolism modulating agent is a hypomethylating agent, wherein the at least third metabolism modulating agent is a compound set forth in Table 1, and wherein the first, second and at least third metabolism modulating agents are not the same compound.

The present disclosure provides a combination of a first metabolism modulating agent, a second metabolism modulating agent and an at least third metabolism modulating agent for use in the treatment of AML in a subject, wherein the first metabolism modulating agent is a BCL-2 inhibitor, wherein the second metabolism modulating agent is a hypomethylating agent, wherein the at least third metabolism modulating agent is a compound set forth in Table 1, and wherein the first, second and at least third metabolism modulating agents are not the same compound, and wherein the first, second and at least third metabolism modulating agents are for administration to a subject in need thereof in a therapeutically effective amount. The present disclosure provides a first metabolism modulating agent for use in the treatment of AML in a subject, the treatment comprising administering a combination comprising the first metabolism modulating agent, a second metabolism modulating agent and an at least third metabolism modulating agent, wherein the first metabolism modulating agent is a BCL-2 inhibitor, wherein the second metabolism modulating agent is a hypomethylating agent, wherein the at least third metabolism modulating agent is a compound set forth in Table 1, and wherein the first, second and at least third metabolism modulating agents are not the same compound, and wherein the first, second and at least third metabolism modulating agents are for administration to a subject in need thereof in a therapeutically effective amount. The present disclosure provides a second metabolism modulating agent for use in the treatment of AML in a subject, the treatment comprising administering a combination comprising a first metabolism modulating agent, the second metabolism modulating agent and an at least third metabolism modulating agent, wherein the first metabolism modulating agent is a BCL-2 inhibitor, wherein the second metabolism modulating agent is a hypomethylating agent, wherein the at least third metabolism modulating agent is a compound set forth in Table 1, and wherein the first, second and at least third metabolism modulating agents are not the same compound, and wherein the first, second and at least third metabolism modulating agents are for administration to a subject in need thereof in a therapeutically effective amount. The present disclosure provides an at least third metabolism modulating agent for use in the treatment of AML in a subject, the treatment comprising administering a combination comprising a first metabolism modulating agent, a second metabolism modulating agent and the at least third metabolism modulating agent, wherein the first metabolism modulating agent is a BCL-2 inhibitor, wherein the second metabolism modulating agent is a hypomethylating agent, wherein the at least third metabolism modulating agent is a compound set forth in Table 1, and wherein the first, second and at least third metabolism modulating agents are not the same compound, and wherein the first, second and at least third metabolism modulating agents are for administration to a subject in need thereof in a therapeutically effective amount. The present disclosure provides a combination of a first metabolism modulating agent, a second metabolism modulating agent and an at least third metabolism modulating agent for the manufacture of a medicament for treating AML in a subject, wherein the first metabolism modulating agent is a BCL-2 inhibitor, wherein the second metabolism modulating agent is a hypomethylating agent, wherein the at least third metabolism modulating agent is a compound set forth in Table 1, and wherein the first, second and at least third metabolism modulating agents are not the same compound, and wherein the first, second and at least third metabolism modulating agents are for administration to a subject in need thereof in a therapeutically effective amount.

In one aspect, the present disclosure provides a method of inducing cell death in cancer stem cells comprising administering an effective amount of at least one agent that modulates a cellular pathway, wherein the cellular pathway is a pathway set forth in Table 2. In one aspect, the present disclosure provides a method of treating cancer in a subject comprising administering an effective amount of at least one agent that modulates a cellular pathway, wherein the cellular pathway is a pathway set forth in Table 2. In one aspect, the present disclosure provides a method of treating AML in a subject comprising administering an effective amount of at least one agent that modulates a cellular pathway, wherein the cellular pathway is a pathway set forth in Table 2.

TABLE 2

Cellular Pathways

| Pathways | Pathways |
| --- | --- |
| Lysosome pathways | amino acid uptake pathways |
| nuclear import pathways | fatty acid oxidation pathways |
| PI3 Kinase and Akt signaling pathways | myc signaling pathways |
| NF-kB signaling pathways | Proteasome pathways |
| Autophagy pathways | nicotinamide metabolism (NAMPT enzyme, other regulators) pathways |
| Mitophagy pathways | amino acid catabolism pathways |
| FIS1 signaling pathways | AMPK signaling pathways |
| CD38 pathways | protein synthesis pathways |
| nicotinamide metabolism pathways | Nampt pathways |
| DNA methylation | BCL-2 activity |

In one aspect, the present disclosure provides at least one agent that modulates a cellular pathway for use in the inducement of cell death in cancer stem cells, wherein the cellular pathway is a pathway set forth in Table 2, wherein the at least one agent is for administration to a subject in need thereof in at least one therapeutically effective amount. In one aspect, the present disclosure provides at least one agent that modulates a cellular pathway for use in the treatment of cancer in a subject, wherein the cellular pathway is a pathway set forth in Table 2, wherein the at least one agent is for administration to a subject in need thereof in at least one therapeutically effective amount. In one aspect, the present disclosure provides at least one agent that modulates a cellular pathway for use in the treatment of AML in a subject, wherein the cellular pathway is a pathway set forth in Table 2, wherein the at least one agent is for administration to a subject in need thereof in at least one therapeutically effective amount.

In one aspect, the present disclosure provides at least one agent that modulates a cellular pathway for the manufacture of a medicament for inducing cell death in cancer stem cells, wherein the cellular pathway is a pathway set forth in Table 2, wherein the at least one agent is for administration to a subject in need thereof in at least one therapeutically effective amount. In one aspect, the present disclosure provides at least one agent that modulates a cellular pathway for use in the manufacture of a medicament for treating cancer in a subject, wherein the cellular pathway is a pathway set forth in Table 2, wherein the at least one agent is for administration to a subject in need thereof in at least one therapeutically effective amount. In one aspect, the present disclosure provides at least one agent that modulates a cellular pathway for use in the manufacture of a medicament for treating AML in a subject, wherein the cellular pathway is a pathway set forth in Table 2, wherein the at least one agent is for administration to a subject in need thereof in at least one therapeutically effective amount.

In some aspects, the present disclosure provides a method of inducing cell death in cancer stem cells comprising administering an effective amount of at least one agent that modulates at least one fatty acid oxidation pathway. In some aspects, an at least one agent that modulates at least one fatty acid oxidation pathway can be etomoxir. In some aspects, an at least one agent that modulates at least one fatty acid oxidation pathway can be an inhibitor of carnitine palmitoyltransferase-1 (CPT-1). In some aspects, an inhibitor of CPT-1 can comprise etomoxir.

In some aspects, the present disclosure provides a method of treating cancer in a subject comprising administering an effective amount of at least one agent that modulates at least one fatty acid oxidation pathway. In some aspects, an at least one agent that modulates at least one fatty acid oxidation pathway can be etomoxir. In some aspects, an at least one agent that modulates at least one fatty acid oxidation pathway can be an inhibitor of carnitine palmitoyltransferase-1 (CPT-1). In some aspects, an inhibitor of CPT-1 can comprise etomoxir.

In some aspects, the present disclosure provides a method of treating AML, in a subject comprising administering an effective amount of at least one agent that modulates at least one fatty acid oxidation pathway. In some aspects, an at least one agent that modulates at least one fatty acid oxidation pathway can be etomoxir. In some aspects, an at least one agent that modulates at least one fatty acid oxidation pathway can be an inhibitor of carnitine palmitoyltransferase-1 (CPT-1). In some aspects, an inhibitor of CPT-1 can comprise etomoxir.

In one aspect, the present disclosure provides at least one agent that modulates at least one fatty acid oxidation pathway for use in the inducement of cell death in cancer stem cells, wherein the at least one agent is for administration to a subject in need thereof in at least one therapeutically effective amount. In one aspect, the present disclosure provides at least one agent that modulates at least one fatty acid oxidation pathway for use in the treatment of cancer in a subject, wherein the at least one agent is for administration to a subject in need thereof in at least one therapeutically effective amount. In one aspect, the present disclosure provides at least one agent that modulates at least one fatty acid oxidation pathway for use in the treatment of AML in a subject, wherein the at least one agent is for administration to a subject in need thereof in at least one therapeutically effective amount. In some aspects, an at least one agent that modulates at least one fatty acid oxidation pathway can be etomoxir. In some aspects, an at least one agent that modulates at least one fatty acid oxidation pathway can be an inhibitor of carnitine palmitoyltransferase-1 (CPT-1). In some aspects, an inhibitor of CPT-1 can comprise etomoxir.

In one aspect, the present disclosure provides at least one agent that modulates at least one fatty acid oxidation pathway for the manufacture of a medicament for inducing cell death in cancer stem cells, wherein the at least one agent is for administration to a subject in need thereof in at least one therapeutically effective amount. In one aspect, the present disclosure provides at least one agent that modulates at least one fatty acid oxidation pathway for use in the manufacture of a medicament for treating cancer in a subject, wherein the at least one agent is for administration to a subject in need thereof in at least one therapeutically effective amount. In one aspect, the present disclosure provides at least one agent that modulates at least one fatty acid oxidation pathway for use in the manufacture of a medicament for treating AML in a subject, wherein the at least one agent is for administration to a subject in need thereof in at least one therapeutically effective amount. In some aspects, an at least one agent that modulates at least one fatty acid oxidation pathway can be etomoxir. In some aspects, an at least one agent that modulates at least one fatty acid oxidation pathway can be an inhibitor of carnitine palmitoyltransferase-1 (CPT-1). In some aspects, an inhibitor of CPT-1 can comprise etomoxir.

In another aspect, the present disclosure provides a method of inducing cell death in cancer stem cells comprising administering an effective amount of venetoclax and an effective amount of at least one agent that modulates a cellular pathway, wherein the cellular pathway is a pathway set forth in Table 2.

In another aspect, the present disclosure provides a combination comprising venetoclax and at least one agent that modulates a cellular pathway for use in the inducement of cell death in cancer stem cells, wherein the cellular pathway is a pathway set forth in Table 2, and wherein venetoclax and the at least one agent are for administration to a subject in need thereof in at least one therapeutically effective amount. In another aspect, the present disclosure provides venetoclax for use in the inducement of cell death in cancer stem cells, the inducement comprising administering a combination comprising the venetoclax and at least one agent that modulates a cellular pathway, wherein the cellular pathway is a pathway set forth in Table 2, and wherein the venetoclax and the at least one agent are for administration to a subject in need thereof in at least one therapeutically effective amount. In another aspect, the present disclosure provides at least one agent that modulates a cellular pathway for use in the inducement of cell death in cancer stem cells, the inducement comprising administering a combination comprising venetoclax and the least one agent that modulates a cellular pathway, wherein the cellular pathway is a pathway set forth in Table 2, and wherein the venetoclax and the at least one agent are for administration to a subject in need thereof in at least one therapeutically effective amount. The present disclosure provides a combination comprising venetoclax and at least one agent that modulates a cellular pathway for the manufacture of a medicament for inducing cell death in cancer stem cells, wherein the cellular pathway is a pathway set forth in Table 2, and wherein venetoclax and the at least one agent are for administration to a subject in need thereof in at least one therapeutically effective amount.

In another aspect, the present disclosure provides a method of treating cancer in a subject comprising administering an effective amount of venetoclax and an effective amount of at least one agent that modulates a cellular pathway, wherein the cellular pathway is a pathway set forth in Table 2.

In another aspect, the present disclosure provides a combination comprising venetoclax and at least one agent that modulates a cellular pathway for use in the treatment of cancer in a subject, wherein the cellular pathway is a pathway set forth in Table 2, and wherein venetoclax and the at least one agent are for administration to a subject in need thereof in at least one therapeutically effective amount. In another aspect, the present disclosure provides venetoclax for use in the treatment of cancer in a subject, the treatment comprising administering a combination comprising venetoclax and at least one agent that modulates a cellular pathway, wherein the cellular pathway is a pathway set forth in Table 2, and wherein the venetoclax and the at least one agent are for administration to a subject in need thereof in at least one therapeutically effective amount. In another aspect, the present disclosure provides at least one agent that modulates a cellular pathway for use in the treatment of cancer in a subject, the treatment comprising administering a combination comprising venetoclax and the least one agent that modulates a cellular pathway, wherein the cellular pathway is a pathway set forth in Table 2, and wherein the venetoclax and the at least one agent are for administration to a subject in need thereof in at least one therapeutically effective amount. The present disclosure provides a combination comprising venetoclax and at least one agent that modulates a cellular pathway for the manufacture of a medicament for treating cancer in a subject, wherein the cellular pathway is a pathway set forth in Table 2, and wherein venetoclax and the at least one agent are for administration to a subject in need thereof in at least one therapeutically effective amount.

In another aspect, the present disclosure provides a method of treating AML in a subject comprising administering an effective amount of venetoclax and an effective amount of at least one agent that modulates a cellular pathway, wherein the cellular pathway is a pathway set forth in Table 2.

In another aspect, the present disclosure provides a combination comprising venetoclax and at least one agent that modulates a cellular pathway for use in the treatment of AML in a subject, wherein the cellular pathway is a pathway set forth in Table 2, and wherein venetoclax and the at least one agent are for administration to a subject in need thereof in at least one therapeutically effective amount. In another aspect, the present disclosure provides venetoclax for use in the treatment of AML in a subject, the treatment comprising administering a combination comprising venetoclax and at least one agent that modulates a cellular pathway, wherein the cellular pathway is a pathway set forth in Table 2, and wherein the venetoclax and the at least one agent are for administration to a subject in need thereof in at least one therapeutically effective amount. In another aspect, the present disclosure provides at least one agent that modulates a cellular pathway for use in the treatment of AML in a subject, the treatment comprising administering a combination comprising venetoclax and the least one agent that modulates a cellular pathway, wherein the cellular pathway is a pathway set forth in Table 2, and wherein the venetoclax and the at least one agent are for administration to a subject in need thereof in at least one therapeutically effective amount. The present disclosure provides a combination comprising venetoclax and at least one agent that modulates a cellular pathway for the manufacture of a medicament for treating AML in a subject, wherein the cellular pathway is a pathway set forth in Table 2, and wherein venetoclax and the at least one agent are for administration to a subject in need thereof in at least one therapeutically effective amount.

In another aspect, the present disclosure provides a method of inducing cell death in cancer stem cells comprising administering an effective amount of azacitidine and an effective amount of at least one agent that modulates a cellular pathway, wherein the cellular pathway is a pathway set forth in Table 2.

In another aspect, the present disclosure provides a combination comprising azacitidine and at least one agent that modulates a cellular pathway for use in the inducement of cell death in cancer stem cells, wherein the cellular pathway is a pathway set forth in Table 2, and wherein azacitidine and the at least one agent are for administration to a subject in need thereof in at least one therapeutically effective amount. In another aspect, the present disclosure provides azacitidine for use in the inducement of cell death in cancer stem cells, the inducement comprising administering a combination comprising the azacitidine and at least one agent that modulates a cellular pathway, wherein the cellular pathway is a pathway set forth in Table 2, and wherein the azacitidine and the at least one agent are for administration to a subject in need thereof in at least one therapeutically effective amount. In another aspect, the present disclosure provides at least one agent that modulates a cellular pathway for use in the inducement of cell death in cancer stem cells, the inducement comprising administering a combination comprising azacitidine and the least one agent that modulates a cellular pathway, wherein the cellular pathway is a pathway set forth in Table 2, and wherein the azacitidine and the at least one agent are for administration to a subject in need thereof in at least one therapeutically effective amount. The present disclosure provides a combination comprising azacitidine and at least one agent that modulates a cellular pathway for the manufacture of a medicament for inducing cell death in cancer stem cells, wherein the cellular pathway is a pathway set forth in Table 2, and wherein azacitidine and the at least one agent are for administration to a subject in need thereof in at least one therapeutically effective amount.

In another aspect, the present disclosure provides a method of treating cancer in a subject comprising administering an effective amount of azacitidine and an effective amount of at least one agent that modulates a cellular pathway, wherein the cellular pathway is a pathway set forth in Table 2.

In another aspect, the present disclosure provides a combination comprising azacitidine and at least one agent that modulates a cellular pathway for use in the treatment of cancer in a subject, wherein the cellular pathway is a pathway set forth in Table 2, and wherein azacitidine and the at least one agent are for administration to a subject in need thereof in at least one therapeutically effective amount. In another aspect, the present disclosure provides azacitidine for use in the treatment of cancer in a subject, the treatment comprising administering a combination comprising azacitidine and at least one agent that modulates a cellular pathway, wherein the cellular pathway is a pathway set forth in Table 2, and wherein the azacitidine and the at least one agent are for administration to a subject in need thereof in at least one therapeutically effective amount. In another aspect, the present disclosure provides at least one agent that modulates a cellular pathway for use in the treatment of cancer in a subject, the treatment comprising administering a combination comprising azacitidine and the least one agent that modulates a cellular pathway, wherein the cellular pathway is a pathway set forth in Table 2, and wherein the azacitidine and the at least one agent are for administration to a subject in need thereof in at least one therapeutically effective amount. The present disclosure provides a combination comprising azacitidine and at least one agent that modulates a cellular pathway for the manufacture of a medicament for treating cancer in a subject, wherein the cellular pathway is a pathway set forth in Table 2, and wherein azacitidine and the at least one agent are for administration to a subject in need thereof in at least one therapeutically effective amount.

In another aspect, the present disclosure provides a method of treating AML in a subject comprising administering an effective amount of azacitidine and an effective amount of at least one agent that modulates a cellular pathway, wherein the cellular pathway is a pathway set forth in Table 2.

In another aspect, the present disclosure provides a combination comprising azacitidine and at least one agent that modulates a cellular pathway for use in the treatment of AML in a subject, wherein the cellular pathway is a pathway set forth in Table 2, and wherein azacitidine and the at least one agent are for administration to a subject in need thereof in at least one therapeutically effective amount. In another aspect, the present disclosure provides azacitidine for use in the treatment of AML in a subject, the treatment comprising administering a combination comprising azacitidine and at least one agent that modulates a cellular pathway, wherein the cellular pathway is a pathway set forth in Table 2, and wherein the azacitidine and the at least one agent are for administration to a subject in need thereof in at least one therapeutically effective amount. In another aspect, the present disclosure provides at least one agent that modulates a cellular pathway for use in the treatment of AML in a subject, the treatment comprising administering a combination comprising azacitidine and the least one agent that modulates a cellular pathway, wherein the cellular pathway is a pathway set forth in Table 2, and wherein the azacitidine and the at least one agent are for administration to a subject in need thereof in at least one therapeutically effective amount. The present disclosure provides a combination comprising azacitidine and at least one agent that modulates a cellular pathway for the manufacture of a medicament for treating AML, in a subject, wherein the cellular pathway is a pathway set forth in Table 2, and wherein azacitidine and the at least one agent are for administration to a subject in need thereof in at least one therapeutically effective amount.

In yet another aspect, the present disclosure provides a method of inducing cell death in cancer stem cells comprising administering an effective amount of venetoclax, an effective amount of azacitidine, and at least one agent that modulates a cellular pathway, wherein the cellular pathway is a pathway set forth in Table 2.

The present disclosure provides a combination comprising venetoclax, azacitidine and at least one agent that modulates a cellular pathway for use in the inducement of cell death in cancer stem cells, wherein the cellular pathway is a pathway set forth in Table 2, wherein the venetoclax, the azacitidine and the at least one agent that modulates a cellular pathway is for administration to a subject in need thereof in at least one therapeutically effective amount. The present disclosure provides venetoclax for use in the inducement of cell death in cancer stem cells, the inducement comprising administering a combination comprising venetoclax, azacitidine and at least one agent that modulates a cellular pathway, wherein the cellular pathway is a pathway set forth in Table 2, wherein the venetoclax, the azacitidine and the at least one agent that modulates a cellular pathway is for administration to a subject in need thereof in at least one therapeutically effective amount. The present disclosure provides azacitidine for use in the inducement of cell death in cancer stem cells, the inducement comprising administering a combination comprising venetoclax, azacitidine and at least one agent that modulates a cellular pathway, wherein the cellular pathway is a pathway set forth in Table 2, wherein the venetoclax, the azacitidine and the at least one agent that modulates a cellular pathway is for administration to a subject in need thereof in at least one therapeutically effective amount. The present disclosure provides at least one agent that modulates a cellular pathway for use in the inducement of cell death in cancer stem cells, the inducement comprising administering a combination comprising venetoclax, azacitidine and the least one agent that modulates a cellular pathway, wherein the cellular pathway is a pathway set forth in Table 2, wherein the venetoclax, the azacitidine and the at least one agent that modulates a cellular pathway is for administration to a subject in need thereof in at least one therapeutically effective amount. The present disclosure provides a combination comprising venetoclax, azacitidine and at least one agent that modulates a cellular pathway for the manufacture of a medicament for inducing cell death in cancer stem cells, wherein the cellular pathway is a pathway set forth in Table 2, wherein the venetoclax, the azacitidine and the at least one agent that modulates a cellular pathway is for administration to a subject in need thereof in at least one therapeutically effective amount.

In yet another aspect, the present disclosure provides a method of treating cancer in a subject comprising administering an effective amount of venetoclax, an effective amount of azacitidine, and at least one agent that modulates a cellular pathway, wherein the cellular pathway is a pathway set forth in Table 2.

The present disclosure provides a combination comprising venetoclax, azacitidine and at least one agent that modulates a cellular pathway for use in the treatment of cancer in a subject, wherein the cellular pathway is a pathway set forth in Table 2, wherein the venetoclax, the azacitidine and the at least one agent that modulates a cellular pathway is for administration to a subject in need thereof in at least one therapeutically effective amount. The present disclosure provides venetoclax for use in the treatment of cancer in a subject, the treatment comprising administering a combination comprising venetoclax, azacitidine and at least one agent that modulates a cellular pathway, wherein the cellular pathway is a pathway set forth in Table 2, wherein the venetoclax, the azacitidine and the at least one agent that modulates a cellular pathway is for administration to a subject in need thereof in at least one therapeutically effective amount. The present disclosure provides azacitidine for use in the treatment of cancer in a subject, the treatment comprising administering a combination comprising venetoclax, azacitidine and at least one agent that modulates a cellular pathway, wherein the cellular pathway is a pathway set forth in Table 2, wherein the venetoclax, the azacitidine and the at least one agent that modulates a cellular pathway is for administration to a subject in need thereof in at least one therapeutically effective amount. The present disclosure provides at least one agent that modulates a cellular pathway for use in the treatment of cancer in a subject, the treatment comprising administering a combination comprising venetoclax, azacitidine and the least one agent that modulates a cellular pathway, wherein the cellular pathway is a pathway set forth in Table 2, wherein the venetoclax, the azacitidine and the at least one agent that modulates a cellular pathway is for administration to a subject in need thereof in at least one therapeutically effective amount. The present disclosure provides a combination comprising venetoclax, azacitidine and at least one agent that modulates a cellular pathway for the manufacture of a medicament for treating cancer in a subject, wherein the cellular pathway is a pathway set forth in Table 2, wherein the venetoclax, the azacitidine and the at least one agent that modulates a cellular pathway is for administration to a subject in need thereof in at least one therapeutically effective amount.

In yet another aspect, the present disclosure provides a method of treating AML in a subject comprising administering an effective amount of venetoclax, an effective amount of azacitidine, and at least one agent that modulates a cellular pathway, wherein the cellular pathway is a pathway set forth in Table 2.

The present disclosure provides a combination comprising venetoclax, azacitidine and at least one agent that modulates a cellular pathway for use in the treatment of AML in a subject, wherein the cellular pathway is a pathway set forth in Table 2, wherein the venetoclax, the azacitidine and the at least one agent that modulates a cellular pathway is for administration to a subject in need thereof in at least one therapeutically effective amount. The present disclosure provides venetoclax for use in the treatment of AML in a subject, the treatment comprising administering a combination comprising venetoclax, azacitidine and at least one agent that modulates a cellular pathway, wherein the cellular pathway is a pathway set forth in Table 2, wherein the venetoclax, the azacitidine and the at least one agent that modulates a cellular pathway is for administration to a subject in need thereof in at least one therapeutically effective amount. The present disclosure provides azacitidine for use in the treatment of AML in a subject, the treatment comprising administering a combination comprising venetoclax, azacitidine and at least one agent that modulates a cellular pathway, wherein the cellular pathway is a pathway set forth in Table 2, wherein the venetoclax, the azacitidine and the at least one agent that modulates a cellular pathway is for administration to a subject in need thereof in at least one therapeutically effective amount. The present disclosure provides at least one agent that modulates a cellular pathway for use in the treatment of AML in a subject, the treatment comprising administering a combination comprising venetoclax, azacitidine and the least one agent that modulates a cellular pathway, wherein the cellular pathway is a pathway set forth in Table 2, wherein the venetoclax, the azacitidine and the at least one agent that modulates a cellular pathway is for administration to a subject in need thereof in at least one therapeutically effective amount. The present disclosure provides a combination comprising venetoclax, azacitidine and at least one agent that modulates a cellular pathway for the manufacture of a medicament for treating AML in a subject, wherein the cellular pathway is a pathway set forth in Table 2, wherein the venetoclax, the azacitidine and the at least one agent that modulates a cellular pathway is for administration to a subject in need thereof in at least one therapeutically effective amount.

In methods of the present disclosure, venetoclax may be administered orally. Venetoclax may be administered in a ramp-up schedule fashion over the course of 5 weeks, wherein during the first week 20 mg of venetoclax is administered daily, during the second week 50 mg of venetoclax is administered daily, during the third week 100 mg of venetoclax is administered daily, during the fourth week 200 mg of venetoclax is administered daily and during the fifth week and onwards until the end of treatment 400 mg of venetoclax is administered daily (final dose amount). Alternatively, the final dose of venetoclax can be about 300 to about 1400 mg daily. The final dose amount of venetoclax can be 400 mg daily. Alternatively, the final dose amount of venetoclax can be 800 mg daily. Alternatively still, the final dose amount of venetoclax can be 1200 mg daily. During the ramp-up schedule, the dose of venetoclax administered during any of the first, second, third or fourth weeks can be adjusted to be about 20 mg, about 50 mg, about 100 mg and about 200 mg respectively.

Azacitidine can be administered intravenously or subcutaneously. Azacitidine can be administered at a concentration of about 75 mg/m$^2$ daily for about 7 days about every 4 weeks. Alternatively, Azacitidine can be administered at a concentration of about 100 mg/m$^2$ daily for about 7 days about every 4 weeks.

In alternative aspects, Azacitidine can be administered orally. Azacitidine can be administered orally at a concentration of about 10 mg, or about 25 mg, or about 50 mg, or about 75 mg, or about 100 mg, or about 120 mg, or about 150 mg, or about 200 mg, or about 250 mg, or about 300 mg, or about 350 mg, or about 400 mg, or about 450 mg, or about 480 mg, or about 500 mg, or about 550 mg, or about 600 mg daily for about 7 days about every 4 weeks, or about 14 days about every 4 weeks, or about 21 days about every 4 weeks.

In another aspect, the present disclosure provides a method of inducing cell death in cancer stem cells comprising administering an effective amount of venetoclax and an effective amount of omacetaxine mepesuccinate.

The present disclosure provides a combination comprising venetoclax and omacetaxine mepesuccinate for use in the inducement of cell death in cancer stem cells, wherein the venetoclax and the omacetaxine mepesuccinate are for administration to a subject in need thereof in at least one therapeutically effective amount. The present disclosure provides venetoclax for use in the inducement of cell death in cancer stem cells, the inducement comprising administering a combination comprising venetoclax and omacetaxine mepesuccinate, wherein the venetoclax and the omacetaxine mepesuccinate are for administration to a subject in need thereof in at least one therapeutically effective amount. The present disclosure provides omacetaxine mepesuccinate for use in the inducement of cell death in cancer stem cells, the inducement comprising administering a combination comprising venetoclax and omacetaxine mepesuccinate, wherein the venetoclax and the omacetaxine mepesuccinate are for administration to a subject in need thereof in at least one therapeutically effective amount. The present disclosure provides a combination comprising venetoclax and omacetaxine mepesuccinate for the manufacture of a medicament for inducing cell death in cancer stem cells, wherein the venetoclax and the omacetaxine mepesuccinate are for administration to a subject in need thereof in at least one therapeutically effective amount.

In another aspect, the present disclosure provides a method of treating cancer in a subject comprising administering an effective amount of venetoclax and an effective amount of omacetaxine mepesuccinate.

The present disclosure provides a combination comprising venetoclax and omacetaxine mepesuccinate for use in the treatment of cancer in a subject, wherein the venetoclax and the omacetaxine mepesuccinate are for administration to a subject in need thereof in at least one therapeutically effective amount. The present disclosure provides venetoclax for use in the treatment of cancer in a subject, the treatment comprising administering a combination comprising venetoclax and omacetaxine mepesuccinate, wherein the venetoclax and the omacetaxine mepesuccinate are for administration to a subject in need thereof in at least one therapeutically effective amount. The present disclosure provides omacetaxine mepesuccinate for use in the treatment of cancer in a subject, the treatment comprising administering a combination comprising venetoclax and omacetaxine mepesuccinate, wherein the venetoclax and the omacetaxine mepesuccinate are for administration to a subject in need thereof in at least one therapeutically effective amount. The present disclosure provides a combination comprising venetoclax and omacetaxine mepesuccinate for the manufacture of a medicament for treating cancer in a subject, wherein the venetoclax and the omacetaxine mepesuccinate are for administration to a subject in need thereof in at least one therapeutically effective amount.

In another aspect, the present disclosure provides a method of treating AML in a subject comprising administering an effective amount of venetoclax and an effective amount of omacetaxine mepesuccinate.

The present disclosure provides a combination comprising venetoclax and omacetaxine mepesuccinate for use in the treatment of AML in a subject, wherein the venetoclax and the omacetaxine mepesuccinate are for administration to a subject in need thereof in at least one therapeutically effective amount. The present disclosure provides venetoclax for use in the treatment of AML in a subject, the treatment comprising administering a combination comprising venetoclax and omacetaxine mepesuccinate, wherein the venetoclax and the omacetaxine mepesuccinate are for administration to a subject in need thereof in at least one therapeutically effective amount. The present disclosure provides omacetaxine mepesuccinate for use in the treatment of AML in a subject, the treatment comprising administering a combination comprising venetoclax and omacetaxine mepesuccinate, wherein the venetoclax and the omacetaxine mepesuccinate are for administration to a subject in need thereof in at least one therapeutically effective amount. The present disclosure provides a combination comprising venetoclax and omacetaxine mepesuccinate for the manufacture of a medicament for treating AML in a subject, wherein the venetoclax and the omacetaxine mepesuccinate are for administration to a subject in need thereof in at least one therapeutically effective amount.

In another aspect, the present disclosure provides a method of inducing cell death in cancer stems cells comprising administering an effective amount of azacitidine and an effective amount of omacetaxine mepesuccinate.

The present disclosure provides a combination comprising azacitidine and omacetaxine mepesuccinate for use in the inducement of cell death in cancer stem cells, wherein the azacitidine and the omacetaxine mepesuccinate are for administration to a subject in need thereof in at least one therapeutically effective amount. The present disclosure provides azacitidine for use in the inducement of cell death in cancer stem cells, the inducement comprising administering a combination comprising azacitidine and omacetaxine mepesuccinate, wherein the azacitidine and the omacetaxine mepesuccinate are for administration to a subject in need thereof in at least one therapeutically effective amount. The present disclosure provides omacetaxine mepesuccinate for use in the inducement of cell death in cancer stem cells, the inducement comprising administering a combination comprising azacitidine and omacetaxine mepesuccinate, wherein the azacitidine and the omacetaxine mepesuccinate are for administration to a subject in need thereof in at least one therapeutically effective amount. The present disclosure provides a combination comprising azacitidine and omacetaxine mepesuccinate for the manufacture of a medicament for inducing cell death in cancer stem cells, wherein the azacitidine and the omacetaxine mepesuccinate are for administration to a subject in need thereof in at least one therapeutically effective amount.

In another aspect, the present disclosure provides a method of treating cancer in a subject comprising administering an effective amount of azacitidine and an effective amount of omacetaxine mepesuccinate.

The present disclosure provides a combination comprising azacitidine and omacetaxine mepesuccinate for use in the treatment of cancer in a subject, wherein the azacitidine and the omacetaxine mepesuccinate are for administration to a subject in need thereof in at least one therapeutically effective amount. The present disclosure provides azacitidine for use in the treatment of cancer in a subject, the treatment comprising administering a combination comprising azacitidine and omacetaxine mepesuccinate, wherein the azacitidine and the omacetaxine mepesuccinate are for administration to a subject in need thereof in at least one therapeutically effective amount. The present disclosure provides omacetaxine mepesuccinate for use in the treatment of cancer in a subject, the treatment comprising administering a combination comprising azacitidine and omacetaxine mepesuccinate, wherein the azacitidine and the omacetaxine mepesuccinate are for administration to a subject in need thereof in at least one therapeutically effective amount. The present disclosure provides a combination comprising azacitidine and omacetaxine mepesuccinate for the manufacture of a medicament for treating cancer in a subject, wherein the azacitidine and the omacetaxine mepesuccinate are for administration to a subject in need thereof in at least one therapeutically effective amount.

In another aspect, the present disclosure provides a method of treating AML in a subject comprising administering an effective amount of azacitidine and an effective amount of omacetaxine mepesuccinate.

The present disclosure provides a combination comprising azacitidine and omacetaxine mepesuccinate for use in the treatment of AML in a subject, wherein the azacitidine and the omacetaxine mepesuccinate are for administration to a subject in need thereof in at least one therapeutically effective amount. The present disclosure provides azacitidine for use in the treatment of AML in a subject, the treatment comprising administering a combination comprising azacitidine and omacetaxine mepesuccinate, wherein the azacitidine and the omacetaxine mepesuccinate are for administration to a subject in need thereof in at least one therapeutically effective amount. The present disclosure provides omacetaxine mepesuccinate for use in the treatment of AML in a subject, the treatment comprising administering a combination comprising azacitidine and omacetaxine mepesuccinate, wherein the azacitidine and the omacetaxine mepesuccinate are for administration to a subject in need thereof in at least one therapeutically effective amount. The present disclosure provides a combination comprising azacitidine and omacetaxine mepesuccinate for the manufacture of a medicament for treating AML in a subject, wherein the azacitidine and the omacetaxine mepesuccinate are for administration to a subject in need thereof in at least one therapeutically effective amount.

In another aspect, the present disclosure provides a method of inducing cell death in cancer stem cells comprising administering an effective amount of venetoclax, an effective amount of azacitidine and an effective amount of omacetaxine mepesuccinate.

The present disclosure provides a combination comprising venetoclax, azacitidine and omacetaxine mepesuccinate for use in the inducement of cell death in cancer stem cells, wherein the venetoclax, azacitidine and omacetaxine mepesuccinate are for administration to a subject in need thereof in at least one therapeutically effective amount. The present disclosure provides venetoclax for use in the inducement of cell death in cancer stem cells, the inducement comprising administering a combination of venetoclax, azacitidine and omacetaxine mepesuccinate, wherein the venetoclax, azacitidine and omacetaxine mepesuccinate are for administration to a subject in need thereof in at least one therapeutically effective amount. The present disclosure provides azacitidine for use in the inducement of cell death in cancer stem cells, the inducement comprising administering a combination of venetoclax, azacitidine and omacetaxine mepesuccinate, wherein the venetoclax, azacitidine and omacetaxine mepesuccinate are for administration to a subject in need thereof in at least one therapeutically effective amount. The present disclosure provides omacetaxine mepesuccinate for use in the inducement of cell death in cancer stem cells, the inducement comprising administering a combination of venetoclax, azacitidine and omacetaxine mepesuccinate, wherein the venetoclax, azacitidine and omacetaxine mepesuccinate are for administration to a subject in need thereof in at least one therapeutically effective amount. The present disclosure provides a combination comprising venetoclax, azacitidine and omacetaxine mepesuccinate for the manufacture of a medicament for inducing cell death in cancer stem cells, wherein the venetoclax, azacitidine and omacetaxine mepesuccinate are for administration to a subject in need thereof in at least one therapeutically effective amount.

In another aspect, the present disclosure provides a method of treating cancer in a subject comprising administering an effective amount of venetoclax, an effective amount of azacitidine and an effective amount of omacetaxine mepesuccinate.

The present disclosure provides a combination comprising venetoclax, azacitidine and omacetaxine mepesuccinate for use in the treatment of cancer in a subject, wherein the venetoclax, azacitidine and omacetaxine mepesuccinate are for administration to a subject in need thereof in at least one therapeutically effective amount. The present disclosure provides venetoclax for use in the treatment of cancer in a subject, the treatment comprising administering a combination of venetoclax, azacitidine and omacetaxine mepesuccinate, wherein the venetoclax, azacitidine and omacetaxine mepesuccinate are for administration to a subject in need thereof in at least one therapeutically effective amount. The present disclosure provides azacitidine for use in the treatment of cancer in a subject, the treatment comprising administering a combination of venetoclax, azacitidine and omacetaxine mepesuccinate, wherein the venetoclax, azacitidine and omacetaxine mepesuccinate are for administration to a subject in need thereof in at least one therapeutically effective amount. The present disclosure provides omacetaxine mepesuccinate for use in the treatment of cancer in a subject, the treatment comprising administering a combination of venetoclax, azacitidine and omacetaxine mepesuccinate, wherein the venetoclax, azacitidine and omacetaxine mepesuccinate are for administration to a subject in need thereof in at least one therapeutically effective amount. The present disclosure provides a combination comprising venetoclax, azacitidine and omacetaxine mepesuccinate for the manufacture of a medicament for treating cancer in a subject, wherein the venetoclax, azacitidine and omacetaxine mepesuccinate are for administration to a subject in need thereof in at least one therapeutically effective amount.

In another aspect, the present disclosure provides a method of treating AML in a subject comprising administering an effective amount of venetoclax, an effective amount of azacitidine and an effective amount of omacetaxine mepesuccinate.

The present disclosure provides a combination comprising venetoclax, azacitidine and omacetaxine mepesuccinate for use in the treatment of AML in a subject, wherein the venetoclax, azacitidine and omacetaxine mepesuccinate are for administration to a subject in need thereof in at least one therapeutically effective amount. The present disclosure provides venetoclax for use in the treatment of AML in a subject, the treatment comprising administering a combination of venetoclax, azacitidine and omacetaxine mepesuccinate, wherein the venetoclax, azacitidine and omacetaxine mepesuccinate are for administration to a subject in need thereof in at least one therapeutically effective amount. The present disclosure provides azacitidine for use in the treatment of AML in a subject, the treatment comprising administering a combination of venetoclax, azacitidine and omacetaxine mepesuccinate, wherein the venetoclax, azacitidine and omacetaxine mepesuccinate are for administration to a subject in need thereof in at least one therapeutically effective amount. The present disclosure provides omacetaxine mepesuccinate for use in the treatment of AML in a subject, the treatment comprising administering a combination of venetoclax, azacitidine and omacetaxine mepesuccinate, wherein the venetoclax, azacitidine and omacetaxine mepesuccinate are for administration to a subject in need thereof in at least one therapeutically effective amount. The present disclosure provides a combination comprising venetoclax, azacitidine and omacetaxine mepesuccinate for the manufacture of a medicament for treating AML in a subject, wherein the venetoclax, azacitidine and omacetaxine mepesuccinate are for administration to a subject in need thereof in at least one therapeutically effective amount.

In another aspect, the present disclosure provides a method of inducing cell death in cancer stem cells comprising administering an effective amount of a BCL-2 inhibitor, an effective amount of a hypomethylating agent and an effective amount of omacetaxine mepesuccinate.

The present disclosure provides a combination comprising a BCL-2 inhibitor, a hypomethylating agent and omacetaxine mepesuccinate for use in the inducement of cell death in cancer stem cells, wherein the BCL-2 inhibitor, the hypomethylating agent and the omacetaxine mepesuccinate are for administration to a subject in need thereof in at least one therapeutically effective amount. The present disclosure provides a BCL-2 inhibitor for use in the inducement of cell death in cancer stem cells, the inducement comprising administering a combination comprising the BCL-2 inhibitor, a hypomethylating agent and omacetaxine mepesuccinate, wherein the BCL-2 inhibitor, the hypomethylating agent and the omacetaxine mepesuccinate are for administration to a subject in need thereof in at least one therapeutically effective amount. The present disclosure provides a hypomethylating agent for use in the inducement of cell death in cancer stem cells, the inducement comprising administering a combination comprising the a BCL-2 inhibitor, the hypomethylating agent and omacetaxine mepesuccinate, wherein the BCL-2 inhibitor, the hypomethylating agent and the omacetaxine mepesuccinate are for administration to a subject in need thereof in at least one therapeutically effective amount. The present disclosure provides omacetaxine mepesuccinate for use in the inducement of cell death in cancer stem cells, the inducement comprising administering a combination comprising the a BCL-2 inhibitor, a hypomethylating agent and omacetaxine mepesuccinate, wherein the BCL-2 inhibitor, the hypomethylating agent and the omacetaxine mepesuccinate are for administration to a subject in need thereof in at least one therapeutically effective amount. The present disclosure provides a combination comprising a BCL-2 inhibitor, a hypomethylating agent and omacetaxine mepesuccinate for the manufacture of a medicament for inducing cell death in cancer stem cells, wherein the BCL-2 inhibitor, the hypomethylating agent and the omacetaxine mepesuccinate are for administration to a subject in need thereof in at least one therapeutically effective amount.

In another aspect, the present disclosure provides a method of treating cancer in a subject comprising administering an effective amount of a BCL-2 inhibitor, an effective amount of a hypomethylating agent and an effective amount of omacetaxine mepesuccinate.

The present disclosure provides a combination comprising a BCL-2 inhibitor, a hypomethylating agent and omacetaxine mepesuccinate for use in the treatment of cancer in a subject, wherein the BCL-2 inhibitor, the hypomethylating agent and the omacetaxine mepesuccinate are for administration to a subject in need thereof in at least one therapeutically effective amount. The present disclosure provides a BCL-2 inhibitor for use in the i treatment of cancer in a subject, the treatment comprising administering a combination comprising the BCL-2 inhibitor, a hypomethylating agent and omacetaxine mepesuccinate, wherein the BCL-2 inhibitor, the hypomethylating agent and the omacetaxine mepesuccinate are for administration to a subject in need thereof in at least one therapeutically effective amount. The present disclosure provides a hypomethylating agent for use in the treatment of cancer in a subject, the treatment comprising administering a combination comprising the a BCL-2 inhibitor, the hypomethylating agent and omacetaxine mepesuccinate, wherein the BCL-2 inhibitor, the hypomethylating agent and the omacetaxine mepesuccinate are for administration to a subject in need thereof in at least one therapeutically effective amount. The present disclosure provides omacetaxine mepesuccinate for use in the treatment of cancer in a subject, the treatment comprising administering a combination comprising a BCL-2 inhibitor, a hypomethylating agent and omacetaxine mepesuccinate, wherein the BCL-2 inhibitor, the hypomethylating agent and the omacetaxine mepesuccinate are for administration to a subject in need thereof in at least one therapeutically effective amount. The present disclosure provides a combination comprising a BCL-2 inhibitor, a hypomethylating agent and omacetaxine mepesuccinate for the manufacture of a medicament for treating cancer in a subject, wherein the BCL-2 inhibitor, the hypomethylating agent and the omacetaxine mepesuccinate are for administration to a subject in need thereof in at least one therapeutically effective amount.

In another aspect, the present disclosure provides a method of treating AML in a subject comprising administering an effective amount of a BCL-2 inhibitor, an effective amount of a hypomethylating agent and an effective amount of omacetaxine mepesuccinate.

The present disclosure provides a combination comprising a BCL-2 inhibitor, a hypomethylating agent and omacetaxine mepesuccinate for use in the treatment of AML in a subject, wherein the BCL-2 inhibitor, the hypomethylating agent and the omacetaxine mepesuccinate are for administration to a subject in need thereof in at least one therapeutically effective amount. The present disclosure provides a BCL-2 inhibitor for use in the i treatment of AML in a subject, the treatment comprising administering a combination comprising the BCL-2 inhibitor, a hypomethylating agent and omacetaxine mepesuccinate, wherein the BCL-2 inhibitor, the hypomethylating agent and the omacetaxine mepesuccinate are for administration to a subject in need thereof in at least one therapeutically effective amount. The present disclosure provides a hypomethylating agent for use in the treatment of AML in a subject, the treatment comprising administering a combination comprising the a BCL-2 inhibitor, the hypomethylating agent and omacetaxine mepesuccinate, wherein the BCL-2 inhibitor, the hypomethylating agent and the omacetaxine mepesuccinate are for administration to a subject in need thereof in at least one therapeutically effective amount. The present disclosure provides omacetaxine mepesuccinate for use in the treatment of AML in a subject, the treatment comprising administering a combination comprising a BCL-2 inhibitor, a hypomethylating agent and omacetaxine mepesuccinate, wherein the BCL-2 inhibitor, the hypomethylating agent and the omacetaxine mepesuccinate are for administration to a subject in need thereof in at least one therapeutically effective amount. The present disclosure provides a combination comprising a BCL-2 inhibitor, a hypomethylating agent and omacetaxine mepesuccinate for the manufacture of a medicament for treating AML in a subject, wherein the BCL-2 inhibitor, the hypomethylating agent and the omacetaxine mepesuccinate are for administration to a subject in need thereof in at least one therapeutically effective amount.

In another aspect, the present disclosure provides a method of inducing cell death in cancer stem cells comprising administering an effective amount of a BCL-2 inhibitor and an effective amount of omacetaxine mepesuccinate.

The present disclosure provides a combination comprising a BCL-2 inhibitor and omacetaxine mepesuccinate for use in the inducement of cell death in cancer stem cells, wherein the BCL-2 inhibitor and the omacetaxine mepesuccinate are for administration to a subject in need thereof in at least one therapeutically effective amount. The present disclosure provides a BCL-2 inhibitor for use in the inducement of cell death in cancer stem cells, the inducement comprising administering a combination comprising the BCL-2 inhibitor and omacetaxine mepesuccinate, wherein the BCL-2 inhibitor and the omacetaxine mepesuccinate are for administration to a subject in need thereof in at least one therapeutically effective amount. The present disclosure provides omacetaxine mepesuccinate for use in the inducement of cell death in cancer stem cells, the inducement comprising administering a combination comprising a BCL-2 inhibitor and omacetaxine mepesuccinate, wherein the BCL-2 inhibitor and the omacetaxine mepesuccinate are for administration to a subject in need thereof in at least one therapeutically effective amount. The present disclosure provides a combination comprising a BCL-2 inhibitor and omacetaxine mepesuccinate for the manufacture of a medicament for inducing cell death in cancer stem cells, wherein the BCL-2 inhibitor and the omacetaxine mepesuccinate are for administration to a subject in need thereof in at least one therapeutically effective amount.

In another aspect, the present disclosure provides a method of treating cancer in a subject comprising administering an effective amount of a BCL-2 inhibitor and an effective amount of omacetaxine mepesuccinate.

The present disclosure provides a combination comprising a BCL-2 inhibitor and omacetaxine mepesuccinate for use in the treatment of cancer in a subject, wherein the BCL-2 inhibitor and the omacetaxine mepesuccinate are for administration to a subject in need thereof in at least one therapeutically effective amount. The present disclosure provides a BCL-2 inhibitor for use in the treatment of cancer in a subject, the treatment comprising administering a combination comprising the BCL-2 inhibitor and omacetaxine mepesuccinate, wherein the BCL-2 inhibitor and the omacetaxine mepesuccinate are for administration to a subject in need thereof in at least one therapeutically effective amount. The present disclosure provides omacetaxine mepesuccinate for use in the treatment of cancer in a subject, the treatment comprising administering a combination comprising a BCL-2 inhibitor and omacetaxine mepesuccinate, wherein the BCL-2 inhibitor and the omacetaxine mepesuccinate are for administration to a subject in need thereof in at least one therapeutically effective amount. The present disclosure provides a combination comprising a BCL-2 inhibitor and omacetaxine mepesuccinate for the manufacture of a medicament for treating cancer in a subject, wherein the BCL-2 inhibitor and the omacetaxine mepesuccinate are for administration to a subject in need thereof in at least one therapeutically effective amount.

In another aspect, the present disclosure provides a method of treating AML in a subject comprising administering an effective amount of a BCL-2 inhibitor and an effective amount of omacetaxine mepesuccinate.

The present disclosure provides a combination comprising a BCL-2 inhibitor and omacetaxine mepesuccinate for use in the treatment of AML in a subject, wherein the BCL-2 inhibitor and the omacetaxine mepesuccinate are for administration to a subject in need thereof in at least one therapeutically effective amount. The present disclosure provides a BCL-2 inhibitor for use in the treatment of AML in a subject, the treatment comprising administering a combination comprising the BCL-2 inhibitor and omacetaxine mepesuccinate, wherein the BCL-2 inhibitor and the omacetaxine mepesuccinate are for administration to a subject in need thereof in at least one therapeutically effective amount. The present disclosure provides omacetaxine mepesuccinate for use in the treatment of AML in a subject, the treatment comprising administering a combination comprising a BCL-2 inhibitor and omacetaxine mepesuccinate, wherein the BCL-2 inhibitor and the omacetaxine mepesuccinate are for administration to a subject in need thereof in at least one therapeutically effective amount. The present disclosure provides a combination comprising a BCL-2 inhibitor and omacetaxine mepesuccinate for the manufacture of a medicament for treating AML, in a subject, wherein the BCL-2 inhibitor and the omacetaxine mepesuccinate are for administration to a subject in need thereof in at least one therapeutically effective amount.

In methods of the present disclosure, omacetaxine mepesuccinate may be administered subcutaneously. Omacetaxine mepesuccinate may be administered by injection. Omacetaxine can be administered subcutaneously at a concentration of about 1.25 mg/m$^2$ about twice daily for about 14 consecutive days in a cycle about 28 days long. Omacetaxine can be administered subcutaneously at a concentration of about 1.25 mg/m$^2$ about twice daily for about 7 consecutive days in a cycle about 28 days long. Omacetaxine can be administered subcutaneously at a concentration of about 0.5 mg/m$^2$, or about 0.75 mg/m$^2$, or about 1.0 mg/m$^2$, or about 1.25 mg/m$^2$, or about 1.5 mg/m$^2$, or about 1.75 mg/m$^2$, or about 2.0 mg/m$^2$, or about 2.25 mg/m$^2$, or about 2.5 mg/m$^2$, or about 2.75 mg/m$^2$, or about 3.0 mg/m$^2$, or about 3.25 mg/m$^2$, or about 3.5 mg/m$^2$, or about 3.75 mg/m$^2$, or about 4.0 mg/m$^2$, or about 4.25 mg/m$^2$, or about 4.5 mg/m$^2$, or about 4.75 mg/m$^2$, or about 5.0 mg/m$^2$, or about 5.25 mg/m$^2$, or about 5.5 mg/m$^2$, or about 5.75 mg/m$^2$, or about 6.0 mg/m$^2$ about twice daily for about 14 consecutive days in a cycle about 28 days long, or about twice daily for about 7 consecutive days in a cycle about 28 days long. Omacetaxine can be administered by 24-hour continuous infusion for about 7 days, or about 9 days, about every 4 weeks.

In one aspect, the present disclosure provides a method of inducing cell death in cancer stem cells comprising administering an effective amount of at least one agent that modulates a cellular pathway, wherein the cellular pathway is nicotinamide metabolism. In some aspects, the at least one agent that modulates nicotinamide metabolism can be a Nampt inhibitor. In some aspects, the Nampt inhibitor is APO866.

The present disclosure provide at least one agent that modulates a cellular pathway for use in the inducement of cell death in cancer stem cells, wherein the cellular pathway is nicotinamide metabolism, wherein the at least one agent is for administration to a subject in need thereof in at least one therapeutically effective amount. In some aspects, the at least one agent that modulates nicotinamide metabolism can be a Nampt inhibitor. In some aspects, the Nampt inhibitor is APO866.

The present disclosure provide at least one agent that modulates a cellular pathway for the manufacture of a medicament for inducing cell death in cancer stem cells, wherein the cellular pathway is nicotinamide metabolism, wherein the at least one agent is for administration to a subject in need thereof in at least one therapeutically effective amount. In some aspects, the at least one agent that modulates nicotinamide metabolism can be a Nampt inhibitor. In some aspects, the Nampt inhibitor is APO866. In one aspect, the present disclosure provides a method of treating cancer in a subject comprising administering an effective amount of at least one agent that modulates a cellular pathway, wherein the cellular pathway is nicotinamide metabolism. In some aspects, the at least one agent that modulates nicotinamide metabolism can be a Nampt inhibitor. In some aspects, the Nampt inhibitor is APO866.

The present disclosure provide at least one agent that modulates a cellular pathway for use in the treatment of cancer in a subject, wherein the cellular pathway is nicotinamide metabolism, wherein the at least one agent is for administration to a subject in need thereof in at least one therapeutically effective amount. In some aspects, the at least one agent that modulates nicotinamide metabolism can be a Nampt inhibitor. In some aspects, the Nampt inhibitor is APO866.

The present disclosure provide at least one agent that modulates a cellular pathway for the manufacture of a medicament for treating cancer in a subject, wherein the cellular pathway is nicotinamide metabolism, wherein the at least one agent is for administration to a subject in need thereof in at least one therapeutically effective amount. In some aspects, the at least one agent that modulates nicotinamide metabolism can be a Nampt inhibitor. In some aspects, the Nampt inhibitor is APO866.

In one aspect, the present disclosure provides a method of treating AML in a subject comprising administering an effective amount of at least one agent that modulates a cellular pathway, wherein the cellular pathway is nicotinamide metabolism. In some aspects, the at least one agent that modulates nicotinamide metabolism can be a Nampt inhibitor. In some aspects, the Nampt inhibitor is APO866.

The present disclosure provide at least one agent that modulates a cellular pathway for use in the treatment of AML in a subject, wherein the cellular pathway is nicotinamide metabolism, wherein the at least one agent is for administration to a subject in need thereof in at least one therapeutically effective amount. In some aspects, the at least one agent that modulates nicotinamide metabolism can be a Nampt inhibitor. In some aspects, the Nampt inhibitor is APO866.

The present disclosure provide at least one agent that modulates a cellular pathway for the manufacture of a medicament for treating AML in a subject, wherein the cellular pathway is nicotinamide metabolism, wherein the at least one agent is for administration to a subject in need thereof in at least one therapeutically effective amount. In some aspects, the at least one agent that modulates nicotinamide metabolism can be a Nampt inhibitor. In some aspects, the Nampt inhibitor is APO866.

In another aspect, the present disclosure provides a method of inducing cell death in cancer stem cells comprising administering an effective amount of venetoclax and an effective amount of at least one agent that modulates a cellular pathway, wherein the cellular pathway is nicotinamide metabolism. In some aspects, the at least one agent that modulates nicotinamide metabolism can be a Nampt inhibitor. In some aspects, the Nampt inhibitor is APO866.

The present disclosure provides a combination of venetoclax and at least one agent that modulates a cellular pathway for use in the inducement of cell death in cancer stem cells, wherein the cellular pathway is nicotinamide metabolism, and wherein the venetoclax and the at least one agent are for administration to a subject in need thereof in at least one therapeutically effective amount. The present disclosure provides venetoclax for use in the inducement of cell death in cancer stem cells, the inducement comprising administering a combination of the venetoclax and at least one agent that modulates a cellular pathway, wherein the cellular pathway is nicotinamide metabolism, and wherein the venetoclax and the at least one agent are for administration to a subject in need thereof in at least one therapeutically effective amount. The present disclosure provides at least one agent that modulates a cellular pathway for use in the inducement of cell death in cancer stem cells, the inducement comprising administering a combination of venetoclax and the at least one agent that modulates a cellular pathway, wherein the cellular pathway is nicotinamide metabolism, and wherein the venetoclax and the at least one agent are for administration to a subject in need thereof in at least one therapeutically effective amount. The present disclosure provides a combination of venetoclax and at least one agent that modulates a cellular pathway for the manufacture of a medicament for inducing cell death in cancer stem cells, wherein the cellular pathway is nicotinamide metabolism, and wherein the venetoclax and the at least one agent are for administration to a subject in need thereof in at least one therapeutically effective amount. In some aspects, the at least one agent that modulates nicotinamide metabolism can be a Nampt inhibitor. In some aspects, the Nampt inhibitor is APO866.

In another aspect, the present disclosure provides a method of treating cancer in a subject comprising administering an effective amount of venetoclax and an effective amount of at least one agent that modulates a cellular pathway, wherein the cellular pathway is nicotinamide metabolism. In some aspects, the at least one agent that modulates nicotinamide metabolism can be a Nampt inhibitor. In some aspects, the Nampt inhibitor is APO866.

The present disclosure provides a combination of venetoclax and at least one agent that modulates a cellular pathway for use in the treatment of cancer in a subject, wherein the cellular pathway is nicotinamide metabolism, and wherein the venetoclax and the at least one agent are for administration to a subject in need thereof in at least one therapeutically effective amount. The present disclosure provides venetoclax for use in the treatment of cancer in a subject, the treatment comprising administering a combination of the venetoclax and at least one agent that modulates a cellular pathway, wherein the cellular pathway is nicotinamide metabolism, and wherein the venetoclax and the at least one agent are for administration to a subject in need thereof in at least one therapeutically effective amount. The present disclosure provides at least one agent that modulates a cellular pathway for use in the treatment of cancer in a subject, the treatment comprising administering a combination of venetoclax and the at least one agent that modulates a cellular pathway, wherein the cellular pathway is nicotinamide metabolism, and wherein the venetoclax and the at least one agent are for administration to a subject in need thereof in at least one therapeutically effective amount. The present disclosure provides a combination of venetoclax and at least one agent that modulates a cellular pathway for the manufacture of a medicament for treating cancer in a subject, wherein the cellular pathway is nicotinamide metabolism, and wherein the venetoclax and the at least one agent are for administration to a subject in need thereof in at least one therapeutically effective amount. In some aspects, the at least one agent that modulates nicotinamide metabolism can be a Nampt inhibitor. In some aspects, the Nampt inhibitor is APO866.

In another aspect, the present disclosure provides a method of treating AML in a subject comprising administering an effective amount of venetoclax and an effective amount of at least one agent that modulates a cellular pathway, wherein the cellular pathway is nicotinamide metabolism. In some aspects, the at least one agent that modulates nicotinamide metabolism can be a Nampt inhibitor. In some aspects, the Nampt inhibitor is APO866.

The present disclosure provides a combination of venetoclax and at least one agent that modulates a cellular pathway for use in the treatment of AML in a subject, wherein the cellular pathway is nicotinamide metabolism, and wherein the venetoclax and the at least one agent are for administration to a subject in need thereof in at least one therapeutically effective amount. The present disclosure provides venetoclax for use in the treatment of AML in a subject, the treatment comprising administering a combination of the venetoclax and at least one agent that modulates a cellular pathway, wherein the cellular pathway is nicotinamide metabolism, and wherein the venetoclax and the at least one agent are for administration to a subject in need thereof in at least one therapeutically effective amount. The present disclosure provides at least one agent that modulates a cellular pathway for use in the treatment of AML in a subject, the treatment comprising administering a combination of venetoclax and the at least one agent that modulates a cellular pathway, wherein the cellular pathway is nicotinamide metabolism, and wherein the venetoclax and the at least one agent are for administration to a subject in need thereof in at least one therapeutically effective amount. The present disclosure provides a combination of venetoclax and at least one agent that modulates a cellular pathway for the manufacture of a medicament for treating AML in a subject, wherein the cellular pathway is nicotinamide metabolism, and wherein the venetoclax and the at least one agent are for administration to a subject in need thereof in at least one therapeutically effective amount. In some aspects, the at least one agent that modulates nicotinamide metabolism can be a Nampt inhibitor. In some aspects, the Nampt inhibitor is APO866.

In another aspect, the present disclosure provides a method of inducing cell death in cancer stem cells comprising administering an effective amount of azacitidine and an effective amount of at least one agent that modulates a cellular pathway, wherein the cellular pathway is nicotinamide metabolism. In some aspects, the at least one agent that modulates nicotinamide metabolism can be a Nampt inhibitor. In some aspects, the Nampt inhibitor is APO866.

The present disclosure provides a combination of azacitidine and at least one agent that modulates a cellular pathway for use in the inducement of cell death in cancer stem cells, wherein the cellular pathway is nicotinamide metabolism, and wherein the azacitidine and the at least one agent are for administration to a subject in need thereof in at least one therapeutically effective amount. The present disclosure provides azacitidine for use in the inducement of cell death in cancer stem cells, the inducement comprising administering a combination of the azacitidine and at least one agent that modulates a cellular pathway, wherein the cellular pathway is nicotinamide metabolism, and wherein the azacitidine and the at least one agent are for administration to a subject in need thereof in at least one therapeutically effective amount. The present disclosure provides at least one agent that modulates a cellular pathway for use in the inducement of cell death in cancer stem cells, the inducement comprising administering a combination of azacitidine and the at least one agent that modulates a cellular pathway, wherein the cellular pathway is nicotinamide metabolism, and wherein the azacitidine and the at least one agent are for administration to a subject in need thereof in at least one therapeutically effective amount. The present disclosure provides a combination of azacitidine and at least one agent that modulates a cellular pathway for the manufacture of a medicament for inducing cell death in cancer stem cells, wherein the cellular pathway is nicotinamide metabolism, and wherein the azacitidine and the at least one agent are for administration to a subject in need thereof in at least one therapeutically effective amount. In some aspects, the at least one agent that modulates nicotinamide metabolism can be a Nampt inhibitor. In some aspects, the Nampt inhibitor is APO866.

In another aspect, the present disclosure provides a method of treating cancer in a subject comprising administering an effective amount of azacitidine and an effective amount of at least one agent that modulates a cellular pathway, wherein the cellular pathway is nicotinamide metabolism. In some aspects, the at least one agent that modulates nicotinamide metabolism can be a Nampt inhibitor. In some aspects, the Nampt inhibitor is APO866.

The present disclosure provides a combination of azacitidine and at least one agent that modulates a cellular pathway for use in the treatment of cancer in a subject, wherein the cellular pathway is nicotinamide metabolism, and wherein the azacitidine and the at least one agent are for administration to a subject in need thereof in at least one therapeutically effective amount. The present disclosure provides azacitidine for use in the treatment of cancer in a subject, the treatment comprising administering a combination of the azacitidine and at least one agent that modulates a cellular pathway, wherein the cellular pathway is nicotinamide metabolism, and wherein the azacitidine and the at least one agent are for administration to a subject in need thereof in at least one therapeutically effective amount. The present disclosure provides at least one agent that modulates a cellular pathway for use in the treatment of cancer in a subject, the treatment comprising administering a combination of azacitidine and the at least one agent that modulates a cellular pathway, wherein the cellular pathway is nicotinamide metabolism, and wherein the azacitidine and the at least one agent are for administration to a subject in need thereof in at least one therapeutically effective amount. The present disclosure provides a combination of azacitidine and at least one agent that modulates a cellular pathway for the manufacture of a medicament for treating cancer in a subject, wherein the cellular pathway is nicotinamide metabolism, and wherein the azacitidine and the at least one agent are for administration to a subject in need thereof in at least one therapeutically effective amount. In some aspects, the at least one agent that modulates nicotinamide metabolism can be a Nampt inhibitor. In some aspects, the Nampt inhibitor is APO866.

In another aspect, the present disclosure provides a method of treating AML in a subject comprising administering an effective amount of azacitidine and an effective amount of at least one agent that modulates a cellular pathway, wherein the cellular pathway is nicotinamide metabolism. In some aspects, the at least one agent that modulates nicotinamide metabolism can be a Nampt inhibitor. In some aspects, the Nampt inhibitor is APO866.

The present disclosure provides a combination of azacitidine and at least one agent that modulates a cellular pathway for use in the treatment of AML in a subject, wherein the cellular pathway is nicotinamide metabolism, and wherein the azacitidine and the at least one agent are for administration to a subject in need thereof in at least one therapeutically effective amount. The present disclosure provides azacitidine for use in the treatment of AML in a subject, the treatment comprising administering a combination of the azacitidine and at least one agent that modulates a cellular pathway, wherein the cellular pathway is nicotinamide metabolism, and wherein the azacitidine and the at least one agent are for administration to a subject in need thereof in at least one therapeutically effective amount. The present disclosure provides at least one agent that modulates a cellular pathway for use in the treatment of AML in a subject, the treatment comprising administering a combination of azacitidine and the at least one agent that modulates a cellular pathway, wherein the cellular pathway is nicotinamide metabolism, and wherein the azacitidine and the at least one agent are for administration to a subject in need thereof in at least one therapeutically effective amount. The present disclosure provides a combination of azacitidine and at least one agent that modulates a cellular pathway for the manufacture of a medicament for treating AML in a subject, wherein the cellular pathway is nicotinamide metabolism, and wherein the azacitidine and the at least one agent are for administration to a subject in need thereof in at least one therapeutically effective amount. In some aspects, the at least one agent that modulates nicotinamide metabolism can be a Nampt inhibitor. In some aspects, the Nampt inhibitor is APO866.

In yet another aspect, the present disclosure provides a method of inducing cell death in cancer stem cells comprising administering an effective amount of venetoclax, an effective amount of azacitidine, and at least one agent that modulates a cellular pathway, wherein the cellular pathway is nicotinamide metabolism. In some aspects, the at least one agent that modulates nicotinamide metabolism can be a Nampt inhibitor. In some aspects, the Nampt inhibitor is APO866.

The present disclosure provides a combination of venetoclax, azacitidine and at least one agent that modulates a cellular pathway for use in the inducement of cell death in cancer stem cells, wherein the cellular pathway is nicotinamide metabolism, and wherein the venetoclax, the azacitidine and the at least one agent are for administration to a subject in need thereof in at least one therapeutically effective amount. The present disclosure provides venetoclax for use in the inducement of cell death in cancer stem cells, the inducement comprising administering a combination comprising the venetoclax, azacitidine and at least one agent that modulates a cellular pathway, wherein the cellular pathway is nicotinamide metabolism, and wherein the venetoclax, the azacitidine and the at least one agent are for administration to a subject in need thereof in at least one therapeutically effective amount. The present disclosure provides azacitidine for use in the inducement of cell death in cancer stem cells, the inducement comprising administering a combination comprising venetoclax, the azacitidine and at least one agent that modulates a cellular pathway, wherein the cellular pathway is nicotinamide metabolism, and wherein the venetoclax, the azacitidine and the at least one agent are for administration to a subject in need thereof in at least one therapeutically effective amount. The present disclosure provides at least one agent that modulates a cellular pathway for use in the inducement of cell death in cancer stem cells, the inducement comprising administering a combination comprising venetoclax, azacitidine and the at least one agent that modulates a cellular pathway, wherein the cellular pathway is nicotinamide metabolism, and wherein the venetoclax, the azacitidine and the at least one agent are for administration to a subject in need thereof in at least one therapeutically effective amount. The present disclosure provides a combination of venetoclax, azacitidine and at least one agent that modulates a cellular pathway for the manufacture of a medicament for inducing cell death in cancer stem cells, wherein the cellular pathway is nicotinamide metabolism, and wherein the venetoclax, the azacitidine and the at least one agent are for administration to a subject in need thereof in at least one therapeutically effective amount. In some aspects, the at least one agent that modulates nicotinamide metabolism can be a Nampt inhibitor. In some aspects, the Nampt inhibitor is APO866.

In yet another aspect, the present disclosure provides a method of treating cancer in a subject comprising administering an effective amount of venetoclax, an effective amount of azacitidine, and at least one agent that modulates a cellular pathway, wherein the cellular pathway is nicotinamide metabolism. In some aspects, the at least one agent that modulates nicotinamide metabolism can be a Nampt inhibitor. In some aspects, the Nampt inhibitor is APO866.

The present disclosure provides a combination of venetoclax, azacitidine and at least one agent that modulates a cellular pathway for use in the treatment of cancer in a subject, wherein the cellular pathway is nicotinamide metabolism, and wherein the venetoclax, the azacitidine and the at least one agent are for administration to a subject in need thereof in at least one therapeutically effective amount. The present disclosure provides venetoclax for use in the treatment of cancer in a subject, the treatment comprising administering a combination comprising the venetoclax, azacitidine and at least one agent that modulates a cellular pathway, wherein the cellular pathway is nicotinamide metabolism, and wherein the venetoclax, the azacitidine and the at least one agent are for administration to a subject in need thereof in at least one therapeutically effective amount. The present disclosure provides azacitidine for use in the treatment of cancer in a subject, the treatment comprising administering a combination comprising venetoclax, the azacitidine and at least one agent that modulates a cellular pathway, wherein the cellular pathway is nicotinamide metabolism, and wherein the venetoclax, the azacitidine and the at least one agent are for administration to a subject in need thereof in at least one therapeutically effective amount. The present disclosure provides at least one agent that modulates a cellular pathway for use in the treatment of cancer in a subject, the treatment comprising administering a combination comprising venetoclax, azacitidine and the at least one agent that modulates a cellular pathway, wherein the cellular pathway is nicotinamide metabolism, and wherein the venetoclax, the azacitidine and the at least one agent are for administration to a subject in need thereof in at least one therapeutically effective amount. The present disclosure provides a combination of venetoclax, azacitidine and at least one agent that modulates a cellular pathway for the manufacture of a medicament for treating cancer in a subject, wherein the cellular pathway is nicotinamide metabolism, and wherein the venetoclax, the azacitidine and the at least one agent are for administration to a subject in need thereof in at least one therapeutically effective amount. In some aspects, the at least one agent that modulates nicotinamide metabolism can be a Nampt inhibitor. In some aspects, the Nampt inhibitor is APO866.

In yet another aspect, the present disclosure provides a method of treating AML in a subject comprising administering an effective amount of venetoclax, an effective amount of azacitidine, and at least one agent that modulates a cellular pathway, wherein the cellular pathway is nicotinamide metabolism. In some aspects, the at least one agent that modulates nicotinamide metabolism can be a Nampt inhibitor. In some aspects, the Nampt inhibitor is APO866.

The present disclosure provides a combination of venetoclax, azacitidine and at least one agent that modulates a cellular pathway for use in the treatment of AML in a subject, wherein the cellular pathway is nicotinamide metabolism, and wherein the venetoclax, the azacitidine and the at least one agent are for administration to a subject in need thereof in at least one therapeutically effective amount. The present disclosure provides venetoclax for use in the treatment of AML in a subject, the treatment comprising administering a combination comprising the venetoclax, azacitidine and at least one agent that modulates a cellular pathway, wherein the cellular pathway is nicotinamide metabolism, and wherein the venetoclax, the azacitidine and the at least one agent are for administration to a subject in need thereof in at least one therapeutically effective amount. The present disclosure provides azacitidine for use in the treatment of AML in a subject, the treatment comprising administering a combination comprising venetoclax, the azacitidine and at least one agent that modulates a cellular pathway, wherein the cellular pathway is nicotinamide metabolism, and wherein the venetoclax, the azacitidine and the at least one agent are for administration to a subject in need thereof in at least one therapeutically effective amount. The present disclosure provides at least one agent that modulates a cellular pathway for use in the treatment of AML in a subject, the treatment comprising administering a combination comprising venetoclax, azacitidine and the at least one agent that modulates a cellular pathway, wherein the cellular pathway is nicotinamide metabolism, and wherein the venetoclax, the azacitidine and the at least one agent are for administration to a subject in need thereof in at least one therapeutically effective amount. The present disclosure provides a combination of venetoclax, azacitidine and at least one agent that modulates a cellular pathway for the manufacture of a medicament for treating AML, in a subject, wherein the cellular pathway is nicotinamide metabolism, and wherein the venetoclax, the azacitidine and the at least one agent are for administration to a subject in need thereof in at least one therapeutically effective amount. In some aspects, the at least one agent that modulates nicotinamide metabolism can be a Nampt inhibitor. In some aspects, the Nampt inhibitor is APO866.

In yet another aspect, the present disclosure provides a method of inducing cell death in cancer stem cells comprising administering an effective amount of a BCL-2 inhibitor, an effective amount of a hypomethylating agent, and at least one agent that modulates a cellular pathway, wherein the cellular pathway is nicotinamide metabolism. In some aspects, the at least one agent that modulates nicotinamide metabolism can be a Nampt inhibitor. In some aspects, the Nampt inhibitor is APO866.

The present disclosure provides a combination comprising a BCL-2 inhibitor, a hypomethylating agent and at least one agent that modulates a cellular pathway for use in the inducement of cell death in cancer stem cells, wherein the cellular pathway is nicotinamide metabolism, and the BCL-2 inhibitor, the hypomethylating agent and the at least one agent that modulates a cellular pathway are for administration to a subject in need thereof in at least one therapeutically effective amount. The present disclosure provides a BCL-2 inhibitor for use in the inducement of cell death in cancer stem cells, the inducement comprising administering a combination comprising the BCL-2 inhibitor, a hypomethylating agent and at least one agent that modulates a cellular pathway, wherein the cellular pathway is nicotinamide metabolism, and wherein the BCL-2 inhibitor, the hypomethylating agent and the at least one agent that modulates a cellular pathway are for administration to a subject in need thereof in at least one therapeutically effective amount. The present disclosure provides a hypomethylating agent for use in the inducement of cell death in cancer stem cells, the inducement comprising administering a combination comprising a BCL-2 inhibitor, the hypomethylating agent and at least one agent that modulates a cellular pathway, wherein the cellular pathway is nicotinamide metabolism, and wherein the BCL-2 inhibitor, the hypomethylating agent and the at least one agent that modulates a cellular pathway are for administration to a subject in need thereof in at least one therapeutically effective amount. The present disclosure provides at least one agent that modulates a cellular pathway for use in the inducement of cell death in cancer stem cells, the inducement comprising administering a combination comprising a BCL-2 inhibitor, a hypomethylating agent and the at least one agent that modulates a cellular pathway, wherein the cellular pathway is nicotinamide metabolism, and wherein the BCL-2 inhibitor, the hypomethylating agent and the at least one agent that modulates a cellular pathway are for administration to a subject in need thereof in at least one therapeutically effective amount. The present disclosure provides a combination comprising a BCL-2 inhibitor, a hypomethylating agent and at least one agent that modulates a cellular pathway for the manufacture of a medicament for inducing cell death in cancer stem cells, wherein the cellular pathway is nicotinamide metabolism, and wherein the BCL-2 inhibitor, the hypomethylating agent and the at least one agent that modulates a cellular pathway are for administration to a subject in need thereof in at least one therapeutically effective amount. In some aspects, the at least one agent that modulates nicotinamide metabolism can be a Nampt inhibitor. In some aspects, the Nampt inhibitor is APO866

In yet another aspect, the present disclosure provides a method of treating cancer in a subject comprising administering an effective amount of a BCL-2 inhibitor, an effective amount of a hypomethylating agent, and at least one agent that modulates a cellular pathway, wherein the cellular pathway is nicotinamide metabolism. In some aspects, the Nampt inhibitor is APO866.

The present disclosure provides a combination comprising a BCL-2 inhibitor, a hypomethylating agent and at least one agent that modulates a cellular pathway for use in the treatment of cancer in a subject, wherein the cellular pathway is nicotinamide metabolism, and the BCL-2 inhibitor, the hypomethylating agent and the at least one agent that modulates a cellular pathway are for administration to a subject in need thereof in at least one therapeutically effective amount. The present disclosure provides a BCL-2 inhibitor for use in the treatment of cancer in a subject, the treatment comprising administering a combination comprising the BCL-2 inhibitor, a hypomethylating agent and at least one agent that modulates a cellular pathway, wherein the cellular pathway is nicotinamide metabolism, and wherein the BCL-2 inhibitor, the hypomethylating agent and the at least one agent that modulates a cellular pathway are for administration to a subject in need thereof in at least one therapeutically effective amount. The present disclosure provides a hypomethylating agent for use in the treatment of cancer in a subject, the treatment comprising administering a combination comprising a BCL-2 inhibitor, the hypomethylating agent and at least one agent that modulates a cellular pathway, wherein the cellular pathway is nicotinamide metabolism, and wherein the BCL-2 inhibitor, the hypomethylating agent and the at least one agent that modulates a cellular pathway are for administration to a subject in need thereof in at least one therapeutically effective amount. The present disclosure provides at least one agent that modulates a cellular pathway for use in the treatment of cancer in a subject, the treatment comprising administering a combination comprising a BCL-2 inhibitor, a hypomethylating agent and the at least one agent that modulates a cellular pathway, wherein the cellular pathway is nicotinamide metabolism, and wherein the BCL-2 inhibitor, the hypomethylating agent and the at least one agent that modulates a cellular pathway are for administration to a subject in need thereof in at least one therapeutically effective amount. The present disclosure provides a combination comprising a BCL-2 inhibitor, a hypomethylating agent and at least one agent that modulates a cellular pathway for the manufacture of a medicament for treating cancer in a subject, wherein the cellular pathway is nicotinamide metabolism, and wherein the BCL-2 inhibitor, the hypomethylating agent and the at least one agent that modulates a cellular pathway are for administration to a subject in need thereof in at least one therapeutically effective amount. In some aspects, the at least one agent that modulates nicotinamide metabolism can be a Nampt inhibitor. In some aspects, the Nampt inhibitor is APO866

In yet another aspect, the present disclosure provides a method of treating AML in a subject comprising administering an effective amount of a BCL-2 inhibitor, an effective amount of a hypomethylating agent, and at least one agent that modulates a cellular pathway, wherein the cellular pathway is nicotinamide metabolism. In some aspects, the at least one agent that modulates nicotinamide metabolism can be a Nampt inhibitor. In some aspects, the Nampt inhibitor is APO866.

The present disclosure provides a combination comprising a BCL-2 inhibitor, a hypomethylating agent and at least one agent that modulates a cellular pathway for use in the treatment of AML in a subject, wherein the cellular pathway is nicotinamide metabolism, and the BCL-2 inhibitor, the hypomethylating agent and the at least one agent that modulates a cellular pathway are for administration to a subject in need thereof in at least one therapeutically effective amount. The present disclosure provides a BCL-2 inhibitor for use in the treatment of AML in a subject, the treatment comprising administering a combination comprising the BCL-2 inhibitor, a hypomethylating agent and at least one agent that modulates a cellular pathway, wherein the cellular pathway is nicotinamide metabolism, and wherein the BCL-2 inhibitor, the hypomethylating agent and the at least one agent that modulates a cellular pathway are for administration to a subject in need thereof in at least one therapeutically effective amount. The present disclosure provides a hypomethylating agent for use in the treatment of AML in a subject, the treatment comprising administering a combination comprising a BCL-2 inhibitor, the hypomethylating agent and at least one agent that modulates a cellular pathway, wherein the cellular pathway is nicotinamide metabolism, and wherein the BCL-2 inhibitor, the hypomethylating agent and the at least one agent that modulates a cellular pathway are for administration to a subject in need thereof in at least one therapeutically effective amount. The present disclosure provides at least one agent that modulates a cellular pathway for use in the treatment of AML in a subject, the treatment comprising administering a combination comprising a BCL-2 inhibitor, a hypomethylating agent and the at least one agent that modulates a cellular pathway, wherein the cellular pathway is nicotinamide metabolism, and wherein the BCL-2 inhibitor, the hypomethylating agent and the at least one agent that modulates a cellular pathway are for administration to a subject in need thereof in at least one therapeutically effective amount. The present disclosure provides a combination comprising a BCL-2 inhibitor, a hypomethylating agent and at least one agent that modulates a cellular pathway for the manufacture of a medicament for treating AML in a subject, wherein the cellular pathway is nicotinamide metabolism, and wherein the BCL-2 inhibitor, the hypomethylating agent and the at least one agent that modulates a cellular pathway are for administration to a subject in need thereof in at least one therapeutically effective amount. In some aspects, the at least one agent that modulates nicotinamide metabolism can be a Nampt inhibitor. In some aspects, the Nampt inhibitor is APO866

In yet another aspect, the present disclosure provides a method of inducing cell death in cancer stem cells comprising administering an effective amount of a BCL-2 inhibitor and at least one agent that modulates a cellular pathway, wherein the cellular pathway is nicotinamide metabolism. In some aspects, the at least one agent that modulates nicotinamide metabolism can be a Nampt inhibitor. In some aspects, the Nampt inhibitor is APO866.

The present disclosure provides a combination comprising a BCL-2 inhibitor and at least one agent that modulates a cellular pathway for use in the induction of cell death in cancer stem cells, wherein the cellular pathway is nicotinamide metabolism, and wherein the BCL-2 inhibitor and the at least one agent that modulates a cellular pathway are for administration to a subject in need thereof in at least one therapeutically effective amount. The present disclosure provides a BCL-2 inhibitor for use in the inducement of cell death in cancer stem cells, the inducement comprising administering a combination of the BCL-2 inhibitor and at least one agent that modulates a cellular pathway, wherein the cellular pathway is nicotinamide metabolism, and wherein the BCL-2 inhibitor and the at least one agent that modulates a cellular pathway are for administration to a subject in need thereof in at least one therapeutically effective amount. The present disclosure provides at least one agent that modulates a cellular pathway for use in the inducement of cell death in cancer stem cells, the inducement comprising administering a combination of a BCL-2 inhibitor and the at least one agent that modulates a cellular pathway, wherein the cellular pathway is nicotinamide metabolism, and wherein the BCL-2 inhibitor and the at least one agent that modulates a cellular pathway are for administration to a subject in need thereof in at least one therapeutically effective amount. The present disclosure provides a combination comprising a BCL-2 inhibitor and at least one agent that modulates a cellular pathway for the manufacture of a medicament for inducing cell death in cancer stem cells, wherein the cellular pathway is nicotinamide metabolism, and wherein the BCL-2 inhibitor and the at least one agent that modulates a cellular pathway are for administration to a subject in need thereof in at least one therapeutically effective amount. In some aspects, the at least one agent that modulates nicotinamide metabolism can be a Nampt inhibitor. In some aspects, the Nampt inhibitor is APO866.

In yet another aspect, the present disclosure provides a method of treating cancer in a subject comprising administering an effective amount of a BCL-2 inhibitor and at least one agent that modulates a cellular pathway, wherein the cellular pathway is nicotinamide metabolism. In some aspects, the Nampt inhibitor is APO866.

The present disclosure provides a combination comprising a BCL-2 inhibitor and at least one agent that modulates a cellular pathway for use in the treatment of cancer in a subject, wherein the cellular pathway is nicotinamide metabolism, and wherein the BCL-2 inhibitor and the at least one agent that modulates a cellular pathway are for administration to a subject in need thereof in at least one therapeutically effective amount. The present disclosure provides a BCL-2 inhibitor for use in the treatment of cancer in a subject, the treatment comprising administering a combination of the BCL-2 inhibitor and at least one agent that modulates a cellular pathway, wherein the cellular pathway is nicotinamide metabolism, and wherein the BCL-2 inhibitor and the at least one agent that modulates a cellular pathway are for administration to a subject in need thereof in at least one therapeutically effective amount. The present disclosure provides at least one agent that modulates a cellular pathway for use in the treatment of cancer in a subject, the treatment comprising administering a combination of a BCL-2 inhibitor and the at least one agent that modulates a cellular pathway, wherein the cellular pathway is nicotinamide metabolism, and wherein the BCL-2 inhibitor and the at least one agent that modulates a cellular pathway are for administration to a subject in need thereof in at least one therapeutically effective amount. The present disclosure provides a combination comprising a BCL-2 inhibitor and at least one agent that modulates a cellular pathway for the manufacture of a medicament for treating cancer in a subject, wherein the cellular pathway is nicotinamide metabolism, and wherein the BCL-2 inhibitor and the at least one agent that modulates a cellular pathway are for administration to a subject in need thereof in at least one therapeutically effective amount. In some aspects, the at least one agent that modulates nicotinamide metabolism can be a Nampt inhibitor. In some aspects, the Nampt inhibitor is APO866.

In yet another aspect, the present disclosure provides a method of treating AML in a subject comprising administering an effective amount of a BCL-2 inhibitor and at least one agent that modulates a cellular pathway, wherein the cellular pathway is nicotinamide metabolism. In some aspects, the at least one agent that modulates nicotinamide metabolism can be a Nampt inhibitor. In some aspects, the Nampt inhibitor is APO866.

The present disclosure provides a combination comprising a BCL-2 inhibitor and at least one agent that modulates a cellular pathway for use in the treatment of AML in a subject, wherein the cellular pathway is nicotinamide metabolism, and wherein the BCL-2 inhibitor and the at least one agent that modulates a cellular pathway are for administration to a subject in need thereof in at least one therapeutically effective amount. The present disclosure provides a BCL-2 inhibitor for use in the treatment of AML in a subject, the treatment comprising administering a combination of the BCL-2 inhibitor and at least one agent that modulates a cellular pathway, wherein the cellular pathway is nicotinamide metabolism, and wherein the BCL-2 inhibitor and the at least one agent that modulates a cellular pathway are for administration to a subject in need thereof in at least one therapeutically effective amount. The present disclosure provides at least one agent that modulates a cellular pathway for use in the treatment of AML in a subject, the treatment comprising administering a combination of a BCL-2 inhibitor and the at least one agent that modulates a cellular pathway, wherein the cellular pathway is nicotinamide metabolism, and wherein the BCL-2 inhibitor and the at least one agent that modulates a cellular pathway are for administration to a subject in need thereof in at least one therapeutically effective amount. The present disclosure provides a combination comprising a BCL-2 inhibitor and at least one agent that modulates a cellular pathway for the manufacture of a medicament for treating AML in a subject, wherein the cellular pathway is nicotinamide metabolism, and wherein the BCL-2 inhibitor and the at least one agent that modulates a cellular pathway are for administration to a subject in need thereof in at least one therapeutically effective amount. In some aspects, the at least one agent that modulates nicotinamide metabolism can be a Nampt inhibitor. In some aspects, the Nampt inhibitor is APO866.

APO866 can be administered intravenously or subcutaneously. APO866 can be administered at a concentration of about 0.126 mg/m$^2$/hr for about 4 consecutive days (about 96 hours) about every 3 weeks for a total of about 3 cycles.

In another aspect, the present disclosure provides a method of inducing cell death in cancer stem cells comprising administering an effective amount of venetoclax and an effective amount of etomoxir.

The present disclosure provides a combination comprising venetoclax and etomoxir for use in the inducement of cell death in cancer stem cells, wherein the venetoclax and the etomoxir are for administration to a subject in need thereof in at least one therapeutically effective amount. The present disclosure provides venetoclax for use in the inducement of cell death in cancer stem cells, the inducement comprising administering a combination of the venetoclax and etomoxir, wherein the venetoclax and the etomoxir are for administration to a subject in need thereof in at least one therapeutically effective amount. The present disclosure provides etomoxir for use in the inducement of cell death in cancer stem cells, the inducement comprising administering a combination of venetoclax and the etomoxir, wherein the venetoclax and the etomoxir are for administration to a subject in need thereof in at least one therapeutically effective amount. The present disclosure provides a combination comprising venetoclax and etomoxir for the manufacture of a medicament for inducing cell death in cancer stem cells, wherein the venetoclax and the etomoxir are for administration to a subject in need thereof in at least one therapeutically effective amount.

In another aspect, the present disclosure provides a method of inducing cell death in cancer stems cells comprising administering an effective amount of azacitidine and an effective amount of etomoxir.

The present disclosure provides a combination comprising azacitidine and etomoxir for use in the inducement of cell death in cancer stem cells, wherein the azacitidine and the etomoxir are for administration to a subject in need thereof in at least one therapeutically effective amount. The present disclosure provides azacitidine for use in the inducement of cell death in cancer stem cells, the inducement comprising administering a combination of the azacitidine and etomoxir, wherein the azacitidine and the etomoxir are for administration to a subject in need thereof in at least one therapeutically effective amount. The present disclosure provides etomoxir for use in the inducement of cell death in cancer stem cells, the inducement comprising administering a combination of azacitidine and the etomoxir, wherein the azacitidine and the etomoxir are for administration to a subject in need thereof in at least one therapeutically effective amount. The present disclosure provides a combination comprising azacitidine and etomoxir for the manufacture of a medicament for inducing cell death in cancer stem cells, wherein the azacitidine and the etomoxir are for administration to a subject in need thereof in at least one therapeutically effective amount.

In another aspect, the present disclosure provides a method of inducing cell death in cancer stem cells comprising administering an effective amount of venetoclax, an effective amount of azacitidine and an effective amount of etomoxir.

The present disclosure provides a combination comprising venetoclax, azacitidine and etomoxir for use in the inducement of cell death in cancer stem cells, wherein the venetoclax, azacitidine and etomoxir are for administration to a subject in need thereof in at least one therapeutically effective amount. The present disclosure provides venetoclax for use in the inducement of cell death in cancer stem cells, the inducement comprising administering a combination of venetoclax, azacitidine and etomoxir, wherein the venetoclax, azacitidine and etomoxir are for administration to a subject in need thereof in at least one therapeutically effective amount. The present disclosure provides azacitidine for use in the inducement of cell death in cancer stem cells, the inducement comprising administering a combination of venetoclax, azacitidine and etomoxir, wherein the venetoclax, azacitidine and etomoxir are for administration to a subject in need thereof in at least one therapeutically effective amount. The present disclosure provides etomoxir for use in the inducement of cell death in cancer stem cells, the inducement comprising administering a combination of venetoclax, azacitidine and etomoxir, wherein the venetoclax, azacitidine and etomoxir are for administration to a subject in need thereof in at least one therapeutically effective amount. The present disclosure provides a combination comprising venetoclax, azacitidine and etomoxir for the manufacture of a medicament for inducing cell death in cancer stem cells, wherein the venetoclax, azacitidine and etomoxir are for administration to a subject in need thereof in at least one therapeutically effective amount.

In another aspect, the present disclosure provides a method of treating cancer in a subject comprising administering an effective amount of venetoclax and an effective amount of etomoxir.

The present disclosure provides a combination comprising venetoclax and etomoxir for use in the treatment of cancer in a subject, wherein the venetoclax and the etomoxir are for administration to a subject in need thereof in at least one therapeutically effective amount. The present disclosure provides venetoclax for use in the treatment of cancer in a subject, the treatment comprising administering a combination of the venetoclax and etomoxir, wherein the venetoclax and the etomoxir are for administration to a subject in need thereof in at least one therapeutically effective amount. The present disclosure provides etomoxir for use in the treatment of cancer in a subject, the treatment comprising administering a combination of venetoclax and the etomoxir, wherein the venetoclax and the etomoxir are for administration to a subject in need thereof in at least one therapeutically effective amount. The present disclosure provides a combination comprising venetoclax and etomoxir for the manufacture of a medicament for treating cancer in a subject, wherein the venetoclax and the etomoxir are for administration to a subject in need thereof in at least one therapeutically effective amount.

In another aspect, the present disclosure provides a method of treating cancer in a subject comprising administering an effective amount of azacitidine and an effective amount of etomoxir.

The present disclosure provides a combination comprising azacitidine and etomoxir for use in the treatment of cancer in a subject, wherein the azacitidine and the etomoxir are for administration to a subject in need thereof in at least one therapeutically effective amount. The present disclosure provides azacitidine for use in the treatment of cancer in a subject, the treatment comprising administering a combination of the azacitidine and etomoxir, wherein the azacitidine and the etomoxir are for administration to a subject in need thereof in at least one therapeutically effective amount. The present disclosure provides etomoxir for use in the treatment of cancer in a subject, the treatment comprising administering a combination of azacitidine and the etomoxir, wherein the azacitidine and the etomoxir are for administration to a subject in need thereof in at least one therapeutically effective amount. The present disclosure provides a combination comprising azacitidine and etomoxir for the manufacture of a medicament for treating cancer in a subject, wherein the azacitidine and the etomoxir are for administration to a subject in need thereof in at least one therapeutically effective amount.

In another aspect, the present disclosure provides a method of treating cancer in a subject comprising administering an effective amount of venetoclax, an effective amount of azacitidine and an effective amount of etomoxir.

The present disclosure provides a combination comprising venetoclax, azacitidine and etomoxir for use in the treatment of cancer in a subject, wherein the venetoclax, azacitidine and etomoxir are for administration to a subject in need thereof in at least one therapeutically effective amount. The present disclosure provides venetoclax for use in the treatment of cancer in a subject, the treatment comprising administering a combination of venetoclax, azacitidine and etomoxir, wherein the venetoclax, azacitidine and etomoxir are for administration to a subject in need thereof in at least one therapeutically effective amount. The present disclosure provides azacitidine for use in the treatment of cancer in a subject, the treatment comprising administering a combination of venetoclax, azacitidine and etomoxir, wherein the venetoclax, azacitidine and etomoxir are for administration to a subject in need thereof in at least one therapeutically effective amount. The present disclosure provides etomoxir for use in the treatment of cancer in a subject, the treatment comprising administering a combination of venetoclax, azacitidine and etomoxir, wherein the venetoclax, azacitidine and etomoxir are for administration to a subject in need thereof in at least one therapeutically effective amount. The present disclosure provides a combination comprising venetoclax, azacitidine and etomoxir for the manufacture of a medicament for treating cancer in a subject, wherein the venetoclax, azacitidine and etomoxir are for administration to a subject in need thereof in at least one therapeutically effective amount.

In another aspect, the present disclosure provides a method of treating AML in a subject comprising administering an effective amount of venetoclax and an effective amount of etomoxir.

The present disclosure provides a combination comprising venetoclax and etomoxir for use in the treatment of AML in a subject, wherein the venetoclax and the etomoxir are for administration to a subject in need thereof in at least one therapeutically effective amount. The present disclosure provides venetoclax for use in the treatment of AML in a subject, the treatment comprising administering a combination of the venetoclax and etomoxir, wherein the venetoclax and the etomoxir are for administration to a subject in need thereof in at least one therapeutically effective amount. The present disclosure provides etomoxir for use in the treatment of AML in a subject, the treatment comprising administering a combination of venetoclax and the etomoxir, wherein the venetoclax and the etomoxir are for administration to a subject in need thereof in at least one therapeutically effective amount. The present disclosure provides a combination comprising venetoclax and etomoxir for the manufacture of a medicament for treating AML in a subject, wherein the venetoclax and the etomoxir are for administration to a subject in need thereof in at least one therapeutically effective amount.

In another aspect, the present disclosure provides a method of treating AML in a subject comprising administering an effective amount of azacitidine and an effective amount of etomoxir.

The present disclosure provides a combination comprising azacitidine and etomoxir for use in the treatment of AML in a subject, wherein the azacitidine and the etomoxir are for administration to a subject in need thereof in at least one therapeutically effective amount. The present disclosure provides azacitidine for use in the treatment of AML in a subject, the treatment comprising administering a combination of the azacitidine and etomoxir, wherein the azacitidine and the etomoxir are for administration to a subject in need thereof in at least one therapeutically effective amount. The present disclosure provides etomoxir for use in the treatment of AML in a subject, the treatment comprising administering a combination of azacitidine and the etomoxir, wherein the azacitidine and the etomoxir are for administration to a subject in need thereof in at least one therapeutically effective amount. The present disclosure provides a combination comprising azacitidine and etomoxir for the manufacture of a medicament for treating AML in a subject, wherein the azacitidine and the etomoxir are for administration to a subject in need thereof in at least one therapeutically effective amount.

In another aspect, the present disclosure provides a method of treating AML in a subject comprising administering an effective amount of venetoclax, an effective amount of azacitidine and an effective amount of etomoxir.

The present disclosure provides a combination comprising venetoclax, azacitidine and etomoxir for use in the treatment of AML in a subject, wherein the venetoclax, azacitidine and etomoxir are for administration to a subject in need thereof in at least one therapeutically effective amount. The present disclosure provides venetoclax for use in the treatment of AML in a subject, the treatment comprising administering a combination of venetoclax, azacitidine and etomoxir, wherein the venetoclax, azacitidine and etomoxir are for administration to a subject in need thereof in at least one therapeutically effective amount. The present disclosure provides azacitidine for use in the treatment of AML in a subject, the treatment comprising administering a combination of venetoclax, azacitidine and etomoxir, wherein the venetoclax, azacitidine and etomoxir are for administration to a subject in need thereof in at least one therapeutically effective amount. The present disclosure provides etomoxir for use in the treatment of AML in a subject, the treatment comprising administering a combination of venetoclax, azacitidine and etomoxir, wherein the venetoclax, azacitidine and etomoxir are for administration to a subject in need thereof in at least one therapeutically effective amount. The present disclosure provides a combination comprising venetoclax, azacitidine and etomoxir for the manufacture of a medicament for treating AML in a subject, wherein the venetoclax, azacitidine and etomoxir are for administration to a subject in need thereof in at least one therapeutically effective amount.

In another aspect, the present disclosure provides a method of inducing cell death in cancer stem cells comprising administering an effective amount of a BCL-2 inhibitor, an effective amount of a hypomethylating agent and an effective amount of etomoxir.

The present disclosure provides a combination comprising a BCL-2 inhibitor, a hypomethylating agent and etomoxir for use in the inducement of cell death in cancer stem cells, wherein the BCL-2 inhibitor, the hypomethylating agent and the etomoxir are for administration to a subject in need thereof in at least one therapeutically effective amount. The present disclosure provides a BCL-2 inhibitor for use in the inducement of cell death in cancer stem cells, the inducement comprising administering a combination comprising the BCL-2 inhibitor, a hypomethylating agent and etomoxir, wherein the BCL-2 inhibitor, the hypomethylating agent and the etomoxir are for administration to a subject in need thereof in at least one therapeutically effective amount. The present disclosure provides a hypomethylating agent for use in the inducement of cell death in cancer stem cells, the inducement comprising administering a combination comprising the a BCL-2 inhibitor, the hypomethylating agent and etomoxir, wherein the BCL-2 inhibitor, the hypomethylating agent and the etomoxir are for administration to a subject in need thereof in at least one therapeutically effective amount. The present disclosure provides etomoxir for use in the inducement of cell death in cancer stem cells, the inducement comprising administering a combination comprising the a BCL-2 inhibitor, a hypomethylating agent and etomoxir, wherein the BCL-2 inhibitor, the hypomethylating agent and the etomoxir are for administration to a subject in need thereof in at least one therapeutically effective amount. The present disclosure provides a combination comprising a BCL-2 inhibitor, a hypomethylating agent and etomoxir for the manufacture of a medicament for inducing cell death in cancer stem cells, wherein the BCL-2 inhibitor, the hypomethylating agent and the etomoxir are for administration to a subject in need thereof in at least one therapeutically effective amount.

In another aspect, the present disclosure provides a method of treating cancer in a subject comprising administering an effective amount of a BCL-2 inhibitor, an effective amount of a hypomethylating agent and an effective amount of etomoxir.

The present disclosure provides a combination comprising a BCL-2 inhibitor, a hypomethylating agent and etomoxir for use in the treatment of cancer in a subject, wherein the BCL-2 inhibitor, the hypomethylating agent and the etomoxir are for administration to a subject in need thereof in at least one therapeutically effective amount. The present disclosure provides a BCL-2 inhibitor for use in the i treatment of cancer in a subject, the treatment comprising administering a combination comprising the BCL-2 inhibitor, a hypomethylating agent and etomoxir, wherein the BCL-2 inhibitor, the hypomethylating agent and the etomoxir are for administration to a subject in need thereof in at least one therapeutically effective amount. The present disclosure provides a hypomethylating agent for use in the treatment of cancer in a subject, the treatment comprising administering a combination comprising the a BCL-2 inhibitor, the hypomethylating agent and etomoxir, wherein the BCL-2 inhibitor, the hypomethylating agent and the etomoxir are for administration to a subject in need thereof in at least one therapeutically effective amount. The present disclosure provides etomoxir for use in the treatment of cancer in a subject, the treatment comprising administering a combination comprising a BCL-2 inhibitor, a hypomethylating agent and etomoxir, wherein the BCL-2 inhibitor, the hypomethylating agent and the etomoxir are for administration to a subject in need thereof in at least one therapeutically effective amount. The present disclosure provides a combination comprising a BCL-2 inhibitor, a hypomethylating agent and etomoxir for the manufacture of a medicament for treating cancer in a subject, wherein the BCL-2 inhibitor, the hypomethylating agent and the etomoxir are for administration to a subject in need thereof in at least one therapeutically effective amount.

In another aspect, the present disclosure provides a method of treating AML in a subject comprising administering an effective amount of a BCL-2 inhibitor, an effective amount of a hypomethylating agent and an effective amount of etomoxir.

The present disclosure provides a combination comprising a BCL-2 inhibitor, a hypomethylating agent and etomoxir for use in the treatment of AML in a subject, wherein the BCL-2 inhibitor, the hypomethylating agent and the etomoxir are for administration to a subject in need thereof in at least one therapeutically effective amount. The present disclosure provides a BCL-2 inhibitor for use in the treatment of AML in a subject, the treatment comprising administering a combination comprising the BCL-2 inhibitor, a hypomethylating agent and etomoxir, wherein the BCL-2 inhibitor, the hypomethylating agent and the etomoxir are for administration to a subject in need thereof in at least one therapeutically effective amount. The present disclosure provides a hypomethylating agent for use in the treatment of AML in a subject, the treatment comprising administering a combination comprising a BCL-2 inhibitor, the hypomethylating agent and etomoxir, wherein the BCL-2 inhibitor, the hypomethylating agent and the etomoxir are for administration to a subject in need thereof in at least one therapeutically effective amount. The present disclosure provides etomoxir for use in the treatment of AML in a subject, the treatment comprising administering a combination comprising a BCL-2 inhibitor, a hypomethylating agent and etomoxir, wherein the BCL-2 inhibitor, the hypomethylating agent and the etomoxir are for administration to a subject in need thereof in at least one therapeutically effective amount. The present disclosure provides a combination comprising a BCL-2 inhibitor, a hypomethylating agent and etomoxir for the manufacture of a medicament for treating AML in a subject, wherein the BCL-2 inhibitor, the hypomethylating agent and the etomoxir are for administration to a subject in need thereof in at least one therapeutically effective amount.

In another aspect, the present disclosure provides a method of inducing cell death in cancer stem cells comprising administering an effective amount of a BCL-2 and an effective amount of etomoxir.

The present disclosure provides a combination comprising a BCL-2 inhibitor and etomoxir for use in the inducement of cell death in cancer stem cells, wherein the BCL-2 inhibitor and the etomoxir are for administration to a subject in need thereof in at least one therapeutically effective amount. The present disclosure provides a BCL-2 inhibitor for use in the inducement of cell death in cancer stem cells, the inducement comprising administering a combination comprising the BCL-2 inhibitor and etomoxir, wherein the BCL-2 inhibitor and the etomoxir are for administration to a subject in need thereof in at least one therapeutically effective amount. The present disclosure provides etomoxir for use in the inducement of cell death in cancer stem cells, the inducement comprising administering a combination comprising a BCL-2 inhibitor and etomoxir, wherein the BCL-2 inhibitor and the etomoxir are for administration to a subject in need thereof in at least one therapeutically effective amount. The present disclosure provides a combination comprising a BCL-2 inhibitor and etomoxir for the manufacture of a medicament for inducing cell death in cancer stem cells, wherein the BCL-2 inhibitor and the etomoxir are for administration to a subject in need thereof in at least one therapeutically effective amount.

In another aspect, the present disclosure provides a method of treating cancer in a subject comprising administering an effective amount of a BCL-2 inhibitor and an effective amount of etomoxir.

The present disclosure provides a combination comprising a BCL-2 inhibitor and etomoxir for use in the treatment of cancer in a subject, wherein the BCL-2 inhibitor and the etomoxir are for administration to a subject in need thereof in at least one therapeutically effective amount. The present disclosure provides a BCL-2 inhibitor for use in the treatment of cancer in a subject, the treatment comprising administering a combination comprising the BCL-2 inhibitor and etomoxir, wherein the BCL-2 inhibitor and the etomoxir are for administration to a subject in need thereof in at least one therapeutically effective amount. The present disclosure provides etomoxir for use in the treatment of cancer in a subject, the treatment comprising administering a combination comprising a BCL-2 inhibitor and etomoxir, wherein the BCL-2 inhibitor and the etomoxir are for administration to a subject in need thereof in at least one therapeutically effective amount. The present disclosure provides a combination comprising a BCL-2 inhibitor and etomoxir for the manufacture of a medicament for treating cancer in a subject, wherein the BCL-2 inhibitor and the etomoxir are for administration to a subject in need thereof in at least one therapeutically effective amount.

In another aspect, the present disclosure provides a method of treating AML in a subject comprising administering an effective amount of a BCL-2 inhibitor and an effective amount of etomoxir.

The present disclosure provides a combination comprising a BCL-2 inhibitor and etomoxir for use in the treatment of AML in a subject, wherein the BCL-2 inhibitor and the etomoxir are for administration to a subject in need thereof in at least one therapeutically effective amount. The present disclosure provides a BCL-2 inhibitor for use in the treatment of AML in a subject, the treatment comprising administering a combination comprising the BCL-2 inhibitor and etomoxir, wherein the BCL-2 inhibitor and the etomoxir are for administration to a subject in need thereof in at least one therapeutically effective amount. The present disclosure provides etomoxir for use in the treatment of AML in a subject, the treatment comprising administering a combination comprising a BCL-2 inhibitor and etomoxir, wherein the BCL-2 inhibitor and the etomoxir are for administration to a subject in need thereof in at least one therapeutically effective amount. The present disclosure provides a combination comprising a BCL-2 inhibitor and etomoxir for the manufacture of a medicament for treating AML in a subject, wherein the BCL-2 inhibitor and the etomoxir are for administration to a subject in need thereof in at least one therapeutically effective amount.

In methods of the present disclosure, etomoxir may be administered orally. In methods of the present disclosure, etomoxir may be administered intravenously. In methods of the present disclosure, etomoxir may be administered subcutaneously. In methods of the present disclosure, etomoxir may be administered by injection. In methods of the present disclosure can be administered orally at in an amount of about 10 mg, or about 15 mg, or about 20 mg, or about 25 mg, about 30 mg, or about 35 mg, or about 40 mg, or about 45 mg, or about 50 mg, or about 55 mg, or about 60 mg, or about 65 mg, or about 70 mg, or about 75 mg, or about 80 mg, or about 85 mg, or about 90 mg, or about 95 mg, or about 100 mg, or about 105 mg, or about 110 mg daily, or about 115 mg, or about 120 mg, or about 125 mg, or about 130 mg, or about 135 mg, or about 140 mg, or about 145 mg, or about 150 mg, or about 160 mg, or about 170 mg, or about 180 mg, or about 190 mg, or about 200 mg daily.

The methods of inducing cell death in cancer stem cells of the present disclosure may be used for the treatment of a subject having cancer. The methods of inducing cell death in cancer stem cells of the present disclosure may be used for the treatment of a subject having a cancer that has relapsed. The methods of inducing cell death in cancer stem cells of the present disclosure may be used for the treatment of a subject having a cancer that has failed to respond to an initial treatment.

In some aspects of the methods of the present disclosure, venetoclax may be substituted by any other BCL-2 inhibitor that is known in the art. In some aspects of the methods of the present disclosure, azacitidine may be substituted by any other hypomethylating agent known in the art.

Definitions

The terms "eradicating" and "reducing" are used in the broadest sense to refer to reduction in the number of cancer stem cells present in a population of cells. The reduction can be about a 5%, or about a 10%, or about a 20%, or about a 30%, or about a 40%, or about a 50%, or about a 60%, or about a 70%, or about an 80%, or about a 90%, or about a 95%, or about a 99% reduction in the number of cancer stem cells present in a population of cells.

The phrase "inducing cell death" is used in the broadest sense to refer to the stimulation of any form of cell death, including but not limited to apoptosis, autophagy, Type I cell-death, Type II cell-death, necrosis, necroptosis, macroautophagy, anoikis, cornification, excitotoxicity, ferroptosis, activation-induced cell death, ischemic cell death, oncosis, pyroptosis, or any combination therefore.

The term "metabolism modulating agent" is used in its broadest sense to refer to any compound, agent, medicament, drug, or pharmaceutical composition that directly or indirectly stimulates any change in the basal metabolism, metabolic pathways and/or levels of metabolites of a target cell. Metabolic pathways can include, but are not limited to, amino acid catabolism, cellular respiration, oxidative phosphorylation, glycolysis, fatty acid oxidation, fatty acid metabolism, electron transport chain (ETC) complex I activity, ETC complex II activity, ETC complex III activity, ETC complex IV activity, the tricarboxylic acid (TCA) cycle, amino acid uptake, any catabolic pathway, any anabolic pathway, and amphibolic pathway, catabolism, anabolism, glucoeneogenesis, glycogenolysis, glycogenesis, the urea cycle, amino transferase pathways, acetyl coA synthesis pathways, pentose phosphate pathway, fructolysis, galactolysis, glycosylation, beta oxidation, fatty acid degradation, fatty acid synthesis, steroid metabolism, sphingolipid metabolism, eicosanoid metabolism, ketosis, reverse cholesterol transport, glutamine/glutamate catabolism, asparagine/aspartate catabolism, alanine catabolism, arginine, ornithine and proline catabolism, serine catabolism, threonine catabolism, glycine catabolism, cysteine catabolism, methionine catabolism, leucine, isoleucine and valine catabolism, phenylalanine and tyrosine catabolism, lysine catabolism, histidine catabolism, tryptophan catabolism, or any combination thereof.

One skilled in the art can measure a change in the basal metabolism, metabolic pathways, or metabolite levels using methods known in the art. In a non-limiting example, global metabolic profiling can be performed using UHPLC-MS metabolomics to analyze changes in specific metabolite levels before and after treatment with a metabolism modulating agent. In another non-limiting example, metabolic flux in a cell can be measured using stable isotope labeling studies. In another non-limiting example, amino acid uptake can be measured using uptake assays comprising stable isotope labeled amino acids. In another non-limiting example, oxygen consumption can be measured using the standard "Seahorse Assay". In another non-limiting example, ETC complex II activity can be measured using the standard Complex II Activity Assay. One skilled in the art can also measure changes in basal metabolism, metabolic pathways, or metabolite levels using standard gene and protein expression assays known in the art to determine the upregulation or downregulation of certain metabolic pathways. These standard gene and protein expression assays include, but are not limited to, RNA-seq, microarrays, western blot, and mass spectrometry.

The term "metabolism modulating agent" is used in its broadest sense to refer to any compound, agent, medicament, drug, or pharmaceutical composition that directly or indirectly stimulates any change in the basal metabolism, metabolic pathways and/or levels of metabolites of a target cell. Metabolic pathways can include, but are not limited to, amino acid catabolism, cellular respiration, oxidative phosphorylation, glycolysis, fatty acid oxidation, fatty acid metabolism, electron transport chain (ETC) complex II activity, the tricarboxylic acid (TCA) cycle, amino acid uptake, any catabolic pathway, any anabolic pathway, any amphibolic pathway, catabolism, anabolism, glucoeneogenesis, glycogenolysis, glycogenesis, the urea cycle, amino transferase pathways, acetyl coA synthesis pathways, pentose phosphate pathway, fructolysis, galactolysis, glycosylation, beta oxidation, fatty acid degradation, fatty acid synthesis, steroid metabolism, sphingolipid metabolism, eicosanoid metabolism, ketosis, reverse cholesterol transport, glutamine/glutamate catabolism, asparagine/aspartate catabolism, alanine catabolism, arginine, ornithine and proline catabolism, serine catabolism, threonine catabolism, glycine catabolism, cysteine catabolism, methionine catabolism, leucine, isoleucine and valine catabolism, phenylalanine and tyrosine catabolism, lysine catabolism, histidine catabolism, tryptophan catabolism, or any combination thereof.

One skilled in the art can measure a change in the basal metabolism, metabolic pathways, or metabolite levels using methods known in the art. In a non-limiting example, global metabolic profiling can be performed using UHPLC-MS metabolomics to analyze changes in specific metabolite levels before and after treatment with a metabolism modulating agent. In another non-limiting example, metabolic flux in a cell can be measured using stable isotope labeling studies. In another non-limiting example, amino acid uptake can be measured using uptake assays comprising stable isotope labeled amino acids. In another non-limiting example, oxygen consumption can be measured using the standard "Seahorse Assay". In another non-limiting example, ETC complex II activity can be measured using the standard Complex II Activity Assay. One skilled in the art can also measure changes in basal metabolism, metabolic pathways, or metabolite levels using standard gene and protein expression assays known in the art to determine the upregulation or downregulation of certain metabolic pathways. These standard gene and protein expression assays include, but are not limited to, RNA-seq, microarrays, western blot, and mass spectrometry.

The term "agent that modulates a cellular pathway" is used in its broadest sense to refer to any compound, agent, medicament, drug, or pharmaceutical composition that directly or indirectly stimulates any change in the basal activity of a particular cellular pathway in a target cell. These pathways can include, but are not limited to, signaling pathways, metabolic pathways, gene expression pathways, transport pathways, nuclear transport pathways, cell growth pathways, cell differentiation pathways, motility pathways, and cell death pathways. One skilled in the art can measure a change in the basal activity of a cellular pathway using methods known in the art, including, but not limited to, mass spectrometry, PCR, RNA-seq, western blot, ribosome profiling, secretion assays, MTT assay, immunostaining and flow cytometry.

The terms "effective amount" and "therapeutically effective amount" of an agent or compound are used in the broadest sense to refer to a nontoxic but sufficient amount of an active agent or compound to provide the desired effect or benefit.

The term "benefit" is used in the broadest sense and refers to any desirable effect and specifically includes clinical benefit as defined herein. Clinical benefit can be measured by assessing various endpoints, e.g., inhibition, to some extent, of disease progression, including slowing down and complete arrest; reduction in the number of disease episodes and/or symptoms; reduction in lesion size; inhibition (i.e., reduction, slowing down or complete stopping) of disease cell infiltration into adjacent peripheral organs and/or tissues; inhibition (i.e. reduction, slowing down or complete stopping) of disease spread; decrease of auto-immune response, which may, but does not have to, result in the regression or ablation of the disease lesion; relief, to some extent, of one or more symptoms associated with the disorder; increase in the length of disease-free presentation following treatment, e.g., progression-free survival; increased overall survival; higher response rate; and/or decreased mortality at a given point of time following treatment.

The terms "cancer" and "cancerous" refer to or describe the physiological condition in mammals that is typically characterized by unregulated cell growth. Included in this definition are benign and malignant cancers. Examples of cancer include but are not limited to, carcinoma, lymphoma, blastoma, sarcoma, and leukemia. More particular examples of such cancers include adrenocortical carcinoma, bladder urothelial carcinoma, breast invasive carcinoma, cervical squamous cell carcinoma, endocervical adenocarcinoma, cholangiocarcinoma, colon adenocarcinoma, lymphoid neoplasm diffuse large B-cell lymphoma, esophageal carcinoma, glioblastoma multiforme, head and neck squamous cell carcinoma, kidney chromophobe, kidney renal clear cell carcinoma, kidney renal papillary cell carcinoma, acute myeloid leukemia, brain lower grade glioma, liver hepatocellular carcinoma, lung adenocarcinoma, lung squamous cell carcinoma, mesothelioma, ovarian serous cystadenocarcinoma, pancreatic adenocarcinoma, pheochromocytoma, paraganglioma, prostate adenocarcinoma, rectum adenocarcinoma, sarcoma, skin cutaneous melanoma, stomach adenocarcinoma, testicular germ cell tumors, thyroid carcinoma, thymoma, uterine carcinosarcoma, uveal melanoma. Other examples include breast cancer, lung cancer, lymphoma, melanoma, liver cancer, colorectal cancer, ovarian cancer, bladder cancer, renal cancer or gastric cancer. Further examples of cancer include neuroendocrine cancer, non-small cell lung cancer (NSCLC), small cell lung cancer, thyroid cancer, endometrial cancer, biliary cancer, esophageal cancer, anal cancer, salivary, cancer, vulvar cancer or cervical cancer.

The term "tumor" refers to all neoplastic cell growth and proliferation, whether malignant or benign, and all precancerous and cancerous cells and tissues. The terms "cancer," "cancerous," "cell proliferative disorder," "proliferative disorder" and "tumor" are not mutually exclusive as referred to herein.

In the methods and uses of the present disclosure that involve the administration of more than one agent, compound and/or drug, the agents, compounds and/or drugs can be administered to a subject concomitantly or sequentially. In a non-limiting example, in methods and uses of the present disclosure that involve two agents, a first agent and a second agent, the first agent and the second agent can be administered to a subject concomitantly, the first agent can be administered prior to the administration of the second agent, or the second agent can be administered prior to the administration of the first agent. When administered sequentially, there can be any amount of time elapsed in between the administration of the first agent and the administration of the second agent. In another non-limiting example, in methods and uses of the present disclosure that involve three agents, a first agent, a second agent and a third agent, the first agent, the second agent and the third agent can be administered concomitantly or sequentially. All three agents can be administered concomitantly. Two of the agents can be administered concomitantly while the other agent is administered before or after the administration of the two agents. The agents can be administered in any order with any amount of time elapsed in between administration of any of the two agents.

As used in this Specification and the appended claims, the singular forms "a," "an" and "the" include plural referents unless the context clearly dictates otherwise.

Unless specifically stated or obvious from context, as used herein, the term "or" is understood to be inclusive and covers both "or" and "and".

Unless specifically stated or obvious from context, as used herein, the term "about" is understood as within a range of normal tolerance in the art, for example within 2 standard deviations of the mean. About can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Unless defined otherwise, all technical and scientific terms used herein have the same meaning as commonly understood by one of ordinary skill in the art to which the invention pertains. Although other probes, compositions, methods, and kits similar, or equivalent, to those described herein can be used in the practice of the present disclosure, the preferred materials and methods are described herein. It is to be understood that the terminology used herein is for the purpose of describing particular aspects only, and is not intended to be limiting.

Any of the above aspects and embodiments can be combined with any other aspect or embodiment as disclosed here in the Summary and/or Detailed Description sections.

EXAMPLES

Example 1—Global Metabolic Profiling of LSCs

To identify metabolic vulnerabilities of LSCs, global metabolic profiling of reactive oxygen species (ROS)-low LSCs compared to the ROS-high AML blasts cells from fifteen primary AML specimens was performed using mass spectrometry. LSCs were isolated from primary human AML specimens by labeling cells with CellROX, a reactive oxygen species-sensitive probe, and then selecting the cells with the 20% lowest ROS levels based on the CellROX fluorescence. LSCs exhibit low ROS levels as compared to mature AML blasts, which are ROS-high.

Figure 1:
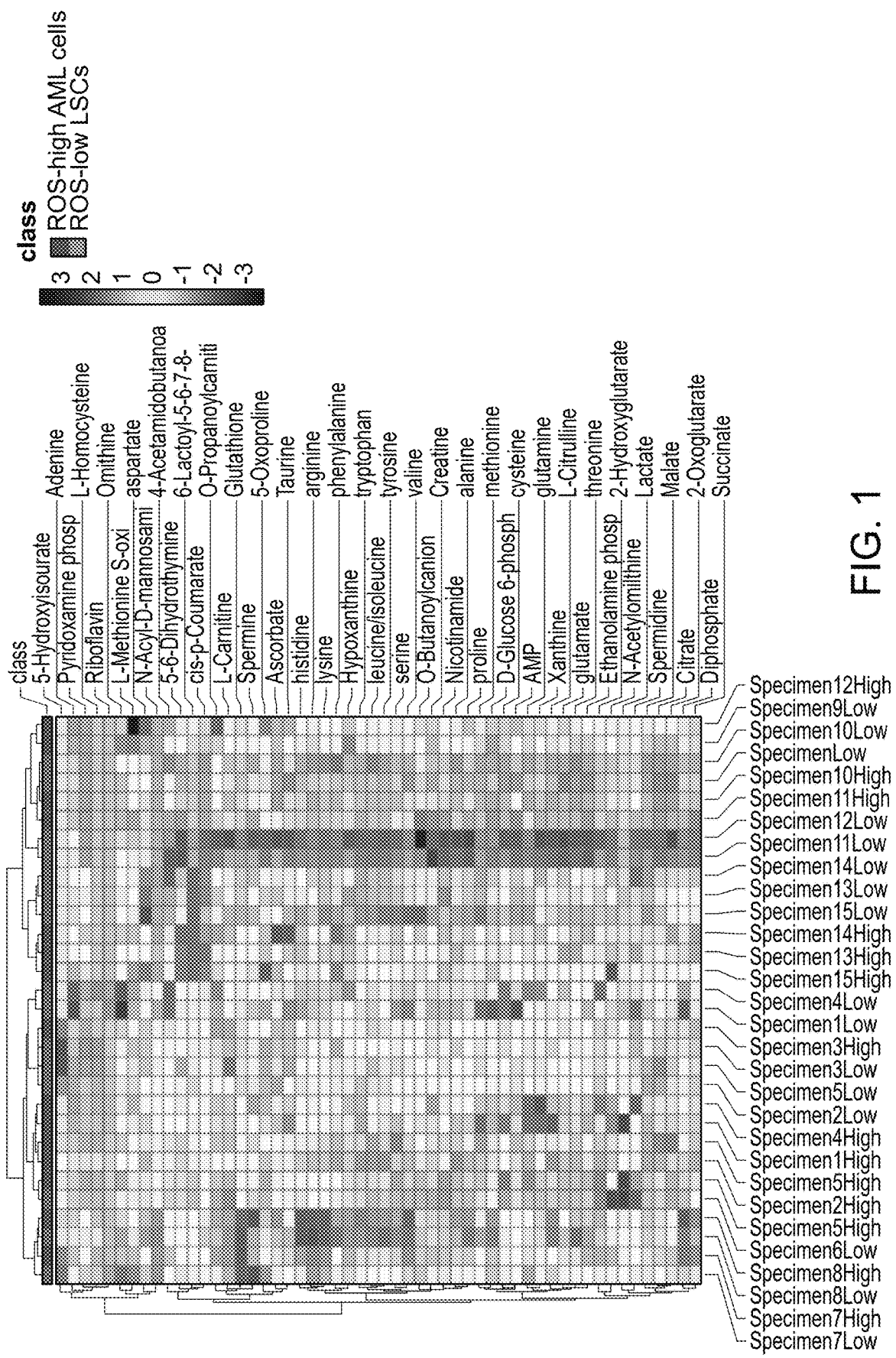
FIG. 1 is a heatmap of the top 50 individual metabolites in ROS-low LSCs (Green) and ROS-high cells (Red) ranked by p-value.
Figure 2:
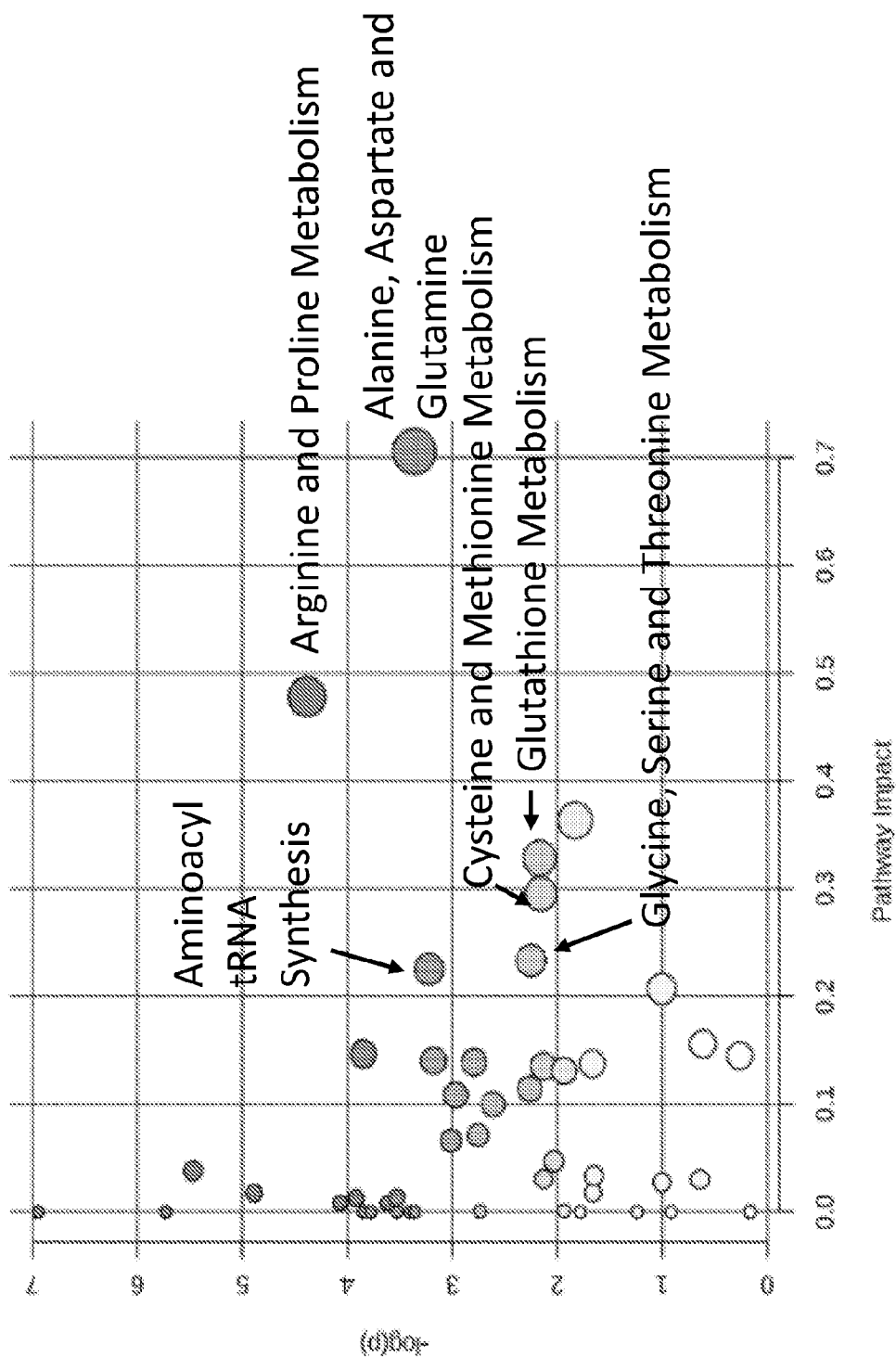
FIG. 2 is a chart showing the pathway analysis of metabolites with differential abundance in ROS-low LSCs and ROS-high AML blasts determined using Metaboanalyst.

As shown in FIG. 1, approximately 100 metabolites were reliably detected in the global metabolic profiling experiment. Principle component analysis revealed that the metabolome of ROS-low LSCs and ROS-high AML blasts was largely similar, with heterogeneity among different patient samples being greater than the differences between ROS-low and ROS-high cells. Thirty-nine metabolites were significantly increased in ROS-low LSCs compared to ROS-high AML blasts, including 16 amino acids, five glutathione homeostasis metabolites, and two TCA cycle intermediates. These 39 metabolites are listed in Table 3. The 39 metabolites fall into metabolic pathways that are all related to amino acid metabolism. As shown in FIG. 2, further pathway analysis revealed that the metabolic pathways involving amino acid metabolism were significantly enriched in ROS-low LSCs compared ROS-high AML blasts. Consistent with this analysis, total amino acids were significantly differentially abundant between ROS-low LSCs and ROS-high blasts.

TABLE 3

Metabolites significantly increased in ROS-low LSCs

| Metabolite | Metabolite |
| --- | --- |
| Alanine | Nicotinamide |
| Ornithine | Proline |
| Histidine | Methionine |
| Lysine | N-acetylornithine |
| Serine | L-Citrulline |
| Leucine/isoleucine | Adenine |
| glutamine | 5-6-dihydrothymine |
| Tryptophan | Creatine |
| 5-oxoproline | L-methionine s-oxide |
| Threonine | Glutamate |
| Phenylalanine | Hypoxanthine |
| Tyrosine | Cis-p-coumarate |
| Arginine | Taurine |
| Aspartate | Glutathione |
| Xanthine | Malate |
| Valine | L-Carnitine |
| Ethanolamine phosphate | Riboflavin |
| O-Propanoylcarnitine | Diphosphate |
| Ascorbate | 6-lactoyl-5-6-7-8-tetrahydropterin |
| Citrate | |

Example 2—Amino Acid Uptake and Metabolism in LSCs

Figure 3:
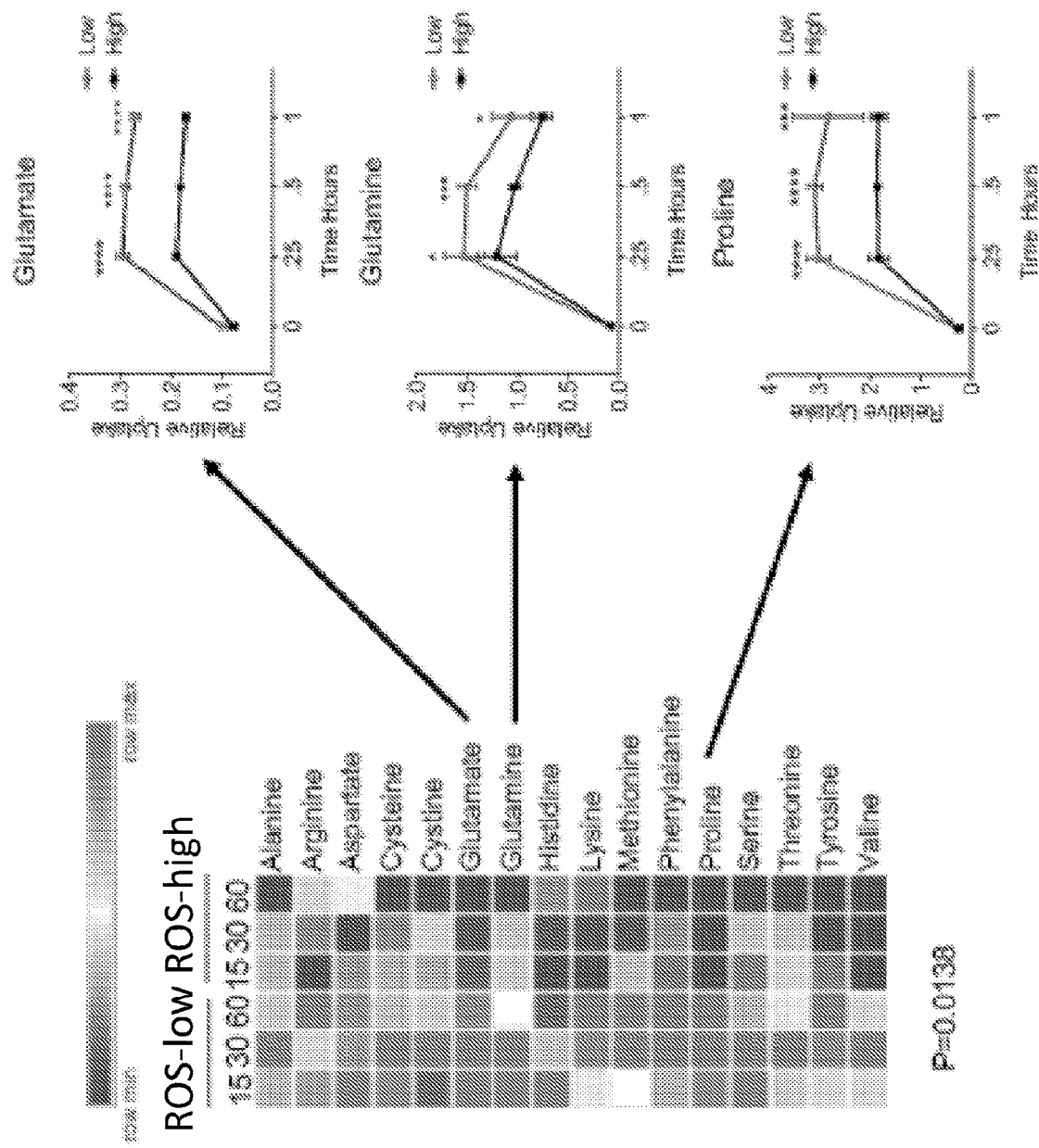
FIG. 3 is a heatmap and series of charts showing amino acid uptake in ROS-low LSCs and ROS-high blasts after a 15, 30, or 60-minute pulse with stable isotope-labeled amino acids.
Figure 4:
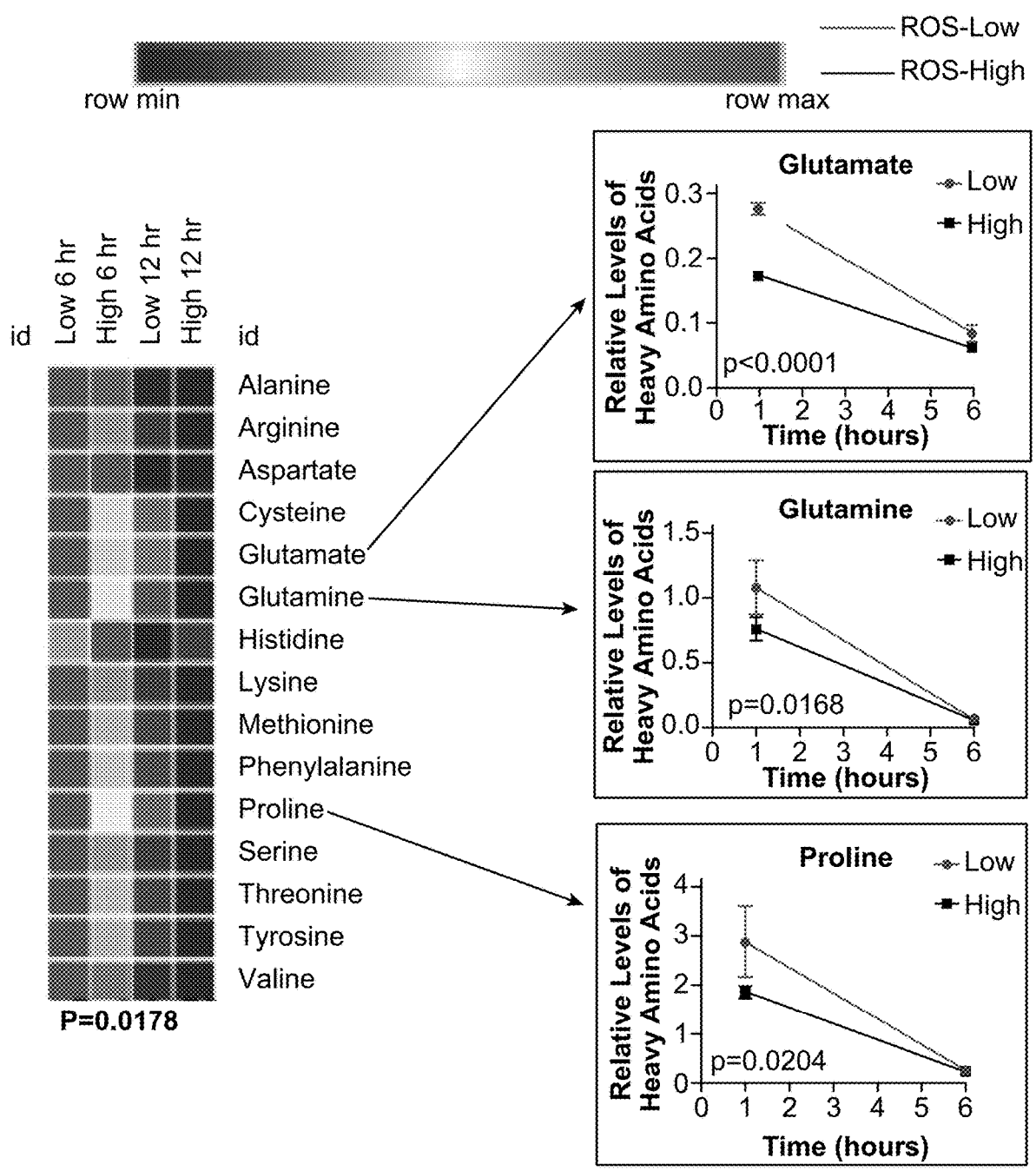
FIG. 4 is a heatmap and a series of charts showing amino acid metabolism in ROS-low LSCs and ROS-high blasts isolated from patients after a 6-hour or 12-hour washout of stable isotope-labeled amino acids.

The uptake of stable isotope labeled amino acids and subsequent metabolism was measured in cultured ROS-low LSCs and ROS-high AML, blasts. As shown in FIG. 3, analysis of amino acid levels at 15, 30, and 60 minutes following exposure to isotope labeled reagents showed significantly faster uptake of amino acids in ROS-low LSCs compared to ROS-high cells. This was particularly evident for glutamine and glutamate, amino acids that have a role in glutathione and alpha-ketoglutarate synthesis. Increased levels of proline uptake by LSCs was also highly significant. Proline and glutamine are interconvertible amino acids underscoring the importance of glutamine metabolism in LSCs. Upon removal of heavy amino acids from the culture media, amino acid metabolism was analyzed. As shown in FIG. 4, significantly higher percentage of amino acid utilization in the ROS-low LSCs was observed, especially glutamine, glutamate and proline utilization. These findings demonstrate that amino acid metabolism is substantially more active in the ROS-low population and indicate that LSCs depend on glutamine, glutamate and proline metabolism.

Example 3—Amino Acid Metabolism is Functionally Relevant for LSC Survival

Figure 5:
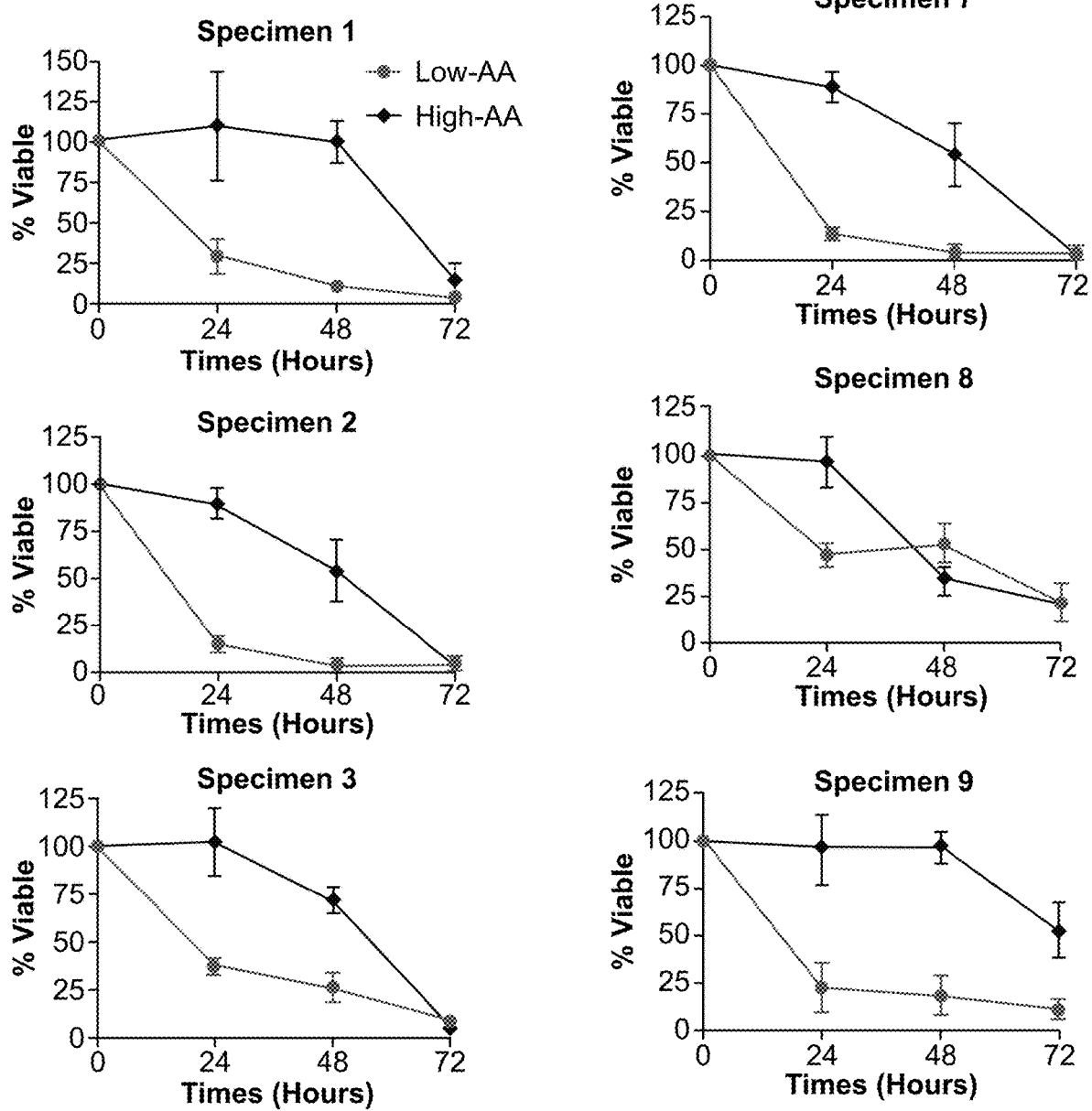
FIG. 5 is a series of charts showing the viability of ROS-low LSCs (red line) and ROS-high cells (black line) after culturing without amino acids for 24, 48, and 72 hours.

To determine if amino acid metabolism is functionally relevant for LSC survival, the cell viability and colony-forming potential of ROS-low LSCs and ROS-high AML, cells after 24-72 hours of culture without amino acids was measured. As shown in FIG. 5, a significant decrease in ROS-low LSC viability after 24 hours of amino acid depletion, normalized to control amino acid containing media, was observed. Conversely, ROS-high cells were not substantially affected by amino acid deprivation until 72 hours in culture. These data indicate the amino acid metabolism is preferentially important for ROS-low LSCs, and also indicates that the mechanism by which amino acid depletions negatively impacts ROS-low LSCs may be different than ROS-high AML cells.

Figure 6:
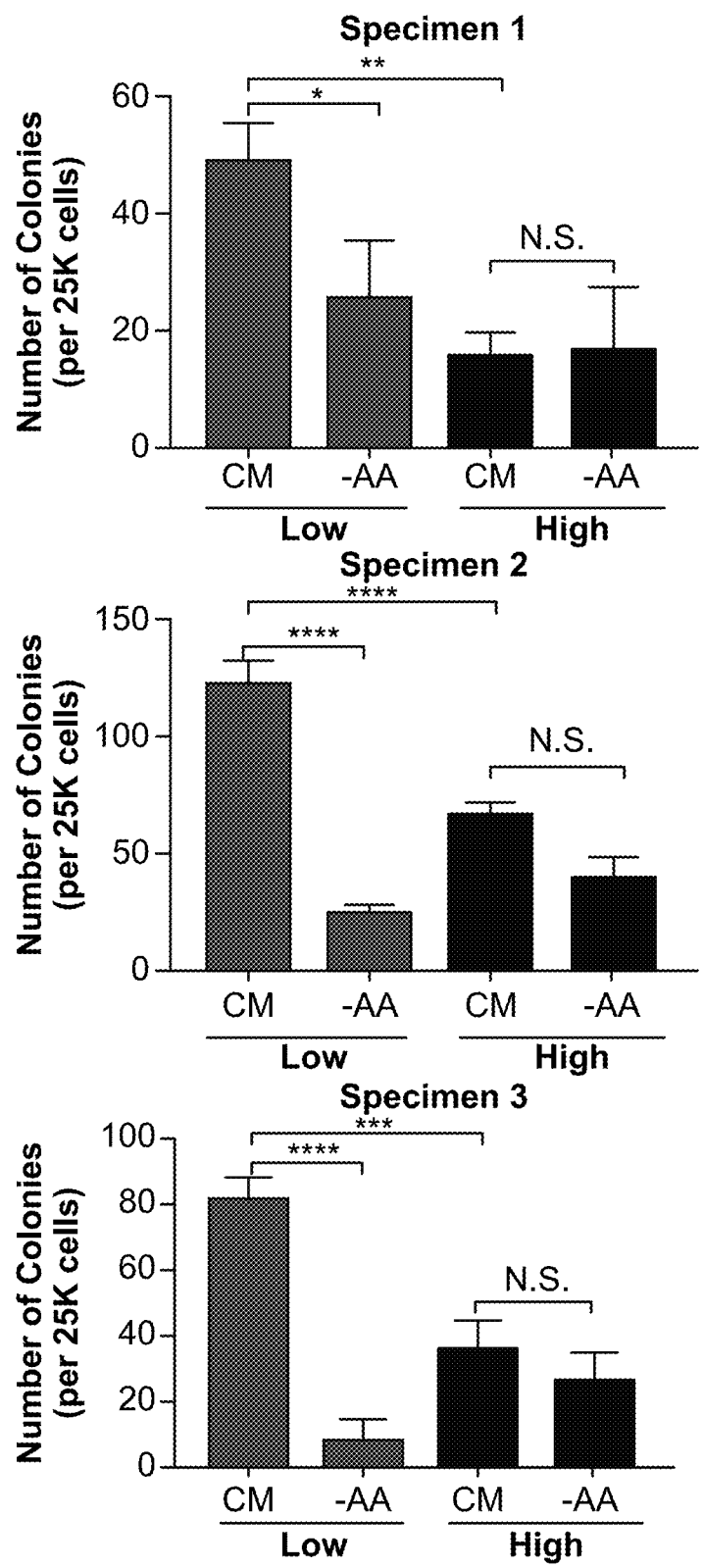
FIG. 6 is a series of charts showing the colony-forming ability of ROS-low LSCs (red or left two bars) and ROS-high cells (black or right two bars) after culturing with or without amino acids for 24 hours.

Colony-forming potential, a measure of leukemic progenitor cells, was assessed in cells deprived of amino acids. As shown in FIG. 6, ROS-high blasts have significantly less colony-forming potential compared to ROS-low LSCs. This result is consistent with the enrichment of AML stem/progenitor cells in the ROS-low compartment. FIG. 6 also shows that amino acid depletion decreased colony formation of ROS-low LSCs but had no significant effect on the colony forming ability of ROS-high blasts.

Figure 7:
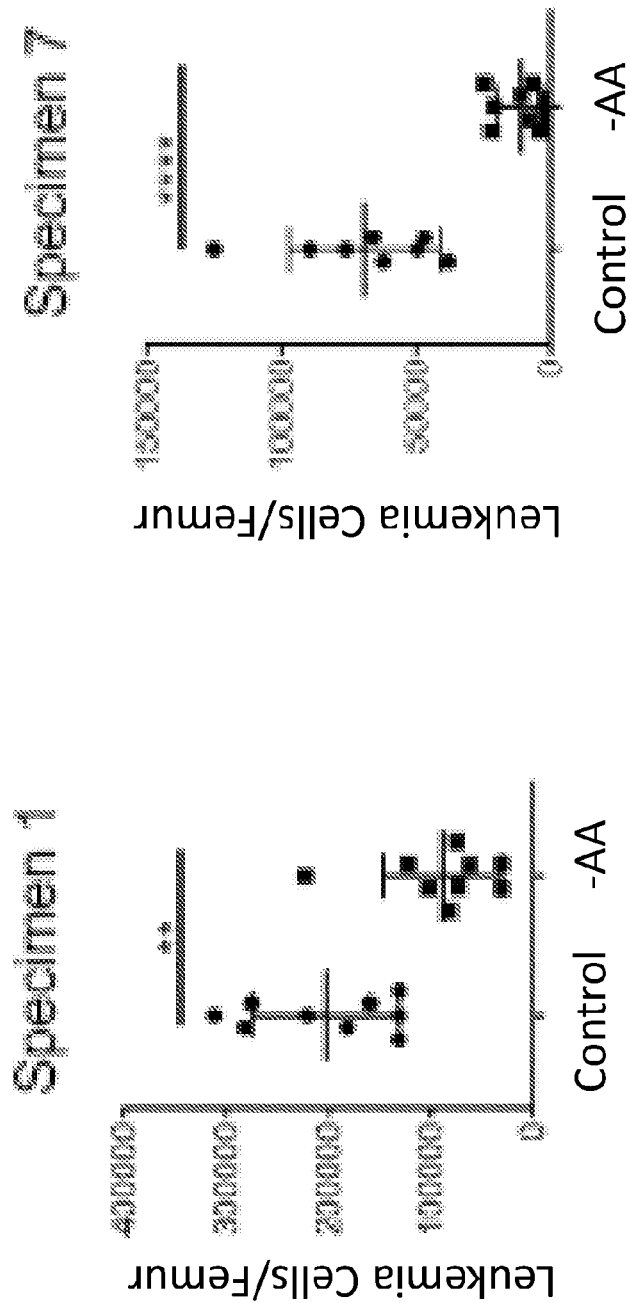
FIG. 7 is a series of charts showing the engraftment of unsorted primary AML cells after culturing with or without amino acids for 24 hours. Each dot represents the leukemia cells/femur of an individual animal. Graphs represent the mean+/−StDev. Statistical analysis was performed using two-way ANOVA and two-tailed Student's t-test where applicable. p<0.01, **p<0.001.

To confirm that amino acid depletion targets the LSC compartment, the ability of primary AML specimens to engraft into immune deficient NSG-S mice after being cultured with or without amino acids was measured. After 24 hours of culture without amino acids, a 15% and 34% decrease in bulk leukemia cell viability in samples 1 and 7 respectively. Upon transplantation of these cells into NSG-S mice, a significant decrease in engraftment for cells cultured without amino acids was observed as shown in FIG. 7, indicating that amino acid depletion directly targets functionally-defined LSCs. The primary xenograft model employed here is the gold standard assay for determining functional LSCs and importantly does not rely on any phenotypic or metabolic selection of LSCs.

Example 4—LSCs are Uniquely Dependent on Amino Acids for Survival

To determine the relative importance of amino acids for LSCs, cell viability and colony-forming potential of ROS-low and ROS-high cells upon depletion of other metabolites was measured.

Figure 8:
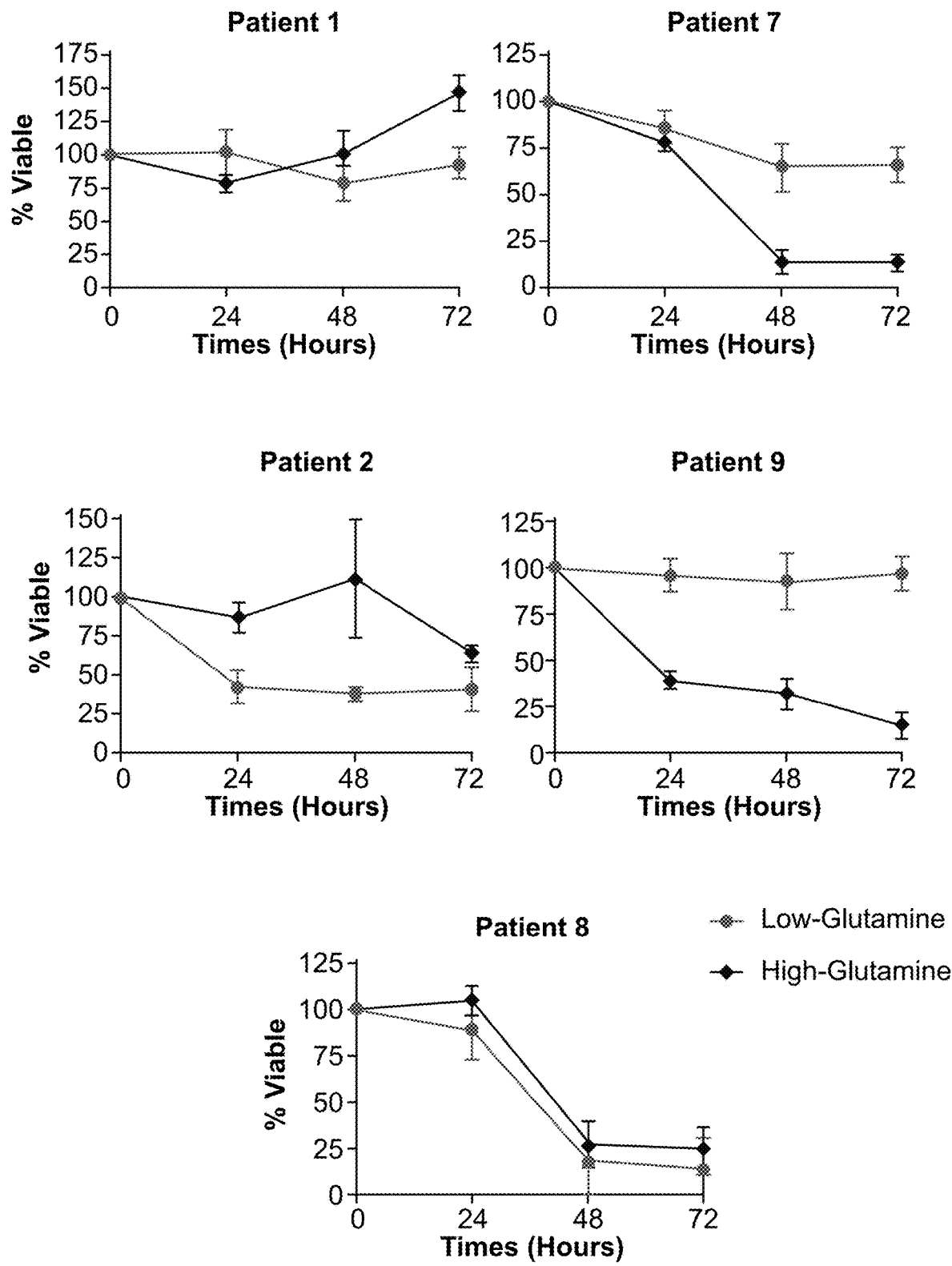
FIG. 8 is a series of charts showing the viability of ROS-low LSCs and ROS-high blasts after culturing without glutamine for 24, 48, and 72 hours (top) and colony-forming ability of ROS-low LSCs and ROS-high blasts after culturing without glutamine for 24 hours (bottom). Statistical analysis was performed using two-way Anova. p<0.01, **p<0.001.
Figure 8:
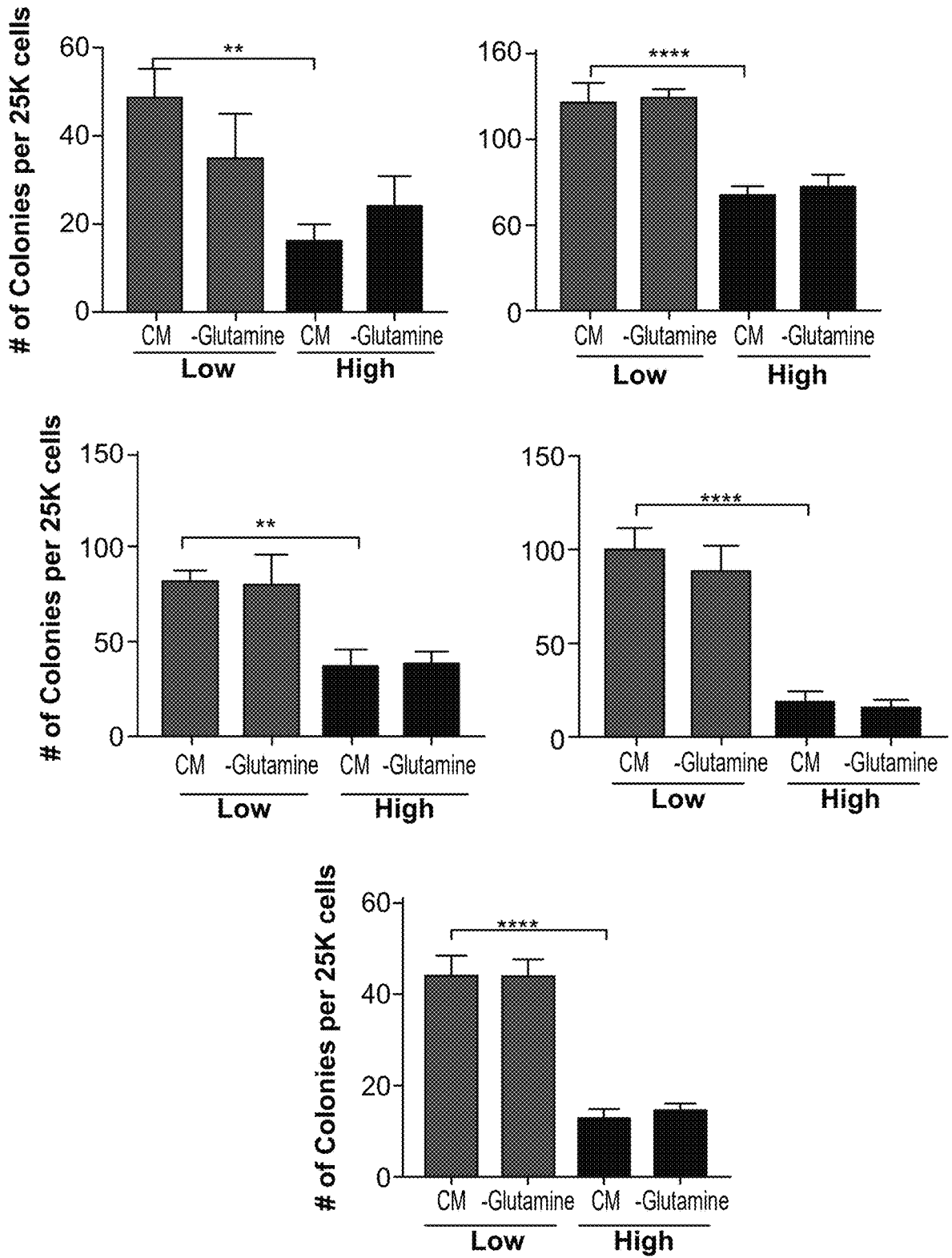

Since glutamine was taken up and metabolized at particularly high rates in ROS-low LSCs, the effect of glutamine depletion alone on LSC viability and colony forming potential was measured. As shown in FIG. 8, glutamine depletion did not affect the viability or colony forming potential of ROS-low LSCs and had a minimal impact on ROS-high cells in a subset of patient samples. Compensation from other metabolites, such as proline, likely contributes to this result.

Figure 9:
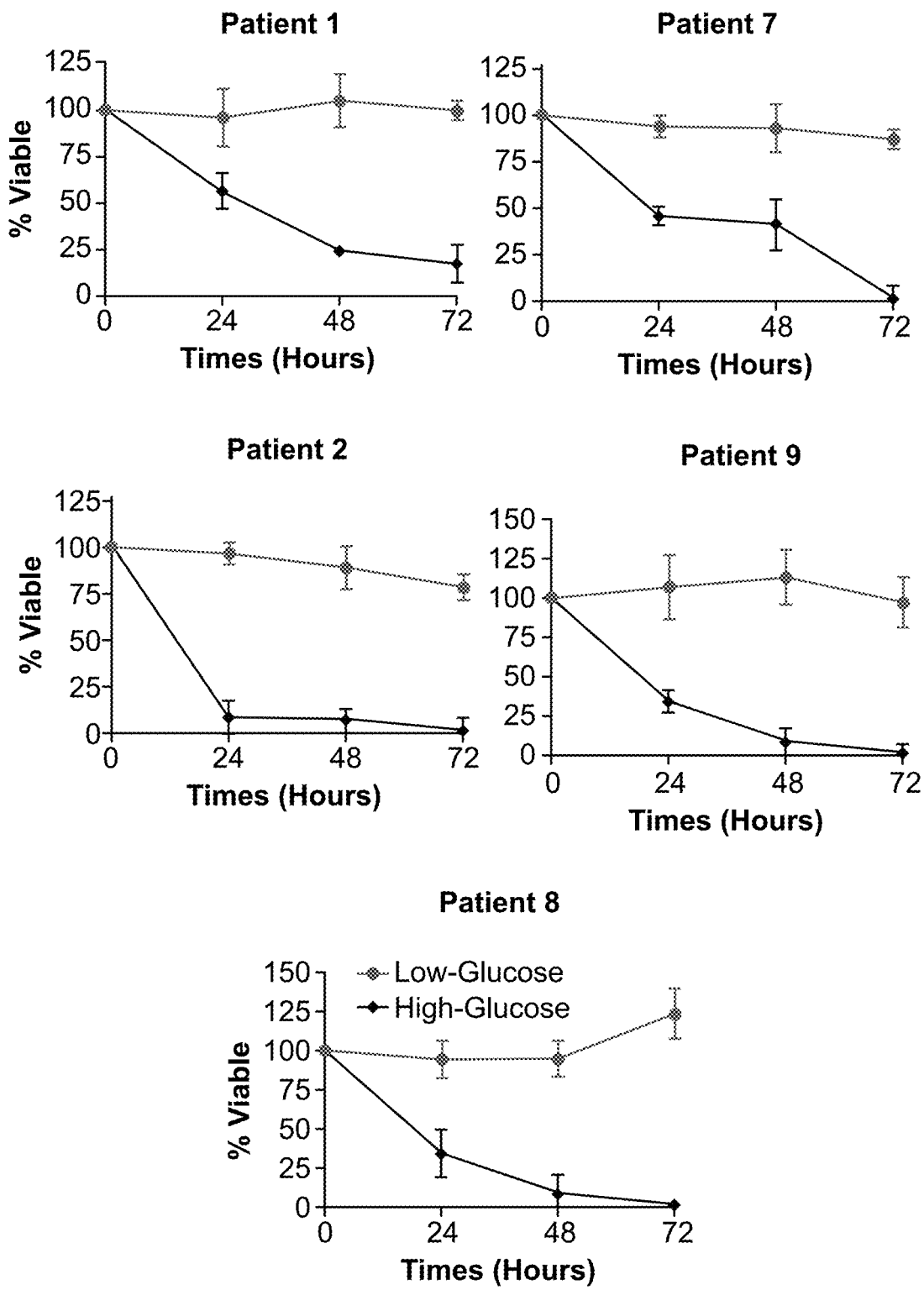
FIG. 9 is a series of charts showing the viability of ROS-low LSCs and ROS-high blasts after culturing without glucose for 24, 48, and 72 hours (top) and the colony-forming ability of ROS-low LSCs and ROS-high blasts after culturing without glucose for 24 hours (bottom). Statistical analysis was performed using two-way Anova. p<0.01, *p<0.005, ****p<0.001.
Figure 9:
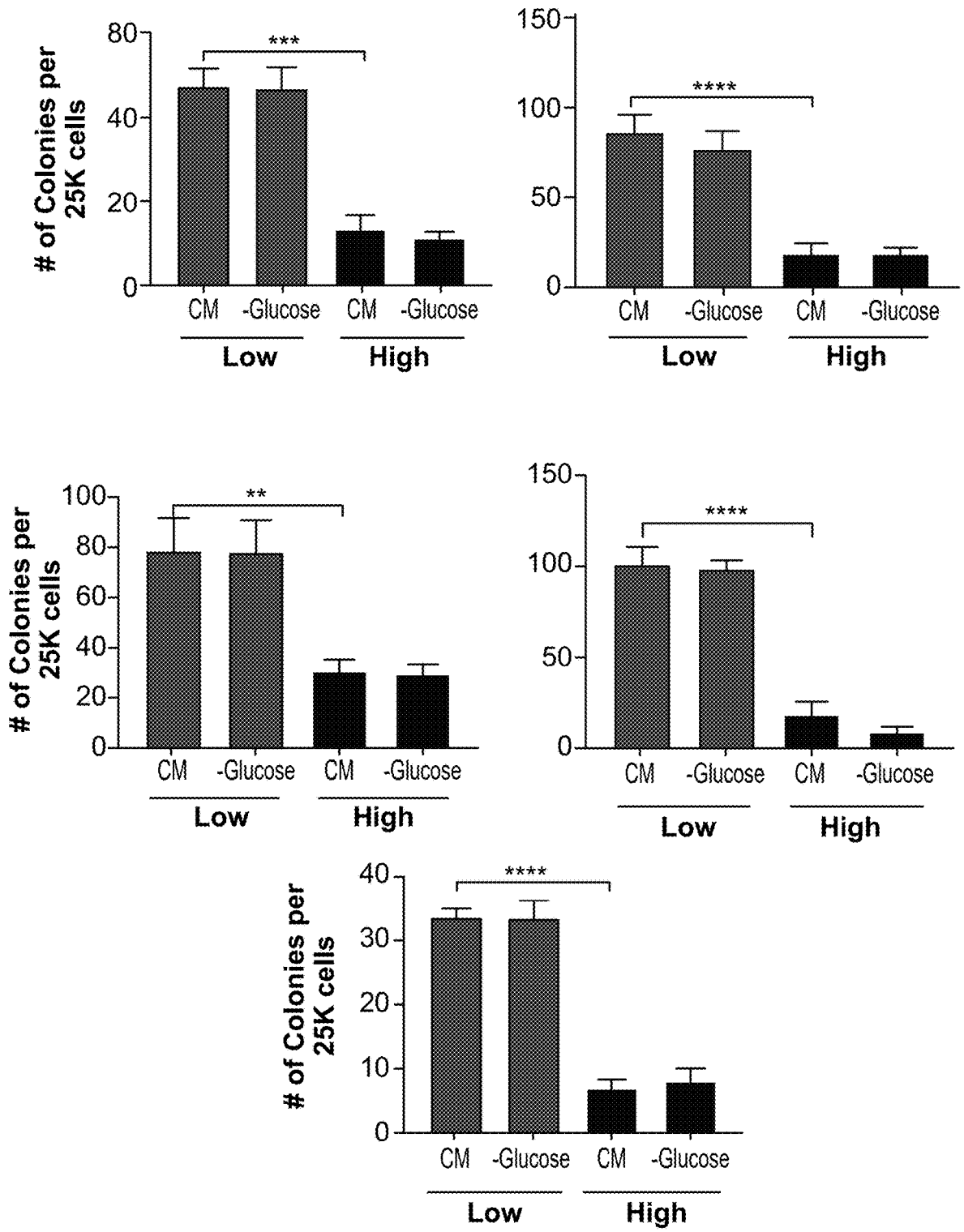

Glucose is one of the main metabolic fuels for many cancer cells; therefore, the effect of glucose deprivation on LSCs was measured. As shown in FIG. 9, glucose depletion did not affect the viability or colony forming potential of the ROS-low LSCs while ROS-high cells were highly dependent on glucose. This indicates a fundamental difference in energy metabolism mechanisms between primitive cells that are ROS-low vs. bulk tumor cells that are ROS-high.

Figure 10:
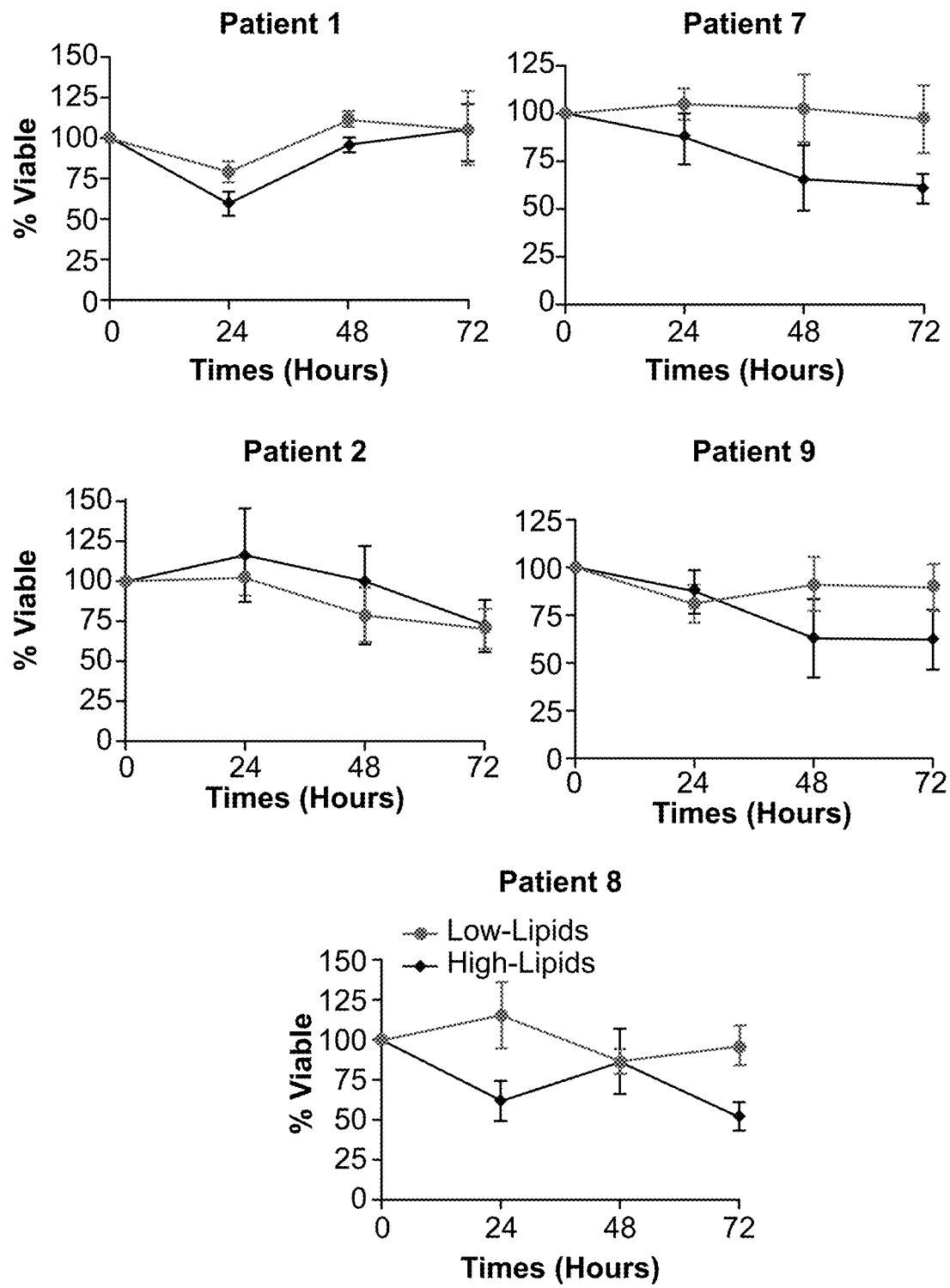
FIG. 10 is a series of charts showing the viability of ROS-low LSCs and ROS-high blasts after culturing without lipids for 24, 48 and 72 hours (top) and the colony forming ability of ROS-low LSCs and ROS-high blasts after culturing without lipids for 24 hours (bottom). Statistical analysis was performed using two-way Anova. *p<0.005, **p<0.001.
Figure 10:
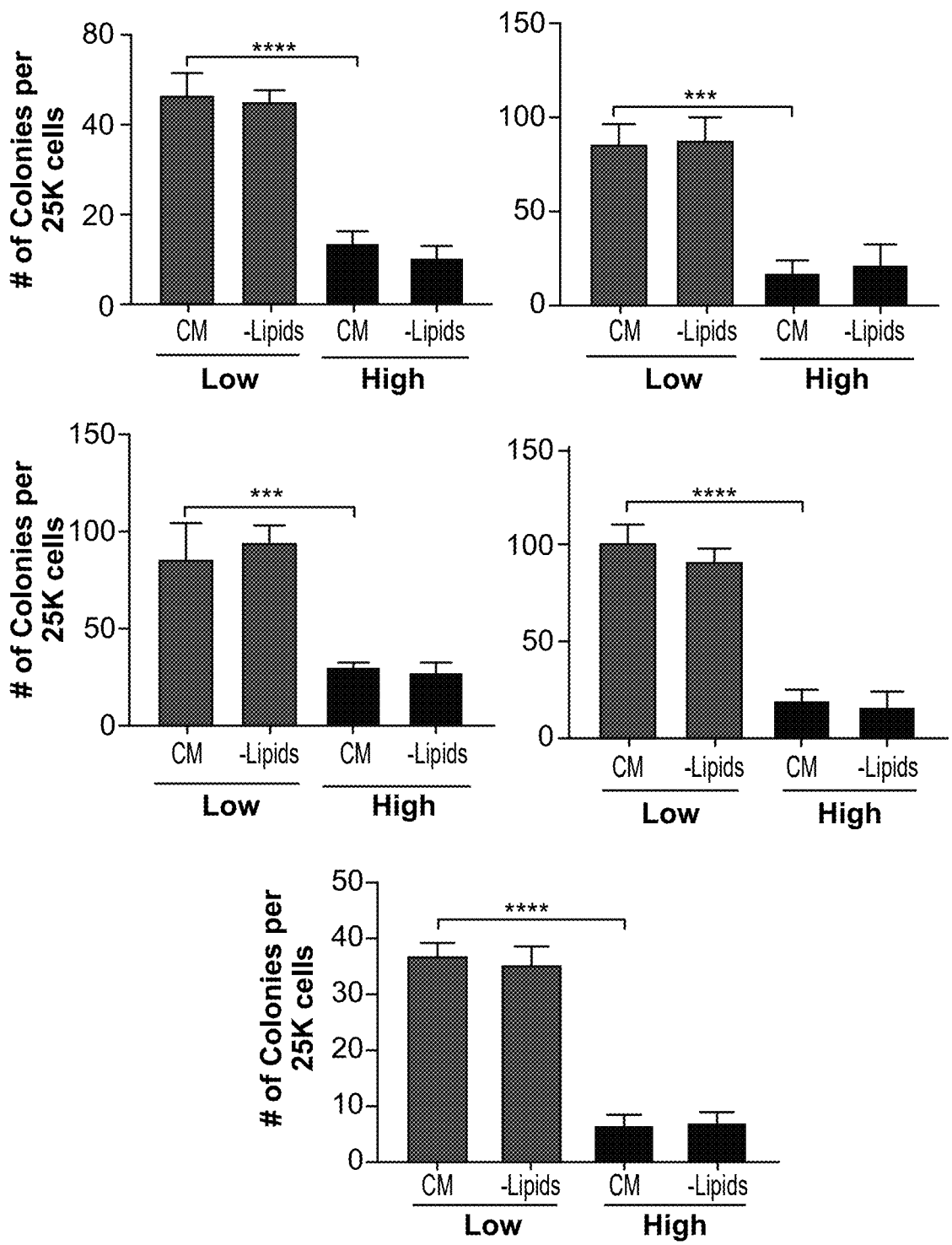

Finally, β-oxidation of lipids is a major source of energy production and has been shown to be important in chemotherapy resistance in LSCs. Therefore, the effect of lipid depletion on LSCs was measured. As shown in FIG. 10, neither ROS-low LSC nor ROS-high AML, cell viability and colony-forming potential was affected by lipid depletion.

Figure 11:
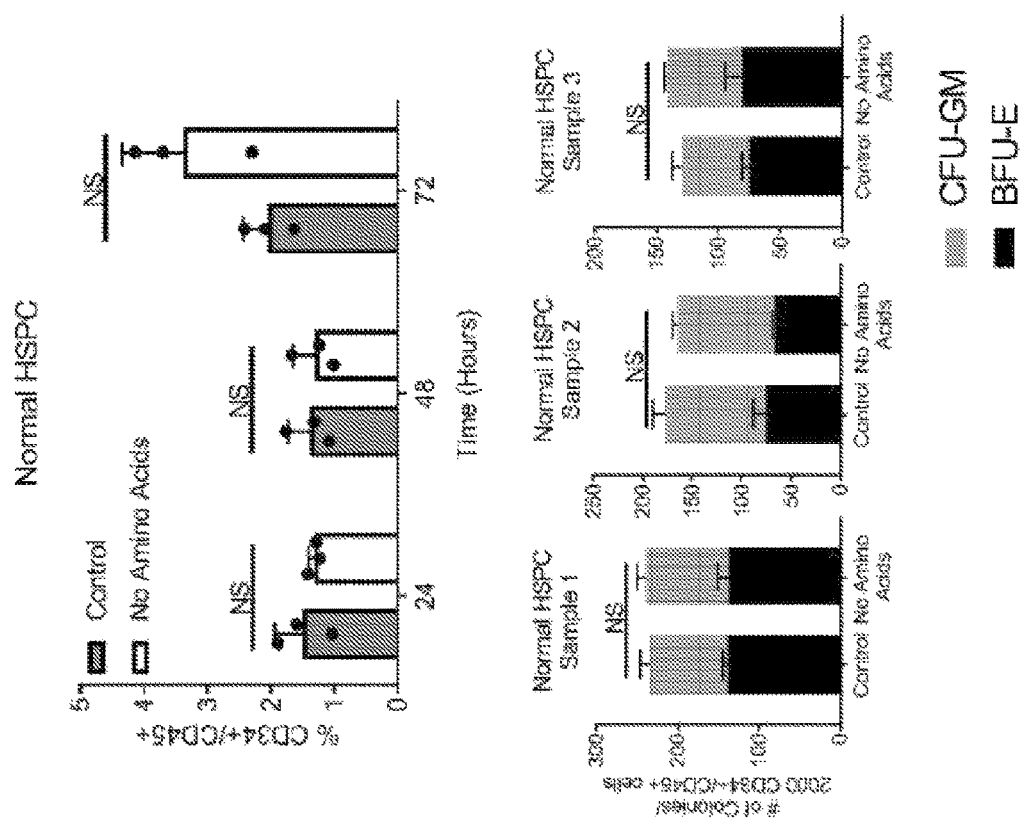
FIG. 11 is a series of charts showing the percentage of normal CD34+/CD45+ cells in mobilized peripheral blood after culturing with or without amino acids for 24, 48, and 72 hours (top) and the colony forming ability of mobilized peripheral blood after culturing with or without amino acids for 24 hours (bottom). Graphs represent the mean+/−StDev. Statistical analysis was performed using two-way ANOVA and two-tailed Student's t-test where applicable. NS=not significant.

To assess the role of amino acid metabolism in normal hematopoiesis, the effect of amino acid depletion on primary human hematopoietic stem and progenitor cells (HSPCs) was measured. Three specimens derived from mobilized peripheral blood were cultured with and without amino acids for 24-72 hours. As shown in the top panel of FIG. 11, no significant differences in HSPC percentages were observed. Furthermore, the colony-forming potential of normal HSPCs after being cultured without amino acids for 24 hours was measured. As shown in the bottom panel of FIG. 11, no significant change in the ability of normal HSPCs to form colonies or the types of colonies formed after amino acid depletion was observed.

To confirm that amino acid depletion does not target normal hematopoietic stem cells (HSCs), the ability of a mobilized peripheral blood sample to engraft into immune deficient NSG-S mice after being cultured with or without amino acids for 24 hours was measured. No significant decrease in engraftment when cells were cultured without amino acids was observed indicating that amino acid depletion does not target functional HSCs. Overall, these data demonstrate that LSCs are uniquely dependent on amino acids for survival.

Figure 12:
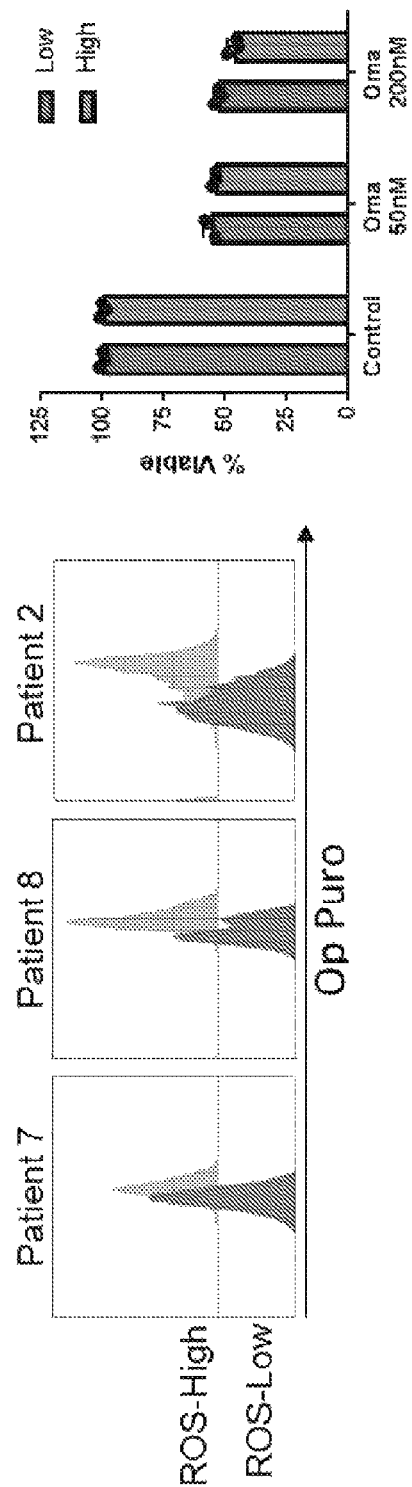
FIG. 12 is (left) a series of charts showing protein translation levels measured by OP-puro staining in ROS-low LSCs (red or bottom histograms) and ROS-high cells (blue or top histograms) and (right) a chart showing the viability of ROS-Low LSCs and ROS-high cells isolated from a patient after treatment with Oma for 24 hours.

Example 5—LSCs are Preferentially Reliant on Amino Acid Catabolism to Fuel OXPHOS In order to determine why LSCs are dependent on amino acids for survival, the importance of amino acids in protein translation in ROS-low LSCs compared to ROS-high blasts was investigated. As shown in the left panel of FIG. 12, decreased levels of protein translation in ROS-low LSCs compared to ROS-high blasts was observed, suggesting that the increased level of amino acid metabolism in ROS-high LSCs is not related to metabolic requirements for protein synthesis. Furthermore, as shown in the right panel of FIG. 12, inhibition of protein translation did not preferentially eradicate ROS-low LSCs.

Figure 13:
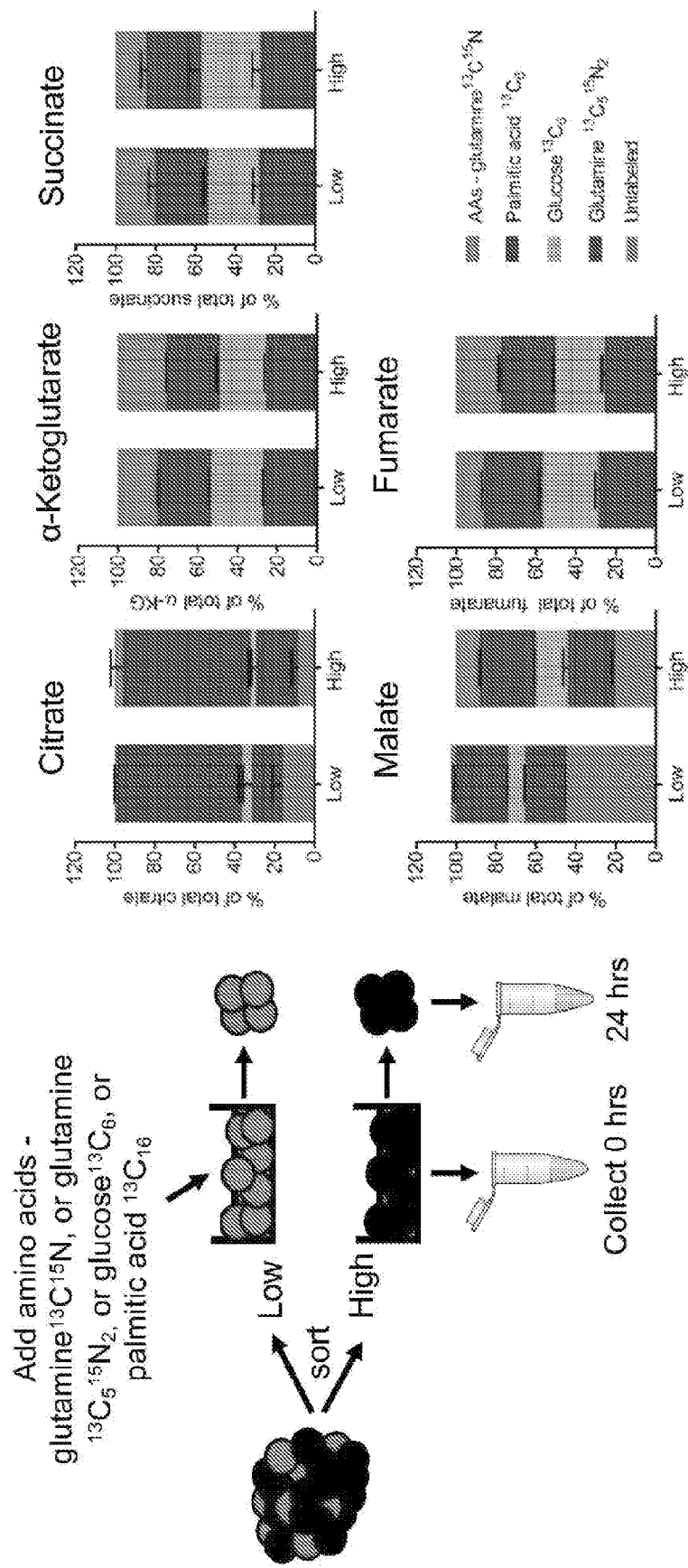
FIG. 13 is (left) a diagram of an experimental design comprising culturing ROS-low LSCs and ROS-high AML, cells with stable isotopes including glucose, glutamine or amino acids without glutamine or palmitic acid for 20 hours and (right) a series of charts showing enrichment of heavy atoms (13C and 15N) from the stable isotopes into TCA cycle intermediates.

Since the selective eradication of LSCs upon amino acid depletion does not appear to be related to protein translation, the contribution of amino acids to the LSC metabolome in comparison with other metabolic fuels was analyzed. As shown in the left panel of FIG. 13, the incorporation of 13C and 15N into metabolites was measured when cells were cultured in the presence of stable isotope-labeled amino acids, glutamine, glucose or palmitic acid. As shown in the right panel of FIG. 13, this analysis revealed amino acids, glucose and fatty acids account for approximately 35% 19% and 33% of the metabolic substrates for TCA cycle intermediates respectively. Therefore, amino acids contributed at the highest percentage to TCA cycle intermediates out of all metabolites measured in LSCs. No significant differences between metabolite contribution to TCA cycle intermediates were observed between the ROS-low LSCs and ROS-high blasts. This finding indicates that amino acid catabolism into the TCA cycle may be important for energy production in both ROS-low LSCs and ROS-high blasts.

Figure 14:
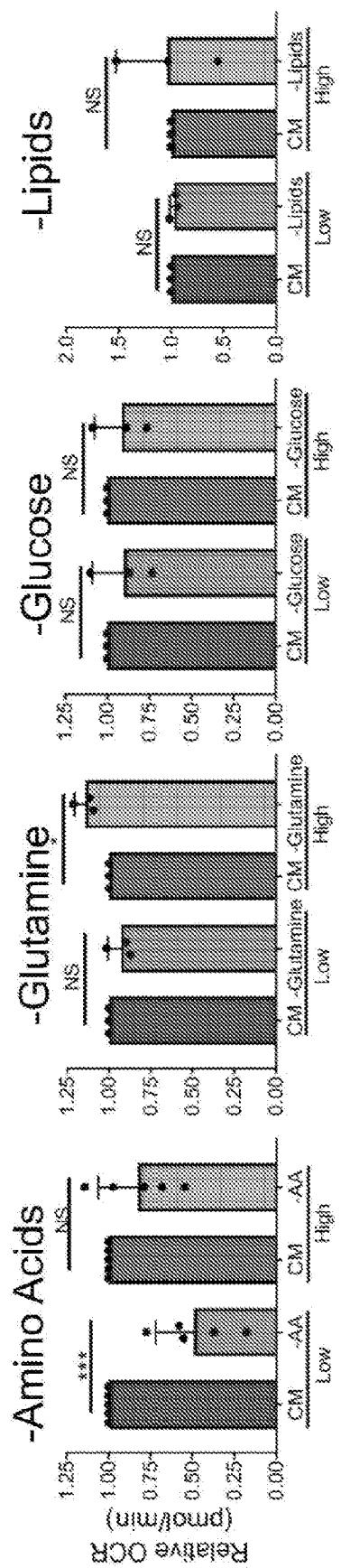
FIG. 14 is a series of charts showing the oxygen consumption (OCR) as measured on an XF24 Seahorse Analyzer of ROS-low LSCs and ROS-high cells isolated from primary AML samples cultured with or without amino acids, glutamine, glucose, or lipids for four hours. Each dot represents a different patient sample. Graphs represent the mean+/−StDev. Statistical analysis was performed using two-way ANOVA and two-tailed Student's t-test where applicable. ***p<0.005, NS=not significant.

To determine if amino acid catabolism is essential for OXPHOS in LSCs and mature AML blasts, changes in oxygen consumption in ROS-low LSCs and ROS-high cells grown in multiple conditions was measured. Cultures were performed in the absence of all 20 amino acids, without glutamine alone, without glucose alone, or without lipids for 4 hours. As shown in FIG. 14, ROS-low LSCs grown without amino acids had significantly less oxygen consumption; however, no change in oxygen consumption was observed in ROS-high cells, indicating that ROS-low LSCs are preferentially reliant on amino acids to fuel OXPHOS compared to ROS-high AML blasts. This reliance contributes to the difference in sensitivity to amino acid depletion. As shown in FIG. 14, neither ROS-low LSCs nor ROS-high cells grown without glutamine, glucose, or lipids had any significant changes in oxygen consumption. This is consistent with results that indicate that amino acid depletion specifically targets LSCs. No consistent differences in basal OXPHOS between ROS-low LSCs and ROS-high AML blasts were observed.

Figure 15:
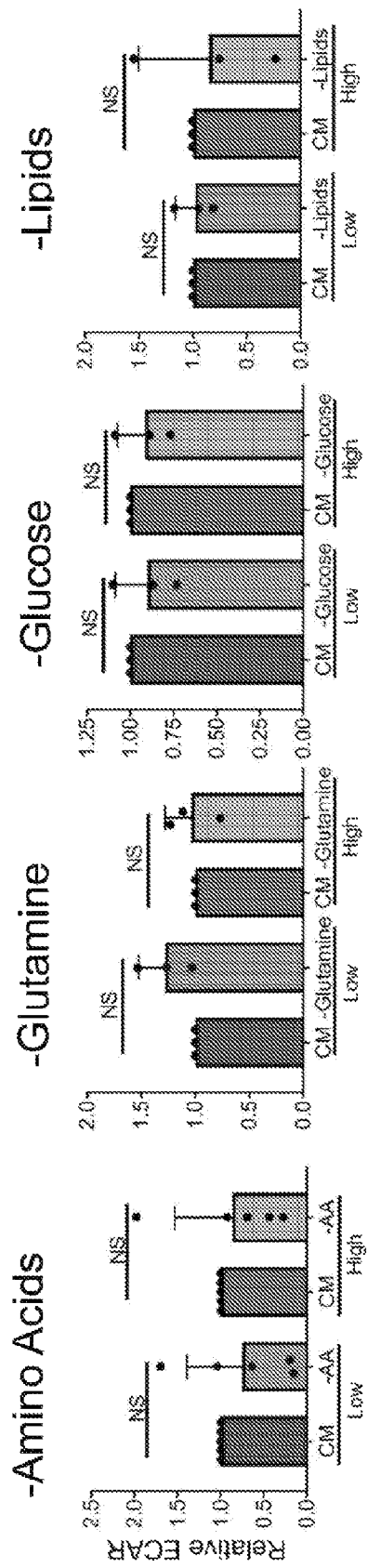
FIG. 15 is a series of charts showing the glycolytic rate (ECAR) as measured on an XF24 Seahorse Analyzer of ROS-low LSCs and ROS-high cells isolated from primary AML samples cultured with or without amino acids, glutamine, glucose, or lipids for four hours. Each dot represents a different patient sample. Graphs represent the mean+/−StDev. Statistical analysis was performed using two-way ANOVA and two-tailed Student's t-test where applicable. NS=not significant

Example 6—OXPHOS Activity in LSCs are Selectively Sensitive to Loss of Amino Acids The effect of amino acid, glutamine, glucose, or lipid depletion on glycolysis in ROS-low LSCs and ROS-high blasts was measured. As shown in FIG. 15, glucose deprivation in the ROS-high blasts but not ROS-low LSCs resulted in a decrease in glycolysis. This is consistent with results that indicate that depletion of glucose only affects the viability of ROS-high cells. As shown in FIG. 15, amino acid, glutamine, or lipid depletion did not significantly affect glycolysis rates. No significant difference in glycolysis was observed between ROS-low LSCs and ROS-high AML blasts. Altogether these data highlight the lack of LSC dependence on glucose for energy production which is in contrast to normal hematopoietic stem cells (HSCs), which are highly dependent on glycolysis.

Figure 16:
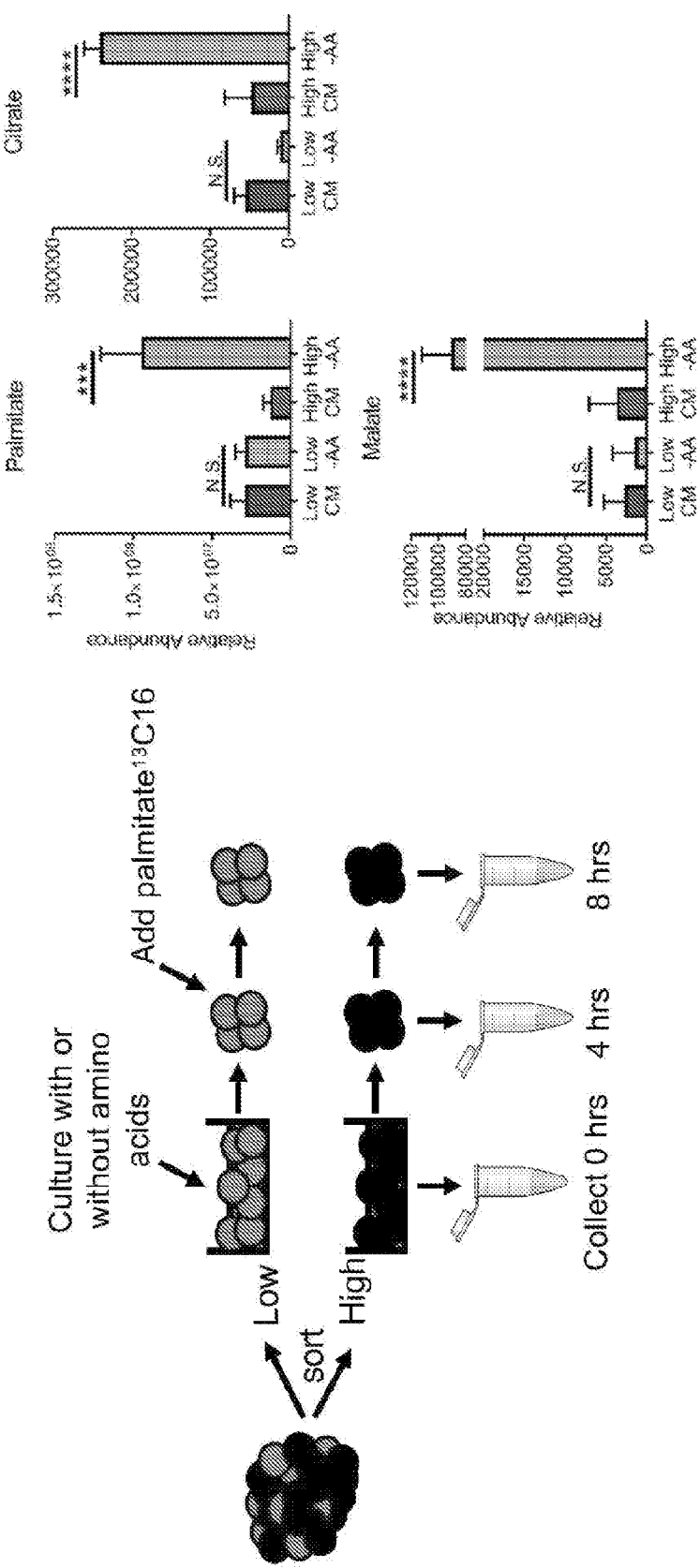
FIG. 16 is a (left) diagram showing an experimental design comprising culturing ROS-low LSCs and ROS-high AML cells with or without amino acids for 4 hours, then fluxing in stable isotope palmitic acid for 8 hours and (right) a series of charts showing levels of 13C palmitic acid and enrichment of heavy atom (13C) from the stable isotope palmitate into TCA cycle intermediates. Graphs represent the mean+/−StDev. Statistical analysis was performed using two-way ANOVA and two-tailed Student's t-test where applicable. *p<0.05, ***p<0.005, NS=not significant.

To determine if OXPHOS in LSCs and not mature AML blasts is selectively sensitive to loss of amino acids, due to the inability of LSCs to catabolize other metabolites into the TCA cycle to compensate for amino acid loss, ROS-low LSCs and ROS-high AML blasts were isolated and cultured with or without amino acids for 4 hours. Immediately after the 4 hours, $13C_{16}$ palmitate or $13C_6$ glucose was added and the cells were cultured for an additional 8 hours. As shown in left panel of FIG. 16, the incorporation of the stable isotope labeled metabolites into TCA cycle intermediates was then measured. As shown in the right panel of FIG. 16, ROS-high AML blasts but not ROS-low LSCs significantly upregulated palmitate uptake and catabolism into TCA cycle intermediates citrate and malate. These data suggest that ROS-high AML blasts but not ROS-low LSCs are able to compensate for amino acid loss by increasing the contribution of fatty acid metabolism to the TCA cycle.

Figure 17:
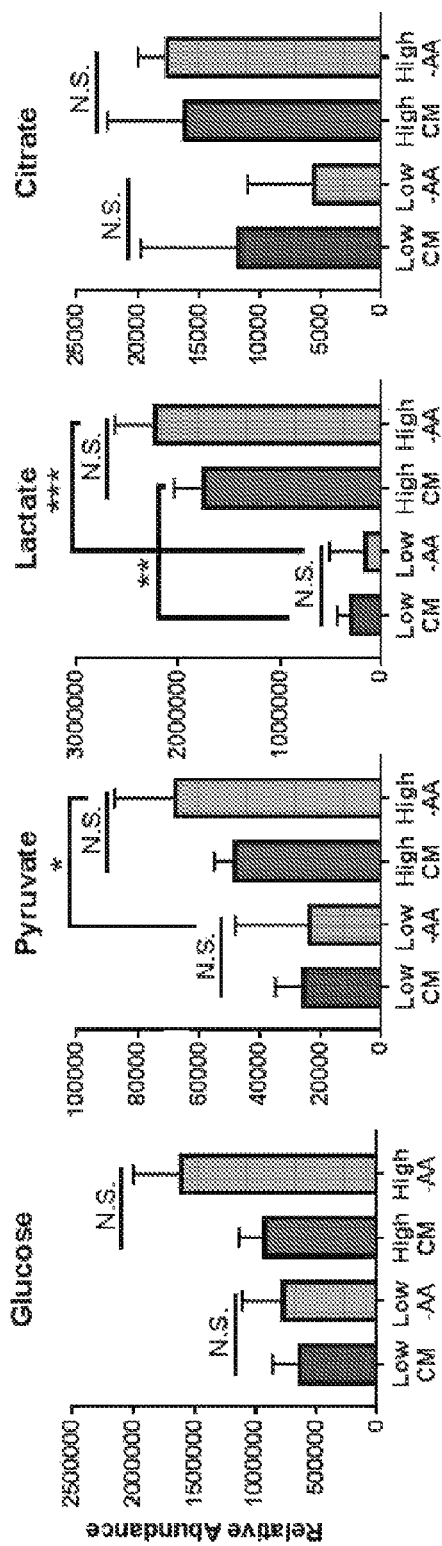
FIG. 17 is a series of charts showing the levels of 13C glucose and enrichment of heavy atom (13C) from the stable isotope glucose into TCA cycle intermediates. Statistical analysis was performed using two-way ANOVA and Student's t-test where applicable. *p<0.05, ***p<0.005, NS=not significant.

The ability of glucose to compensate for loss of amino acids in ROS-low LSCs and ROS-AML blasts was also measured. As shown in FIG. 17, Amino acid depletion did not change the levels of glucose uptake in either ROS-low LSCs or ROS-high AML blasts. Furthermore, there was no observable difference in glucose uptake between the ROS-low LSCs or ROS-high AML blasts. FIG. 17 shows that ROS-high AML blasts produced significantly more of the glycolytic products, pyruvate and lactate, upon amino acid loss compared to ROS-low LSCs. Neither ROS-low LSCs nor ROS-high AML blasts increased the contribution of glucose into the TCA cycle upon amino acid loss. These results suggest that ROS-high AML blasts but not ROS-low LSCs upregulate glycolysis upon amino acid loss.

Overall, this demonstrates that LSCs are less metabolically flexible than more mature AML cells, which likely contributes to the selective sensitivity of ROS-low LSCs to amino acid depletion.

Example 7—Venetoclax+Azacitidine Treatment Decreases Amino Acid Levels and Metabolism in LSCs To investigate whether the inhibition of amino acid metabolism is a viable therapeutic strategy to eradicate LSCs, AML patient specimens from a clinical study were analyzed. The clinical study was a test of a combination therapy of the BCL-2 inhibitor venetoclax, in combination with the hypomethylating agents decitabine or azacitidine for the treatment of newly diagnosed AML patients. Patients enrolled in this study at a single institution who received venetoclax+azacitidine had a 91% overall response rate, with deep and durable remissions, suggesting that this regimen is targeting LSCs in patients.

Figure 18:
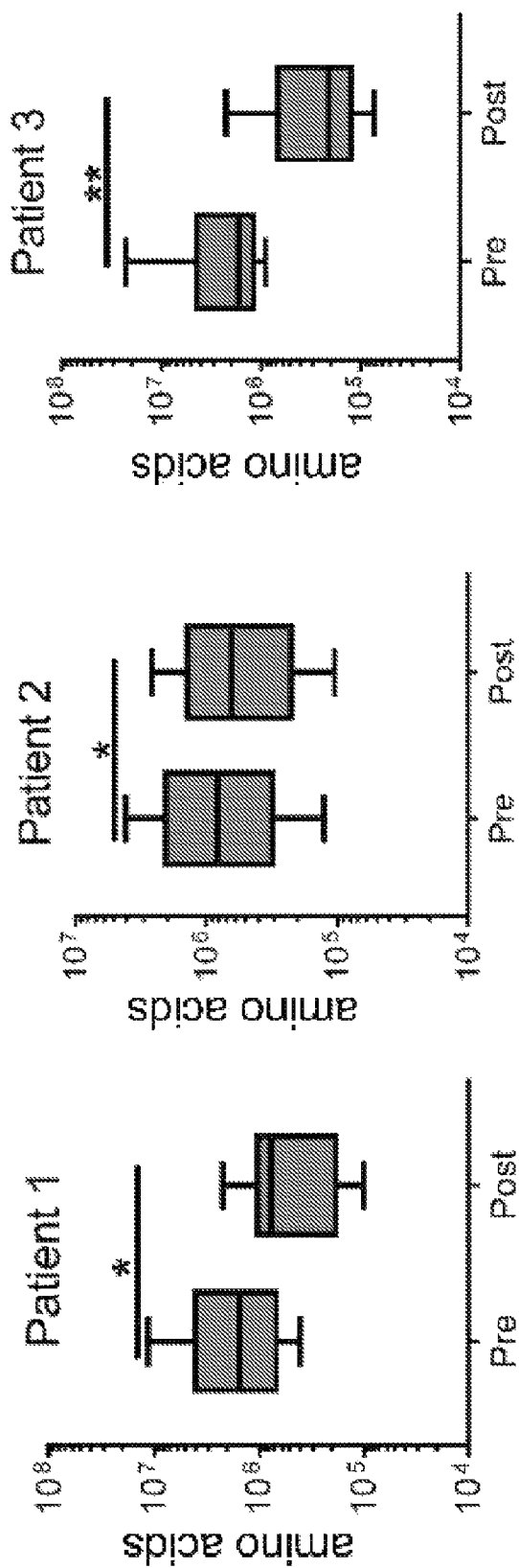
FIG. 18 shows a series of charts showing the amino acid levels in ROS-low LSCs isolated from three patients on the venetoclax with azacitidine trial before (pre) and 24 hours post treatment (post) with venetoclax+azacitidine.
Figure 19:
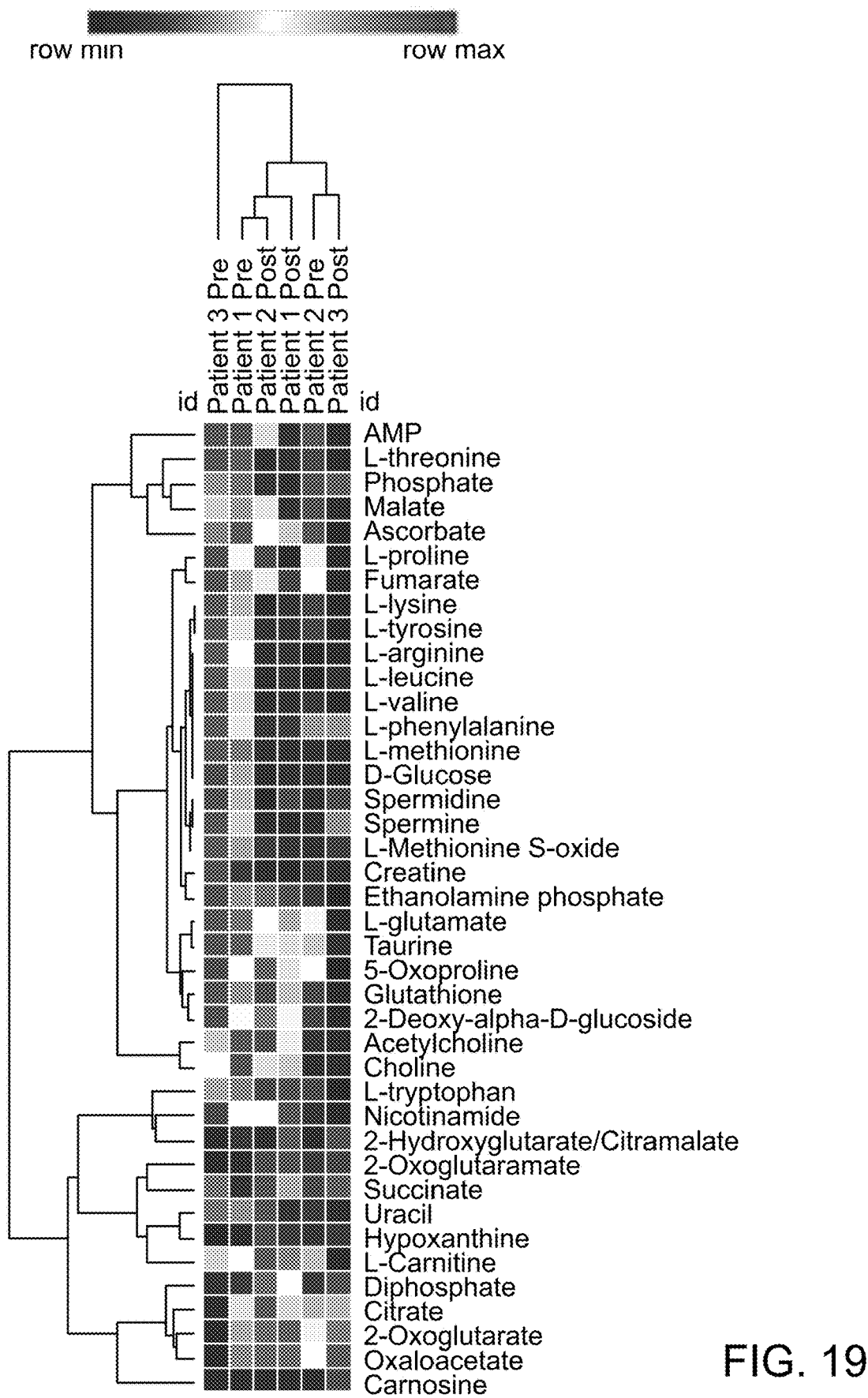
FIG. 19 shows a heatmap (left) showing the individual metabolites from three patient pre and 24-hours post venetoclax+azacitidine treatment and a series of charts (right) showing metabolic pathways altered after a 24-hour treatment with venetoclax+azacitidine in patients.
Figure 19:
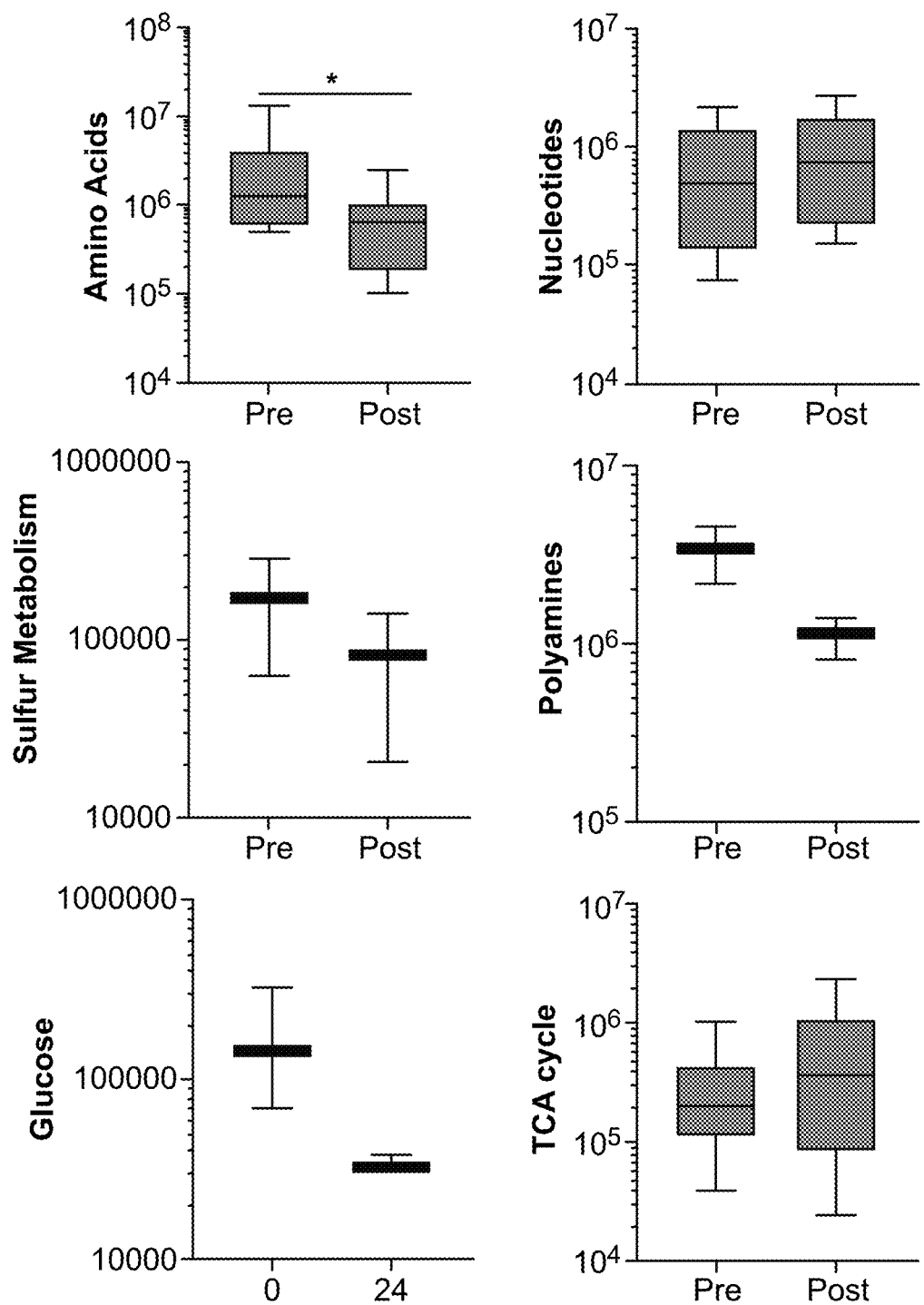
Figure 20:
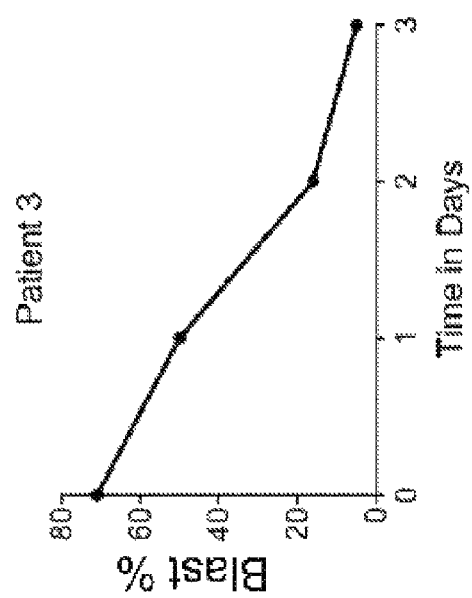
FIG. 20 is a series of charts showing Peripheral blast percentages determined by manual CBC in two patients treated with venetoclax+azacitidine. Day 0 corresponds to pretreatment, day 1 is 24-hours post treatment, etc.
Figure 20:
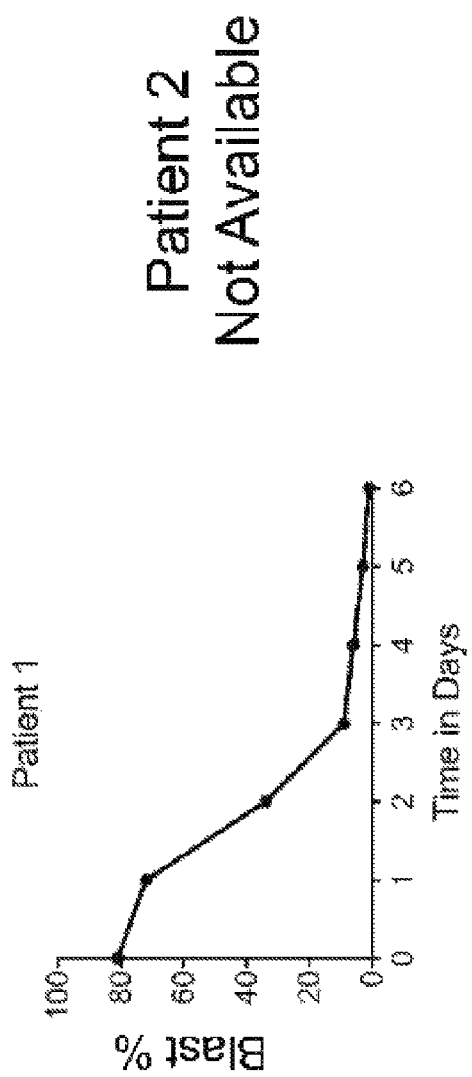

To determine if inhibition of BCL-2 by venetoclax may act to reduce amino acid metabolism and thereby suppress OXPHOS, ROS-low LSC populations from patients immediately before and 24 hours after initiating treatment with venetoclax and azacitidine were isolated and the metabolic changes measured. As shown in FIG. 18, analysis of these specimens showed that the drug combination induced a significant decrease in total levels of amino acids in ROS-low LSCs. As shown in FIG. 19, the venetoclax+azacitidine treatment did not globally change the LSC metabolome suggesting that venetoclax with azacitidine is selectively targeting amino acid metabolism. As shown in FIG. 20, while a slight reduction in leukemic burden as measured in the peripheral blood was detected one-day post therapy, a much greater reduction was seen two to six days post-therapy, indicating that the metabolic changes observed at the one-day time point precede the onset of overt leukemic cell death in patients.

Figure 21:
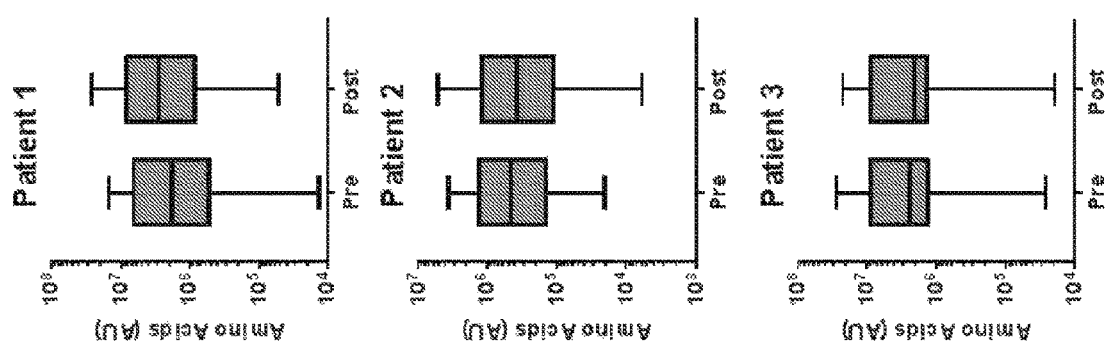
FIG. 21 is a series of charts showing amino acid levels in the ROS-high AML blasts isolated from the 3 patients pre and post venetoclax with azacitidine.

As shown in FIG. 21, venetoclax+azacitidine treatment did not reduce amino acid levels in ROS-high AML blasts as it did in the ROS-low LSCs, suggesting that venetoclax+azacitidine is specifically affecting amino acid metabolism in ROS-low LSCs.

Figure 22:
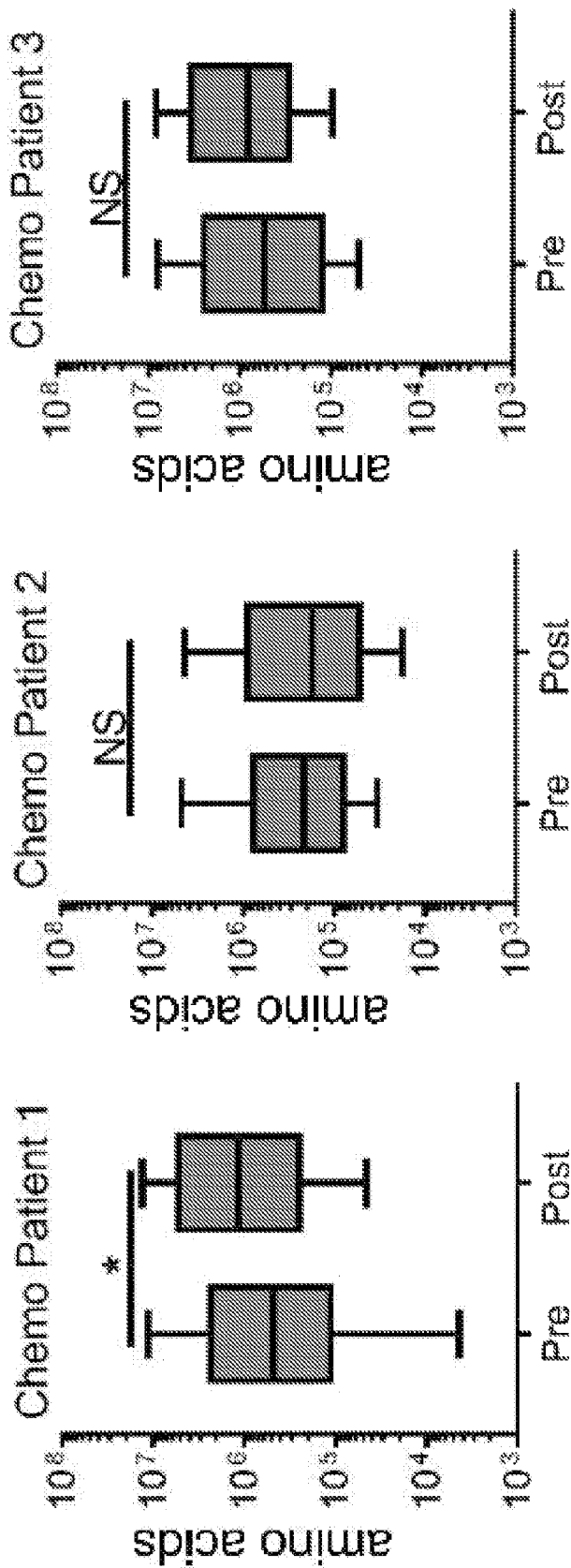
FIG. 22 is a series of charts showing amino acid levels in ROS-low LSCs isolated from three patients before (pre) and 24 hours post 7+3 chemotherapy (post). Graphs represent the mean+/−StDev. Statistical analysis was performed using a two-tailed Student's t-test where applicable.

To determine if amino acid reduction is part of the mechanism by which venetoclax+azacitidine target LSCs, amino acid levels in ROS-low LSCs and ROS-high AML blasts pre and 24-hours post treatment with conventional chemotherapy was measured. As shown in FIG. 22, amino acid levels were not reduced in ROS-low LSCs upon treatment with chemotherapy. Furthermore, no changes in cell cycle upon venetoclax with azacitidine treatment were observed, suggesting that the venetoclax+azacitidine combination does not preferentially target any cell cycle state, but rather is equally cytotoxic regardless of cycle status.

These data demonstrate that venetoclax+azacitidine, but not conventional therapy reduce amino acid levels in ROS-low LSCs. Further, these data indicate that venetoclax+azacitidine treatment reduces amino acid metabolism in LSCs in vivo.

Figure 23:
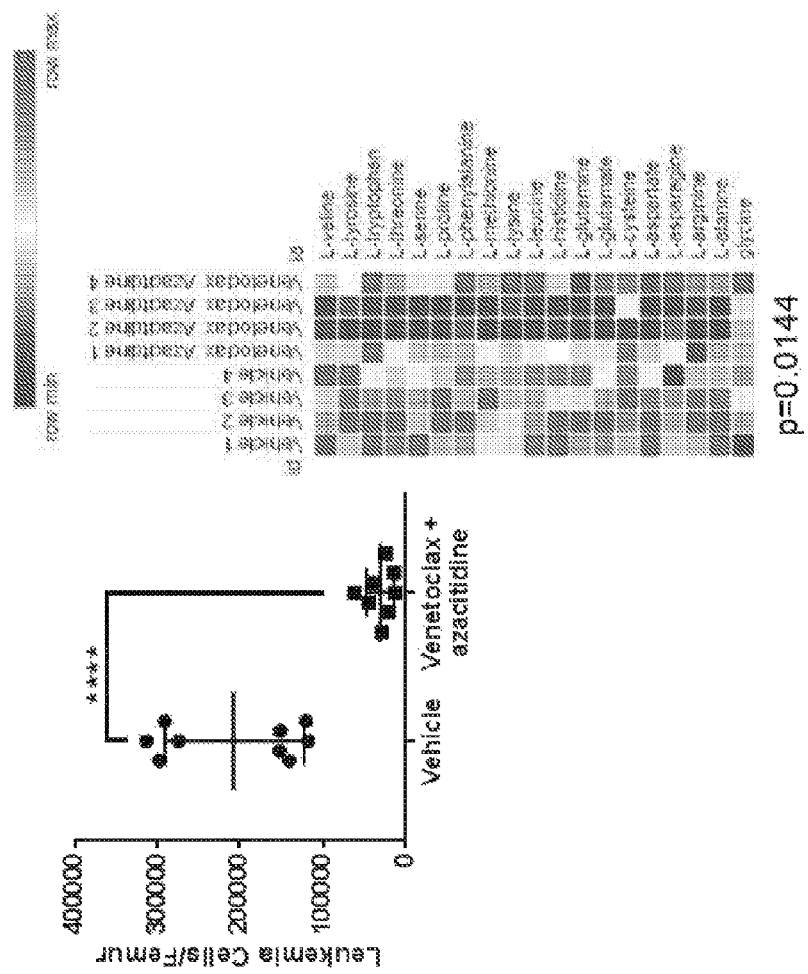
FIG. 23 shows a chart of leukemia cell burden in a patient derived xenograft (PDX) model treated with venetoclax (100 mg/kg) and azacitidine (3 mg/kg) for 2 weeks (left chart), a heatmap of amino acids with examples showing amino acid levels in AML cells isolated from the PDX model 24 hours post treatment with venetoclax with azacitidine (middle heatmap) and a table of metabolic pathways identified as significantly changed after a 24-hour in vivo treatment with one dose of venetoclax (100 mg/kg)+azacitidine (3 mg/kg). Statistical analysis was performed using Student's T-test. ****p<0.001

To confirm these results in a metabolically controlled environment, venetoclax+azacitidine treatment was tested in a patient derived xenograft (PDX) system. Treatment with the combination of venetoclax with azacitidine for two weeks significantly decreased leukemia burden, as shown in the left panel of FIG. 23, and decreased amino acid levels, as shown in the middle panel of FIG. 23. Further analysis showed that the majority of metabolic pathways altered by the venetoclax+azacitidine treatment were directly related to amino acid metabolism, as shown in the right panel of FIG. 23. Overall, these results indicate that venetoclax+azacitidine treatment decreases amino acid levels in LSCs in vivo.

Figure 24:
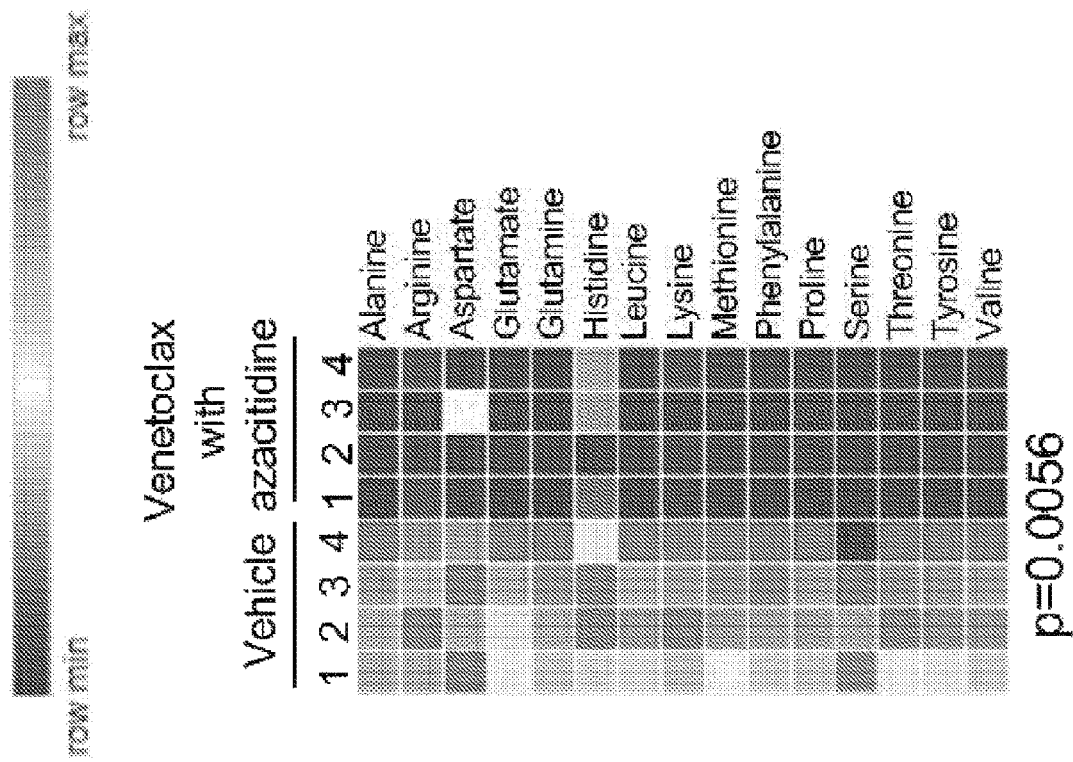
FIG. 24 is a heatmap of amino acid uptake in ROS-low LSCs upon vehicle or venetoclax with azacitidine treatment.

To determine if venetoclax+azacitidine treatment may decrease amino acid levels in ROS-low LSCs by impairing the ability of the LSCs to import amino acids, changes in stable isotope labelled amino acid uptake in human LSCs after a 4-hour in vitro treatment with venetoclax+azacitidine was measured. As shown in FIG. 24, amino acid uptake was significantly reduced in LSCs after venetoclax+azacitidine treatment.

Figure 25:
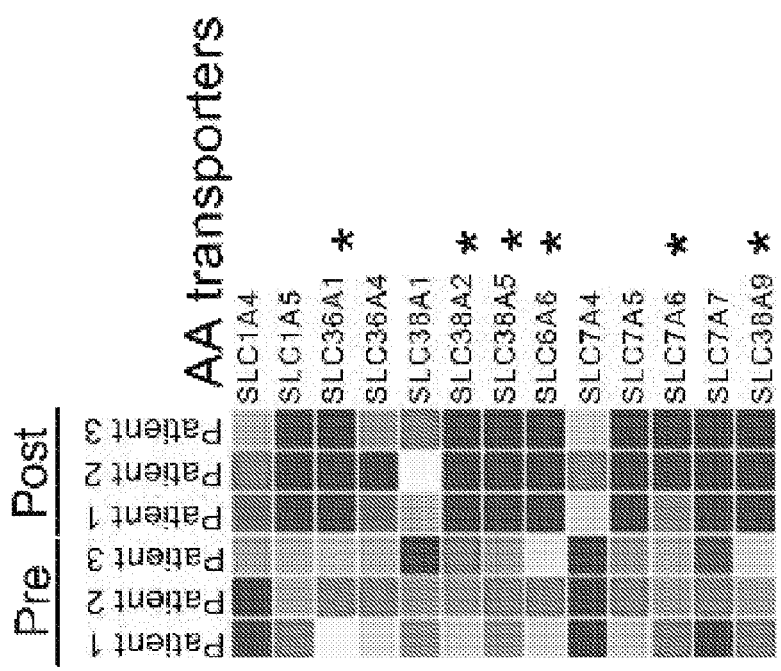
FIG. 25 is a heatmap of changes in amino acids transporters from three patients treated with venetoclax+azacitidine for 5-7 hours.

To corroborate this data in patients, the gene expression of known amino acid transporters in ROS-low LSCs after 5-7 hours of venetoclax+azacitidine treatment was measured. As shown in FIG. 25, a significant decrease in six of the 13 amino acid transporters expressed in the patient samples was observed. In vitro treatment of LSCs isolated from three patients with venetoclax, azacitidine, or venetoclax+azacitidine revealed that venetoclax+azacitidine treatment significantly reduced amino acid transporter expression. Neither venetoclax nor azacitidine could reduce expression of amino acid transporter alone, indicating that the combination of both venetoclax and azacitidine is needed to effectively target amino acid metabolism in LSCs.

Figure 26:
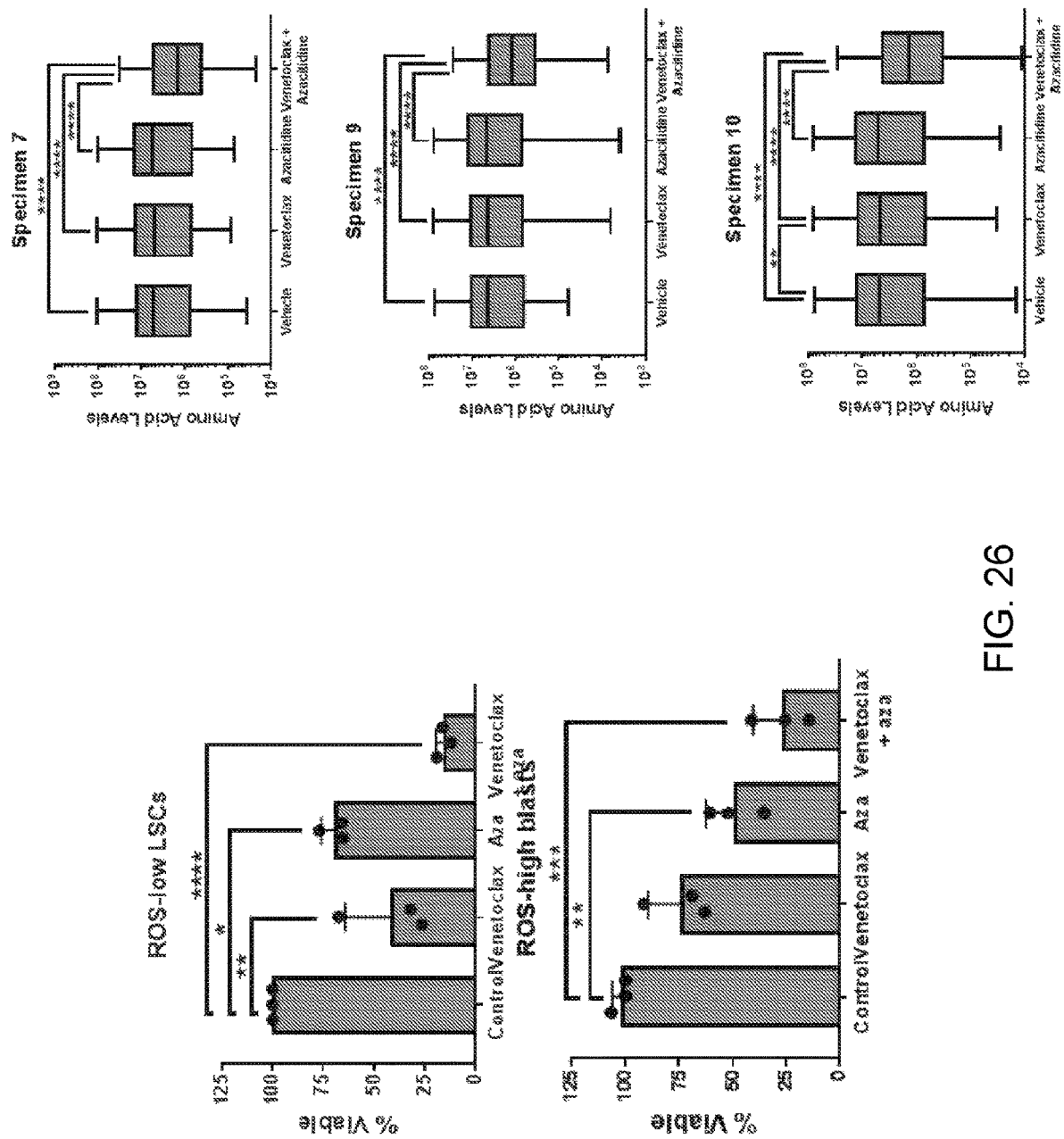
FIG. 26 is a series of charts showing (left two charts) the viability of ROS-low LSCs and ROS-high AML blasts isolated from patient samples treated with 500 nM venetoclax, 2.5 µM azacitidine, or the combination of venetoclax+azacitidine for 24 hours and (right three charts) the amino acid levels measured in ROS-low LSCs isolated from patient samples treated with 500 nM venetoclax, 2.5 µM azacitidine, or the combination of venetoclax+azacitidine for 4 hours.

The changes in amino acid transporter gene expression occurred before amino acid levels changes. Furthermore, as shown in the left panel of FIG. 26, azacitidine potentiates the effect of venetoclax on ROS-low LSC and ROS-high AML blast viability in vitro, which is consistent with the reduction in transporter expression occurring only upon treatment with the combination of venetoclax and azacitidine. As shown in the right panel of FIG. 26, both venetoclax and azacitidine are necessary to reduce amino acid levels in ROS-low LSCs in the majority of patient samples.

Overall, these data demonstrate the combination of venetoclax with azacitidine results in decreased amino acid uptake in LSCs.

Figure 27:
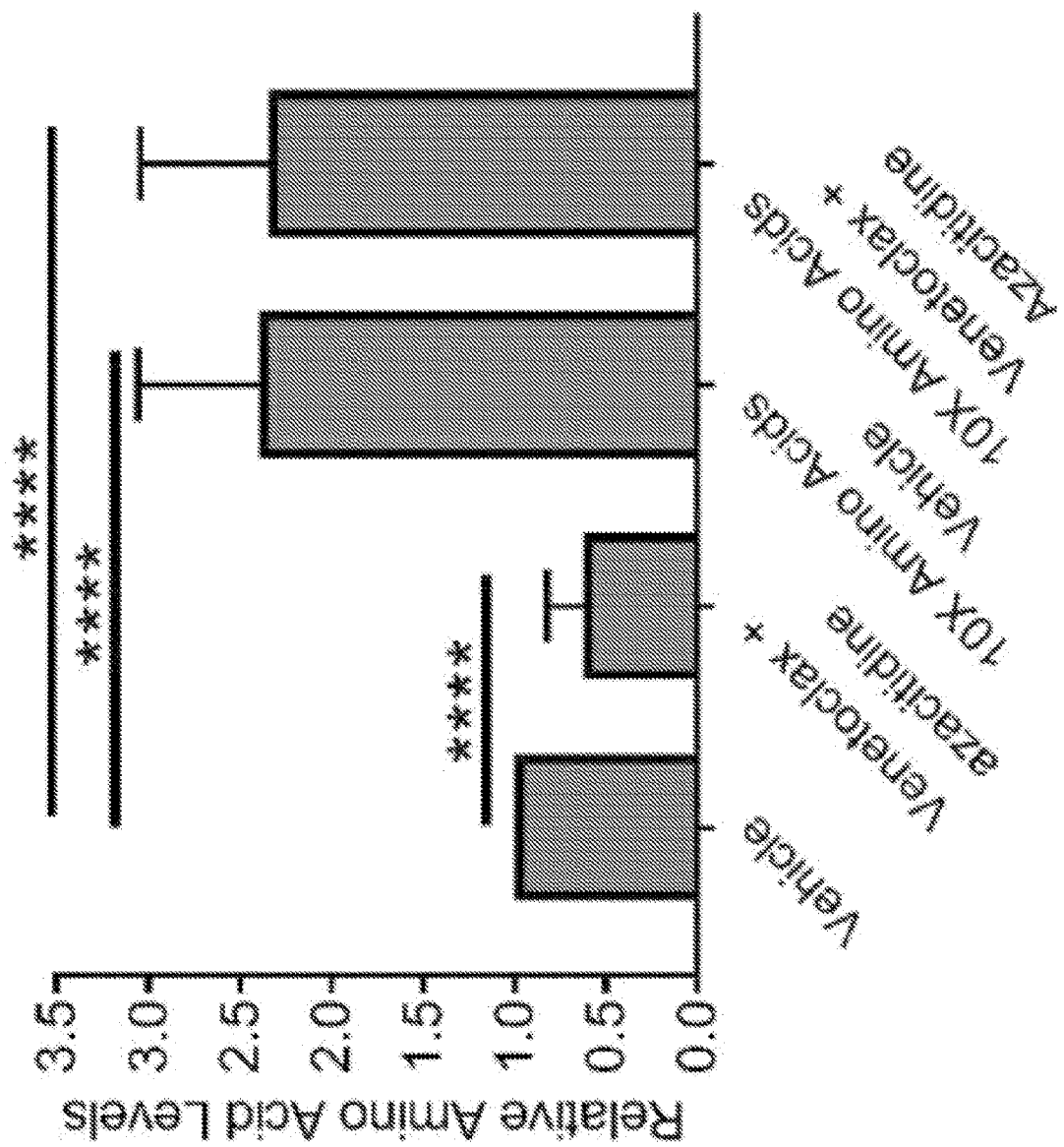
FIG. 27 is a chart showing the amino acid levels in ROS-low LSCs that were cultured in media containing ten times the levels of amino acids found in normal human plasma for 4 hours and then were treated with vehicle or venetoclax (500 nM) and azacitidine (2.5 µM) for 4 hours.

Example 8—Venetoclax+Azacitidine Treatment Eradicates LSCs by Decreasing Amino Acid Levels To determine if decreased levels of amino acid uptake was an important part of the mechanism by which venetoclax+azacitidine treatment targets LSCs, isolated LSCs were pretreated with 10 times the level of amino acids compared to normal human plasma for 4 hours before venetoclax+azacitidine treatment. Amino acid levels and cell viability were then measured. As shown in FIG. 27, consistent with what was observed in patients, amino acid levels were significantly decreased following venetoclax+azacitidine treatment in ROS-low LSCs that were cultured in media containing normal amino acid levels. Additionally, amino acid levels were significantly increased in ROS-low LSCs cultured in media containing 10 times the level of amino acids compared to normal human plasma.

When ROS-low LSCs that were cultured in media containing 10 times the level of amino acids compared to human plasma, amino acid levels were not reduced following venetoclax+azacitidine treatment. FIG. 28 shows that using the same conditions, it was observed that culturing ROS-low LSCs in media with high levels of amino acids rescued cell death by venetoclax+azacitidine treatment. Furthermore, amino acid transporter expression was not altered by culturing LSCs with high levels of amino acids, which indicates that pretreating LSCs with high amino acid levels allows the LSCs to uptake extra amino acids, which in turn protects the LSCs from decreased amino acid transporter expression upon venetoclax+azacitidine treatment.

These data demonstrate that decreased amino acids levels upon venetoclax+azacitidine treatment is functionally linked to the mechanism by which venetoclax+azacitidine treatment eradicate LSCs.

Example 9—Venetoclax+Azacitidine Treatment Reduces OXPHOS Activity in LSCs by Decreasing Amino Acid Levels To determine if venetoclax+azacitidine targets OXPHOS by decreasing levels of amino acids, enrichment map analysis was performed to identify pathways altered in three patients treated with venetoclax+azacitidine. The analysis revealed that the three pathways significantly decreased by venetoclax+azacitidine treatment include protein translation, TCA cycle, and adenylyl cyclase activity. Protein translation does not account for the differential sensitivity to amino acid loss between ROS-low and ROS-high cells (see Example 5) and there is no connection between adenylyl cyclase activity and amino acid metabolism.

To determine if the TCA cycle was altered in the three patients upon venetoclax+azacitidine treatment, a gene set enrichment analysis (GSEA) analysis specifically for the TCA cycle reactome was performed. As shown in FIG. 29, a significant decrease in the TCA cycle reactome signature post treatment was observed, suggesting that OXPHOS was decreased by venetoclax+azacitidine treatment in LSCs isolated from AML, patients. To confirm that OXPHOS was reduced by venetoclax+azacitidine treatment, OXPHOS was measured directly via seahorse assay in patient samples from the venetoclax+azacitidine clinical trial. After a 24-hour treatment with venetoclax+azacitidine, blasts from patient 3 had a significant decrease in OXPHOS, as shown in the left panel of FIG. 30. In AML cells isolated from patient 2, baseline OXPHOS levels were minimally decreased post treatment; however, oxygen consumption rate (OCR) spare capacity was significantly reduced post treatment, as shown in the right panel of FIG. 30.

These results were confirmed in a PDX model by treating mice transplanted with human AML with venetoclax, azacitidine, or venetoclax+azacitidine for 24 hours, harvesting human leukemic cells from the bone marrow of the mice, and measuring OXPHOS. A significant decrease in OXPHOS upon treatment with the combination of venetoclax+azacitidine but not with venetoclax or azacitidine alone was observed.

These data demonstrate that venetoclax+azacitidine treatment decreases OXPHOS and suppresses the ability of leukemic cells to up-regulate OXPHOS in AML patients.

To determine if decreased amino acid levels upon venetoclax+azacitidine treatment contributed to decreased OXPHOS levels, ROS-low LSCs were isolated and cultured in high levels of amino acids before venetoclax+azacitidine treatment. Consistent with the patient observations, venetoclax+azacitidine treatment significantly decreased OXPHOS (as measured by oxygen consumption) in ROS-low LSCs, as shown in FIG. 31. FIG. 31 also shows that pretreatment with high levels of amino acids rescued OXPHOS levels upon venetoclax with azacitidine treatment.

This data demonstrates that venetoclax with azacitidine reduces OXPHOS by decreasing the levels of amino acids.

Example 10—Relapse LSCs Can Utilize Other Metabolic Pathways to Fuel OXPHOS

The overall response rate of older untreated AML patients to venetoclax with a hypomethylator is very high. However, the response rate for venetoclax as single agent or in combination with other therapies in the relapsed setting is considerably lower. Given that LSCs from untreated patients are highly responsive to venetoclax+azacitidine treatment, it is possible that venetoclax+azacitidine would be effective in eradicating LSCs obtained from AML patients at relapse. However, initial studies using venetoclax as a single agent or in combination with azacitidine for relapsed/refractory AML patients have not shown strong efficacy.

To determine if relapse LSCs are resistant to the amino acid loss induced by venetoclax+azacitidine treatment, isolated LSCs from de novo and relapse AML patients were isolated and treated with venetoclax+azacitidine in vitro. As shown in the top left panel of FIG. 32, LSCs isolated from de novo patients had a significantly greater reduction in viability upon treatment compared to relapse LSCs. The top right panel of FIG. 32 shows that OXPHOS levels were not reduced in relapse LSCs upon venetoclax+azacitidine treatment, unlike de novo LSCs. These data indicate that venetoclax with azacitidine is not able to affect the metabolism of relapse LSCs in the same manner as we have characterized for LSCs from newly diagnosed patients.

To confirm that relapse LSCs are not sensitive to the same metabolic perturbations as de novo LSCs, relapse and de novo LSCs were cultured without amino acids. Cell survival and OXPHOS activity was then measured. As shown in the bottom left panel of FIG. 32, relapse LSCs were more resistant to amino acid depletion compared to de novo LSCs. In addition, OXPHOS in relapse LSCs was not affected by amino acid depletion unlike LSCs isolated from newly diagnosed patients, as shown in the bottom right panel of FIG. 32.

LSCs may escape amino acid depletion by upregulating other metabolic pathways. Metabolic changes in de novo and relapse LSCs were measured after being cultured without amino acids for 4 hours. As shown in FIG. 33, a significant increase in fatty acid levels after amino acid depletion was observed, specifically in relapse LSCs. To determine whether the increased fatty acids in relapsed LSCs can compensate for amino acids in driving energy metabolism, the flux of palmitate upon amino acid depletion was measured. The left panel of FIG. 34 shows that palmitate levels were significantly increased in relapse LSCs compared to de novo LSCs. The right panel of FIG. 34 shows that the levels of palmitate metabolized to TCA cycle intermediate citrate were also significantly increased in relapse LSCs compared to de novo LSCs. These data indicate that relapse LSCs can compensate for amino acid loss by increasing the contribution of fatty acid metabolism into the TCA cycle and thereby rescuing any reductions in OXPHOS.

Finally, to determine if inhibiting fatty acid uptake using CD36 inhibitor, sorbitan sesquioleate (SSO), could re-sensitize relapse LSCs to venetoclax with azacitidine, relapse LSCs were treated with SSO and venetoclax+azacitidine or cultured in amino acid depleted media. As shown in FIG. 35, these cells were significantly less viable than any of the treatment conditions alone. Furthermore, SSO treatment in combination with venetoclax+azacitidine treatment or amino acid depleted media for 4 hours resulted in a significant decrease in OXPHOS, as shown in FIG. 36. Venetoclax+azacitidine, SSO, and the combination did not affect normal HSPCs viability or colony forming ability.

Example 11—Venetoclax+Azacitidine Clinical Study

33 AML patients were enrolled in a clinical study in which they were administered escalating dosages of a combination of venetoclax and azacitidine. The overall response rate (complete remission [CR]+CR with incomplete hematological recovery [CRi]+partial response [PR]+morphologic leukemia free state [MLFS]) was 91% ($^{30}/_{33}$). Twenty (61%) had a CR, eight (24%) had a CRi and one each had a PR and MLFS. Median time to response was 34.5 days (25-62), and 19 patients (58%) achieved their best response after the first cycle. Three had no response; one was refractory after two cycles, and two discontinued the study before the first week of treatment completed for personal reasons. This regimen was well tolerated and the toxicity profile was consistent with what has been previously reported.

Nine responders (30%) relapsed; three relapsed after discontinuing therapy for reasons unrelated to toxicity, 44-165 days after discontinuation. Six relapsed while on therapy, 168-420 days after first response. Median follow up time is 580 days (95% CI 377, 713). As shown in FIG. 37, median response duration, progression free survival (PFS) and OS have not been reached.

These outcomes were compared to control patients. For the control population, 285 AML newly diagnosed patients consecutively treated with any therapy besides venetoclax+azacitidine over a seven-year period were screened; those >59 years with intermediate to adverse cytogenetics were selected (N=88). The CR/CRi rate for controls was 51%, inferior compared to the 85% that achieved CR/CRi with venetoclax+azacitidine (Z score=-3.102, p=0.0019). In addition, the median OS for venetoclax+azacitidine was superior to controls (not reached vs 341.5 days, p=0.0003, as shown in FIG. 38). FIG. 39 shows additional analyses stratified by treatment and age. Univariate logistic regression did not reveal any relevant variables as response predictors. Prior to initiation of therapy, patient specimens were genotyped using the TruSight myeloid panel to assess patient specific mutations. Of patients who completed more than one week of therapy, 3/4 with FLT3 internal tandem duplications, 2/2 with TP53 mutations and 5/5 with monosomal karyotypes experienced a CR/CRi. BH3 profiling of seven patients showed no correlation between response and degree of BCL-2 priming. Isocitrate dehydrogenase (IDH) isoform 1 or 2 predicted longer responses (hazard ratio=0.119 [0.015, 0.923], p=0.042), while PTPN11 and other RAS pathway mutations predicted shorter responses (hazard ratio=10.22 [2.36, 43.48]; p=0.0019).

Measurable residual disease (MRD) was evaluated using droplet digital PCR (ddPCR) in 22 responders for whom detectable mutations were available. The results of this analysis are shown in FIG. 40. Of the nine patients who relapsed, seven were analyzable for MRD by ddPCR; 0/7 had achieved MRD negativity. Eleven patients are in sustained remission with MRD positivity. Four patients achieved MRD negativity, defined as a lack of detectable evidence of all analyzed mutations; 0/4 have relapsed with a median follow up time of 823 days (623-1093), and two (patients 1 and 2), who opted to come off all treatment after achieving a remission after 1 and 3 cycles, remain MRD negative with no clinical signs of disease after 983 and 1093 days, respectively.

Example 12—Venetoclax+Azacitidine Treatment Preferentially Targets LSCs

Peripheral blood from patients with circulating disease was examined to investigate cellular events that accompanied responses to venetoclax+azacitidine treatment. Following venetoclax+azacitidine treatment, a rapid decrease in peripheral blood blasts in patients with circulating disease was observed, with significant reduction in as little as 24 hours and complete eradication in all patients within six days of treatment, as shown in FIG. 41. Selected pre- and post-treatment patient samples were then analyzed using mass cytometry. As shown in FIG. 42, the effects of treatment were highly selective for the phenotypically-defined AML blast cell population, with a dramatic and rapid reduction in tumor burden, consistent with the clinical experience with this regimen. Importantly, examination of phenotypically-defined LSCs (CD34+, CD38−, Lin−, CD123+) also demonstrated rapid eradication, as shown in FIG. 43. By comparison, analysis of patients undergoing treatment with standard induction chemotherapy showed strikingly different results, with no significant reduction in blasts during the first four days of treatment; this was observed regardless of whether patients ultimately responded to this therapy. The venetoclax+azacitidine treatment also showed high specificity for malignant versus non-malignant cells. No reduction in normal hematopoietic lineages CD3+, CD7+, or CD19+ subpopulations were evident after four days of therapy with venetoclax+azacitidine treatment.

To further investigate the molecular characteristics of cells targeted during the initial stages of treatment, single cell RNA-seq studies at baseline and after two and four days of venetoclax+azacitidine treatment was performed. In this analysis, various cell populations were identified by expression of lineage specific transcripts. As observed for the immunophenotypic analysis, no changes in normal hematopoietic cells were observed, while cells identified as blasts were rapidly depleted, as shown in FIGS. 44 and 45. Gene set enrichment analysis (GSEA) comparing global expression changes between leukemic and normal cells pre- and post-treatment demonstrated the population eradicated by venetoclax+azacitidine treatment strongly expressed molecular signatures identified in primary human LSCs, as shown in FIG. 46. These data, combined with the phenotypic findings shown in FIG. 43, suggest targeting of primitive AML, populations is preferentially achieved with venetoclax+azacitidine treatment.

Example 13—Venetoclax+Azacitidine Treatment Decreases OXPHOS Activity in LSCs

LSCs exhibit a low level of reactive oxygen species. Thus, LSCs from AML samples can be isolated by staining AML samples with a reactive oxygen species-sensitive probe and selecting the cells with the lowest levels of ROS. RNA-seq analysis of ROS-low specimens isolated from patient samples six hours after the initiation of venetoclax+azacitidine treatment showed that pathways related to OXPHOS were strongly down-regulated, a significant finding as it is known that OXPHOS is a critical pathway for LSC maintenance and survival.

BCL-2 inhibition decreases OXPHOS, leading to death of LSCs but not normal hematopoietic stem cells, as normal stem cells compensate for reduced OXPHOS through increased glycolysis. To determine if venetoclax+azacitidine treatment targets LSCs in patients by decreasing OXPHOS, metabolomics analyses was performed on tumor samples obtained from patients pre- and 24 hours post-treatment with venetoclax+azacitidine. Analysis of ROS-low cells showed that patient 7 had a significant decrease in basal OXPHOS post treatment, as shown in the left panel of FIG. 47, and that patient 9 had a significant decrease in OXPHOS spare capacity post treatment, as shown in the right panel of FIG. 47 and in FIG. 48. The decreased OXPHOS that was observed upon treatment with venetoclax+azacitidine was not observed in patients treated with standard induction chemotherapy (7+3 therapy). Furthermore, two of three patients receiving azacitidine alone did not have alterations in OXPHOS levels upon azacitidine treatment.

These results were confirmed in vitro by treating LSCs isolated from patients for four hours with venetoclax+azacitidine. As shown in the left panel of FIG. 49, a reduction in OXPHOS was observed in 4/4 AML patient samples tested. Venetoclax+azacitidine treatment did not significantly reduce OXPHOS in ROS-high AML blasts. The expected consequence of decreased OXPHOS in LSCs is reduced ATP levels, which was detected in treated specimens, as shown in the right panel of FIG. 49. Overall, these demonstrate that venetoclax+azacitidine treatment decreases OXPHOS and energy production in AML patients.

Example 14—Venetoclax+Azacitidine Treatment Decreases Glutathione Levels

To determine how venetoclax+azacitidine decreases OXPHOS, changes in metabolite abundance pre- and 24 hours post-treatment was measured. Of particular interest were TCA cycle intermediates, as these metabolites supply substrate for OXPHOS directly through electron transport chain (ETC) complex II. As shown in FIG. 50, LSCs isolated from three patients displayed decreases in α-ketoglutarate, malate, and fumarate, and an increase in succinate, 24 hours after treatment. Succinate is the metabolic substrate for ETC complex II, and increased succinate levels indicate a defect in ETC complex II activity. A significant decrease in glutathione levels in 3 of 3 patients post-treatment was also observed, as shown in the left panel of FIG. 51. This decrease correlates with increased cellular ROS, as shown in the right panel of FIG. 51. Interestingly, patients receiving 7+3 standard therapy also had increased levels of ROS suggesting that elevated ROS alone is not sufficient to target LSCs in patients.

To determine if venetoclax+azacitidine treatment decreases glutathione and therefore reduces sdhA glutathionylation events that would diminish ETC complex II activity and inhibit OXPHOS, ETC complex II activity and sdhA glutathionylation was directly measured in primary AML specimens after venetoclax+azacitidine treatment in vitro. The left panel of FIG. 52 shows that the venetoclax+azacitidine treatment decreases glutathione levels in vitro. The venetoclax+azacitidine treatment also decreased glutathionylation of sdhA, as shown in the middle panel of FIG. 52. This resulted in a correlated reduction in ETC complex II activity, as shown in the right panel of FIG. 52.

Furthermore, FIG. 53 shows that pretreatment of leukemic cells with cell permeable glutathione increased intracellular glutathione even in the presence of venetoclax+azacitidine. Cell permeable glutathione also induced a partial rescue of ETC complex II activity upon venetoclax+azacitidine treatment, as shown in the right panel of FIG. 52.

Succinate levels were measured in the samples treated with venetoclax+azacitidine in vitro. FIG. 53 shows that an increase in intracellular succinate was observed, consistent with a loss of glutathione. Pretreatment with cell permeable glutathione completely restored succinate to normal levels demonstrating a reciprocal relationship between glutathione and succinate in cells treated with venetoclax+azacitidine. These data suggest decreased glutathione levels from venetoclax+azacitidine are responsible for reduced ETC complex II activity.

To determine the impact of glutathione reduction on OXPHOS, OXPHOS activity in ROS-low LSCs after pretreatment with cell permeable glutathione followed by venetoclax+azacitidine was measured. As shown in the right panel of FIG. 52, venetoclax+azacitidine decreased OXPHOS in LSCs. However, pretreatment with cell permeable glutathione partially rescued OXPHOS levels upon venetoclax+azacitidine treatment, as shown in FIG. 55. Furthermore, pretreatment with cell permeable glutathione partially rescued the reduction in ATP levels after venetoclax+azacitidine treatment in LSCs, as shown in FIG. 56. It was also observed that Cell permeable glutathione pretreatment partially rescued cell viability upon venetoclax+azacitidine treatment, as shown in FIG. 57.

The decreases in sdhA glutathionylation, ETC complex II activity, OXPHOS, and ATP levels only occurred upon treatment with both venetoclax+azacitidine, and not with either agent individually. Furthermore, venetoclax+azacitidine resulted in the synergistic induction of cell death in 5 of 6 primary AML, specimens tested. However, venetoclax or azacitidine alone can increase ROS levels and the ROS levels induced by venetoclax+azacitidine are not significantly higher than that seen with the individual agents. Overall, these findings demonstrate that the combination of venetoclax+azacitidine decreases OXPHOS via disruption of ETC complex II in a glutathione-dependent fashion, resulting in the selective targeting of the LSC population.

Example 15—LSCs Have Higher Expression of FIS1 and Distinct Mitochondrial Morphology RNA sequence analysis of ROS-low LSCs shows a trend toward increased expression of many mitochondrial dynamics regulators, including FIS1, TBC1D15, PINK1, MFF, MiD49, and MiD51. Among the genes known to regulate mitochondrial dynamics, FIS1 shows the clearest and most consistent differential expression in comparison with the ROS-high non-LSC population.

To test if FIS1 activity is elevated in LSCs and whether this activity may drive a distinct state of mitochondrial dynamics as a component of LSC growth and survival, ROS-low LSCs and ROS-high AML blasts were isolated from AML patient samples. As shown in FIG. 58, subsequent analysis showed that both mRNA and protein expression of FIS1 are significantly higher in LSCs relative to non-LSCs. Given the role of FIS1 in mitochondrial dynamics, the mitochondrial morphology in LSCs versus non- LSCs was examined using confocal and transmission electron microscopy (TEM). For confocal studies, mitochondria and nuclei of freshly sorted LSCs and non-LSCs were labeled with the mitochondrial dye Mito-Tracker and the DNA dye DAPI. As shown in FIG. 59, compared with non-LSCs, LSCs demonstrate a significantly lower mitochondrial to nuclear area ratio, suggesting that they have less mitochondrial content. In addition, the majority of mitochondria in LSCs are located in a single compact crescent-shaped area, whereas non-LSCs show a distinctly more diffuse labeling pattern. To further investigate mitochondrial morphology at individual mitochondrion resolution, TEM was performed on freshly isolated LSC and non-LSC populations. As shown in FIG. 60, The TEM images revealed that the cross-sections of mitochondria in LSCs consistently demonstrate a significantly smaller area compared with non-LSCs, suggesting that LSC mitochondria have a smaller volume. Together, these data indicate that AML LSCs have a unique mitochondrial morphology indicative of a distinct state of mitochondrial dynamics relative to non-LSCs.

Example 16—Inhibition of FIS1 Disrupts Mitochondrial Dynamics in LSCs and AML Blasts To test whether FIS1 is responsible for the distinct mitochondrial morphology, shRNA-mediated knockdown studies in both the AML cell line MOLM-13 and primary AML cells were performed to examine the effect of FIS1 loss on mitochondrial dynamics. As shown in FIG. 61, FIS1-depleted MOLM-13 cells have significantly increased mitochondrial content relative to control cells. To determine if the increased mitochondrial content in FIS1-depleted AML cells is caused by a deficient state of mitophagy, mitophagy was induced in the FIS1-depleted and control cells using the mitochondrial stress inducer valinomycin. Although control cells responded to valinomycin treatment with loss of mitochondria, the shFIS1 cells further accumulated mitochondrial content, indicating an inability to perform efficient mitophagy in response to mitochondrial stress, as shown in the right panel of FIG. 61. Expression of PINK1, a kinase stabilized upon mitophagy activation and involved in the clearance of damaged mitochondria was also measured. Although control cells had increased PINK1 expression upon valinomycin treatment, shFIS1 cells showed no change in PINK1 level despite the same insult, as shown in FIG. 62. These data indicate that FIS1-depleted AML cells are unable to activate mitophagy upon mitochondrial stress increase.

shFIS1 knockdown studies were also performed in primary human AML cells. In primary human AML cells, a reduction of FIS1 also induced accumulation of mitochondria. As shown in FIG. 63, this led to a significant increase in the mitochondrial to nuclear area ratio in AML 1 and AML 7. In addition, depletion of the known mitophagy regulators PINK1 and TBC1D15 reproduced the same mitochondrial accumulation phenotype in shFIS1 AML cells, further indicating that FIS1 in regulates mitophagy in LSCs. The mitophagy defect phenotype is distinctly different from a fission defect phenotype observed in shDRP1 MOLM-13 and primary AML cells, where longer and more thread-like mitochondria are prevalent. shFIS1 primary AML cells recapitulated the diffuse mitochondrial distribution phenotype seen in non-LSCs, where FIS1 expression is low.

To determine whether primary AML cells with a higher expression of FIS1 have increased mitophagy activity, valinomycin treatment experiments were performed on freshly sorted LSCs and non-LSCs from human AML specimens. Consistent with the knockdown experiments, LSCs also responded to valinomycin treatment with efficient clearance of mitochondria, whereas non-LSCs showed further accumulation of mitochondrial mass, as shown in FIG. 64.

These data demonstrate that FIS1 regulates the mitochondrial dynamics of leukemic cells, largely through mitophagy, and suggest the model shown in FIG. 65. LSCs or AML cells expressing higher levels of FIS1 possess fewer mitochondria and show localization to a defined region of the cell. In contrast, non-LSCs or AML cells engineered to reduce FIS1 expression have increased mitochondrial mass and a more diffuse mitochondrial morphology. Elevated FIS1 expression in LSC populations mediates increased mitophagy activity, whereas non-LSCs with less FIS1 expression are inefficient in mitophagy, resulting in further accumulation of mitochondria under stress conditions.

Example 17—Loss of FIS1 Impairs Stem and Progenitor Potential of LSCs

To determine the functional role of FIS1 and other mitophagy regulators in AML stem and progenitor cells, knockdown of FIS1, TBC1D15, and PINK1 was performed in both the MOLM-13 cell line and primary AML specimens. As shown in FIG. 66, depletion of FIS1 using shRNA strongly reduced the colony-forming ability of MOLM-13 and primary AML cells. In addition, shRNA-mediated knockdown of TBC1D15 and PINK1 also caused a significant loss of colony-forming ability in these specimens, suggesting that mitophagy in general might be required for the stem and progenitor potential of AML. To directly assess the role of FIS1 in LSC growth and survival, xenograft studies using shFIS1-transduced MOLM-13 and primary AML specimens were performed. Importantly, given the known heterogeneity of LSCs, knockdown studies were performed using unfractionated primary AML specimens to avoid any possible bias that may be introduced using a subpopulation of cells defined using a specific phenotype (e.g., CD34+, ROS-low, etc.). As shown in FIG. 67, loss of FIS1 almost completely abolished the engraftment ability of MOLM-13 and AML specimens in immune-deficient mice. This depleting effect was evident in both primary and secondary transplantation assays, indicating that FIS1 is required for LSC self-renewal potential. Finally, CRISPR/Cas9-mediated disruption of the FIS1 gene also significantly impaired both the colony-forming and engraftment ability of MOLM-13 cells, corroborating the results obtained with shRNA approaches. Together, these findings indicate a central role of FIS1 in the maintenance of LSC populations.

Example 18—FIS1 Loss Attenuates Erythropoiesis Without Affecting Normal HSPC Engraftment Ability To investigate the role of FIS1 in normal hematopoiesis, CD34+ normal cord blood mononuclear cells (CBMCs) and peripheral blood mononuclear cells (PBMCs) were isolated from healthy donors and subjected to FIS1 knockdown using the same shRNA strategy employed for AML studies (see Examples 16-17). FIS1-depleted CD34+ cells had negligible change in their mitochondrial mass compared with control cells, indicating that FIS1 is largely dispensable in the regulation of mitochondrial morphology in normal HSPCs. In contrast to the mitochondrial loss phenotype seen in valinomycin-treated AML, the same treatment induced mitochondrial accumulation in both control and shFIS1 CD34+ cells, indicating a slower rate of mitophagy in normal HSPCs. To determine the effect of FIS1 loss on the stem and progenitor potential of normal HSPCs, analysis of colony-forming ability was performed. The analysis showed two notable phenotypes. As shown in FIGS. 68 and 69, although the number of burst-forming unit-erythroid colonies (BFU-E) was markedly reduced, the size and morphology of BFU-Es were normal. In contrast, granulocyte/macrophage myeloid colonies (CFU-G/M) were more abundant and much larger upon FIS1 depletion, as shown in FIGS. 68 and 69. As a result of this lineage skewing, FIS1 depletion substantially increased the proportion of CFU-G/M colonies compared with the control, as shown in FIG. 70. Together, these data indicate that FIS1 loss predisposes normal hematopoietic progenitors to favor myelopoiesis over erythropoiesis. Furthermore, analysis of FIS1 expression during normal human hematopoiesis in the publicly available dataset GSE24759 shows that, among all stages of normal hematopoiesis, the expression of FIS1 is highest in the erythroid lineage.

To measure the effect of FIS1 loss in the HSC compartment, xenograft assays were performed to measure the engraftment ability of normal CD34+ PBMCs transduced with control versus shFIS1 vectors. A level of FIS1 knockdown comparable with AML experiments was achieved. The engraftment efficiency of total human cells in recipient mice was 14%±18% (n=15) 12 weeks post-transplant. As shown in FIG. 71, FIS1 knockdown caused a modest loss of engraftment potential (about 3-fold). This is in sharp contrast to the 50- to 350-fold drop in relative engraftment potential seen in primary AML cells. Together, these data indicate that the functional role of FIS1 is critical to survival and self-renewal of AML LSCs but that its role in normal mitochondrial morphology and self-renewal is much more subtle.

Example 19—Loss of FIS1 Induces GASK3 Inhibition and Myeloid Differentiation

To determine the mechanism underlying shFIS1-induced loss of stem and progenitor potential in AML, two independent RNA-seq experiments to characterize global gene expression changes induced by shFIS1 were performed in MOLM-13 and a cohort of 3 primary AML specimens. Gene set enrichment analysis (GSEA) identified that FIS1 loss in both MOLM-13 and primary AML specimens strongly enriches a list of gene sets representing inactivation of GSK3 signaling in leukemic cells. As shown in FIG. 72, these gene sets include the WANG_GSK3I_SB216763 gene set, which is generated by treating human leukemia cell line RS4; 11 cells with the GSK3 inhibitor SB216763. The list also includes the BANERJI_GSK3A_KD and BANERJI_GSK3B_KD gene sets, which are produced by specifically knocking down GSK3A and GSK3B in leukemic cell line MOLM-14 cells. GSK3A and GSK3B are inactivated by phosphorylation at S21 and S9, respectively. To confirm GSK3 inactivation, phospho-S21-GSK3A and phospho-S9-GSK3B levels in AML cells following FIS1 depletion using both shRNA and CRISPR/Cas9 strategies was measured. As shown in FIG. 73, both MOLM-13 and primary AML cells with depleted FIS1 expression showed elevated phospho-S21-GSK3A and phospho-S9-GSK3B, indicating that GSK3 inactivation occurs as a result of losing FIS1.

Furthermore, shFIS1-induced GSK3 inactivation enriches the KEGG_HEMATOPOIETIC_CELL_LINEAGE gene set and induces global upregulation of many hematopoietic lineage markers, including CD33, CD22, CD14, and CD11b. As shown in FIG. 74, flow cytometry analysis verified a strong increase in the myeloid differentiation marker CD11b in FIS1-depleted MOLM-13 cells grown in culture and methylcellulose and engrafted in immune-deficient mice. As shown in FIG. 75, knockdown of other mitophagy regulators, such as TBC1D15 and PINK1, also strongly upregulated CD11b expression, indicating that inhibition of mitophagy activity in general can trigger myeloid differentiation in AML. Finally, Giemsa staining revealed that FIS1-depleted MOLM-13 and primary AML cells displayed crumpled cytoplasmic membranes, nuclear condensation, and a decreased nuclear to cytoplasmic area ratio, indicative of clear myeloid differentiation. Despite a strong global upregulation of hematopoietic lineage genes, no significant changes in histone H3K27ac marks, an event often associated with activation of gene expression during stem cell differentiation was detected.

To determine whether GSK3 inhibition is required for the differentiation phenotype seen in FIS1-depleted leukemic cells, genetic rescue experiments were performed. GSK3B wild-type (GSK3B-WT) or GSK3B-S9A alleles were successfully expressed in combination with or without shFIS1 knockdown in MOLM13 cells, as shown in FIG. 76. The GSK3B-S9A allele cannot be inhibited through phosphorylation of its Ser9 residue; thus, is commonly used as a constitutively active allele of GSK3B. As shown in FIG. 77, coexpression of the GSK3B-S9A but not the GSK3B-WT allele suppressed the shFIS1-induced CD11b increase, suggesting that the shFIS1-induced differentiation phenotype is mediated, at least in part, by GSK3B inactivation. Expression of the GSK3BS9A allele, however, did not rescue shFIS1-induced CFU loss, suggesting that multiple mechanisms exist downstream of FIS1 that control the stem and progenitor potential of AML in addition to GSK3B. Last, expression of the constitutively active GSK3B-S9A allele failed to rescue the shFIS1-induced mitochondrial accumulation phenotype, indicating that GSK3B inactivation is likely downstream of the shFIS1-induced mitophagy defect event.

Example 20—FIS1 Loss Induces Cell Cycle Arrest in AML Samples

FIS1 loss in both primary AML specimens and MOLM-13 cells acted to strongly modulate cell cycle activity. As shown in FIG. 78, cell cycle inhibition is clearly evident from GSEA analysis of multiple cell cycle-related gene sets. Additionally, comparative analysis of control versus FIS1 knockdown showed a trend toward global inhibition of many representative cell cycle-related genes at all major stages (G1, G1/S, S, G2/M, and M) upon FIS1 loss, as shown in FIG. 79. The consequence was substantially reduced cell cycle activity, as shown by Ki-67/DAPI staining, as shown in FIGS. 80 and 81, and a significantly lower in vitro proliferation rate, as shown by cell count in primary AML cells, as shown in FIG. 82. Together, these data indicate that the strong effect of FIS1 loss on the stem and progenitor potential of AML is related to its downstream GSK3 inactivation and cell cycle arrest effects.

Example 21—AMPK Signaling Regulates FIS1 Activity in LSCs

To determine if AMPK signaling regulates the activity of FIS1 in human LSCs as a means to manage mitochondrial stress, the activity of AMPK signaling in freshly sorted ROS-low LSCs versus ROS-high non-LSCs was measured. As shown in FIG. 83, AMPK was constitutively activated in LSC relative to non-LSC populations, indicating that AMPK may play an important role in human LSCs. To directly test whether AMPK is upstream of FIS1, the AMPKa1(PR-KAA1) subunit was knocked down in both MOLM-13 and primary AML cells and the subsequent expression of FIS1 measured. As shown in FIG. 84, knockdown of AMPKa1 resulted in significant FIS1 mRNA and protein loss, indicating that AMPK is upstream of FIS1.

As a regulator of energy metabolism, modulation of AMPK activity is expected to have numerous downstream effects. To measure how much the downstream effects of AMPK loss overlap with FIS1 loss, AMPK was knocked down using shRNA (shAMPK) in primary AML cells. As shown in FIG. 85, shAMPK primary AML cells display a mitochondrial accumulation phenotype similar to that observed for FIS1 knockdown. These data indicate that AMPK is an upstream regulator of FIS1 in AML cells and that inhibition of AMPK largely recapitulate the biological effects of FIS1 loss in AML.

RNA-seq experiments were performed to characterize global gene expression changes induced by AMPKa1 knockdown in primary AML cells. Using a minimal p value of 0.05, a list of significantly downregulated genes induced by shAMPKa1 was identified. As shown in FIG. 86, the genes identified significantly overlap with the shFIS1 gene expression profiles obtained from both the primary AML cohort and MOLM-13 cells, indicating that AMPK loss indeed largely recapitulates the biological effects of FIS1 loss in AML.

To assess the effect of AMPK loss on AML LSC function, the engraftment ability of AML cells following shRNA-mediated depletion of AMPKa1 was measured in immune-deficient mice. As shown in FIG. 87, upon knockdown of AMPKa1, both MOLM-13 cells and primary AML specimens show greatly reduced engraftment potential. AMPK depleted primary AML cells show further loss of engraftment potential in secondary transplantation assays, indicating that AMPK loss, like FIS1 depletion, can also impair long-term LSC potential. Together, these data demonstrate that AMPK regulates the activity of human AML LSCs and indicate that the mechanism involves downstream modulation of FIS1 activity.

Example 22—Phenotype of Emergent CSCs

Bone marrow samples from high risk Myelodysplastic syndrome (MDS) patients were analyzed using mass cytometry and flow cytometry to perform a high-dimensional analysis of cell surface antigens. This analysis confirmed the presence of a CD123+ population in the primitive compartment of the samples. The left panel of FIG. 88 shows a high-dimensional representation of CD34 expression in a MDS sample. The left panel of FIG. 88 shows clustering of independent populations based on the measured expression of 14 different cell surface markers (including CD34, CD38, CD123, CD90, CD45, RPL5, CD3, CD14, CD16, CD19, CD20 and CD56). CD34 is expressed in a number of these heterogeneous subpopulations. The boxed subpopulations in the left panel of FIG. 88 exhibit the CD34+/Lin– phenotype that is typically associated with stem cells. The right panel of FIG. 88 shows the expression of CD123 in the CD34+/Lin– (primitive) compartment. However, the expression level of CD123 varies widely even within this subpopulation, indicating stem cells can further be subdivided into multiple phenotypically distinct subpopulations. The CD123+ population in the primitive subpopulations also overlapped with traditional HSC markers such as CD90. Spanning-tree Progression Analysis of Density-normalized Events (SPADE) showed that cell populations that were CD123+ fit into a traditional HSC definition of Lin–/CD34+/CD38–/CD90+.

While there were other subpopulations exhibiting CD123 positivity, these populations can be defined as more common myeloid progenitor (CMP) or granulocyte-monocyte progenitor (GMP). As shown in FIG. 89, analysis of MDS patient samples using conventional flow cytometry corroborated the presence of a CD123+ subpopulation within the primitive compartment (Lin–/CD34+/CD38–) of high-risk specimens, but not in low risk MDS patients. As shown in the right panel of FIG. 89, significant differences were found in the mean fluorescent intensity between low-risk and high-risk patients. As shown in the middle panel of FIG. 89, CD123 expression was variable in the high-risk patients. Furthermore, the frequency of the CD123+ subpopulation was variable amongst patients across the total marrow, frequency of blasts, and frequency in the CD34+/CD38– primitive cells. Expression of the only other known MDS stem cell marker, CD99, was increased in CD34+/CD38–/CD123+ cells.

Together, these data indicate that CD123 is upregulated in the stem cell compartment during progressive stages of MDS evolution.

To further investigate the role of the CD123+ subpopulation in the progression of MDS, sorted CD123+ cells from the Lin–/CD34+/CD38– compartment (hereafter termed "stem cells") of three high-risk MDS specimens were isolated and subjected to whole-transcriptomic analysis. For comparison, CD123– cells in the primitive compartment and whole bone marrow mononuclear cells were also evaluated. As shown in FIG. 90, among the most strongly upregulated individual genes in the CD123+ population were HOXA9, MN1, and SMO. HOXA9 has been studied extensively in AML and has been shown to be overexpressed in CD34+ cells of MDS patients and is known to play a role in leukemogenesis and transformation. MN1 has also been shown to play a role in AML and has been correlated to poor response and decreased survival. It has a role in the cell of origin of AML through the control of histone methyltransferases and creating a block in differentiation and inducing proliferation. SMO has been shown to play a role in sensitivity to 5-azacytidine in MDS. An RNAi screen showed knockdown of SMO in combination with 5-azacytidine led to increased cytotoxicity.

To probe global and pathway differences between CD123+ and CD123– cells, gene set enrichment analysis (GSEA) was performed. These results were compiled into the enrichment map shown in FIG. 91. The algorithm clusters gene sets to show functional groups as a collection of nodes. These nodes are grouped and annotated by their major phenotypic characteristics. In comparing CD123+ and CD123–, there were clear differences in multiple functions. In CD123+ cells there were increases in translation, IL-1 signaling and inflammation, and interferon signaling in contrast to changes in mitotic signaling and heme biosynthesis in CD123– cells. Differences in IL1RAP levels in MDS specimens with chromosome 7 alterations was observed. However, the differences in IL1 signaling was not due to IL1RAP expression alone as there were no differences between CD123+ and CD123– subpopulations.

As shown in FIG. 92, these node clusters were further examined in CD123+ cells (top row) and CD123– cells (bottom row). This analysis showed the KEGG Ribosome pathway as the most strongly upregulated gene set in CD123+ cells versus CD123– stem cells. The ribosomal subunits were almost globally overexpressed in the CD123+ cells. Many of these subunits contribute to the assembly of the large and small ribosomal subunits and protein production. One of the top hits, RPL5, showed significantly increased expression in the CD123+ compartment of the primitive compartment of a high-risk MDS patient in comparison to the CD123− compartment and the primitive compartment (Lin−/CD34+/CD38−) of normal bone marrow.

These results demonstrate differential expression of ribosomal genes in primitive CD123+ MDS cells and indicate a fundamental change in the physiology of malignant stem cells concomitant with expression of CD123.

Additional gene sets found in the enrichment analysis represent known AML LSC targets including the JAK-STAT pathway and interestingly the spliceosome pathway. Upregulation of STAT3 signaling was observed, although the upregulation was not directly related to increased STAT3 levels. Gene-set enrichment and a small but significant increase in STAT3 Serine 727 phosphorylation was observed. An enrichment for the REACTOME_ACUTE_MYELOID LEUKMIA gene set in the CD123+ subpopulation was observed. Collectively, the gene expression changes observed in the CD123+ subpopulation are consistent with transformation to AML.

The upregulation of the translation gene sets indicates a potential for increased protein synthesis in the CD123+ stem cell population. To further investigate changes in translational activity, protein synthesis levels were measured by culturing cells with a fluorescent substrate known as OP-puro, which is incorporated into newly synthesized polypeptide chains and can be quantified as a measure of overall protein synthesis activity.

As shown in FIG. 93, this method revealed that CD123+ stem cells exhibited markedly higher levels of protein translation in 12 separate patient samples. As shown in FIG. 94, while the overall translation rates were variable there was a significant increase in translation rates between Lin−/CD34+/CD38−/CD123+ and Lin−/CD34+/CD38−/CD123− cells.

An increase in translation rates in the CD123+ subpopulation as compared to lymphocytes was also observed, as was similar translation rates as compared to monocytes in MDS patient specimens. As shown in FIG. 95, cell cycle analyses demonstrated virtually identical profiles for the CD123+ and CD123− populations, with both largely in the G0 phase of the cell cycle (84% in CD123+ vs. 88% in CD123−) for eight independent patient specimens. Thus, the malignant stem cell population retains a mostly quiescent phenotype, similar to normal HSCs.

Example 23—Metabolic Characteristics of CD123+ MDS Stem Cells

To characterize the cellular metabolism of MDS stem cells, CD34+/CD123+, CD34+/CD123−, and Lin− cells from primary high-risk MDS specimens were sorted and LC-MS metabolomic analyses was performed. As shown in FIG. 96, principle component analysis of the metabolomics analyses showed that the malignant stem cell compartment is biologically distinct from bulk cells. These data indicated a fundamentally different physiology for the stem cell population. As show in FIG. 97, in comparing the CD123+ vs. CD123− stem cell subpopulations, a strong upregulation of protein synthesis and RNA transcription was observed. The enrichment of protein synthesis and RNA transcription in CD123+ populations was also evidenced by increases in the majority of amino acids detected by mass spectrometry analysis. Energy metabolism was also distinct in the CD123+ MDS cells. The third, fifth, and sixth most enriched pathways were related to oxidative phosphorylation and the citric acid cycle. FIG. 98 shows the individual metabolites contributing to these pathways that were increased in the CD123+ subpopulation. These metabolites included multiple components of the TCA cycle (e.g., L-glutamate, citrate, L-glutamine, succinate, malate). In addition, increased components of glutathione metabolism (e.g., S-glutathionyl-L cysteine and glutathione disulfide) were observed. Notably, as shown in FIG. 99, the analysis of the MDS specimens showed a ROS-low phenotype for primitive cells in 7 patient samples (Lin−/CD34+/CD38−/CD123+). Thus, increased glutathione metabolism as stem cells transition to more acute stages of malignancy may be important for maintaining a ROS-low status and therefore conditions conducive to self-renewal or related stem cell function.

Example 24—Targeting Unique Metabolic Properties of MDS Stem Cells

Strategies involving inhibiting protein translation were investigated as a means of improving therapeutic outcomes for MDS through the targeting of pathways deregulated in the CD123+ MDS stem cell compartment. A reagent grade compound, anisomycin was tested. Anisomycin is known to inhibit protein translation and induce "ribotoxic stress". As shown in FIG. 100, Anisomycin showed selective killing of CD34+/CD38−/CD123+ cells at 200 nM and 400 nM, indicating that primary MDS cells with elevated protein synthesis were indeed susceptible to drugs of this class.

Next, the drug omacetaxine mepesuccinate was tested. Omacetaxine is a protein synthesis inhibitor which is FDA approved. As shown in FIGS. 101-103, omacetaxine specifically targeted CD123+ cells in multiple patient samples and was effective at decreasing protein translation levels. FIG. 100 shows that Omacetaxine was also preferentially active against the CD123+ stem cell compartment.

The drug azacitidine was also tested. As shown in FIGS. 102-103, little activity for this agent towards the MDS stem cell population was observed with no significant decreases in viability in CD123+ cells and no differential toxicity between CD123+ vs. CD123− in seven high-risk MDS patient specimens.

The second major phenotype found to be deregulated in CD123+ cells was oxidative phosphorylation and redox status. Thus, the ability of the BCL-2 inhibitor ABT-199 (venetoclax) to preferentially eliminate MDS stem cells was tested. As shown in FIG. 104, ABT-199 alone showed preferential toxicity to CD123+ cells, albeit with varying degrees of efficacy. As shown in FIG. 102, the single drug resistance to venetoclax found in certain patient samples was overcome with the combination of a protein translation inhibitor (anisomycin or omacetaxine). Thus, the combination of inhibiting protein synthesis and BCL2-mediated events showed enhanced and selective targeting of CD123+ MDS stem cells.

Treatment of primary MDS cells with either venetoclax or omacetaxine alone impairs mitochondrial respiration. However, as shown in FIG. 105, the combination of venetoclax and omacetaxine is markedly superior, with clear inhibition of basal oxygen consumption, maximal respiration, and ATP production. An additional component of the efficacy observed with combined ABT-199 and omacetaxine may involve suppression of MCL-1 as increased MCL-1 expression in CD34+/CD123+ MDS cells was observed. Resistance to BCL-2 inhibition can be overcome via treatment with protein synthesis inhibitors, which down-regulate expression of MCL-1.

Neither the combination of omacetaxine and ABT-199 or omacetaxine and azacitidine had a significant effect on normal primitive cells in vitro. As shown in FIG. 102, there were no significant changes in CD34+ viability of mobilized normal peripheral blood. Little toxicity in CD34+/CD38− cells was observed.

These data from in vitro culture of primary MDS specimens with varying drug combinations indicate that inhibition of both protein translation and oxidative phosphorylation mediates effective targeting of MDS stem cells.

Example 25—Xenograft Modeling to Target MDS Stem Cell Metabolism

To further evaluate the clinical potential of various agents for targeting of MDS stem cells, an in vivo patient bone marrow derived xenograft model of MDS was developed. The system employed the use of primary MDS specimens transplanted into immune deficient NSG-S mice. In the context of high-risk disease, highly significant engraftment (~50-80% of bone marrow cells) was achieved. FIG. 106 shows representative plots of the human CD45 staining of mouse marrow post-engraftment from four separate primary human MDS specimens. As shown in FIG. 107, the immunophenotype of these four specimens was further analyzed with respect to CD34/CD38 and CD123 expression. FIG. 108 shows an analysis pre- and post-transplant for a primary human MDS specimen.

Genotyping of marrow cells isolated post-transplant (analyzed in total human cells as well as lineage− and CD34+/CD123+ populations) showed an allelic frequency for a diagnostic IDH2 mutation at 39.8-43.0%, virtually identical to the allele frequency in the pre-transplant specimen (43.06%). These data indicated that the malignant cells were effectively maintained in the xenograft environment. Subsequent phenotypic analysis showed that the CD123+ subpopulation of MDS/AML stem cells demonstrated more efficient and robust engraftment, indicating that CD123+ cells represent a more aggressive or AML-like stage of disease. As shown in FIG. 108, the Lin− compartment increased about 2-fold, the more primitive compartment (Lin−/CD34+/CD38−) increased approximately 4-fold (4.4-16.6%) and the CD123+ subpopulation of the stem cell population increased approximately 7-fold (1.6-12.3%) in comparing pre to post engraftment cell populations. As shown in FIG. 109, histological analysis of the marrow of engrafted mice showed residual evidence of MDS-like cells, but predominantly a blast-like phenotype, consistent with transition to more malignant disease. As shown in FIG. 110, examination of protein translation in human CD45+/Lin−/CD34+/CD38−/CD123+ MDS stem cells (isolated post-engraftment) showed a significant increase over the human CD45+/Lin−/CD34+/CD38−/CD123− cells. Similar differential translation rates of mature cells in the patient xenografts to Lin+ cells in patient specimens were also found. The robust engraftment, immunophenotype, mutational background, and blast-like phenotype were very similar to previously described AML xenograft studies, and indicating that these engraftments represent a model of a transitional stage of pathogenesis that spans advanced MDS and possibly extends to early AML-like disease.

The xenograft model was used to test the agents found to selectively target CD123+ cells in vitro in Example 24. Xenografts established using specimens from three independent high-risk MDS patients were used. Drug treatments included single agent therapy with omacetaxine, venetoclax (ABT), azacitidine, the combination of omacetaxine and venetoclax, or the combination of omacetaxine and azacitidine. To evaluate overall drug activity, the reduction of total human hematopoietic cells was measured using the CD45 (pan-hematopoietic) antigen as a marker. As shown in FIG. 111, single agent toxicity of omacetaxine for human CD45+ cells was observed in two of the engraftment models. Single agent toxicity of venetoclax and azacitidine for human CD45+ cells was also observed in one engraftment model. Next, drug activity in the stem cell compartment was monitored by gating on the CD34+/CD38−/CD123+ subpopulation. As shown in FIG. 112, single agent toxicity of omacetaxine was observed for 2 of 3 engraftment models in the more primitive cells. Each xenograft had a greater than or equal to 50% reduction in CD34+/CD38−/CD123+ cells with one xenograft having more than an 80% reduction in these cells. Thus, omacetaxine showed considerable single agent activity, when analysis was performed specifically within the primitive population. An examination of translation rates shows the xenograft with the least single agent efficacy correlated to the lowest translation rate in the MDS stem cells upon engraftment. The protein translation rate as measured by op-puro staining of CD123+ cells isolated from xenografted mice was ~25% less in the single agent insensitive patient xenograft. Significantly improved targeting was achieved using a combination of omacetaxine and venetoclax or azacitidine, where effective elimination of both hCD45+ and CD34+/CD38−/CD123+ cells was observed (3 of 3 xenograft models responded to the omacetaxine+venetoclax combination, and 2 of 2 xenograft models responded to the omacetaxine+azacitidine combination). Notably, in xenograft model one, the combination therapies overcame the low single agent toxicity to eliminate the CD34+/CD38−/CD123+ cells almost completely. The potent eradication of MDS stem cells is in stark contrast to a lack of significant toxicity in parallel xenograft studies performed using normal human CD34+ cells.

As shown in FIG. 113, xenograft models treated with either a combination of omacetaxine and azacitidine or omacetaxine and venetoclax showed very little effect in bulk cells and no significant effect in the CD34+/CD38− cells. To further explore the slight reduction in total CD45+ cells, total CD34+ cells, CD19+ cells (B cell lineage) and CD33+ cells (myeloid lineage) were examined. For the omacetaxine and venetoclax regimen, an approximately two-fold reductions in all compartments tested was observed. For omacetaxine and azacitidine, there was no significant loss of CD34+ cells, and only a slight loss of CD19+ cells. A small enrichment in CD33+ cells suggested a selection for myeloid cells over the 2 week treatment. As shown in FIG. 114, in support of protein synthesis as the central mechanism of cell death, residual MDS cells recovered from treated MDS xenograft mice demonstrated reduced labeling with OP-puro. The toxicities found in normal xenografts correlated with translation rates of normal BM. Decreased translation rates in CD34+/CD38− cells were observed and no significant toxicity to either drug regimen in vivo was detected. Increased translation in the Lin+ and Lin−/CD34+ in normal BM and a corresponding small increase in toxicity for these populations in the normal xenografts was also observed.

These data indicate that the combination therapy of venetoclax and omacetaxine and the combination therapy of omacetaxine and azacitidine can be used to eliminate particular stem cells, including CSCs.

Example 26—Targeting Nicotinamide Metabolism to Induce Cell Death in Cancer Stem Cells To determine if nicotinamide metabolism is important in LSC survival, particularly in the context of relapsed disease, LSCs were first isolated from de novo AML and relapsed AML patients and analyzed. As shown in FIG. 115, this analysis revealed that relapsed LSCs had significantly increased levels of nicotinamide compared to de novo LSCs. Nicotinamide is a precursor of NAD+, an essential coenzyme in energy metabolism. To test if relapsed LSCs are dependent on nicotinamide metabolism to maintain energy metabolism, nicotinamide metabolism was disrupted in LSCs using the small molecule APO866, which is an inhibitor of Nampt, the rate-limiting enzyme for conversion of nicotinamide to NAD+. APO866 treatment resulted in a significant decrease in NAD+ in LSCs isolated from both de novo and relapsed AML patient samples. However, as shown in FIG. 116, inhibition of nicotinamide metabolism via APO866 treatment only decreased viability and colony-forming ability of LSCs isolated from relapsed AML patients and not LSCs from de novo, untreated patients.

To verify that inhibition of Nampt was targeting functional LSCs, a relapsed AML patient sample was treated with APO866 for 24 hours and the ability of the leukemia cells to engraft into immune deficient mice was then measured. A significant reduction in leukemia engraftment upon APO866 treatment was observed. Importantly, inhibition of nicotinamide metabolism did not affect normal hematopoietic stem cell frequency or colony forming ability. These data suggest that inhibition of nicotinamide metabolism specifically targets relapsed LSCs.

To better understand the mechanism by which inhibiting nicotinamide metabolism targets relapsed LSCs, changes in OXPHOS and glycolysis activity in de novo and relapsed LSCs after APO866 treatment was measured. As shown in FIG. 117, upon APO866 treatment, a significant decrease in OXPHOS and OXPHOS capacity in relapsed LSCs but not de novo LSCs was observed. No change in glycolysis was observed. These data demonstrate that inhibition of nicotinamide metabolism targets OXPHOS specifically in relapsed LSCs.

To determine how APO866 reduced OXPHOS, stable isotope metabolic flux of amino acids, the fatty acid palmitate, and glucose into the TCA cycle after APO866 treatment was measured. An increased accumulation of citrate, malate, and α-ketoglutarate from amino acids and palmitate was observed, consistent with decreased activity of the NAD+ dependent enzymes isocitrate dehydrogenase, α-ketoglutarate dehydrogenase and malate dehydrogenase. As shown in FIG. 118, direct measurement of enzyme activity indicated that isocitrate dehydrogenase, α-ketoglutarate dehydrogenase and malate dehydrogenase activity were each significantly decreased upon APO866 treatment. No changes in glycolysis or glucose contribution to the TCA cycle was observed. Overall, these data suggest that inhibition of nicotinamide metabolism through Nampt inhibition results in decreased OXPHOS through decreased TCA cycle activity.

Example 27—Targeting LSCs and AML Using a Combination of Venetoclax+Azacitidine+Etomoxir As shown in FIG. 119, LSCs from relapsed patients were viable even after treatment with 500 nM venetoclax in combination with 2.5 µM azacitidine. As shown in FIG. 120, the activity of venetoclax/azacitidine treatment was directly related to the inhibition of OXPHOS, with resistant LSCs exhibited higher OXPHOS levels after treatment with venetoclax and azacitidine for four hours. Without wishing to be bound by theory, the failure to inhibit OXPHOS in venetoclax/azacitidine resistant LSCs indicate that energy metabolism dependencies are altered in patients with venetoclax/azacitidine resistant AML.

As shown in FIG. 121 and FIG. 122, venetoclax/azacitidine resistant LSCs compensate for amino acid loss by upregulating fatty acid levels. Venetoclax/azacitidine sensitive and resistant LSCs were subjected to 4 hours of amino acid depletion and treated with venetoclax and azacitidine. As shown in FIG. 121, analysis of the relative levels of fatty acids by mass spectrometry shows that venetoclax/azacitidine-resistant LSCs exhibit increased levels of fatty acids following treatment. Venetoclax/azacitidine sensitive and resistant LSCs were also subjected to 4 hours of amino acid depletion, after which they were incubated with $^{13}C_{16}$ palmitic acid and treated with venetoclax and azacitidine. As shown in FIG. 122, analysis of citrate levels shows that venetoclax/azacitidine resistant LSCs exhibit increased citrate levels, indicating that the metabolism of fatty acids into the TCA is greater in venetoclax/azacitidine resistant LSCs as compared to venetoclax/azacitidine sensitive LSCs.

In another set of experiments, LSCs obtained from de novo diagnosed AML patients and to LSCs obtained from relapsed AML patients were each incubated with $^{13}C_{16}$ palmitate for 1, 4 or 8 hours. The metabolism of the palmitate was then measured by mass spectrometry and the results are shown in FIG. 123. FIG. 123 shows that the relapsed LSCs exhibit increased palmitate metabolism into TCA cycle intermediates, indicating that relapsed/resistant LSCs exhibit altered fatty acid metabolism with increased flux of fatty acids into the TCA cycle.

Fatty acid metabolism is controlled by multiple genes and pathways, including the gene Carnitine Palmitolytransferase 1 (CPT1), which has a role in the beta-oxidation of long chain fatty acids. The Cancer Genome Atlas AML dataset was analyzed for CPT1 expression. The analysis indicated that higher expression of CPT1 leads to significantly worse overall survival. To evaluate whether CPT1 contributes to venetoclax/azacitidine resistance, venetoclax/azacitidine resistant LSCs were treated with either a vehicle control, venetoclax+azacitidine, etomoxir alone or a combination of venetoclax+azacitidine+etomoxir for four hours and the oxygen consumption rate of the LSCs was measured by seahorse assay. As shown in FIG. 124, treatment with venetoclax+azacitidine+etomoxir decreases OXPHOS in the venetoclax/azacitidine resistant LSCs. In another experiment, venetoclax/azacitidine resistant LSCs were treated with the vehicle control, venetoclax+azacitidine, etomoxir alone or a combination of venetoclax+azacitidine+etomoxir for 24 hours and the viability of the cells was assessed. As shown in FIG. 125, the venetoclax+azacitidine+etomoxir treatment dramatically decreased the viability of the venetoclax/azacitidine resistant LSCs, indicating that etomoxir potently sensitizes LSCs to venetoclax+azacitidine and the combination of venetoclax+azacitidine+etomoxir can be used to reduce LSCs and treat AML.

Etomoxir was further evaluated by treating a patient-derived xenograft (PDX) model. The PDX model was treated for 2 weeks with saline, venetoclax+azacitidine, etomoxir alone or a combination of venetoclax+azacitidine+etomoxir. FIG. 8 shows the leukemia burden in the PDX mice after two weeks of treatment. As shown in FIG. 126, PDX mice treated with venetoclax+azacitidine+etomoxir exhibited drastically reduced leukemia burden. Furthermore, as shown in FIG. 127, the treatment with venetoclax+azacitidine+etomoxir did not affect normal hematopoietic stem cells in the PDX mice. Finally, in another experiments, LSCs were treated with saline, venetoclax+azacitidine, etomoxir alone or a combination of venetoclax+azacitidine+etomoxir prior to engrafting in a mouse. As shown in FIG. 128, pretreatment with venetoclax+azacitidine+etomoxir drastically reduced engraftment potential of the LSCs. Thus, these results indicate that treatment with venetoclax+azacitidine+etomoxir can potently reduce LSCs and treat AML.

What is claimed is:

1. A method of treating acute myeloid leukemia (AML) in a patient in need thereof comprising administering to the patient a combination comprising venetoclax, azacitidine, and etomoxir.

2. The method of claim 1, wherein the combination is administered to the patient in an amount sufficient to induce cell death in leukemia stem cells in the patient.

3. The method of claim 1, wherein the venetoclax, azacitidine and etomoxir are administered to the patient concomitantly.

4. The method of claim 1, wherein the venetoclax, azacitidine and etomoxir are administered to the patient sequentially.

5. A method of treating AML in a patient in need thereof comprising administering to the patient a combination comprising venetoclax and etomoxir.

6. The method of claim 5, wherein the combination is administered to the patient in an amount sufficient to induce cell death in leukemia stem cells in the patient.

7. The method of claim 5, wherein the venetoclax and etomoxir are administered to the patient concomitantly.

8. The method of claim 5, wherein the venetoclax and etomoxir are administered to the patient sequentially.

9. A method of treating myelodysplastic syndrome (MDS) in a patient in need thereof comprising administering to the patient a combination comprising venetoclax and omacetaxine mepesuccinate.

10. The method of claim 9, wherein the combination is administered to the patient in an amount sufficient to induce cell death in MDS stem cells in the patient.

11. The method of claim 9, wherein the venetoclax and omacetaxine mepesuccinate are administered to the patient concomitantly.

12. The method of claim 9, wherein the venetoclax and omacetaxine mepesuccinate are administered to the patient sequentially.

* * * * *